US 12,282,168 B2

(12) United States Patent
Robinson et al.

(10) Patent No.: US 12,282,168 B2
(45) Date of Patent: Apr. 22, 2025

(54) ANAMORPHIC DIRECTIONAL ILLUMINATION DEVICE WITH SELECTIVE LIGHT-GUIDING

(71) Applicant: ReaID Spark, LLC, Boulder, CO (US)

(72) Inventors: Michael G. Robinson, Boulder, CO (US); Graham J. Woodgate, Henley-on-Thames (GB); Jonathan Harrold, Leamington Spa (GB); Austin Wilson, Tempe, AZ (US)

(73) Assignee: ReaID Spark, LLC, Boulder, CO (US)

( * ) Notice: Subject to any disclaimer, the term of this patent is extended or adjusted under 35 U.S.C. 154(b) by 0 days.

(21) Appl. No.: 18/232,048

(22) Filed: Aug. 9, 2023

(65) Prior Publication Data

US 2024/0061248 A1 Feb. 22, 2024

Related U.S. Application Data

(60) Provisional application No. 63/521,903, filed on Jun. 20, 2023, provisional application No. 63/447,977,
(Continued)

(51) Int. Cl.
*G02B 27/01* (2006.01)
*F21V 8/00* (2006.01)
(Continued)

(52) U.S. Cl.
CPC ....... *G02B 27/0172* (2013.01); *G02B 5/0825* (2013.01); *G02B 5/3083* (2013.01);
(Continued)

(58) Field of Classification Search
CPC .............. G02B 27/0172; G02B 5/0825; G02B 5/3083; G02B 6/0031; G02B 6/0055;
(Continued)

(56) References Cited

U.S. PATENT DOCUMENTS 1,128,979 A 2/1915 Hess
1,970,311 A 8/1934 Ives
(Continued)

FOREIGN PATENT DOCUMENTS

CN 1142869 A 2/1997
CN 1377453 A 10/2002
(Continued)

OTHER PUBLICATIONS

3M™M ePrivacy Filter software professional version; http://www.cdw.com/shop/products/3M-ePrivacy-Filter-software-professional-version/3239412.aspx?cm_mmc=ShoppingFeeds-_-ChannelIntelligence-_-Software-_-3239412_3MT%20ePrivacy%20Filter%20software%20professional%20version_3MF-EPFPRO&cpncode=37-7582919&srccode=cii_10191459#PO; Copyright 2007-2016.
(Continued)

*Primary Examiner* — Afroza Chowdhury
(74) *Attorney, Agent, or Firm* — Neil G J Mothew

(57) ABSTRACT

An anamorphic directional illumination device may provide a near-eye display apparatus or a vehicle external light device. The anamorphic near-eye display apparatus comprises a spatial light modulator with asymmetric pixels; an input transverse anamorphic lens; and an extraction waveguide that passes input light in a first direction between a polarization-sensitive reflector and front guide surface to a lateral anamorphic reflector, and to reflect the light back through the extraction waveguide to guide between the rear guide surface and front guide surface. Reflective extraction features are arranged to extract the reflected light towards the pupil of a viewer, maintaining the directionality of the fan of light rays from the spatial light modulator and anamorphic imaging system. A thin, transparent and efficient anamorphic display apparatus for Augmented Reality and
(Continued)

Virtual Reality displays and for scene illumination is provided.

62 Claims, 56 Drawing Sheets

Related U.S. Application Data filed on Feb. 24, 2023, provisional application No. 63/423,998, filed on Nov. 9, 2022, provisional application No. 63/402,571, filed on Aug. 31, 2022, provisional application No. 63/397,251, filed on Aug. 11, 2022.

(51) Int. Cl.
| | |
|---|---|
| *G02B 5/00* | (2006.01) |
| *G02B 5/08* | (2006.01) |
| *G02B 5/30* | (2006.01) |
| *G02B 13/12* | (2006.01) |
| *G02B 27/00* | (2006.01) |
| *G02B 27/28* | (2006.01) |
| *F21S 43/20* | (2018.01) |

(52) U.S. Cl.
CPC ......... *G02B 6/0031* (2013.01); *G02B 6/0055* (2013.01); *G02B 13/12* (2013.01); *G02B 27/0081* (2013.01); *G02B 27/288* (2013.01); *F21S 43/26* (2018.01)

(58) Field of Classification Search
CPC .. G02B 13/12; G02B 27/0081; G02B 27/288; F21S 43/26
See application file for complete search history.

(56) References Cited

U.S. PATENT DOCUMENTS

| | | |
|---|---|---|
| 2,133,121 A | 10/1938 | Stearns |
| 2,247,969 A | 7/1941 | Stewart |
| 2,480,178 A | 8/1949 | Zinberg |
| 2,810,905 A | 10/1957 | Barlow |
| 3,409,351 A | 11/1968 | Winnek |
| 3,715,154 A | 2/1973 | Bestenreiner |
| 4,057,323 A | 11/1977 | Ward |
| 4,528,617 A | 7/1985 | Blackington |
| 4,542,958 A | 9/1985 | Young |
| 4,804,253 A | 2/1989 | Stewart |
| 4,807,978 A | 2/1989 | Grinberg et al. |
| 4,829,365 A | 5/1989 | Eichenlaub |
| 4,914,553 A | 4/1990 | Hamada et al. |
| 5,050,946 A | 9/1991 | Hathaway et al. |
| 5,278,608 A | 1/1994 | Taylor et al. |
| 5,347,644 A | 9/1994 | Sedlmayr |
| 5,349,419 A | 9/1994 | Taguchi et al. |
| 5,459,592 A | 10/1995 | Shibatani et al. |
| 5,466,926 A | 11/1995 | Sasano et al. |
| 5,510,831 A | 4/1996 | Mayhew |
| 5,528,720 A | 6/1996 | Winston et al. |
| 5,581,402 A | 12/1996 | Taylor |
| 5,588,526 A | 12/1996 | Fantone et al. |
| 5,688,035 A | 11/1997 | Kashima et al. |
| 5,697,006 A | 12/1997 | Taguchi et al. |
| 5,703,667 A | 12/1997 | Ochiai |
| 5,727,107 A | 3/1998 | Umemoto et al. |
| 5,771,066 A | 6/1998 | Barnea |
| 5,796,451 A | 8/1998 | Kim |
| 5,808,792 A | 9/1998 | Woodgate et al. |
| 5,850,580 A | 12/1998 | Taguchi et al. |
| 5,875,055 A | 2/1999 | Morishima et al. |
| 5,896,225 A | 4/1999 | Chikazawa |
| 5,903,388 A | 5/1999 | Sedlmayr |
| 5,933,276 A | 8/1999 | Magee |
| 5,956,001 A | 9/1999 | Sumida et al. |
| 5,959,664 A | 9/1999 | Woodgate |
| 5,959,702 A | 9/1999 | Goodman |
| 5,969,850 A | 10/1999 | Harrold et al. |
| 5,971,559 A | 10/1999 | Ishikawa et al. |
| 6,008,484 A | 12/1999 | Woodgate et al. |
| 6,014,164 A | 1/2000 | Woodgate et al. |
| 6,023,315 A | 2/2000 | Harrold et al. |
| 6,044,196 A | 3/2000 | Winston et al. |
| 6,055,013 A | 4/2000 | Woodgate et al. |
| 6,061,179 A | 5/2000 | Inoguchi et al. |
| 6,061,489 A | 5/2000 | Ezra et al. |
| 6,064,424 A | 5/2000 | Berkel et al. |
| 6,075,557 A | 6/2000 | Holliman et al. |
| 6,094,216 A | 7/2000 | Taniguchi et al. |
| 6,108,059 A | 8/2000 | Yang |
| 6,118,584 A | 9/2000 | Berkel et al. |
| 6,128,054 A | 10/2000 | Schwarzenberger |
| 6,144,118 A | 11/2000 | Cahill et al. |
| 6,172,723 B1 | 1/2001 | Inoue et al. |
| 6,199,995 B1 | 3/2001 | Umemoto et al. |
| 6,219,113 B1 | 4/2001 | Takahara |
| 6,224,214 B1 | 5/2001 | Martin et al. |
| 6,232,592 B1 | 5/2001 | Sugiyama |
| 6,256,447 B1 | 7/2001 | Laine |
| 6,262,786 B1 | 7/2001 | Perlo et al. |
| 6,295,109 B1 | 9/2001 | Kubo et al. |
| 6,302,541 B1 | 10/2001 | Grossmann |
| 6,305,813 B1 | 10/2001 | Lekson et al. |
| 6,335,999 B1 | 1/2002 | Winston et al. |
| 6,373,637 B1 | 4/2002 | Gulick et al. |
| 6,377,295 B1 | 4/2002 | Woodgate et al. |
| 6,422,713 B1 | 7/2002 | Fohl et al. |
| 6,456,340 B1 | 9/2002 | Margulis |
| 6,464,365 B1 | 10/2002 | Gunn et al. |
| 6,476,850 B1 | 11/2002 | Erbey |
| 6,481,849 B2 | 11/2002 | Martin et al. |
| 6,654,156 B1 | 11/2003 | Crossland et al. |
| 6,663,254 B2 | 12/2003 | Ohsumi |
| 6,724,452 B1 | 4/2004 | Takeda et al. |
| 6,731,355 B2 | 5/2004 | Miyashita |
| 6,736,512 B2 | 5/2004 | Balogh |
| 6,798,406 B1 | 9/2004 | Jones et al. |
| 6,801,243 B1 | 10/2004 | Berkel |
| 6,816,158 B1 | 11/2004 | Lemelson et al. |
| 6,825,985 B2 | 11/2004 | Brown et al. |
| 6,847,354 B2 | 1/2005 | Vranish |
| 6,847,488 B2 | 1/2005 | Travis |
| 6,859,240 B1 | 2/2005 | Brown et al. |
| 6,867,828 B2 | 3/2005 | Taira et al. |
| 6,870,671 B2 | 3/2005 | Travis |
| 6,883,919 B2 | 4/2005 | Travis |
| 7,052,168 B2 | 5/2006 | Epstein et al. |
| 7,058,252 B2 | 6/2006 | Woodgate et al. |
| 7,073,933 B2 | 7/2006 | Gotoh et al. |
| 7,091,931 B2 | 8/2006 | Yoon |
| 7,101,048 B2 | 9/2006 | Travis |
| 7,136,031 B2 | 11/2006 | Lee et al. |
| 7,215,391 B2 | 5/2007 | Kuan et al. |
| 7,215,415 B2 | 5/2007 | Maehara et al. |
| 7,215,475 B2 | 5/2007 | Woodgate et al. |
| 7,227,567 B1 | 6/2007 | Beck et al. |
| 7,239,293 B2 | 7/2007 | Perlin et al. |
| 7,365,908 B2 | 4/2008 | Dolgoff |
| 7,375,886 B2 | 5/2008 | Lipton et al. |
| 7,410,286 B2 | 8/2008 | Travis |
| 7,430,358 B2 | 9/2008 | Qi et al. |
| 7,492,346 B2 | 2/2009 | Manabe et al. |
| 7,528,893 B2 | 5/2009 | Schultz et al. |
| 7,545,429 B2 | 6/2009 | Travis |
| 7,587,117 B2 | 9/2009 | Winston et al. |
| 7,614,777 B2 | 11/2009 | Koganezawa et al. |
| 7,660,047 B1 | 2/2010 | Travis et al. |
| 7,750,981 B2 | 7/2010 | Shestak et al. |
| 7,750,982 B2 | 7/2010 | Nelson et al. |
| 7,771,102 B2 | 8/2010 | Iwasaki |
| 7,798,699 B2 | 9/2010 | Laitinen et al. |
| 7,944,428 B2 | 5/2011 | Travis |
| 7,970,246 B2 | 6/2011 | Travis et al. |
| 7,976,208 B2 | 7/2011 | Travis |

(56) References Cited

U.S. PATENT DOCUMENTS

| | | |
|---|---|---|
| 8,016,475 B2 | 9/2011 | Travis |
| 8,179,361 B2 | 5/2012 | Sugimoto et al. |
| 8,216,405 B2 | 7/2012 | Emerton et al. |
| 8,223,296 B2 | 7/2012 | Lee et al. |
| 8,325,295 B2 | 12/2012 | Sugita et al. |
| 8,354,806 B2 | 1/2013 | Travis et al. |
| 8,477,261 B2 | 7/2013 | Travis et al. |
| 8,502,253 B2 | 8/2013 | Min |
| 8,534,901 B2 | 9/2013 | Panagotacos et al. |
| 8,556,491 B2 | 10/2013 | Lee |
| 8,651,725 B2 | 2/2014 | Ie |
| 8,684,588 B2 | 4/2014 | Ajichi et al. |
| 8,714,804 B2 | 5/2014 | Kim et al. |
| 8,736,967 B1 | 5/2014 | Browne et al. |
| 8,752,995 B2 | 6/2014 | Park |
| 8,760,762 B1 | 6/2014 | Kelly et al. |
| 8,926,112 B2 | 1/2015 | Uchiike et al. |
| 8,942,434 B1 | 1/2015 | Karakotsios et al. |
| 8,985,810 B2 | 3/2015 | Woodgate et al. |
| 9,188,731 B2 | 11/2015 | Woodgate et al. |
| 9,197,884 B2 | 11/2015 | Lee et al. |
| 9,350,980 B2 | 5/2016 | Robinson et al. |
| 9,519,153 B2 | 12/2016 | Robinson et al. |
| 10,054,732 B2 | 8/2018 | Robinson et al. |
| 10,191,196 B2 | 1/2019 | Morozov et al. |
| 10,425,635 B2 | 9/2019 | Woodgate et al. |
| 11,821,602 B2 | 11/2023 | Woodgate et al. |
| 2001/0001566 A1 | 5/2001 | Moseley et al. |
| 2001/0050686 A1 | 12/2001 | Allen |
| 2002/0018299 A1 | 2/2002 | Daniell |
| 2002/0113246 A1 | 8/2002 | Nagai et al. |
| 2002/0113866 A1 | 8/2002 | Taniguchi et al. |
| 2003/0046839 A1 | 3/2003 | Oda et al. |
| 2003/0137738 A1 | 7/2003 | Ozawa et al. |
| 2003/0137821 A1 | 7/2003 | Gotoh et al. |
| 2004/0008877 A1 | 1/2004 | Leppard et al. |
| 2004/0015729 A1 | 1/2004 | Elms et al. |
| 2004/0021809 A1 | 2/2004 | Sumiyoshi et al. |
| 2004/0042233 A1 | 3/2004 | Suzuki et al. |
| 2004/0046709 A1 | 3/2004 | Yoshino |
| 2004/0105264 A1 | 6/2004 | Spero |
| 2004/0108971 A1 | 6/2004 | Waldern et al. |
| 2004/0109303 A1 | 6/2004 | Olczak |
| 2004/0135741 A1 | 7/2004 | Tomisawa et al. |
| 2004/0170011 A1 | 9/2004 | Kim et al. |
| 2004/0263968 A1 | 12/2004 | Kobayashi et al. |
| 2004/0263969 A1 | 12/2004 | Lipton et al. |
| 2005/0007753 A1 | 1/2005 | Hees et al. |
| 2005/0073495 A1 | 4/2005 | Harbers et al. |
| 2005/0094295 A1 | 5/2005 | Yamashita et al. |
| 2005/0110980 A1 | 5/2005 | Maehara et al. |
| 2005/0135116 A1 | 6/2005 | Epstein et al. |
| 2005/0174768 A1 | 8/2005 | Conner |
| 2005/0180167 A1 | 8/2005 | Hoelen et al. |
| 2005/0190180 A1 | 9/2005 | Jin et al. |
| 2005/0190345 A1 | 9/2005 | Dubin et al. |
| 2005/0237488 A1 | 10/2005 | Yamasaki et al. |
| 2005/0254127 A1 | 11/2005 | Evans et al. |
| 2005/0264717 A1 | 12/2005 | Chien et al. |
| 2005/0274956 A1 | 12/2005 | Bhat |
| 2005/0276071 A1 | 12/2005 | Sasagawa et al. |
| 2005/0280637 A1 | 12/2005 | Ikeda et al. |
| 2006/0002678 A1 | 1/2006 | Weber et al. |
| 2006/0012845 A1 | 1/2006 | Edwards |
| 2006/0056166 A1 | 3/2006 | Yeo et al. |
| 2006/0114664 A1 | 6/2006 | Sakata et al. |
| 2006/0132423 A1 | 6/2006 | Travis |
| 2006/0139447 A1 | 6/2006 | Unkrich |
| 2006/0158729 A1 | 7/2006 | Vissenberg et al. |
| 2006/0176912 A1 | 8/2006 | Anikitchev |
| 2006/0203200 A1 | 9/2006 | Koide |
| 2006/0215129 A1 | 9/2006 | Alasaarela et al. |
| 2006/0221642 A1 | 10/2006 | Daiku |
| 2006/0227087 A1 | 10/2006 | Hajjar et al. |
| 2006/0227427 A1 | 10/2006 | Dolgoff |
| 2006/0244918 A1 | 11/2006 | Cossairt et al. |
| 2006/0250580 A1 | 11/2006 | Silverstein et al. |
| 2006/0262376 A1 | 11/2006 | Mather et al. |
| 2006/0269213 A1 | 11/2006 | Hwang et al. |
| 2006/0284974 A1 | 12/2006 | Lipton et al. |
| 2006/0291053 A1 | 12/2006 | Robinson et al. |
| 2006/0291243 A1 | 12/2006 | Niioka et al. |
| 2007/0008406 A1 | 1/2007 | Shestak et al. |
| 2007/0013624 A1 | 1/2007 | Bourhill |
| 2007/0025680 A1 | 2/2007 | Winston et al. |
| 2007/0035829 A1 | 2/2007 | Woodgate et al. |
| 2007/0035964 A1 | 2/2007 | Olczak |
| 2007/0081110 A1 | 4/2007 | Lee |
| 2007/0085105 A1 | 4/2007 | Beeson et al. |
| 2007/0109400 A1 | 5/2007 | Woodgate et al. |
| 2007/0109401 A1 | 5/2007 | Lipton et al. |
| 2007/0115551 A1 | 5/2007 | Spilman et al. |
| 2007/0115552 A1 | 5/2007 | Robinson et al. |
| 2007/0153160 A1 | 7/2007 | Lee et al. |
| 2007/0183466 A1 | 8/2007 | Son et al. |
| 2007/0188667 A1 | 8/2007 | Schwerdtner |
| 2007/0189701 A1 | 8/2007 | Chakmakjian et al. |
| 2007/0223251 A1 | 9/2007 | Liao |
| 2007/0223252 A1 | 9/2007 | Lee et al. |
| 2007/0279554 A1 | 12/2007 | Kowarz et al. |
| 2007/0279727 A1 | 12/2007 | Gandhi et al. |
| 2008/0079662 A1 | 4/2008 | Saishu et al. |
| 2008/0084519 A1 | 4/2008 | Brigham et al. |
| 2008/0086289 A1 | 4/2008 | Brott |
| 2008/0128728 A1 | 6/2008 | Nemchuk et al. |
| 2008/0225205 A1 | 9/2008 | Travis |
| 2008/0259012 A1 | 10/2008 | Fergason |
| 2008/0259643 A1 | 10/2008 | Ijzerman et al. |
| 2008/0291359 A1 | 11/2008 | Miyashita |
| 2008/0297431 A1 | 12/2008 | Yuuki et al. |
| 2008/0297459 A1 | 12/2008 | Sugimoto et al. |
| 2008/0304282 A1 | 12/2008 | Mi et al. |
| 2008/0316768 A1 | 12/2008 | Travis |
| 2009/0016057 A1 | 1/2009 | Rinko |
| 2009/0040426 A1 | 2/2009 | Mather et al. |
| 2009/0067156 A1 | 3/2009 | Bonnett et al. |
| 2009/0109705 A1 | 4/2009 | Pakhchyan et al. |
| 2009/0128735 A1 | 5/2009 | Larson et al. |
| 2009/0135623 A1 | 5/2009 | Kunimochi |
| 2009/0140656 A1 | 6/2009 | Kohashikawa et al. |
| 2009/0160757 A1 | 6/2009 | Robinson |
| 2009/0167651 A1 | 7/2009 | Minaño et al. |
| 2009/0168459 A1 | 7/2009 | Holman et al. |
| 2009/0174700 A1 | 7/2009 | Daiku |
| 2009/0174840 A1 | 7/2009 | Lee et al. |
| 2009/0190072 A1 | 7/2009 | Nagata et al. |
| 2009/0190079 A1 | 7/2009 | Saitoh |
| 2009/0207629 A1 | 8/2009 | Fujiyama et al. |
| 2009/0225380 A1 | 9/2009 | Schwerdtner et al. |
| 2009/0278936 A1 | 11/2009 | Pastoor et al. |
| 2009/0290203 A1 | 11/2009 | Schwerdtner |
| 2009/0315915 A1 | 12/2009 | Dunn et al. |
| 2010/0034987 A1 | 2/2010 | Fujii et al. |
| 2010/0040280 A1 | 2/2010 | McKnight |
| 2010/0053771 A1 | 3/2010 | Travis et al. |
| 2010/0053938 A1 | 3/2010 | Kim et al. |
| 2010/0091254 A1 | 4/2010 | Travis et al. |
| 2010/0165598 A1 | 7/2010 | Chen et al. |
| 2010/0177387 A1 | 7/2010 | Travis et al. |
| 2010/0182542 A1 | 7/2010 | Nakamoto et al. |
| 2010/0188438 A1 | 7/2010 | Kang |
| 2010/0188602 A1 | 7/2010 | Feng |
| 2010/0214135 A1 | 8/2010 | Bathiche et al. |
| 2010/0220260 A1 | 9/2010 | Sugita et al. |
| 2010/0231498 A1 | 9/2010 | Large et al. |
| 2010/0271838 A1 | 10/2010 | Yamaguchi |
| 2010/0277575 A1 | 11/2010 | Ismael et al. |
| 2010/0278480 A1 | 11/2010 | Vasylyev |
| 2010/0289870 A1 | 11/2010 | Leister |
| 2010/0295920 A1 | 11/2010 | McGowan |
| 2010/0295930 A1 | 11/2010 | Ezhov |
| 2010/0300608 A1 | 12/2010 | Emerton et al. |
| 2010/0302135 A1 | 12/2010 | Larson et al. |
| 2010/0309296 A1 | 12/2010 | Harrold et al. |

(56) References Cited

U.S. PATENT DOCUMENTS

| | | |
|---|---|---|
| 2010/0328438 A1 | 12/2010 | Ohyama et al. |
| 2010/0328561 A1 | 12/2010 | Schuck et al. |
| 2011/0013417 A1 | 1/2011 | Saccomanno et al. |
| 2011/0019112 A1 | 1/2011 | Dolgoff |
| 2011/0032483 A1 | 2/2011 | Hruska et al. |
| 2011/0032724 A1 | 2/2011 | Kinoshita |
| 2011/0043142 A1 | 2/2011 | Travis et al. |
| 2011/0043501 A1 | 2/2011 | Daniel |
| 2011/0044056 A1 | 2/2011 | Travis et al. |
| 2011/0044579 A1 | 2/2011 | Travis et al. |
| 2011/0051237 A1 | 3/2011 | Hasegawa et al. |
| 2011/0187293 A1 | 8/2011 | Travis |
| 2011/0187635 A1 | 8/2011 | Lee et al. |
| 2011/0188120 A1 | 8/2011 | Tabirian et al. |
| 2011/0199459 A1 | 8/2011 | Barenbrug et al. |
| 2011/0211142 A1 | 9/2011 | Kashiwagi et al. |
| 2011/0216266 A1 | 9/2011 | Travis |
| 2011/0221998 A1 | 9/2011 | Adachi et al. |
| 2011/0228183 A1 | 9/2011 | Hamagishi |
| 2011/0228562 A1 | 9/2011 | Travis et al. |
| 2011/0235359 A1 | 9/2011 | Liu et al. |
| 2011/0242150 A1 | 10/2011 | Song et al. |
| 2011/0242277 A1 | 10/2011 | Do et al. |
| 2011/0242298 A1 | 10/2011 | Bathiche et al. |
| 2011/0255303 A1 | 10/2011 | Nichol et al. |
| 2011/0267563 A1 | 11/2011 | Shimizu |
| 2011/0285927 A1 | 11/2011 | Schultz et al. |
| 2011/0292321 A1 | 12/2011 | Travis et al. |
| 2011/0310232 A1 | 12/2011 | Wilson et al. |
| 2012/0002136 A1 | 1/2012 | Nagata et al. |
| 2012/0002295 A1 | 1/2012 | Dobschal et al. |
| 2012/0008067 A1 | 1/2012 | Mun et al. |
| 2012/0013720 A1 | 1/2012 | Kadowaki et al. |
| 2012/0056971 A1 | 3/2012 | Kumar et al. |
| 2012/0062991 A1 | 3/2012 | Krijn et al. |
| 2012/0075285 A1 | 3/2012 | Oyagi et al. |
| 2012/0081920 A1 | 4/2012 | Ie et al. |
| 2012/0086776 A1 | 4/2012 | Lo |
| 2012/0092435 A1 | 4/2012 | Wohlert |
| 2012/0106193 A1 | 5/2012 | Kim et al. |
| 2012/0127573 A1 | 5/2012 | Robinson et al. |
| 2012/0154450 A1 | 6/2012 | Aho et al. |
| 2012/0169838 A1 | 7/2012 | Sekine |
| 2012/0182482 A1 | 7/2012 | Byoun et al. |
| 2012/0206050 A1 | 8/2012 | Spero |
| 2012/0243204 A1 | 9/2012 | Robinson |
| 2012/0243261 A1 | 9/2012 | Yamamoto et al. |
| 2012/0268426 A1 | 10/2012 | Yi et al. |
| 2012/0293721 A1 | 11/2012 | Ueyama |
| 2012/0294579 A1 | 11/2012 | Chen |
| 2012/0299913 A1 | 11/2012 | Robinson et al. |
| 2012/0314145 A1 | 12/2012 | Robinson |
| 2012/0327172 A1 | 12/2012 | El-Saban et al. |
| 2013/0050452 A1 | 2/2013 | Ramsey et al. |
| 2013/0083303 A1 | 4/2013 | Hoover et al. |
| 2013/0101253 A1 | 4/2013 | Popovich et al. |
| 2013/0107340 A1 | 5/2013 | Wong et al. |
| 2013/0119237 A1 | 5/2013 | Raguin et al. |
| 2013/0127861 A1 | 5/2013 | Gollier |
| 2013/0135588 A1 | 5/2013 | Popovich et al. |
| 2013/0156265 A1 | 6/2013 | Hennessy |
| 2013/0169701 A1 | 7/2013 | Whitehead et al. |
| 2013/0170004 A1 | 7/2013 | Futterer |
| 2013/0222384 A1 | 8/2013 | Futterer et al. |
| 2013/0230136 A1 | 9/2013 | Sakaguchi et al. |
| 2013/0235561 A1 | 9/2013 | Etienne et al. |
| 2013/0278612 A1 | 10/2013 | Holman et al. |
| 2013/0307831 A1 | 11/2013 | Robinson et al. |
| 2013/0307946 A1 | 11/2013 | Robinson et al. |
| 2013/0308339 A1 | 11/2013 | Woodgate et al. |
| 2013/0321599 A1 | 12/2013 | Harrold et al. |
| 2013/0328866 A1 | 12/2013 | Woodgate et al. |
| 2013/0335821 A1 | 12/2013 | Robinson et al. |
| 2014/0009508 A1 | 1/2014 | Woodgate et al. |
| 2014/0016354 A1 | 1/2014 | Lee et al. |
| 2014/0022619 A1 | 1/2014 | Woodgate et al. |
| 2014/0028807 A1 | 1/2014 | Goulanian et al. |
| 2014/0036361 A1 | 2/2014 | Woodgate et al. |
| 2014/0041205 A1 | 2/2014 | Robinson et al. |
| 2014/0043323 A1 | 2/2014 | Sumi |
| 2014/0098558 A1 | 4/2014 | Vasylyev |
| 2014/0240344 A1 | 8/2014 | Tomono et al. |
| 2014/0240828 A1 | 8/2014 | Robinson et al. |
| 2014/0289835 A1 | 9/2014 | Varshavsky et al. |
| 2014/0340728 A1 | 11/2014 | Taheri |
| 2015/0029754 A1 | 1/2015 | Ouderkirk et al. |
| 2015/0070773 A1 | 3/2015 | Wang et al. |
| 2015/0085091 A1 | 3/2015 | Varekamp |
| 2015/0116212 A1 | 4/2015 | Freed et al. |
| 2015/0192265 A1 | 7/2015 | Yu et al. |
| 2015/0268479 A1 | 9/2015 | Woodgate et al. |
| 2015/0334365 A1 | 11/2015 | Tsubaki et al. |
| 2015/0339512 A1 | 11/2015 | Son et al. |
| 2016/0033710 A1 | 2/2016 | Kim et al. |
| 2018/0074265 A1 | 3/2018 | Waldern et al. |
| 2018/0113310 A1 | 4/2018 | Rolland et al. |
| 2018/0196275 A1 | 7/2018 | Robinson et al. |
| 2018/0284341 A1 | 10/2018 | Woodgate et al. |
| 2018/0313510 A1 | 11/2018 | Albou et al. |
| 2018/0373051 A1 | 12/2018 | Harrold et al. |
| 2019/0056086 A1 | 2/2019 | Nambara et al. |
| 2019/0227322 A1 | 7/2019 | Schaub et al. |
| 2020/0049995 A1 | 2/2020 | Urey et al. |
| 2020/0183152 A1* | 6/2020 | Pennell ............... G02B 27/141 |
| 2020/0278538 A1 | 9/2020 | Taylor et al. |
| 2021/0333570 A1 | 10/2021 | Fattal et al. |
| 2022/0120402 A1 | 4/2022 | Woodgate et al. |
| 2023/0408826 A1* | 12/2023 | Oh ....................... G02F 1/1368 |
| 2023/0418068 A1* | 12/2023 | Woodgate .......... G02B 27/0172 |

FOREIGN PATENT DOCUMENTS

| | | |
|---|---|---|
| CN | 1454329 A | 11/2003 |
| CN | 1466005 A | 1/2004 |
| CN | 1487332 A | 4/2004 |
| CN | 1588196 A | 3/2005 |
| CN | 1678943 A | 10/2005 |
| CN | 1696788 A | 11/2005 |
| CN | 1769971 A | 5/2006 |
| CN | 1823292 A | 8/2006 |
| CN | 1826553 A | 8/2006 |
| CN | 1866112 A | 11/2006 |
| CN | 1900785 A | 1/2007 |
| CN | 1908753 A | 2/2007 |
| CN | 2872404 | 2/2007 |
| CN | 1307481 | 3/2007 |
| CN | 101029975 A | 9/2007 |
| CN | 101049028 A | 10/2007 |
| CN | 200983052 | 11/2007 |
| CN | 101114080 A | 1/2008 |
| CN | 101142823 A | 3/2008 |
| CN | 101266338 A | 9/2008 |
| CN | 100449353 | 1/2009 |
| CN | 101364004 A | 2/2009 |
| CN | 101598863 B | 12/2009 |
| CN | 100591141 | 2/2010 |
| CN | 101660689 A | 3/2010 |
| CN | 102147079 A | 8/2011 |
| CN | 202486493 U | 10/2012 |
| EP | 0653891 A1 | 5/1995 |
| EP | 0721131 A2 | 7/1996 |
| EP | 0830984 A2 | 3/1998 |
| EP | 0833183 A1 | 4/1998 |
| EP | 0860729 A2 | 8/1998 |
| EP | 0939273 A1 | 9/1999 |
| EP | 0656555 B1 | 3/2003 |
| EP | 1394593 A1 | 3/2004 |
| EP | 1736702 A1 | 12/2006 |
| EP | 2003394 A2 | 12/2008 |
| EP | 2105655 A2 | 9/2009 |
| EP | 2219067 A1 | 8/2010 |
| EP | 2451180 A2 | 5/2012 |
| EP | 1634119 B1 | 8/2012 |
| EP | 2796771 B1 | 5/2020 |

(56) References Cited

FOREIGN PATENT DOCUMENTS

| | | |
|---|---|---|
| GB | 2405542 | 2/2005 |
| JP | H07270792 | 10/1995 |
| JP | H08211334 | 8/1996 |
| JP | H08237691 A | 9/1996 |
| JP | H08254617 | 10/1996 |
| JP | H08070475 | 12/1996 |
| JP | H08340556 | 12/1996 |
| JP | H1042315 A | 2/1998 |
| JP | H10142556 A | 5/1998 |
| JP | H11242908 A | 9/1999 |
| JP | 2000048618 A | 2/2000 |
| JP | 2000069504 A | 3/2000 |
| JP | 2000131683 A | 5/2000 |
| JP | 2000200049 A | 7/2000 |
| JP | 2001093321 A | 4/2001 |
| JP | 2002049004 A | 2/2002 |
| JP | 2003215349 A | 7/2003 |
| JP | 2003215705 A | 7/2003 |
| JP | 2004112814 A | 4/2004 |
| JP | 2004127810 A | 4/2004 |
| JP | 2004265813 A | 9/2004 |
| JP | 2004319364 A | 11/2004 |
| JP | 2005135844 A | 5/2005 |
| JP | 2005181914 A | 7/2005 |
| JP | 2005183030 A | 7/2005 |
| JP | 2005203182 A | 7/2005 |
| JP | 2005259361 A | 9/2005 |
| JP | 2006004877 A | 1/2006 |
| JP | 2006010935 A | 1/2006 |
| JP | 2006031941 A | 2/2006 |
| JP | 2006310269 A | 11/2006 |
| JP | 2007094035 A | 4/2007 |
| JP | 3968742 B2 | 8/2007 |
| JP | 2007273288 A | 10/2007 |
| JP | 2008204874 A | 9/2008 |
| JP | 2010160527 A | 7/2010 |
| JP | 2011192468 A | 9/2011 |
| JP | 2012060607 A | 3/2012 |
| JP | 2014022309 A | 2/2014 |
| KR | 20030064258 | 7/2003 |
| KR | 20090932304 | 12/2009 |
| KR | 20110006773 A | 1/2011 |
| KR | 20110017918 A | 2/2011 |
| KR | 20110067534 A | 6/2011 |
| KR | 20120048301 A | 5/2012 |
| KR | 20120049890 A | 5/2012 |
| KR | 20130002646 A | 1/2013 |
| TW | 200528780 A | 9/2005 |
| WO | 1998021620 A1 | 5/1998 |
| WO | 1999011074 A1 | 3/1999 |
| WO | 2001061241 A1 | 8/2001 |
| WO | 2008038539 A1 | 4/2008 |
| WO | 2008045681 A1 | 4/2008 |
| WO | 2009098809 A1 | 8/2009 |
| WO | 2010021926 A2 | 2/2010 |
| WO | 2011020962 A1 | 2/2011 |
| WO | 2011022342 A2 | 2/2011 |
| WO | 2011068907 A1 | 6/2011 |
| WO | 2011149739 A2 | 12/2011 |
| WO | 2012158574 A1 | 11/2012 |
| WO | 2013137161 A1 | 9/2013 |
| WO | 2014130860 A1 | 8/2014 |
| WO | 2022060673 A1 | 3/2022 |

OTHER PUBLICATIONS

AU-2014218711 Examination report No. 1 dated Mar. 20, 2017.
BEATO: "Understanding Comfortable stereography", Dec. 31, 2011 (Dec. 31, 2011), XP055335952, Retrieved from the Internet: URL:http://64.17.134.112/Affonso Beato/Understanding Comfortable Stereography.html [retrieved-on Jan. 17, 2017].
Braverman: "The 3D Toolbox : News", Aug. 13, 2010 (Aug. 13, 2010), XP055336081, Retrieved from the Internet: URL:http://www.dashwood3d.com/blog/the-3d-toolbox/ [retrieved on Jan. 17, 2017].
Cheng et al., "Design and manufacturing AR head-mounted displays: A review and outlook", Light: Advanced Manufacturing (2021)2:24, Official journal of the JHL 2689-9620, pp. 1-20.
CN-201180065590.0 Office fourth action dated Jan. 4, 2017.
CN-201380026045.X Chinese First Office Action of Chinese Patent Office dated Aug. 29, 2016.
CN-201380026046.4 Chinese 1st Office Action of the State Intellectual Property Office of P.R. China dated Oct. 24, 2016.
CN-201380026047.9 Chinese 1st Office Action of the State Intellectual Property Office of P.R. dated Dec. 18, 2015.
CN-201380026050.0 Chinese 2nd Office Action of the State Intellectual Property Office of P.R. dated Apr. 1, 2017.
CN-201380026058.7 Chinese 1st Office Action of the State Intellectual Property Office of P.R. China dated Nov. 2, 2016.
CN-201380026059.1 Chinese 2nd Office Action of the State Intellectual Property Office of P.R. dated Feb. 22, 2017.
CN-201380026059.1 Chinese 1st Office Action of the State Intellectual Property Office of P.R. dated Apr. 25, 2016.
CN-201380049451.8 Chinese Office Action of the State Intellectual Property Office of P.R. dated Apr. 5, 2016.
CN-201380063047.6 Chinese Office Action of the State Intellectual Property Office of P.R. China dated Oct. 9, 2016.
CN-201380063055.0 Chinese 1st Office Action of the State Intellectual Property Office of P.R. dated Jun. 23, 2016.
CN-201380073381.X Chinese Office Action of the State Intellectual Property Office of P.R. China dated Nov. 16, 2016.
CN-201480023023.2 Office second action dated May 11, 2017.
Cootes et al., "Active Appearance Models", IEEE Trans. Pattern Analysis and Machine Intelligence, 23(6):681-685, 2001.
Cootes et al., "Active Shape Models—Their Training and Application" Computer Vision and Image Understanding 61(1):38-59 Jan. 1995.
Dalal et al., "Histogram of Oriented Gradients for Human Detection", Computer Vision and Pattern Recognition, pp. 886-893, 2005.
Drucker et al., "Support Vector Regression Machines", Advances in Neural Information Processing Systems 9, pp. 155-161, NIPS 1996.
EP-11842021.5 Office Action dated Oct. 2, 2015.
EP-11842021.5 Office Action dated Sep. 2, 2016.
EP-13758536.0 European Extended Search Report of European Patent Office dated Feb. 4, 2016.
EP-13790013.0 European Extended Search Report of European Patent Office dated Jan. 26, 2016.
EP-13790141.9 European Extended Search Report of European Patent Office dated Feb. 11, 2016.
EP-13790195.5 European Extended Search Report of European Patent Office dated Mar. 2, 2016.
EP-13790775.4 European Extended Search Report of European Patent Office dated Oct. 9, 2015.
EP-13790775.4 Office Action dated Aug. 29, 2016.
EP-13790809.1 European Extended Search Report of European Patent Office dated Feb. 16, 2016.
EP-13790942.0 European Extended Search Report of European Patent Office dated May 23, 2016.
EP-13791332.3 European Extended Search Report of European Patent Office dated Feb. 1, 2016.
EP-13791437.0 European first office action dated Aug. 30, 2016.
EP-13822472.0 European Extended Search Report of European Patent Office dated Mar. 2, 2016.
EP-13843659.7 European Extended Search Report of European Patent Office dated May 10, 2016.
EP-13865893.5 European Extended Search Report of European Patent Office dated Oct. 6, 2016.
EP-14754859.8 European Extended Search Report of European Patent Office dated Oct. 14, 2016.
EP-14813739.1 European Extended Search Report of European Patent Office dated Jan. 25, 2017.
EP-14853532.1 European Extended Search Report of European Patent Office dated May 23, 2017.
Ho, "Random Decision Forests", Proceedings of the 3rd International Conference on Document Analysis and Recognition, Montreal, QC, pp. 278-282, Aug. 14-16, 1995.
Ian Sexton et al: "Stereoscopic and autostereoscopic display-systems", - IEEE Signal Processing Magazine, May 1, 1999 (May

(56) References Cited

OTHER PUBLICATIONS 1, 1999), pp. 85-99, XP055305471, Retrieved from the Internet: RL:http://ieeexplore.ieee.org/iel5/79/16655/00768575.pdf [retrieved on Sep. 26, 2016].
International search report and written opinion of international searching authority for co-pending PCT application No. PCT/US2013/041619 mailed Aug. 27, 2013.
Jeong et al., Holographically customized optical combiner for eye-box extended near-eye display, Opt. Express 27, 38006-38018 (2019) Dec. 23, 2019.
JP-2013540083 Notice of reasons for rejection of Jun. 30, 2015.
JP-2015-512794 1st Office Action (translated) dated Feb. 14, 2017.
JP-2015-512809 1st Office Action dated Mar. 28, 2017.
JP-2015-512810 1st Office Action (translated) dated Feb. 7, 2017.
JP-2015-512879 1st Office Action (translated) dated Apr. 11, 2017.
JP-2015-512887 1st Office Action (translated) dated Feb. 7, 2017.
JP-2015-512896 1st Office Action (translated) dated May 9, 2017 1st Office Action dated Mar. 28, 2017.
JP-2015-512901 1st Office Action dated Feb. 28, 2017.
JP-2015-512905 1st Office Action (translated) dated Feb. 7, 2017.
Kalantar, et al. "Backlight Unit With Double Surface Light Emission," J. Soc. Inf. Display, vol. 12, Issue 4, pp. 379-387 (Dec. 2004).
Kononenko et al., "Learning to Look Up: Realtime Monocular Gaze Correction Using Machine Learning", Computer Vision and Pattern Recognition, pp. 4667-4675, 2015.
KR-20137015775 Office action (translated) dated Oct. 18, 2016.
Languy et al., "Performance comparison of four kinds of flat nonimaging Fresnel lenses made of polycarbonates and polymethyl methacrylate for concentrated photovoltaics", Optics Letters, 36, pp. 2743-2745.
Lipton: "Stereoscopic Composition Lenny Lipton", Feb. 15, 2009 (Feb. 15, 2009), XP055335930, Retrieved from the Internet: URL:https://lennylipton.wordpress.com/2009/02/15/stereoscopic-composition/ [retrieved on Jan. 17, 2017].
Lowe, "Distinctive Image Features from Scale-Invariant Keypoints", International Journal of Computer Vision 60 (2), pp. 91-110, 2004.
Lucio et al: "RGBD Camera Effects", Aug. 1, 2012 (Aug. 1, 2012), XP055335831, SIBGRAPI—Conference on Graphics, Patterns and Images Retrieved from the Internet: URL:https://www.researchgate.net/profile/Leandro Cruz/publication/233398182 RGBD Camera Effects/links/0912f50a2922010eb2000000.pdf [retrieved on Jan. 17, 2017].
Ozuysal et al., "Fast Keypoint recognition in Ten Lines of Code", Computer Vision and Pattern Recognition, pp. 1-8, 2007.
PCT/US2007/85475 International preliminary report on patentability dated May 26, 2009.
PCT/US2011/061511 International Preliminary Report on Patentability dated May 21, 2013.
PCT/US2011/061511 International search report and written opinion of international searching authority dated Jun. 29, 2012.
PCT/US2012/037677 International search report and written opinion of international searching authority dated Jun. 29, 2012.
PCT/US2012/042279 International search report and written opinion of international searching authority dated Feb. 26, 2013.
PCT/US2012/052189 International search report and written opinion of the international searching authority dated Jan. 29, 2013.
PCT/US2013/041192 International search report and written opinion of international searching authority mailed Aug. 28, 2013.
PCT/US2013/041228 International search report and written opinion of international searching authority mailed Aug. 23, 2013.
PCT/US2013/041235 International search report and written opinion of international searching authority Mailed Aug. 23, 2013.
PCT/US2013/041548 International search report and written opinion of international searching authority mailed Aug. 27, 2013.
PCT/US2013/041619 International search report and written opinion of international searching authority mailed Aug. 27, 2013.
PCT/US2013/041655 International search report and written opinion of international searching authority mailed Aug. 27, 2013.
PCT/US2013/041683 International search report and written opinion of international searching authority mailed Aug. 27, 2013.
PCT/US2013/041697 International search report and written opinion of international searching authority mailed Aug. 23, 2013.
PCT/US2013/041703 International search report and written opinion of international searching authority mailed Aug. 27, 2013.
PCT/US2013/063125 International search report and written opinion of international searching authority mailed Jan. 20, 2014.
PCT/US2013/063133 International search report and written opinion of international searching authority mailed Jan. 20, 2014.
PCT/US2013/077288 International search report and written opinion of international searching authority mailed Apr. 18, 2014.
PCT/US2014/017779 International search report and written opinion of international searching authority mailed May 28. 2014.
PCT/US2014/042721 International search report and written opinion of international searching authority mailed Oct. 10, 2014.
PCT/US2015/054523 International search report and written opinion of international searching authority dated Mar. 18, 2016.
PCT/US2016/034418 International search report and written opinion of the international searching authority dated Sep. 7, 2016.
PCT/US2016/056410 International search report and written opinion of the international searching authority dated Jan. 25, 2017.
PCT/US2016/058695 International search report and written opinion of international searching authority dated Feb. 28, 2017.
PCT/US2016/061428 International search report and written opinion of international searching authority mailed Jan. 20, 2017.
PCT/US2017/012203 International search report and written opinion of international searching authority mailed Apr. 18, 2017.
PCT/US2023/025706 International search report and written opinion of the international searching authority mailed Oct. 5, 2023.
PCT/US2023/025722 International search report and written opinion of the international searching authority mailed Oct. 6, 2023.
PCT/US2023/028359 International search report and written opinion of the international searching authority mailed Oct. 20, 2023.
PCT/US2023/029866 International search report and written opinion of the international searching authority mailed Nov. 27, 2023.
Robinson et al., U.S. Appl. No. 14/751,878 entitled "Directional privacy display" filed Jun. 26, 2015. (Docket 373001) A copy of the application is available to Examiner on the USPTO database and has not been filed herewith.
Robinson et al., U.S. Appl. No. 15/165,960 entitled "Wide Angle Imaging Directional Backlights" filed May 26, 2016. (Docket 384001). A copy of the application is available to Examiner on the USPTO database and has not been filed herewith.
Robinson et al., U.S. Appl. No. 15/290,543 entitled "Wide angle imaging directional backlights" filed Oct. 11, 2016. (Docket 394001). A copy of the application is available to Examiner on the USPTO database and has not been filed herewith.
Robinson, U.S. Appl. No. 13/300,293 entitled "Directional flat illuminators" filed Nov. 18, 2011. (Docket 281001). A copy of the application is available to Examiner on the USPTO database and has not been filed herewith.
RU-2013122560 First office action dated Jan. 22, 2014.
RU-2013122560 Second office action dated Apr. 10, 2015.
RU-201401264 Office action dated Jan. 18, 2017.
Tabiryan et al., "The Promise of Diffractive Waveplates," Optics and Photonics News, vol. 21, Issue 3, pp. 40-45 (Mar. 2010).
Travis, et al. "Backlight for view-sequential autostereo 3D", Microsoft E&DD Applied Sciences, (date unknown), 25 pages.
EP-21870034.2 European Extended Search Report of European Patent Office dated Jul. 30, 2024.
Travis, et al. "Collimated light from a waveguide for a display," Optics Express, vol. 17, No. 22, pp. 19714-19719 (2009).
Mola and Jones, "Rapid Object Detection using a Boosted Cascade of Simple Features", pp. 1-9 CVPR 2001.
Zach et al., "A Duality Based Approach for Realtime TV-L1 Optical Flow", Pattern Recognition (Proc. DAGM), 2007, pp. 214-223.
EP-23207269.4 European Extended Search Report of European Patent Office dated Dec. 22, 2023.
KR1020207030206 Notice of Preliminary Rejection dated Jan. 4, 2024.
PCT/US2023/081677 International search report and written opinion of the international searching authority mailed Mar. 15, 2024.
PCT/US2023/081692 International search report and written opinion of the international searchingMarch 12, 2024.

(56) References Cited

OTHER PUBLICATIONS

PCT/US2024/032628 International search report and written opinion of the international searching authority mailed Sep. 20, 2024.
PCT/US2024/032630 International search report and written opinion of the international searching authority mailed Sep. 20, 2024.
PCT/US2024/032634 International search report and written opinion of the international searching authority mailed Sep. 19, 2024.

\* cited by examiner

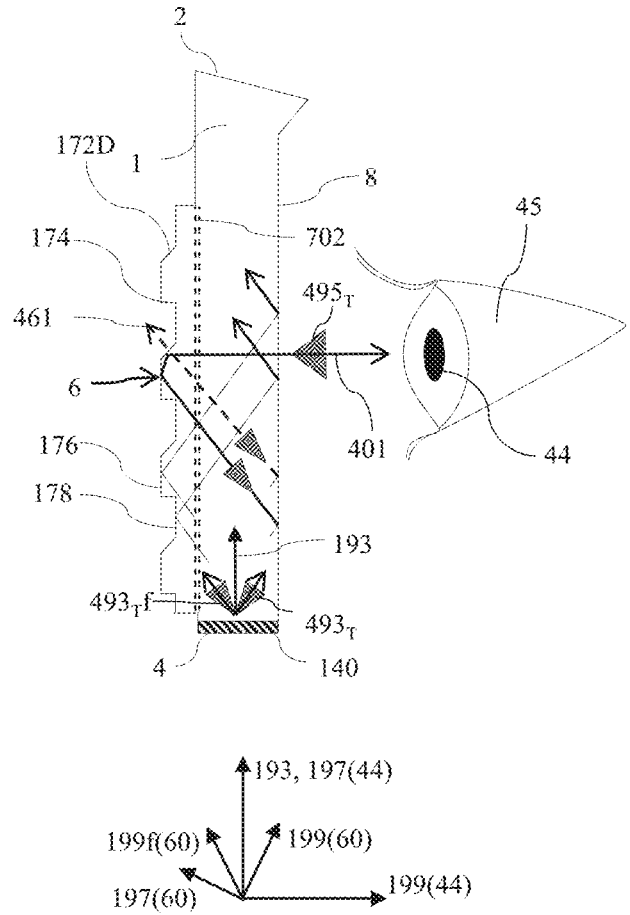
*FIG. 3B*   *FIG. 3C*

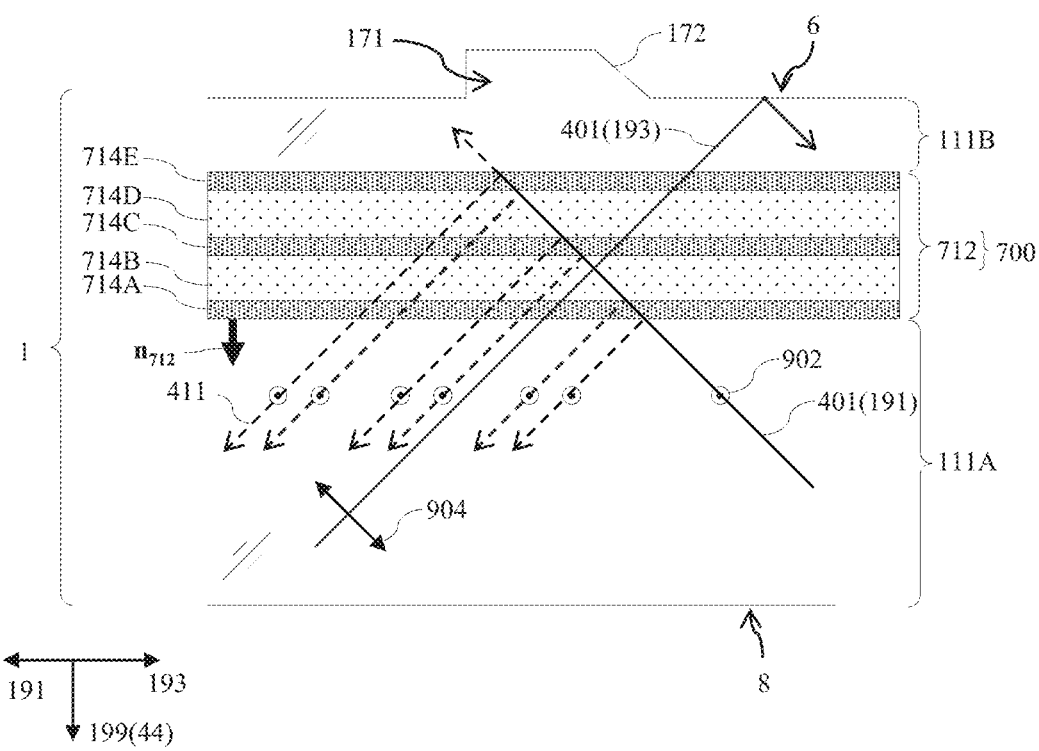
*FIG. 7A*
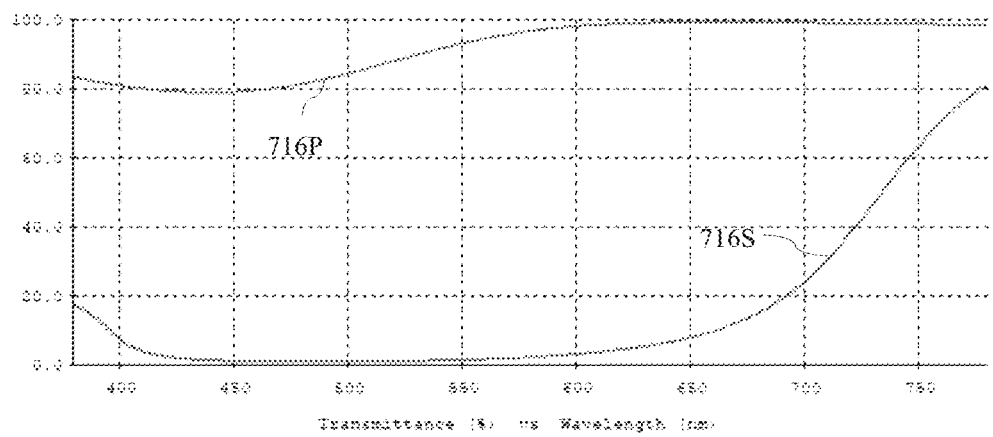
*FIG. 7B*
| S1 | S2 | S3 |
|---|---|---|
| Calculate ray 401 angle in waveguide for transverse row 221T | Calculate ray 401 reflectivity at dielectric stack 712 | Modify pixel output of transverse row 221T |
*FIG. 7C*

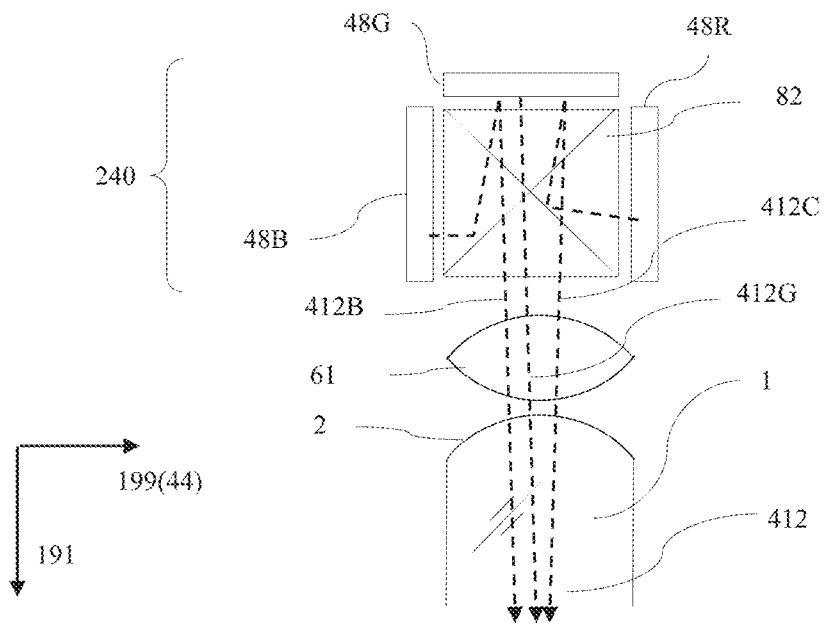
FIG. 34A
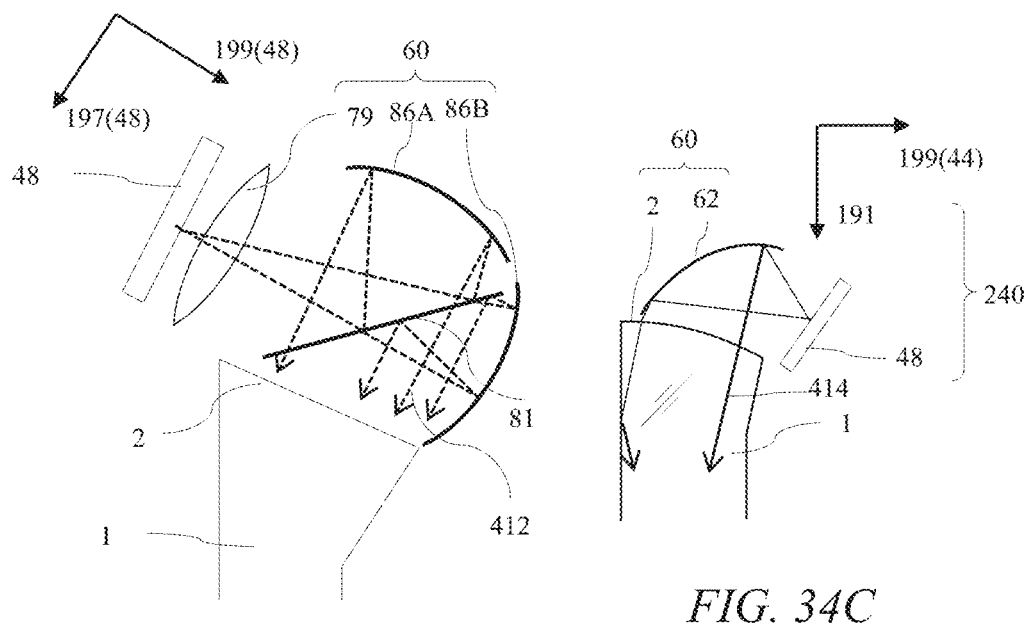
FIG. 34C
FIG. 34B

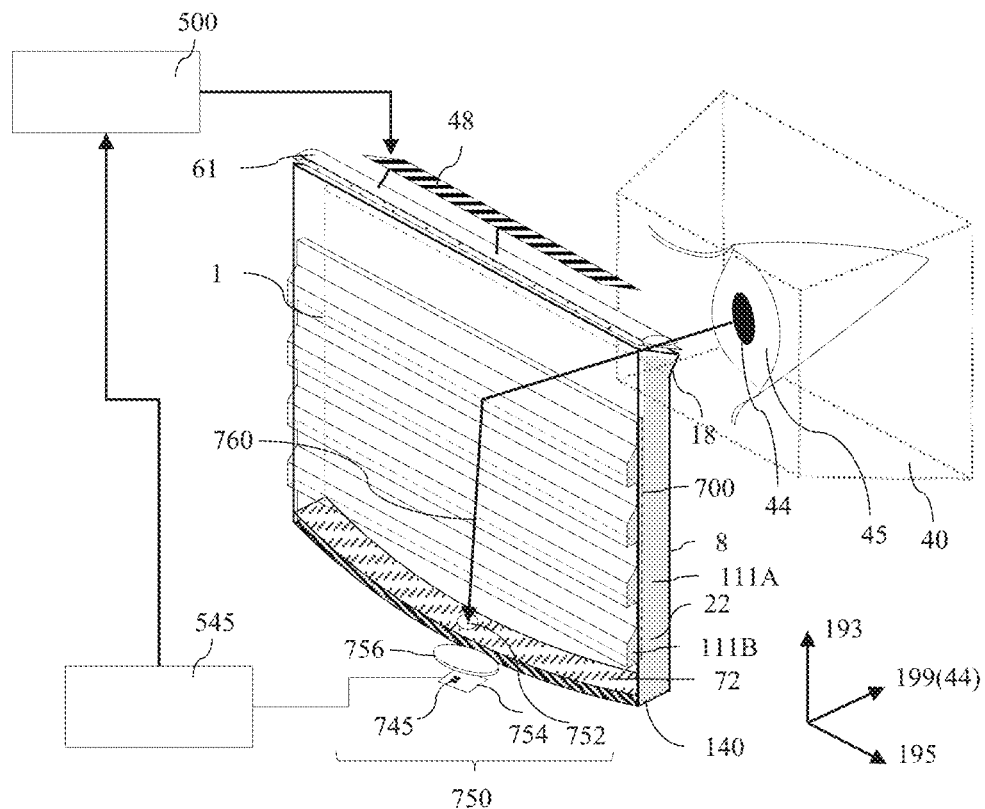
FIG. 38A
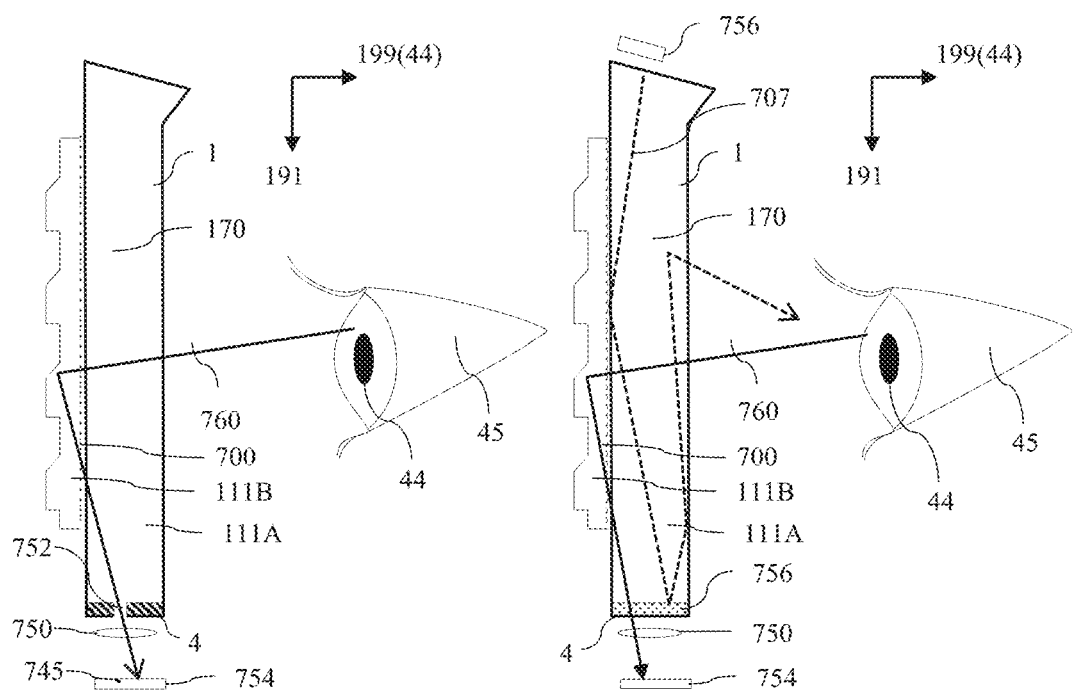
FIG. 38B
FIG. 38C

ANAMORPHIC DIRECTIONAL ILLUMINATION DEVICE WITH SELECTIVE LIGHT-GUIDING

TECHNICAL FIELD

This disclosure generally relates to near-eye display apparatuses and illumination systems therefor.

BACKGROUND

Head-worn displays incorporating a near-eye display apparatus may be arranged to provide fully immersive imagery such as in virtual reality (VR) displays or augmented imagery overlayed over views of the real world such as in augmented reality (AR) displays. If the overlayed imagery is aligned or registered with the real-world image it may be termed Mixed Reality (MR). In VR displays, the near-eye display apparatus is typically opaque to the real world, whereas in AR displays the optical system is partially transmissive to light from the real-world.

The near-eye display apparatuses of AR and VR displays aim to provide images to at least one eye of a user with full colour, high resolution, high luminance and high contrast; and with wide fields of view (angular size of image) and large eyebox sizes (the geometry over which the eye can move while having visibility of the full image field of view). Such displays are desirable in thin form factors, low weight and with low manufacturing cost and complexity.

Further, AR near-eye display apparatuses aim to have high transmission of real-world light rays without image distortions or degradations and reduced glare of stray light away from the display wearer. AR optics may broadly be categorised as reflective combiner type or waveguide type. Waveguide types typically achieve reduced form factor and weight due to the optical path folding within the waveguide. Known methods for injecting images into a waveguide may use a spatial light modulator and a projection lens arrangement with a prism or grating to couple light into the waveguide. Pixel locations in the spatial light modulator are converted to a fan of ray directions by the projection lens. In other arrangements a laser scanner may provide the fan of ray directions. The angular locations are propagated through the waveguide and output to the eye of the user. The eye's optical system collects the angular locations and provides spatial images at the retina.

BRIEF SUMMARY

According to a first aspect of the present disclosure, there is provided an anamorphic near-eye display apparatus comprising: an illumination system comprising a spatial light modulator, the illumination system being arranged to output light; and an optical system arranged to direct light from the illumination system to a viewer's eye, wherein the optical system has an optical axis and has anamorphic properties in a lateral direction and a transverse direction that are perpendicular to each other and perpendicular to the optical axis, wherein the spatial light modulator comprises pixels distributed in the lateral direction, and the optical system comprises: a transverse anamorphic component having positive optical power in the transverse direction, wherein the transverse anamorphic component is arranged to receive light from the spatial light modulator and the illumination system is arranged so that light output from the transverse anamorphic component is directed in directions that are distributed in the transverse direction; an extraction waveguide arranged to receive light from the transverse anamorphic component; a lateral anamorphic component having positive optical power in the lateral direction, the extraction waveguide being arranged to guide light from the transverse anamorphic component to the lateral anamorphic component along the extraction waveguide in a first direction; and a light reversing reflector that is arranged to reflect light guided along the extraction waveguide in the first direction to form light that is guided along the extraction waveguide in a second direction opposite to the first direction, wherein: the extraction waveguide comprises: a front guide surface; a polarization-sensitive reflector opposing the front guide surface; and an extraction element disposed outside the polarization-sensitive reflector, the extraction element comprising: a rear guide surface opposing the front guide surface; and an array of extraction features; the anamorphic near-eye display apparatus is arranged to provide light guided along the extraction waveguide in the first direction with an input linear polarization state before reaching the polarization-sensitive reflector; and the optical system further comprises a polarization conversion retarder disposed between the polarization-sensitive reflector and the light reversing reflector, wherein the polarization conversion retarder is arranged to convert a polarization state of light passing therethrough between a linear polarization state and a circular polarization state, and the polarization conversion retarder and the light reversing reflector are arranged in combination to rotate the input linear polarization state of the light guided in the first direction so that the light guided in the second direction and output from the polarization conversion retarder has an orthogonal linear polarization state that is orthogonal to the input linear polarization state; the polarization-sensitive reflector is arranged to reflect light guided in the first direction having the input linear polarization state and to pass light guided in the second direction having the orthogonal linear polarization state, so that the front guide surface and the polarization-sensitive reflector are arranged to guide light in the first direction, and the front guide surface and the rear guide surface are arranged to guide light in the second direction; and the array of extraction features is arranged to extract light guided along the extraction waveguide in the second direction towards an eye of a viewer through the front guide surface, the array of extraction features distributed along the extraction waveguide so as to provide exit pupil expansion in the transverse direction.

The anamorphic near-eye display apparatus may provide images with wide field of view with high brightness and high efficiency. Compact physical size and low weight of the anamorphic near-eye display apparatus may be achieved to provide high comfort of use and extend viewing times. High transparency may be provided. Images may be provided with reduced colour blur. A large size eyebox may be achieved for relaxing limitations of pupil positioning at desirable eye relief distances may achieve vignetting-free images over a wide range of observer pupil positions and for a wide field of view. The anamorphic near-eye display apparatus may be suitable for augmented reality and virtual reality applications.

The polarization-sensitive reflector may comprise a reflective linear polarizer. High efficiency may advantageously be achieved. The reflective linear polarizer may be provided with low thickness high flatness to advantageously achieve high resolution output. The reflective linear polarizer may be conveniently manufactured over the area of the extraction waveguide at low cost. Light travelling along the second direction may be efficiently transmitted onto the extraction features. High efficiency and uniformity may be achieved. The exit pupil size may be increased. High image luminance uniformity over a wide field of view may be achieved.

The polarization conversion retarder may have a retardance of a quarter wavelength at a wavelength of visible light, for example 550 nm. High efficiency of polarization conversion for light travelling in the second direction along the extraction waveguide may be achieved. Advantageously efficiency image contrast and image uniformity may be increased.

The input linear polarization state may be a p-polarization state in the extraction waveguide, or the input linear polarization state may be an s-polarization state in the extraction waveguide. The optical system may further comprise an input linear polarizer that may be disposed between the spatial light modulator and the polarization-sensitive reflector and arranged to pass light having the input linear polarization state. The light propagating along the extraction waveguide in first and second directions may undergo reduced skew ray depolarization. Advantageously uniformity and efficiency may be increased.

The input linear polarizer may be disposed between the spatial light modulator and the extraction waveguide. Fabrication cost may advantageously be reduced.

The input linear polarizer may be disposed within the extraction waveguide. Advantageously depolarization along the extraction waveguide may be reduced and efficiency advantageously increased.

The input linear polarizer may be disposed after the transverse anamorphic component, and the optical system may further comprise a polarization conversion retarder disposed between the transverse anamorphic component and the input linear polarizer, the polarization conversion retarder being arranged to convert a polarization state of light passing therethrough between a linear polarization state and a circular polarization state. The illumination system may be arranged to output light that may be unpolarized or the illumination system may be arranged to output light having the input linear polarization state. Stray light from back reflections falling on the input end may be reduced. Advantageously image contrast may be increased.

The extraction features may be elongate in the lateral direction. The lateral size of the exit pupil may be increased. Advantageously viewer comfort may be increased.

The rear guide surface may comprise extraction facets that may be the extraction features, each extraction facet being arranged to reflect light guided in the second direction towards an eye of a viewer through the front guide surface. Light propagating in the second direction may be output from the extraction waveguide. An image may be provided on the retina of a user after imaging by the transverse anamorphic component and the lateral anamorphic component. Advantageously a wide field of view and high resolution image with high brightness may be achieved.

The rear guide surface may comprise plural prisms that protrude outwardly, the prisms each comprising the at least one extraction facet and at least one draft facet. The prisms may be provided by advantageously low cost and low complexity tooling and replication processes with high surface reproducibility and accuracy.

At least one of the prisms may comprise plural draft facets, and an intermediate guide facet arranged between each adjacent pair of the plural draft facets. Advantageously spatial uniformity across the exit pupil may be improved.

The prisms may each further comprise a primary guide facet between the at least one extraction facet and the at least one draft facet. No metal coating may be provided on the prisms, advantageously reducing cost and complexity, and increasing transmission efficiency.

The rear guide surface may comprise guide portions between the prisms. Transmission efficiency may be increased. Uniformity of output across the transverse direction of the exit pupil may be increased and image vignetting reduced.

The rear guide surface may comprise a surface relief grating comprising the extraction features. Advantageously the aperture size of the optical element is increased, and diffraction from the aperture reduced.

The extraction element may comprise an array of extraction reflectors disposed internally within the extraction waveguide. Advantageously increased efficiency may be achieved, and resistance to surface damage increased.

The array of extraction reflectors may be arranged between the polarization-sensitive reflector and the rear light guide surface. Advantageously increased efficiency may be achieved, and resistance to surface damage increased.

The array of reflectors may have reflectivities defined across their overall area that increase with increasing distance along the optical axis. Advantageously uniformity of output image for varying eye location within the exit pupil may be improved.

The extraction reflectors may comprise extraction surfaces spaced apart by a partially reflective coating. Images may be provided advantageously without missing angular regions. Efficiency, brightness and contrast may be increased and the visibility of artefacts arising from stray light including double images and ghost images reduced.

The partially reflective coating may comprise at least one dielectric layer. Advantageously the cost of the fabrication may be reduced.

The at least one dielectric layer may comprise a stack of dielectric layers. Advantageously brightness and uniformity may be increased.

The partially reflective coating may be metallic. Advantageously cost of manufacture may be reduced.

The extraction reflectors may extend partially across the extraction waveguide between opposing rear and front guide surfaces of the extraction waveguide with successively shifted positions. Advantageously the cost of manufacture of the extraction waveguide may be reduced. High uniformity with viewing angle may be achieved for pupil locations across the headbox.

The anamorphic near-eye display apparatus may further comprise intermediate reflectors extending along the extraction waveguide between adjacent pairs of extraction reflectors. Advantageously manufacturing cost may be reduced.

The partially reflective coating may comprise at least one dielectric layer. Advantageously the cost of the fabrication may be reduced.

The at least one dielectric layer may comprise a stack of dielectric layers. Advantageously brightness, efficiency and uniformity may be increased.

The polarization-sensitive reflector may comprise a nematic liquid crystal layer. The liquid crystal layer may comprise a liquid crystal material arranged between first and second opposing alignment layers. The component of the optical axis of the liquid crystal layer in the plane of the liquid crystal layer may be parallel or orthogonal to the first direction along the extraction waveguide. Advantageously a low thickness reflector may be provided with low scatter and high transparency.

The polarization-sensitive reflector may comprise a cholesteric liquid crystal layer. The anamorphic near-eye display apparatus may further comprise a polarization conversion retarder arranged between a front guiding surface and the cholesteric liquid crystal retarder wherein the polarization conversion retarder may be arranged to convert a polarization state of light passing therethrough between a linear polarization state and a circular polarization state, and the polarization conversion retarder and the cholesteric liquid crystal layer may be arranged in combination to reflect the input linear polarization state of the light guided in the first direction and to transmit the linear polarization state of the light guided in the second direction. The anamorphic near-eye display apparatus may further comprise a polarization conversion retarder arranged between the rear guiding surface and the cholesteric liquid crystal retarder wherein the polarization conversion retarder may be arranged to convert a polarization state of light passing therethrough between a linear polarization state and a circular polarization state. Advantageously high reflectivity may be achieved over a wide field of view for light propagating in the first direction with a linear polarization state, and high transmission for light propagating in the second direction. The cholesteric liquid crystal layer may have low thickness.

The extraction waveguide may have an input end extending in the lateral and transverse directions, the extraction waveguide being arranged to receive light from the illumination system through the input end. The direction of the optical axis through the transverse anamorphic component may be inclined with respect to the first and second directions along the extraction waveguide. The input end may be inclined with respect to the first and second directions along the extraction waveguide. The input linear polarizer may be disposed between the spatial light modulator and the input end of the extraction waveguide. The polarization conversion retarder may have a retardance of a quarter wavelength at a wavelength of visible light. Light may be input into the extraction waveguide at angles that may be extracted without double imaging. Image contrast may advantageously be improved.

The light reversing reflector may be a reflective end of the extraction waveguide. The lateral anamorphic component may comprise the light reversing reflector. Advantageously the cost and complexity of manufacture may be reduced. Interfacial losses may be reduced.

The transverse anamorphic component may comprise a lens. The lens of the transverse anamorphic component may be a compound lens. Advantageously aberrations in the transverse direction may be reduced.

The optical system may comprise an input section comprising an input reflector that is the transverse anamorphic component and may be arranged to reflect the light from the illumination system and direct it along the waveguide. Advantageously complexity, cost of fabrication and weight may be reduced.

The transverse anamorphic component may further comprise a lens. Advantageously aberrations may be reduced, image fidelity increased and headbox increased in size.

The input section may further comprise an input face disposed on a front or rear side of the waveguide and facing the input reflector, and the input section may be arranged to receive the light from the illumination system through the input face. The input face may extend at an acute angle to the front guide surface in the case that the input face is on the front side of the waveguide or to the rear guide surface in the case that the input face is on the rear side of the waveguide. The input face may extend parallel to the front guide surface in the case that the input face is on the front side of the waveguide or to the rear guide surface in the case that the input face is on the rear side of the waveguide. The input face may be coplanar with the front guide surface in the case that the input face is on the front side of the waveguide or with the rear guide surface in the case that the input face is on the rear side of the waveguide. The input face may be disposed outwardly of one of the front or rear guide surfaces. The input section may further comprise a separation face extending outwardly from one of the front or rear guide surfaces to the input face. Advantageously improved mechanical arrangements of the illumination system and optical system may be achieved.

The input section may be integral with the waveguide. Advantageously complexity of manufacture may be reduced, and lower cost achieved.

The waveguide may have an end that is an input face through which the waveguide is arranged to receive light from the illumination system, and the input section may be a separate element from the waveguide that may further comprise an output face and is arranged to direct light reflected by the input reflector through the output face and into the waveguide through the input face of the waveguide. Advantageously improved aberrations may be achieved. Reflective surfaces may be protected.

The pixels of the spatial light modulator may also be distributed in the transverse direction so that the light output from the transverse anamorphic component may be directed in the directions that may be distributed in the transverse direction. Advantageously, image rows may be provided simultaneously. Image break-up artefacts may be reduced.

The illumination system further may comprise a deflector element arranged to deflect light output from the transverse anamorphic component by a selectable amount, the deflector element being selectively operable to direct the light output from the transverse anamorphic component in the directions that may be distributed in the transverse direction. Advantageously the complexity of the illumination system may be reduced.

The spatial light modulator may comprise pixels having pitches in the lateral and transverse directions with a ratio that may be the same as the inverse of the ratio of optical powers of the lateral and transverse anamorphic optical elements. Advantageously the observer may perceive square pixels. Image fidelity may be increased.

The anamorphic near-eye display apparatus may further comprise a control system arranged to operate the illumination system to provide light input in accordance with image data representing an image. Advantageously image data may be perceived to provide an augmented reality or virtual reality image.

According to a second aspect of the present disclosure there is provided a head-worn display apparatus comprising an anamorphic near-eye display apparatus according to the first aspect arranged to mount the anamorphic near-eye display apparatus on a head of a wearer with the anamorphic near-eye display apparatus extending across at least one eye of the wearer. Virtual reality and augmented reality images may be conveniently provided to moving observers.

The head-worn display apparatus may further comprise lenses having optical power, the anamorphic near-eye display apparatus overlying one or each lens. The nominal viewing distance of the virtual image may be adjusted to achieve reduced discrepancy between accommodation and convergence depth cues in a stereoscopic display apparatus. Correction for visual characteristics of the observer's eyes may be provided.

The head-worn display apparatus may comprise a pair of spectacles. Advantageously a low-weight transparent head-worn display apparatus suitable for augmented reality applications may be achieved.

According to a third aspect of the present disclosure there is provided an anamorphic directional illumination device comprising: an illumination system comprising a light source array, the illumination system being arranged to output light; and an optical system arranged to direct light from the illumination system, wherein the optical system has an optical axis and has anamorphic properties in a lateral direction and a transverse direction that are perpendicular to each other and perpendicular to the optical axis, wherein the light source array comprises light sources distributed in the lateral direction, and the optical system comprises: a transverse anamorphic component having positive optical power in the transverse direction, wherein the transverse anamorphic component is arranged to receive light from the light source array and the illumination system is arranged so that light output from the transverse anamorphic component is directed in directions that are distributed in the transverse direction; an extraction waveguide arranged to receive light from the transverse anamorphic component; a lateral anamorphic component having positive optical power in the lateral direction, the extraction waveguide being arranged to guide light from the transverse anamorphic component to the lateral anamorphic component along the extraction waveguide in a first direction; and a light reversing reflector that is arranged to reflect light guided along the extraction waveguide in the first direction to form light that is guided along the extraction waveguide in a second direction opposite to the first direction, wherein: the extraction waveguide comprises: a front guide surface; a polarization-sensitive reflector opposing the front guide surface; and an extraction element disposed outside the polarization-sensitive reflector, the extraction element comprising: a rear guide surface opposing the front guide surface; and at least one extraction feature; the anamorphic directional illumination device is arranged to provide light guided along the extraction waveguide in the first direction with an input linear polarization state before reaching the polarization-sensitive reflector; and the optical system further comprises a polarization conversion retarder disposed between the polarization-sensitive reflector and the light reversing reflector, wherein the polarization conversion retarder is arranged to convert a polarization state of light passing therethrough between a linear polarization state and a circular polarization state, and the polarization conversion retarder and the light reversing reflector are arranged in combination to rotate the input linear polarization state of the light guided in the first direction so that the light guided in the second direction and output from the polarization conversion retarder has an orthogonal linear polarization state that is orthogonal to the input linear polarization state; the polarization-sensitive reflector is arranged to reflect light guided in the first direction having the input linear polarization state and to pass light guided in the second direction having the orthogonal linear polarization state, so that the front guide surface and the polarization-sensitive reflector are arranged to guide light in the first direction, and the front guide surface and the rear guide surface are arranged to guide light in the second direction; and the at least one extraction feature is arranged to extract light guided along the extraction waveguide in the second direction through the front guide surface. A directional illumination device may be provided in a compact arrangement with low cost. High resolution output light beams may be provided that may be controllable and with high efficiency.

According to a fourth aspect of the present disclosure there is provided a vehicle external light apparatus comprising: an anamorphic directional illumination device according to the third aspect. The height of the emitting aperture may be reduced to advantageously achieve desirable aesthetic appearance. High illuminance of illuminated scenes may be achieved with high resolution imaging of addressable light cones in one or two dimensions. High image contrast may be achieved for adjustable beam shaping. Image glare to oncoming viewers of the illumination device may be reduced while improved visibility of scenes around the oncoming viewers may be achieved.

Any of the aspects of the present disclosure may be applied in any combination.

Embodiments of the present disclosure may be used in a variety of optical systems. The embodiments may include or work with a variety of projectors, projection systems, optical components, displays, microdisplays, computer systems, processors, self-contained projector systems, visual and/or audio-visual systems and electrical and/or optical devices. Aspects of the present disclosure may be used with practically any apparatus related to optical and electrical devices, optical systems, presentation systems or any apparatus that may contain any type of optical system. Accordingly, embodiments of the present disclosure may be employed in optical systems, devices used in visual and/or optical presentations, visual peripherals and so on and in a number of computing environments and automotive environments.

Before proceeding to the disclosed embodiments in detail, it should be understood that the disclosure is not limited in its application or creation to the details of the particular arrangements shown, because the disclosure is capable of other embodiments. Moreover, aspects of the disclosure may be set forth in different combinations and arrangements to define embodiments unique in their own right. Also, the terminology used herein is for the purpose of description and not of limitation.

These and other advantages and features of the present disclosure will become apparent to those of ordinary skill in the art upon reading this disclosure in its entirety.

BRIEF DESCRIPTION OF THE DRAWINGS

Embodiments are illustrated by way of example in the accompanying FIGURES, in which like reference numbers indicate similar parts, and in which:

FIG. 3B is a schematic diagram illustrating a side view of light propagation along a first direction in an extraction waveguide;

FIG. 3C is a schematic diagram illustrating a side view of light extraction from the anamorphic near-eye display apparatus of FIG. 1A;

FIG. 7A is a schematic diagram illustrating a side view of the operation of an alternative polarization-sensitive reflector comprising a thin film stack;

FIG. 7B is a schematic graph illustrating the variation of thin film stack transmission against wavelength for incident s-polarized and p-polarized light;

FIG. 7C is a flow chart illustrating compensation of pixel level to correct for transmission of a thin film stack polarization-sensitive reflector;

FIG. 34A is a schematic diagram illustrating in side view a spatial light modulator arrangement for use in the anamorphic near-eye display apparatus of FIG. 1 comprising separate red, green and blue spatial light modulators and a beam combining element;

FIG. 34B is a schematic diagram illustrating in side view an illumination system for use in the anamorphic near-eye display apparatus of FIG. 1 comprising a birdbath folded arrangement;

FIG. 34C is a schematic diagram illustrating in side view a spatial light modulator arrangement for use in an anamorphic near-eye display apparatus comprising a transverse anamorphic component comprising a reflector;

FIG. 38A is a schematic diagram illustrating in perspective front view an anamorphic near-eye display apparatus comprising a stepped extraction interface and an eye tracking arrangement;

FIG. 38B is a schematic diagram illustrating in side view an anamorphic near-eye display apparatus comprising an eye tracking arrangement with a transmissive hole arranged at the reflective end;

FIG. 38C is a schematic diagram illustrating in side view an anamorphic near-eye display apparatus comprising an eye tracking arrangement with a partially transmissive mirror arranged at the reflective end;

FIG. 39A is a schematic diagram illustrating a front perspective view of an anamorphic directional illumination device; and FIG. 39B is a schematic diagram illustrating a side view of a road scene comprising a vehicle comprising a vehicle external light apparatus comprising the anamorphic directional illumination device of FIG. 39A.

DETAILED DESCRIPTION

Figure 1A:
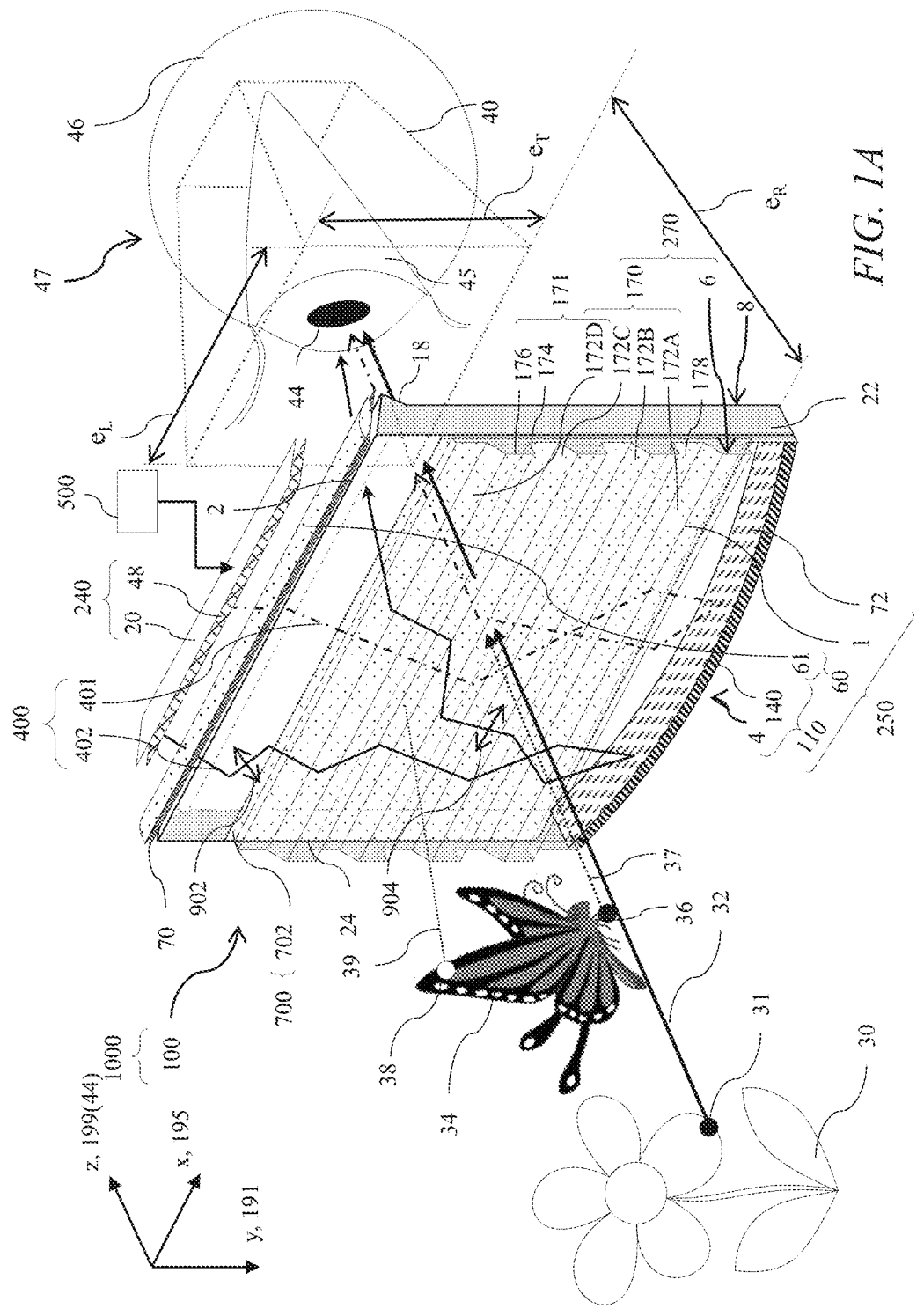
FIG. 1A is a schematic diagram illustrating a front perspective view of an anamorphic near-eye display apparatus.

Terms related to optical retarders for the purposes of the present disclosure will now be described.

In a layer comprising a uniaxial birefringent material there is a direction governing the optical anisotropy whereas all directions perpendicular to it (or at a given angle to it) have equivalent birefringence.

The optical axis of an optical retarder refers to the direction of propagation of a light ray in the uniaxial birefringent material in which no birefringence is experienced. This is different from the optical axis of an optical system which may for example be parallel to a line of symmetry or normal to a display surface along which a principal ray propagates.

For light propagating in a direction orthogonal to the optical axis, the optical axis is the slow axis when linearly polarized light with an electric vector direction parallel to the slow axis travels at the slowest speed. The slow axis direction is the direction with the highest refractive index at the design wavelength. Similarly the fast axis direction is the direction with the lowest refractive index at the design wavelength.

For positive dielectric anisotropy uniaxial birefringent materials the slow axis direction is the extraordinary axis of the birefringent material. For negative dielectric anisotropy uniaxial birefringent materials the fast axis direction is the extraordinary axis of the birefringent material.

The terms half a wavelength and quarter a wavelength refer to the operation of a retarder for a design wavelength $\lambda_0$ that may typically be between 500 nm and 570 nm. In the present illustrative embodiments exemplary retardance values are provided for a wavelength of 550 nm unless otherwise specified.

The retarder provides a phase shift between two perpendicular polarization components of the light wave incident thereon and is characterized by the amount of relative phase, $\Gamma$, that it imparts on the two polarization components; which is related to the birefringence $\Delta n$ and the thickness d of the retarder with retardance $\Delta n \cdot d$ by:

$$\Gamma = 2 \cdot \pi \cdot \Delta n \cdot d / \lambda_0 \qquad \text{eqn. 1}$$

In eqn. 1, $\Delta n$ is defined as the difference between the extraordinary and the ordinary index of refraction, i.e.

$$\Delta n = n_e - n_o \qquad \text{eqn. 2}$$

For a half-wave retarder, the relationship between d, $\Delta n$, and $\lambda_0$ is chosen so that the phase shift between polarization components is $\Gamma = \pi$. For a quarter-wave retarder, the relationship between d, $\Delta n$, and $\lambda_0$ is chosen so that the phase shift between polarization components is $\Gamma = \pi/2$.

Some aspects of the propagation of light rays through a transparent retarder between a pair of polarizers will now be described.

The state of polarization (SOP) of a light ray is described by the relative amplitude and phase shift between any two orthogonal polarization components. Transparent retarders do not alter the relative amplitudes of these orthogonal polarization components but act only on their relative phase.

Providing a net phase shift between the orthogonal polarization components alters the SOP whereas maintaining net relative phase preserves the SOP. In the current description, the SOP may be termed the polarization state.

A linear SOP has a polarization component with a non-zero amplitude and an orthogonal polarization component which has zero amplitude. A p-polarization state is a linear polarization state that lies within the plane of incidence of a ray comprising the p-polarization state and a s-polarization state is a linear polarization state that lies orthogonal to the plane of incidence of a ray comprising the p-polarization state. For a linearly polarized SOP incident onto a retarder, the relative phase $\Gamma$ is determined by the angle between the optical axis of the retarder and the direction of the polarization component.

A linear polarizer transmits a unique linear SOP that has a linear polarization component parallel to the electric vector transmission direction of the linear polarizer and attenuates light with a different SOP. The term "electric vector transmission direction" refers to a non-directional axis of the polarizer parallel to which the electric vector of incident light is transmitted, even though the transmitted "electric vector" always has an instantaneous direction. The term "direction" is commonly used to describe this axis.

Absorbing polarizers are polarizers that absorb one polarization component of incident light and transmit a second orthogonal polarization component. Examples of absorbing linear polarizers are dichroic polarizers.

Reflective polarizers are polarizers that reflect one polarization component of incident light and transmit a second orthogonal polarization component. Examples of reflective polarizers that are linear polarizers are multilayer polymeric film stacks such as DBEF™ or APF™ from 3M Corporation, or wire grid polarizers such as ProFlux™ from Moxtek. Reflective linear polarizers may further comprise cholesteric reflective materials and a quarter-wave retarder arranged in series.

A retarder arranged between a linear polarizer and a parallel linear analysing polarizer that introduces no relative net phase shift provides full transmission of the light other than residual absorption within the linear polarizer.

A retarder that provides a relative net phase shift between orthogonal polarization components changes the SOP and provides attenuation at the analysing polarizer.

Achromatic retarders may be provided wherein the material of the retarder is provided with a retardance $\Delta n \cdot d$ that varies with wavelength $\lambda$ as $$\Delta n \cdot d / \lambda = \kappa \qquad \text{eqn. 3}$$

where $\kappa$ is substantially a constant.

Examples of suitable materials include modified polycarbonates from Teijin Films. Achromatic retarders may be provided in the present embodiments to advantageously minimise colour changes between polar angular viewing directions which have low luminance reduction and polar angular viewing directions which have increased luminance reductions as will be described below.

Various other terms used in the present disclosure related to retarders and to liquid crystals will now be described.

A liquid crystal cell has a retardance given by $\Delta n \cdot d$ where $\Delta n$ is the birefringence of the liquid crystal material in the liquid crystal cell and d is the thickness of the liquid crystal cell, independent of the alignment of the liquid crystal material in the liquid crystal cell.

Homogeneous alignment refers to the alignment of liquid crystals in switchable liquid crystal displays where molecules align substantially parallel to a substrate. Homogeneous alignment is sometimes referred to as planar alignment. Homogeneous alignment may typically be provided with a small pre-tilt such as 2 degrees, so that the molecules at the surfaces of the alignment layers of the liquid crystal cell are slightly inclined as will be described below. Pretilt is arranged to minimise degeneracies in switching of cells.

In the present disclosure, homeotropic alignment is the state in which rod-like liquid crystalline molecules align substantially perpendicularly to the substrate. In discotic liquid crystals homeotropic alignment is defined as the state in which an axis of the column structure, which is formed by disc-like liquid crystalline molecules, aligns perpendicularly to a surface. In homeotropic alignment, pretilt is the tilt angle of the molecules that are close to the alignment layer and is typically close to 90 degrees and for example may be 88 degrees.

In a twisted liquid crystal layer, a twisted configuration (also known as a helical structure or helix) of nematic liquid crystal molecules is provided. The twist may be achieved by means of a non-parallel alignment of alignment layers. Further, cholesteric dopants may be added to the liquid crystal material to break degeneracy of the twist direction (clockwise or anti-clockwise) and to further control the pitch of the twist in the relaxed (typically undriven) state. A super twisted liquid crystal layer has a twist of greater than 180 degrees. A twisted nematic layer used in spatial light modulators typically has a twist of 90 degrees.

Liquid crystal molecules with positive dielectric anisotropy are switched from a homogeneous alignment (such as an A-plate retarder orientation) to a homeotropic alignment (such as a C-plate or O-plate retarder orientation) by means of an applied electric field.

Liquid crystal molecules with negative dielectric anisotropy are switched from a homeotropic alignment (such as a C-plate or O-plate retarder orientation) to a homogeneous alignment (such as an A-plate retarder orientation) by means of an applied electric field.

Rod-like molecules have a positive birefringence so that $n_e > n_o$ as described in eqn. 2. Discotic molecules have negative birefringence so that $n_e < n_o$.

Positive retarders such as A-plates, positive O-plates and positive C-plates may typically be provided by stretched films or rod-like liquid crystal molecules. Negative retarders such as negative C-plates may be provided by stretched films or discotic-like liquid crystal molecules.

Parallel liquid crystal cell alignment refers to the alignment direction of homogeneous alignment layers being parallel or more typically antiparallel. In the case of pre-tilted homeotropic alignment, the alignment layers may have components that are substantially parallel or antiparallel. Hybrid aligned liquid crystal cells may have one homogeneous alignment layer and one homeotropic alignment layer. Twisted liquid crystal cells may be provided by alignment layers that do not have parallel alignment, for example oriented at 90 degrees to each other.

The structure and operation of various anamorphic near-eye display apparatuses will now be described. In this description, common elements have common reference numerals. It is noted that the disclosure relating to any element applies mutatis mutandi to each device in which the same or corresponding element is provided. Accordingly, for brevity such disclosure is not repeated. Similarly, the various features of any of the following examples may be combined together in any combination.

It would be desirable to provide an anamorphic near-eye display apparatus 100 with a thin form factor, large freedom of movement, high resolution, high brightness and wide field of view. An anamorphic near-eye display apparatus 100 will now be described.

Figure 1B:
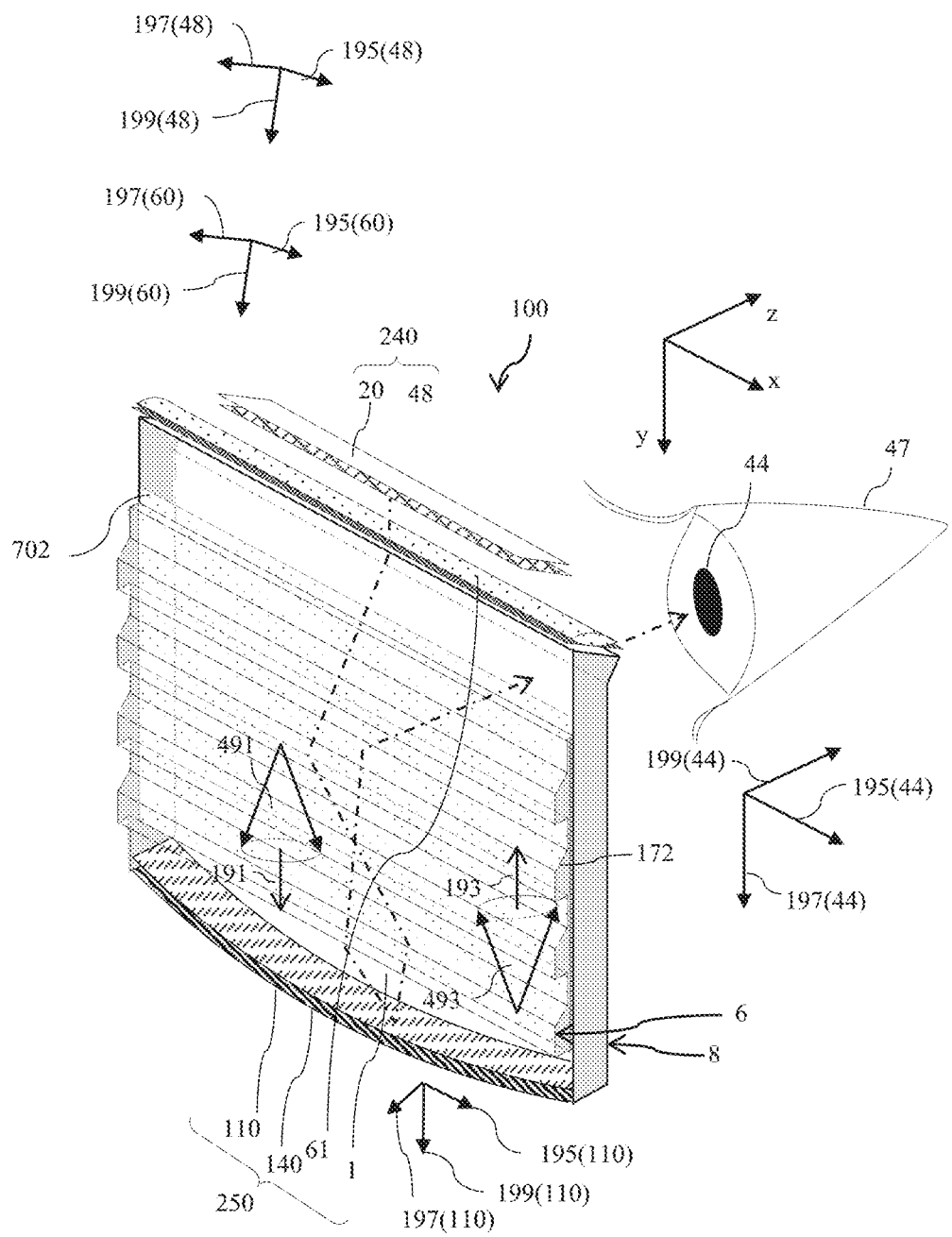
FIG. 1B is a schematic diagram illustrating a front perspective view of the coordinate system arrangements for the anamorphic near-eye display apparatus of FIG. 1A.

FIG. 1A is a schematic diagram illustrating a front perspective view of an anamorphic near-eye display apparatus 100; and FIG. 1B is a schematic diagram illustrating a front perspective view of the coordinate system arrangements for the anamorphic near-eye display apparatus 100 of FIG. 1A.

FIG. 1A illustrates an anamorphic directional illumination device 1000 which is an anamorphic near-eye display apparatus 100. In the present description, an anamorphic near-eye display apparatus 100 is provided near to an eye 45, to provide light to the pupil 44 of the eye 45 of a viewer 47. In an illustrative embodiment, the eye 45 may be arranged at a nominal viewing distance $e_R$ of between 5 mm and 100 mm and preferably between 8 mm and 25 mm from the output surface of the anamorphic near-eye display apparatus 100. Such displays are distinct from direct view displays wherein the viewing distance is typically greater than 100 mm. The nominal viewing distance $e_R$ may be referred to as the eye relief.

The anamorphic near-eye display apparatus 100 comprises an illumination system 240 comprising a spatial light modulator 48 and arranged to output light and an optical system 250 arranged to direct light from the illumination system 240 to the eye 45 of a viewer 47. The illumination system 240 is arranged to output light rays 400 including illustrative light rays 401, 402 that are input into the optical system 250.

In operation, it is desirable that the spatial pixel data provided on the spatial light modulator 48 is directed to the pupil 44 of the eye 45 as angular pixel data. The lens of the viewer's eye 45 relays the angular spatial data to spatial pixel data at the retina 46 of the eye 45 such that an image is provided by the anamorphic near-eye display apparatus 100 to the viewer 47.

The pupil 44 is located in a spatial volume near to the anamorphic near-eye display apparatus 100 commonly referred to as the exit pupil 40, or eyebox. When the pupil 44 is located within the exit pupil 40, the viewer 47 is provided with a full image without missing parts of the image, that is the image does not appear to be vignetted at the viewer's retina 46. The shape of the exit pupil 40 is determined at least by the anamorphic imaging properties of the anamorphic near-eye display apparatus and the respective aberrations of the anamorphic optical system. The exit pupil 40 at a nominal eye relief distance $e_R$ may have dimension $e_R$ in the lateral direction 195 and dimension $e_R$ in the transverse direction 197. The maximum eye relief distance $E_{Rmax}$ refers to the maximum distance of the pupil 44 from the anamorphic near-eye display apparatus 100 wherein no image vignetting is present. In the present embodiment, increasing the size of the exit pupil 40 refers to increasing the dimensions $e_L$, $e_T$. Increased exit pupil 40 achieves an increased viewer freedom and an increase in $e_{Rmax}$ as will be described further hereinbelow with reference to FIGS. 4A-C for example.

The spatial light modulator 48 comprises pixels 222 distributed at least in the lateral direction 195 as will be described further hereinbelow, for example in FIGS. 2A-D and FIG. 37B. In the illustrative embodiment of FIG. 1A, the illumination system 240 comprises a transmissive spatial light modulator 48 comprising an array of spatially separated pixels 222 distributed in a lateral direction 195(48) and transverse direction 197(48). In the embodiment of FIG. 1A, the spatial light modulator 48 is a TFT-LCD and illumination system 240 further comprises a backlight 20 arranged to illuminate the spatial light modulator 48.

The anamorphic near-eye display apparatus 100 further comprises a control system 500 arranged to operate the illumination system 240 to provide light that is spatially modulated in accordance with image data representing an image.

The optical system 250 comprises a transverse anamorphic component 60 comprising transverse lens 61 in the embodiment of FIG. 1A, as discussed below. The transverse lens 61 comprises a cylindrical lens in this example.

A transverse anamorphic component 60 is arranged to receive light rays 400 from the spatial light modulator 48. The optical system 250 is arranged so that light output from the transverse anamorphic component 60 is directed in directions that are distributed in the transverse direction 197(60).

In the embodiment of FIG. 1A, the transverse anamorphic component 60 is a transverse lens 61 that is extended in a lateral direction 195 (60) parallel to the lateral direction 195(48) of the spatial light modulator 48. The transverse anamorphic component 60 that is lens 61 has positive optical power in a transverse direction 197(60) that is parallel to the direction 197(48) and orthogonal to the lateral direction 195 (60); and no optical power in the lateral direction 195 (60).

In the present disclosure, the term lens most generally refers to a single lens element or most commonly a compound lens (group of lens elements) as will be described hereinbelow in FIG. 35 for example; and is arranged to provide optical power. A lens may comprise a single refractive surface, multiple refractive surfaces, reflective surfaces or may comprise a catadioptric lens element that combines refractive and reflective surfaces for example as illustrated in FIG. 34C hereinbelow. A lens may further or alternatively comprise diffractive optical elements. A transverse lens is a lens that provides optical power in the transverse direction. Typically a transverse lens provides no optical power in the lateral direction. A transverse lens may be termed a cylindrical lens, although the profile in cross section of the surface or surfaces providing optical power may be different to a segment of a circle, for example paraboidal, elliptical or aspheric.

The optical system 250 further comprises an extraction waveguide 1 arranged to receive light from the transverse lens 61 and arranged to guide light rays 400 in cone 491 from the transverse lens 61 to a lateral anamorphic component 110 along the extraction waveguide 1 in a first direction 191. The lateral anamorphic component 110 has positive optical power in the lateral direction 195.

The extraction waveguide 1 has opposing rear guide surface 6 and front guide surface 8, and a polarization-sensitive reflector 700 opposing the front guide surface 8. One example of a polarization-sensitive reflector 700 is a reflective linear polarizer 702. Other types of polarization-sensitive reflector 700 will be described further hereinbelow.

The extraction waveguide 1 further has an input end 2 extending in the lateral and transverse directions 195 (60), 197(60), the extraction waveguide 1 being arranged to receive light 400 from the illumination system 240 through the input end 2. The input end 2 extends in the lateral direction 195 between edges 22, 24 of the extraction waveguide 1, and extends in the transverse direction between opposing rear and front guide surfaces 6, 8 of the extraction waveguide 1.

The anamorphic near-eye display apparatus 100 is arranged to provide light 400 guided along the extraction waveguide 1 in the first direction 191 with an input linear polarization state 902 before reaching the polarization-sensitive reflector 700 comprising the reflective linear polarizer 702.

The optical system 250 further comprises a light reversing reflector 140 arranged to reflect the light rays 400 in light cones 491 that have been guided along the extraction waveguide 1 in the first direction 191. The reflected light rays 400 in light cone 493 with polarization state 904 is light that is formed to be guided along the extraction waveguide 1 in a second direction 193 opposite to the first direction 191 and so that reflected cone 493 is guided back through the extraction waveguide 1.

In the embodiment of FIG. 1A, the light reversing reflector 140 is a reflective end 4 of the extraction waveguide 1. Furthermore, the lateral anamorphic component 110 comprises the light reversing reflector 140. The reflective end 4 of the extraction waveguide 1 has a curved shape in the lateral direction 195 that provides positive optical power, affecting the light rays in cone 491 in the lateral direction 195 (110), and no power in the transverse direction 197 (110). The optical system 250 is thus arranged so that light output from the lateral anamorphic component 110 is directed in directions that are distributed in the transverse direction 197 (110) and the lateral direction 195 (110). The curved shape of the reflective end 4 may be a shape that is the cross section of a sphere, ellipse, parabola or other aspheric shape to achieve desirable imaging of light rays from the spatial light modulator 48 to the pupil 44 of the eye 45 as will be described further hereinbelow.

Extraction element 270 is disposed outside the polarization-sensitive reflector 700, the extraction element 270 comprising: the rear guide surface 6 opposing the front guide surface 8; and an array of extraction features 170.

The array of extraction features 170 is arranged on the rear guide surface 6 that comprises plural prisms 171 that protrude outwardly. The prisms 171 each comprise at least one extraction facet 172, and at least one draft facet 174. At least one primary guide facet 176 may be arranged between the respective at least one extraction facet 172 and the at least one draft facet 174. The rear guide surface 6 further comprises guide portions 178 between the prisms 171.

The array of extraction features 170 comprises extraction facets 172A-D, each extraction facet 172 being arranged to reflect light 401, 402 guided in the second direction 193 towards the eye 45 of the viewer 47 through the front guide surface 8.

The array of extraction facets 172A-D are distributed along the extraction waveguide 1 so as to provide exit pupil 40 expansion in the transverse direction, as will be described further hereinbelow with reference to FIGS. 4A-C for example.

The optical system 250 further comprises a polarization conversion retarder 72 disposed between the reflective linear polarizer 702 and the light reversing reflector 140; wherein the operation of the polarization conversion retarder 72 will be described further hereinbelow in FIGS. 3B-C for example, and is arranged to convert between the linear polarization state 902 propagating in the first direction 191 and the linear polarization state 194 propagating in the second direction 193.

The principle of operation of the anamorphic near-eye display apparatus 100 will now be further described. The optical system 250 has an optical axis 199 and has anamorphic properties in a lateral direction 195 and in a transverse direction 197 that are perpendicular to each other and perpendicular to the optical axis 199.

Mathematically expressed, for any location within the anamorphic near-eye display apparatus 100, the optical axis direction 199 may be referred to as the O unit vector, the transverse direction 197 may be referred to as the T unit vector and the lateral direction 195 may be referred to as the L unit vector wherein the optical axis direction 199 is the crossed product of the transverse direction 197 and the lateral direction 195:

$$O = T \times L \qquad \text{eqn. 4}$$

Various surfaces of the anamorphic near-eye display apparatus 100 transform or replicate the optical axis direction 199; however, for any given ray, the expression of eqn. 4 may be applied.

FIG. 1B illustrates the variation of optical axis 199 direction, lateral direction 195 and transverse direction 197 as light rays propagate through the optical system 250. In the present description, the lateral and transverse directions 195, 197 are defined relative to the optical axis 199 direction in any part of the illumination system 240 or optical system 250, and are not in constant directions in space. In the embodiment of FIG. 1B, the transverse direction 197(60) illustrates the transverse direction 197 at the transverse anamorphic component 60 formed by the transverse lens 61; the transverse direction 197 (110) illustrates the transverse direction 197 at the lateral anamorphic component 110; and the transverse direction 197(44) illustrates the transverse direction 197 at the eye 45 of the viewer 47. The transverse anamorphic component 60 has lateral direction 195 (60) that is the same as the lateral direction 195 (110) of the lateral anamorphic component 110 and the lateral direction 195(44) at the pupil 44 of the eye 45. The Euclidian coordinate system illustrated by x, y, z directions is invariant, whereas the transverse direction 197, lateral direction 195 and optical axis direction 199 may be transformed at various optical components, in particular by reflection from optical components, of the anamorphic near-eye display apparatus 100.

Further features of the arrangement of FIG. 1A will now be described.

The optical system 250 may comprise an input linear polarizer 70 disposed between the spatial light modulator 48 and the extraction features 170 and disposed between the spatial light modulator 48 and the polarization-sensitive reflector 700 of the extraction waveguide 1; and is arranged to pass light having the input linear polarization state 902. In FIG. 1A, the input linear polarizer 70 is arranged between the transverse anamorphic component 60 and the extraction waveguide 1. The input linear polarizer 70 is an absorbing polarizer such as a dichroic iodine polarizer arranged to transmit a linear polarization state and absorb the orthogonal polarization state.

Further the optical system 250 may comprise a polarization conversion retarder 72 disposed between the light reversing reflector 140 and the array of extraction features 170. Polarization conversion retarder 72 may be an A-plate with an optical axis direction arranged to convert linearly polarized light to circularly polarized light and circularly polarized light to linearly polarized light. The operation of the input linear polarizer 70 and polarization conversion retarder 72 will be described further hereinbelow, for example in FIGS. 6A-B.

In operation, extraction waveguide 1 is arranged to guide light rays 400 propagating in the first direction 191 between the reflective linear polarizer 702 and the front guide surface 8 as illustrated by the zig-zag paths of guided rays 401, 402.

Waveguide 1 further comprises a reflective end 4 arranged to receive the guided light rays 401, 402 from the input end 2. The lateral anamorphic component 110 comprises the reflective end 4 of the extraction waveguide 1 with a reflective material provided on the reflective end 4. The reflective material may be a reflective film such as ESR™ from 3M or may be an evaporated or sputtered metal material such as aluminium or silver. In the embodiment of FIG. 1A, the lateral anamorphic component 110 is thus a curved mirror with positive optical power in the lateral direction 195 and no optical power in the transverse direction 197.

For light rays 400 propagating in the second direction 193, the extraction waveguide is arranged to provide guiding between the front guide surface 8 and the guide facet 174 or between the front guide surface 8 and the guide portion 178. In the second direction 193, light is transmitted through the reflective linear polarizer 702.

For light cone 493 propagating in the second direction 193, the extraction facets 172A-D are oriented to extract light guided back along the extraction waveguide 1 in the second direction 193 through the front guide surface 8 and towards the pupil 44 of eye 45 arranged in eyebox 40.

The operation of the near-eye display device 100 as an augmented reality display will now be further described.

The extraction waveguide 1 is transmissive to light that passes through the intermediate surfaces of the rear guide surface 6, comprising primary guide facets 176, and guide portions 178 such that on-axis real image point 31 on a real-world object 30 is directly viewed through the extraction waveguide 1 by light ray 32. Similarly virtual image 34 with aligned on-axis virtual pixel 36 is desirably viewed with virtual ray 37. Such virtual ray 37 is provided by on-axis light ray 401 after reflection from extraction facet 172C to the pupil 44 of eye 45. Similarly off-axis virtual ray 39 for viewing of virtual pixel 38 is provided by off-axis ray 402 after reflection from the extraction facet 172D. An augmented reality display with advantageously high transmission of external light rays 32 may be provided.

The imaging properties of the anamorphic near-eye display apparatus 100 will now be further described using an unfolded schematic representation wherein said transformations of coordinates are removed for purposes of explanation.

Figure 1C:
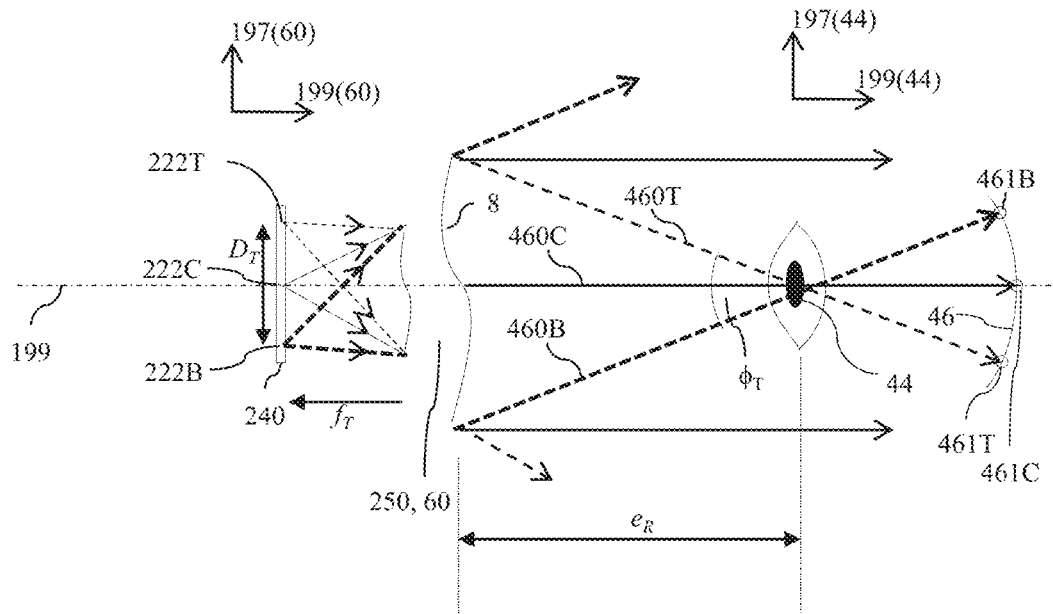
FIG. 1C is a schematic diagram illustrating in side view the operation of a near-eye display in a transverse plane.
Figure 1D:
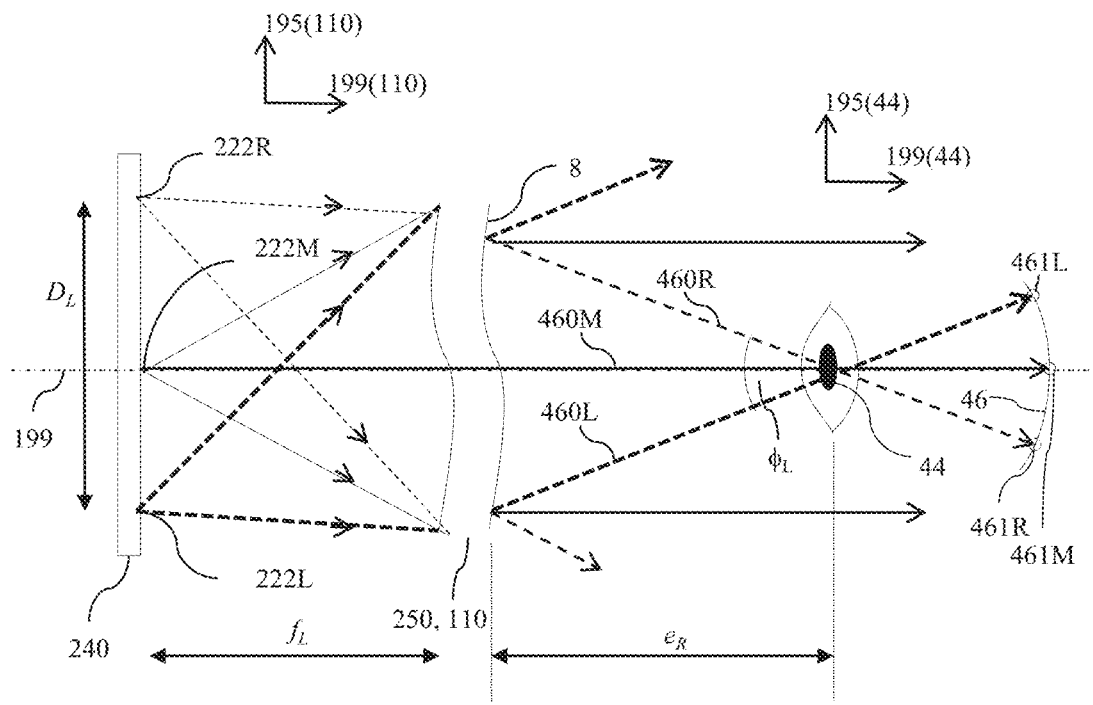
FIG. 1D is a schematic diagram illustrating in side view the operation of a near-eye display in a lateral plane orthogonal to the transverse plane.
Figure 1E:
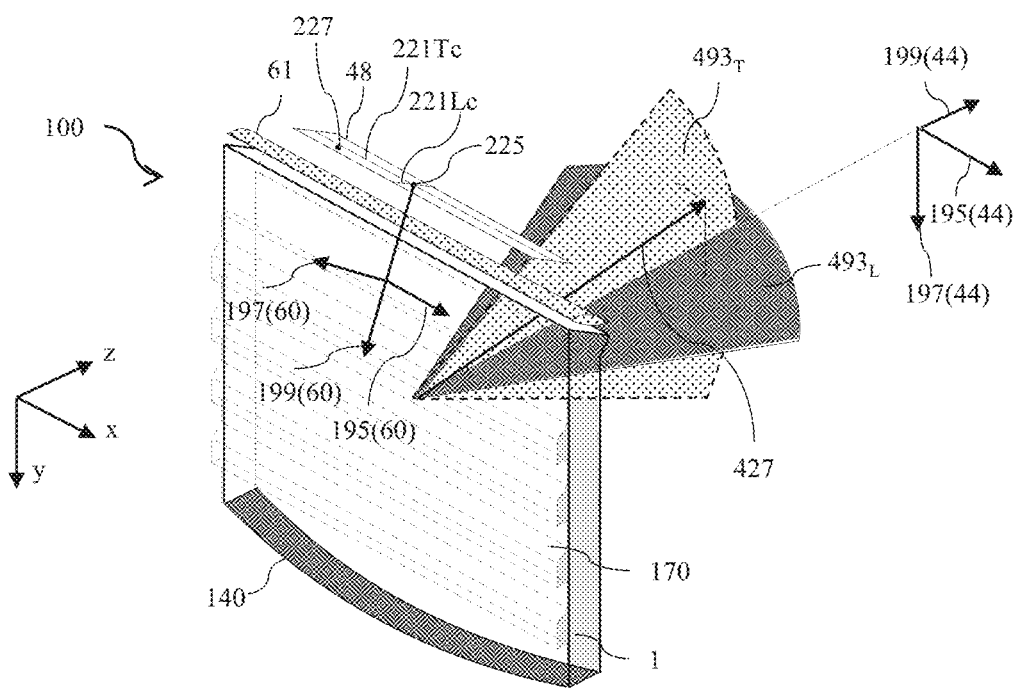
FIG. 1E is a schematic diagram illustrating a front perspective view of a coordinate system mapping for the anamorphic near-eye display apparatus of FIG. 1A.

FIG. 1C is a schematic diagram illustrating in side view the operation of an anamorphic near-eye display apparatus 100 in a transverse plane; FIG. 1D is a schematic diagram illustrating in side view the operation of an anamorphic near-eye display apparatus 100 in a lateral plane orthogonal to the transverse plane; and FIG. 1E is a schematic diagram illustrating a front perspective view of the mapping of the coordinate system for the anamorphic near-eye display apparatus 100 of FIG. 1A. Features of the embodiment of FIGS. 1C-E not discussed in further detail may be assumed to correspond to the features with equivalent reference numerals as discussed above, including any potential variations in the features.

For illustrative purposes, in FIGS. 1C-D, the variation of optical axis direction 199 as illustrated in FIGS. 1A-B is omitted. FIGS. 1C-D illustrate the principle of operation of the anamorphic near-eye display apparatus 100 of FIG. 1A in unfolded illustrative arrangements to achieve a near-eye image with lateral and transverse fields of view $\phi_T$ and $\phi_L$ that are the same to the viewer 47, that is for illustrative purposes a square image is provided to the retina 46. The pupil 44 is shown as at the common viewing distance $e_R$ from the output light guide surface 8 of the optical system 250.

FIG. 1C illustrates the transverse imaging property of the anamorphic near-eye display apparatus 100. Illumination system 240 is provided with top, centre and bottom illuminated pixels 222T, 222C, 222B across the transverse direction 197 with light rays output into the transverse anamorphic component 60 with optical power only in the transverse direction that collimates the output from each pixel 222L, 222C, 222R and directs towards the eye 45. Light rays 460T pass through the pupil 44 of the eye 45 onto the retina 46 of the eye 45 and create an off-axis image point 461T. Light rays 460C pass onto the retina 46 and create centre image point 461C and light rays 460B pass onto the retina 46 and create off-axis image point 461B.

FIG. 1D illustrates the lateral imaging property of the anamorphic near-eye display apparatus 100. Illumination system 240 is provided with right, middle and left illuminated pixels 222L, 222M, 222R across the lateral direction 195 with light rays output into the lateral anamorphic component 110 with optical power only in the lateral direction that collimates the output from each pixel 222L, 222M, 222R and directs towards the pupil 44 of the eye 45. Light rays 460L pass through the pupil 44 of the eye 45 onto the retina 46 of the eye 45 and create an off-axis image point 461L. Light rays 460M pass onto the retina 46 and create image point 461M and light rays 460R pass onto the retina 46 and create an image point 461R.

The viewer perceives a magnified virtual image with the optical system 250 arranged between the virtual image 34 and the eye 45, with the same field of view $\phi$ in each of lateral and transverse directions 195, 197.

In the anamorphic near-eye display apparatus 100 of the present embodiments, the distance $f_T$ between the first principal plane of the transverse anamorphic component 60 of the optical system 250 is different to the distance $f_L$ between the first principal plane of the lateral anamorphic component 110 of the optical system 250. Similarly, for a square output field of view ($\phi_T$ is the same as $\phi_L$), the separation $D_T$ of pixels 222T, 222B in the transverse direction is different to the separation $D_L$ of pixels 222R, 222L in the lateral direction 195.

In the present description, the lateral angular magnification $M_T$ provided by the lateral anamorphic component 110 of the optical system 250 may be given as $$M_L = \phi p_L / p_L \quad \text{eqn. 5}$$

and the transverse angular magnification $M_T$ provided by the transverse anamorphic component 60 of the optical system 250 may be given as:

$$M_T = \phi p_T / P_T \quad \text{eqn. 6}$$

where $\phi p_L$ is the angular size of a virtual pixel 36 seen by the eye in the lateral direction 195, $P_L$ is the pixel pitch in the lateral direction 195, $\phi p_T$ is the angular size of a virtual pixel 36 seen by the eye in the transverse direction 197, and $P^T$ is the pixel pitch in the transverse direction 197. In the case that the angular virtual pixels 36 are square, then $\phi p_L$ and $\phi p_T$ are equal and the angular magnification provided by the lateral anamorphic component 110 may be given as:

$$M_L = M_T * P_T / P_L \quad \text{eqn. 7}$$

The angular magnification $M_L$, $M_T$ of the lateral and transverse anamorphic optical elements 110, 60 is proportional to the respective optical power $K_L$, $K_T$ of said elements 60, 110. The spatial light modulator 48 may comprise pixels 222 having pitches $P_L$, $P_T$ in the lateral and transverse directions 195, 197 with a ratio $P_L/P_T$ that is the same as $K_T/K_L$, being the inverse of the ratio of optical powers of the lateral and transverse anamorphic optical elements 110, 60.

The output coordinate system is illustrated in FIG. 1E wherein output light from a central pixel 225 is directed along optical axis 199(60) through the transverse anamorphic component 60 and into the extraction waveguide 1, from which it is visible along the optical axis 199 (44) at the pupil 44.

The row 221Tc of pixels 222 through the central pixel 225 that is extended in the lateral direction 195 is output as fan $493_L$ of rays, each ray representing the angle at which a virtual pixel 38 is provided to the pupil 44 across the lateral direction 195.

The column 221Lc of pixels 222 through the central pixel 225 that is extended in the transverse direction 197 is output as fan $493_T$ of rays, each ray representing the angle at which a virtual pixel 38 is provided to the eye 45 across the transverse direction 197.

For a pixel 227 arranged in a quadrant of the spatial light modulator 48 an output ray 427 is provided to the pupil 44 that is imaged first by the transverse anamorphic component 60 and then by the lateral anamorphic component 110.

Illustrative imaging properties of the anamorphic near-eye display apparatus 100 of FIG. 1A will now be described.

Figure 1F:
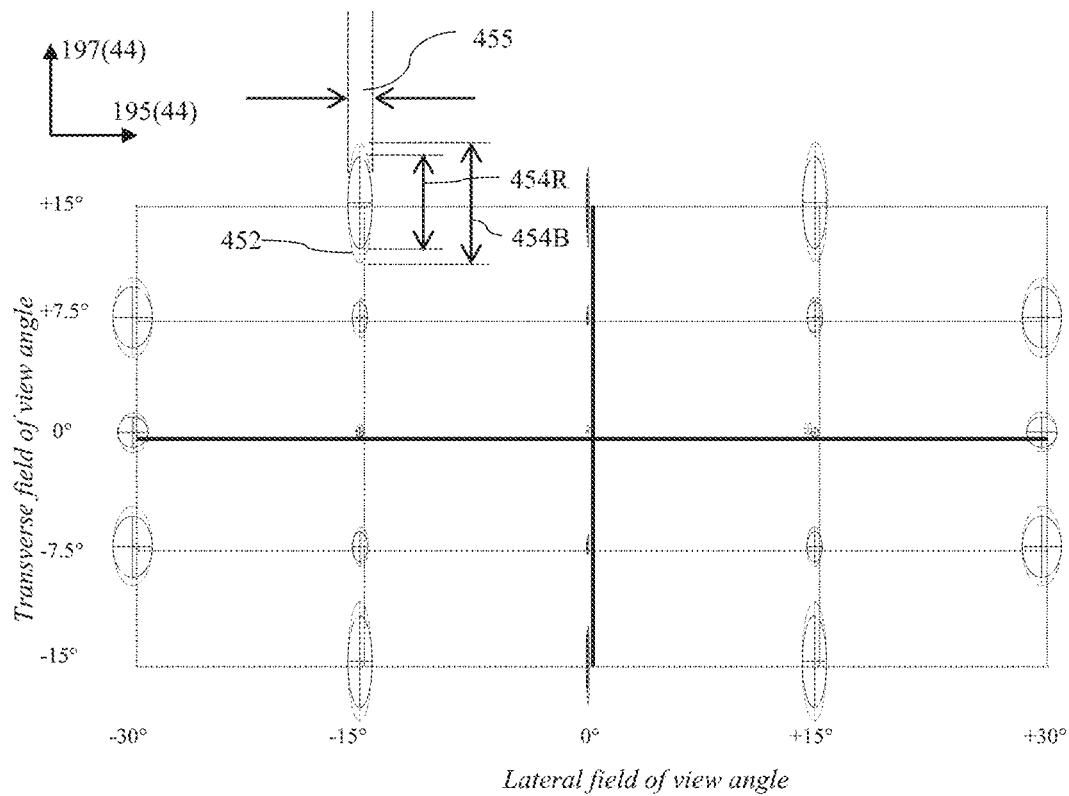
FIG. 1F is a schematic diagram illustrating a field-of-view plot of the output of the anamorphic near-eye display apparatus of FIG. 1A for polychromatic illumination.

FIG. 1F is a schematic diagram illustrating a field-of-view plot of the output of the anamorphic near-eye display apparatus 100 of FIG. 1A for polychromatic illumination.

FIG. 1F is a graph of the transverse viewing angle against the lateral viewing angle. The lateral field of view $\phi_L$ is 60 degrees and the transverse field of view $\phi_T$ is 30 degrees.

Points with 0 degrees lateral field of view lie in the transverse light cone $493_L$ while points with 0 degrees transverse field of view lie in the transverse light cone $493_T$. The relative aberrations at various image points are illustrated by blur ellipses 452.

The width 455 of each blur ellipse 452 indicates the relative blurring of a single pixel 227 when output to the eye 45 and thus represents the relative spot size at the retina 46 of the eye 45 in the lateral direction 195. For illustrative reasons, the heights 454 and widths 455 of the blur ellipse 452 are illustrated as magnified on the scale of the plot of FIG. 1F, and do not represent the actual angular size of the blurring of each angular pixel at the pupil 44.

The width 455 is the same for each colour of output light because the lateral anamorphic component 110 is a mirror and thus its imaging is advantageously achromatic.

The vertical height 454 of each ellipse indicates the relative blurring of a single pixel 227 from the spatial light modulator 48 when output as an angular cone to the eye 45 and thus represents the relative spot size at the retina 46 of the eye 45 in the transverse direction 197. The transverse anamorphic component 60 of FIG. 1A is a refractive optical element such as a compound lens and thus exhibits chromatic aberration. Thus the height 454R of the blur region for red pixels 222R is different to the height 454B for blue pixels 222B.

Thus the eye 45 looking at a white point off-axis will see some colour blurring for off-axis virtual pixels when looking up or down, but not side-by-side in the geometry of FIG. 1A.

Illustrative arrangements of pixels 222 of the spatially multiplexed spatial light modulator 48 will now be described.

Figure 2A:
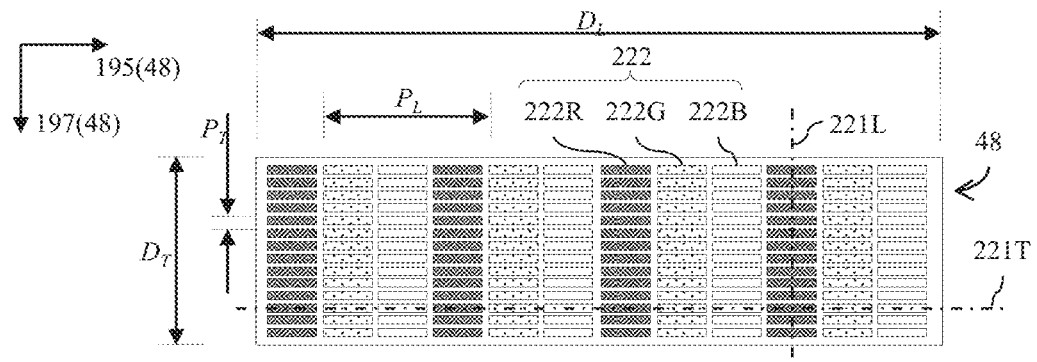
FIG. 2A, FIG. 2B, and FIG. 2C are schematic diagrams illustrating in front view arrangements of a spatial light modulator for use in the anamorphic near-eye display apparatus of FIG. 1A comprising spatially multiplexed red, green and blue sub-pixels.
Figure 2B:
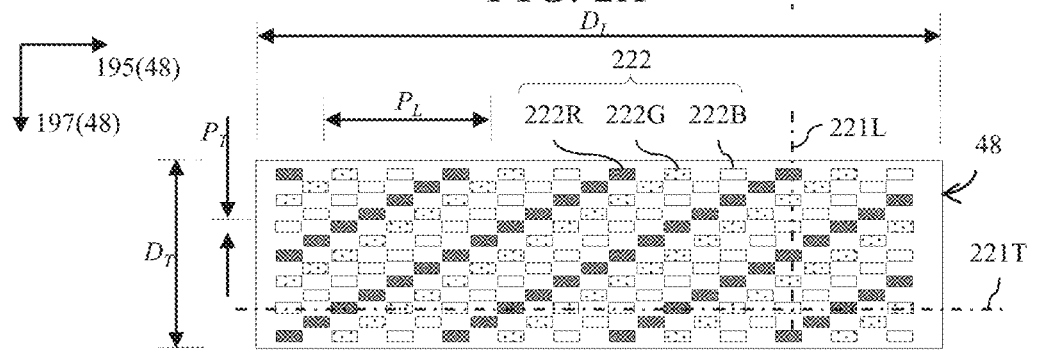
Figure 2C:
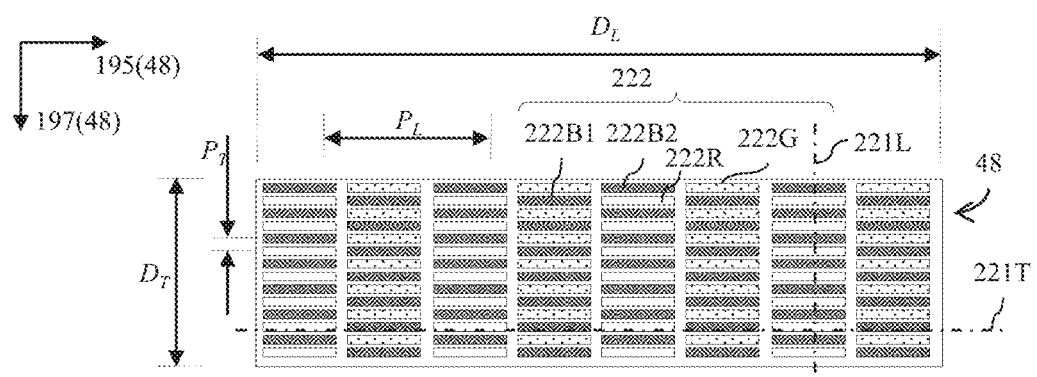

FIGS. 2A-C are schematic diagrams illustrating in front view a spatial light modulator 48 for use in the anamorphic near-eye display apparatus 100 of FIG. 1A comprising spatially multiplexed red, green and blue sub-pixels 222R, 222G, 222B. Features of the embodiments of FIGS. 2A-C not discussed in further detail may be assumed to correspond to the features with equivalent reference numerals as discussed above, including any potential variations in the features.

The spatial light modulator 48 may be a transmissive spatial light modulator such as an LCD as illustrated in FIG. 1A. Alternatively the spatial light modulator 48 may be a reflective spatial light modulator such as Liquid Crystal on Silicon (LCOS) or a Microoptoelectromechanical (MO-EMS) array of micro-mirrors such as the DMD from Texas Instruments. Alternatively the spatial light modulator 48 may be an emissive spatial light modulator using material systems such as OLED or inorganic micro-LED. A silicon backplane may be provided to achieve high speed addressing of high resolution arrays of pixels 222.

In FIGS. 2A-C, the pixels 222 of the spatial light modulator 48 are distributed in the lateral direction 195(48) and also distributed in the transverse direction 197(48) so that the light output from the transverse anamorphic component 60 is directed in the directions that are distributed in the transverse direction 197 and the light output from the lateral anamorphic component 110 is directed in the directions that are distributed in the lateral direction 195 when output towards the pupil 44 of the eye 45.

White pixels 222 comprising red, green and blue sub-pixels 222R, 222G, 222B are provided spatially separated in the lateral direction 195 and the sub-pixels 222R, 222G, 222B are elongate with a pitch $P_L$ in the lateral direction that is greater than the pitch $P_T$ in the transverse direction 197.

Considering FIGS. 1C-D and the embodiments of FIGS. 2A-D, it may be desirable to provide square white pixels in the final perceived virtual image 34. The pitch $P_L$ is magnified by the lateral anamorphic component to an angular size $\phi_L$ (with spatial pitch $\delta_L$ at the retina 46) and the pitch $P_T$ is magnified by the transverse anamorphic component to an angular size $\phi_L$ (with spatial pitch $\delta_T$ at the retina 46). The pitches $P_L$, $P_T$ may be determined by said different angular magnifications to advantageously achieve square angular pixels from the anamorphic near-eye display apparatus 100.

The pixels 222 are arranged as columns 221L, wherein the columns 221L are distributed in the lateral direction 195, and the pixels along the columns 221L are distributed in the transverse direction 197; and the pixels 222 are further arranged as rows 221T, wherein the rows 221T are distributed in the transverse direction 197, and the pixels along the rows 221T are distributed in the lateral direction 195.

In FIG. 2A, the sub-pixels 222R, 222G, 222B are distributed in columns of red, green, and blue pixels. Advantageously vertical and horizontal image lines may be provided with high fidelity.

In the alternative embodiment of FIG. 2B, the sub-pixels 222R, 222G, 222B are distributed along diagonal lines. Advantageously reproduction of natural imagery may be improved in comparison to the embodiment of FIG. 2A.

The sub-pixels 222R, 222G, 222B may be provided by white light emission and patterned colour filters, or may be provided by direct emission of respective coloured light. The present embodiments comprise sub-pixel 222 pitch $P_L$ that is larger than other known arrangements comprising a symmetric input lens for thin waveguides.

In the alternative embodiment of FIG. 2C, multiple blue pixels 222B1 and 222B2 may be provided. The blue pixels 222B1, 222B2 may be driven with reduced current for a desirable output luminance. Advantageously the lifetime of the pixels may be improved, for example when the spatial light modulator 48 is provided by an OLED microdisplay. In other embodiments, additional or alternative white pixels (for example with no colour filters) or a fourth colour such as yellow may be provided. Colour gamut and/or brightness and efficiency may advantageously be achieved.

Figure 2D:
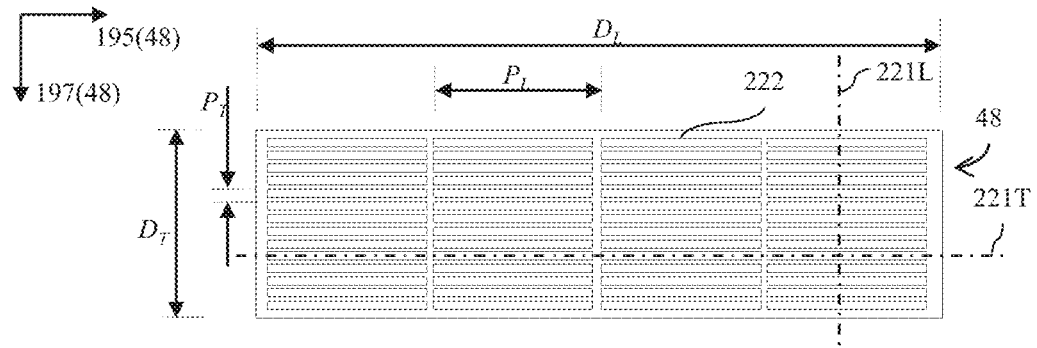
FIG. 2D is a schematic diagram illustrating in front view a spatial light modulator for use in the anamorphic near-eye display apparatus of FIG. 1A for use with temporally multiplexed spectral illumination.

FIG. 2D is a schematic diagram illustrating in front view a spatial light modulator 48 for use in the anamorphic near-eye display apparatus 100 of FIG. 1A with pixels 222 for use with temporally multiplexed spectral illumination. Features of the embodiment of FIG. 2D not discussed in further detail may be assumed to correspond to the features with equivalent reference numerals as discussed above, including any potential variations in the features.

The spatial light modulator 48 may be used for monochromatic illumination. In alternative embodiments wide colour gamut imagery may be provided by time sequential illumination, for example by red, green and blue illumination in synchronisation with red, green and blue image data provided on the spatial light modulator 48. Advantageously image resolution may be increased.

In comparison to non-anamorphic image projectors in which equal angular magnification is provided between the lateral direction 195 and transverse direction 197, the present embodiments provide pixel pitch $P_L$ that is substantially increased in size for a given angular image size and magnification in the transverse direction 197. Such increased size may advantageously achieve increased brightness, increased efficiency and reduced alignment tolerances for the spatial light modulator 48 and illumination system 240.

In colour filter type spatial light modulators 48, the size of colour filters may be increased. Advantageously cost and complexity of colour filters may be reduced. The aperture ratio of the pixels 222 may be increased. In direct emission displays the size of the emitting region may be increased. Advantageously cost and complexity of fabricating the pixels may be reduced and brightness increased. In inorganic micro-LED spatial light modulators 48, efficiency loss due to recombination losses at the edges of pixels may be reduced and system efficiency and brightness advantageously increased.

Input and extraction of light into the extraction waveguide 1 of FIG. 1A will now be further described.

Figure 3A:
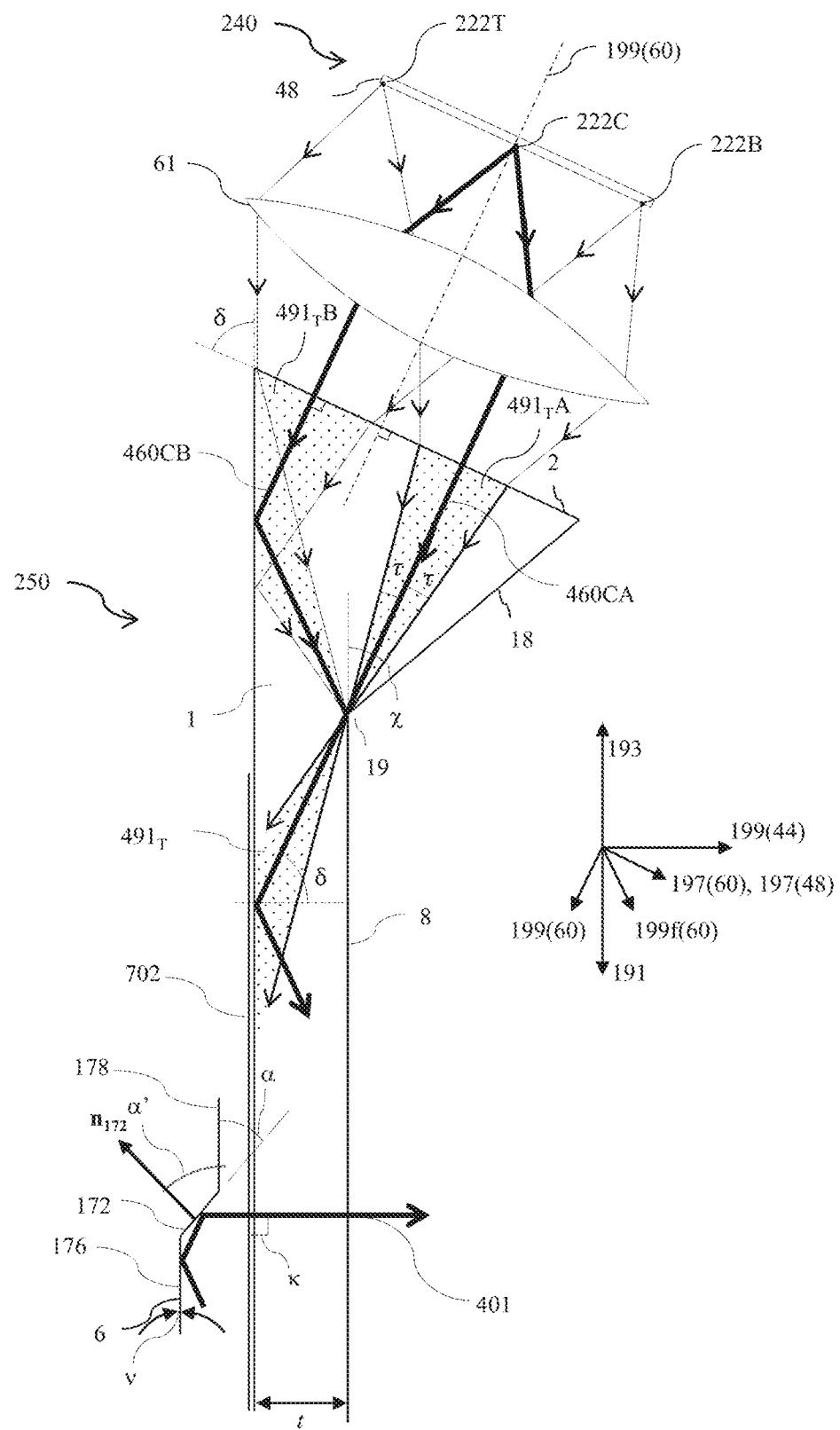
FIG. 3A is a schematic diagram illustrating a side view of light input into an extraction waveguide.

FIG. 3A is a schematic diagram illustrating a side view of light input into the extraction waveguide 1; FIG. 3B is a schematic diagram illustrating a side view of light propagation along the first direction 191 in the extraction waveguide 1; and FIG. 3C is a schematic diagram illustrating a side view of light extraction from the extraction waveguide 1. Features of the embodiments of FIGS. 3A-C not discussed in further detail may be assumed to correspond to the features with equivalent reference numerals as discussed above, including any potential variations in the features.

Extraction waveguide 1 comprises waveguide member 111A between the front guide surface 8 and polarization-sensitive reflector 700 and waveguide member 111B between the polarization-sensitive reflector 700 and the rear guide surface 6.

The input of transverse light cones $491_T$ into the extraction waveguide 1 will now be described with reference to FIG. 3A.

In the illustrative embodiment of FIG. 3A, the input end 2 of the extraction waveguide 1 is inclined, in particular having a surface normal that is inclined at angle δ with respect to the surface normal to the rear and front guide surfaces 6, 8, that is the input end 2 is inclined at angle δ with respect to the first and second directions 191, 193 along the extraction waveguide 1.

Spatial light modulator 48 and transverse anamorphic component 60 formed by the transverse lens 61 are inclined at the angle δ with respect to the normal to the rear and front guide surfaces 6, 8. The direction of the optical axis 199(60) through the transverse anamorphic component 60 is thus inclined with respect to the first and second directions 191, 193 along the extraction waveguide 1. The optical axis 199(60) direction is typically parallel to the surface normal of the input end 2, such that the optical axis direction 199(60) is inclined at the angle 90-δ with respect to the first and second direction 191, 193. Referring to FIG. 1F, advantageously improved aberrations may be achieved and the height 454 of the pixel blur ellipse 452 may be reduced in at least the transverse direction 197.

The optical system 250 further comprises a tapered surface 18 that is a surface inclined at angle χ provided near the input end 2 to direct light bundles in the transverse direction 197 from the transverse anamorphic component 60 into the extraction waveguide 1 at desirable angles of propagation. The tapered surface 18 is arranged between the input end 2 and the light guide surface 8, with surface normal direction inclined at an angle χ with respect to the surface normal to the light guide surface 8. In alternative embodiments, the tapered surface 18 may be arranged on the rear guide surface 6.

TABLE 1 shows an illustrative embodiment of the geometry of the arrangement of FIG. 3A for an extraction waveguide 1 refractive index of 1.5.

TABLE 1

| Angle compared to direction 191 along the extraction waveguide 1 | Illustrative embodiment |
| --- | --- |
| Input end 2 inclination, δ | 60° |
| Tapered surface 18 inclination, χ | 44° |
| Cone $491_T$ half angle in the material of the extraction waveguide, τ | 10° |
| Extraction facet 172 tilt angle, α | 60° |
| Intermediate surfaces 176, 178 tilt angle, ν | 0° |
| Angle of incidence of central output ray 460 C. at output surface 8, κ. | 90° |

Central pixel 222C provides illumination to the transverse anamorphic component 60 with illustrative light rays 460CA, 460CB. Light ray 460CA is input through the input end 2 without deflection and is directed to just miss the interface 19 of the tapered surface 18 and the front guide surface 8, and is thus undeflected. Light ray 460CB is however incident on the region of the rear guide surface 6 opposite the tapered surface 18 and is reflected by total internal reflection to the same interface 19, at which it is just totally internally reflected, such that the rays 460CA, 460CB overlap and are guided in the first direction 191 along the extraction waveguide 1.

The extraction facets 172 desirably have a surface normal direction $n_{172}$ that is inclined with respect to the direction 191 along the extraction waveguide by an angle α' (which in FIG. 3A is 90-α) in the range 20 to 40 degrees, preferably by an angle in the range 25 to 35 degrees and most preferably by an angle in the range 27.5 degrees to 32.5 degrees. Advantageously such an arrangement reduces stray light rays.

In alternative embodiments, the extraction facets 172 may have an angle α' that is in the range 50 to 70 degrees, preferably in the range 55 to 65 degrees and most preferably in the range 57.5 degrees to 62.5 degrees. Such arrangement directs light ray 460C through the light guide surface 8 when the ray has not reflected from the intermediate surfaces 176, 178 after reflection from the front light guide surface 8.

The embodiment of TABLE 1 illustrates a design for refractive index of 1.5. The refractive index of the extraction waveguide 1 may be increased, for example to a refractive index of 1.7 or greater. Advantageously the size of the light cone or may be increased and a larger angular image seen in the transverse direction.

The outer pixels 222T, 222B in the lateral direction 195(48) define the outer limit of light cones $491_T A$, $491_T B$ that propagate at angles τ either side of rays 460CA, 460CB. The tapered surface 18 is provided such that the whole of the light cone $491_T A$ is not deflected near to the input end 2, advantageously achieving reduced cross talk and high efficiency. After the light cones $491_T A$, $491_T B$ pass the interface 19, then they recombine to propagate along the extraction waveguide 1.

The propagation of transverse light cones $491_T$ along the extraction waveguide 1 in the first direction 191 will now be described with reference to FIG. 3B.

Considering FIG. 3B, the propagation of light rays in cone 491 that are distributed in the transverse direction 197 are illustrated. On-axis light ray 401 from a central pixel 222 of the spatial light modulator 48 is directed through the transverse anamorphic component 60 into the extraction waveguide.

The direction of the optical axis 199(60) through the transverse anamorphic component 60 is inclined at angle δ that is inclined at angle 90-δ to the first direction 191 along the extraction waveguide 1.

After the interface 19, the light cone $491_T$ is incident on the reflective linear polarizer 702 with an angle of incidence δ and is reflected such that a replicated light cone $491_T f$ is provided propagating along the extraction waveguide 1 in the direction 191.

FIG. 3C illustrates the propagation of corresponding reflected light cones $493_T$, $493_T f$ after reflection at the light reversing component 140. In the transverse direction 197, the lateral anamorphic component 110 has no optical power and has a surface normal direction $n_4$ that is desirably parallel to the first directions 191, 193. The visibility of artefacts arising from stray light including double images and ghost images may be reduced.

The reflected light cones $493_T$, $493_T f$ propagate along the second direction 193 with angle τ about optical axes 199(60) and 199f(60). Corresponding transverse directions 197(60), 197f(60) are also indicated.

Both cones $493_T$, $493_T f$ comprise image data that between the cones $493_T$, $493_T f$ is flipped about the direction 191 and thus provides degeneracy of ray directions for a given pixel 222 on the spatial light modulator 48. It is desirable to remove such degeneracy so that only one of the cones $493_T$, $493_T f$ is extracted and a secondary image is not directed to the pupil 44 of the eye 45.

Output light ray 401 propagates by total internal reflection of opposing surfaces 6, 8 until it is incident on a guide surface 176 at which at least some light is reflected, and then at extraction facet 172 at which at least some light is further reflected as will be described further hereinbelow such that light cone $493_T$ is preferentially directed towards the front guide surface 8. After refraction at the light guide surface 8, light in the cone $495_T$ is extracted towards the eye 45, with a cone angle that has increased size compared to the cone $493_T$.

The extraction facets 172A-E are inclined at the same angle, a such that for each of the light extraction facets 172A-E of FIG. 1A, the light cones $493_T$ are parallel and image blur for light ray 401 extracted to the pupil 44 from different extraction facets 172 across the extraction waveguide 1 is advantageously reduced.

By way of comparison, the light cone $493_T$f around light ray 461 which is incident on the surface 8 and then directly incident on extraction facet 172 without first reflecting from the guide surface 176 has an angle of incidence that is different to the angle of incidence δ. The difference in angle of incidence provides for preferential transmission through the extraction facet 172, and light cone $493_T$f is not directed towards the eye 45. Degeneracy is reduced or removed and image cross talk or reflected images are advantageously reduced.

The inclined input end 2 and inclined transverse anamorphic component 60 thus provide cones $493_T$, $493_T$f that are not overlapping with one of said cones preferentially extracted towards the eye 45 and the other cone preferentially retained within the extraction waveguide. The tilted input end 2 and tilted transverse anamorphic component 60 thus advantageously achieve a single image visible to the eye 45 and double images are minimised. In some of the illustrative embodiments hereinbelow, the surface normal of the input end 2 is not inclined to the first and second directions 191, 193; however that is to simplify the illustrations hereinbelow rather than a typical arrangement.

In alternative embodiments (not shown), the central output ray 401 may be inclined to the surface normal to the light guide surface 8, for example to adjust the angular location of the centre of the field of view of the extracted light cone $495_T$.

The present embodiments enable the uniformity of output to be improved in comparison to a near-eye display system is described in U.S. Pat. No. 10,048,500, which is herein incorporated by reference in its entirety. The uniformity of output for light from a single extraction facet 172 may at least in part be considered by evaluating the angular ranges from which light is received after reflection at the light reversing reflector 140. For the light propagating along the extraction waveguide 1 in the first direction 191, all ray angles within the light cones $491_T$ and $491_T$f are preserved because of guiding between the polarization-sensitive reflector 700 and the front light guide surface 8. Such guiding preserves visibility of said ray angles such that the extraction facet 172 provides output of all ray angles. Missing ray angles are reduced or eliminated and advantageously uniformity of the field of ray angles seen by the eye 45 is increased. Further, the size of the transverse anamorphic component 60 in the transverse direction is increased for a given desirable thickness. Advantageously brightness may be increased and/or thickness of the extraction waveguide 1 reduced.

Pupil expansion in the transverse direction 197 will now be described.

Figure 4A:
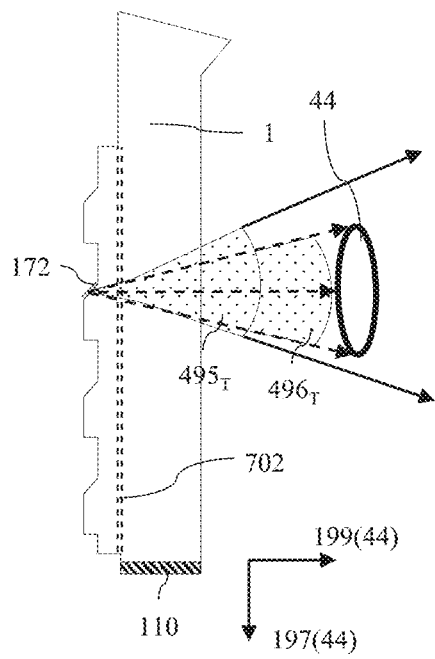
FIG. 4A is a schematic diagram illustrating a side view of light output from an anamorphic near-eye display apparatus for a single extraction feature.

FIG. 4A is a schematic diagram illustrating a side view of light output from the anamorphic near-eye display apparatus 100 for a single extraction facet 172; FIG. 4B is a schematic diagram illustrating a side view of light output from the anamorphic near-eye display apparatus 100 for multiple extraction facets 172A-M to achieve a full ray cone input in the transverse direction 197(44) into the viewer's pupil 44; and FIG. 4C is a schematic diagram illustrating a front view of light output from the anamorphic near-eye display apparatus 100 for multiple extraction facets 172A-N for a moving viewer 47 in the transverse direction 197(44). Features of the embodiments of FIGS. 4A-C not discussed in further detail may be assumed to correspond to the features with equivalent reference numerals as discussed above, including any potential variations in the features.

The array of extraction facets 172 are distributed along the extraction waveguide 1 to provide exit pupil 40 expansion, that is increasing the size $e_T$ of the eyebox 40 in the transverse direction 197 as will now be described.

Considering FIG. 4A, a single extraction facet 172 is arranged to output light cone $495_T$ towards the pupil 44. However, the limited size of the pupil 44 determines that only those light rays within the partial light cone $496_T$ are received by the eye 45 and the field of view of the image observed on the retina in the transverse direction 197(44) is smaller than that input into the extraction waveguide 1. It would be desirable to increase the field of view of observation.

Figure 4B:
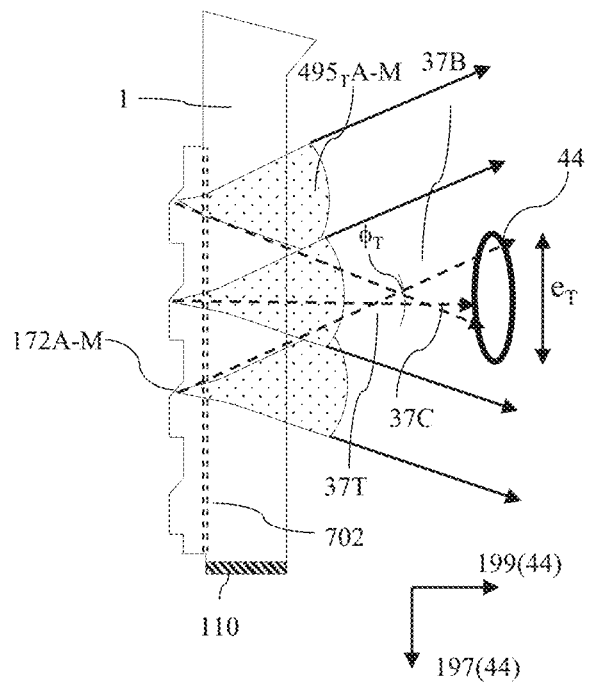
FIG. 4B is a schematic diagram illustrating a side view of light output from an anamorphic near-eye display apparatus for multiple extraction features to achieve a full ray cone input in the transverse direction into a viewer's pupil.

Considering FIG. 4B, multiple extraction facets 172A-M are provided sufficient to provide light rays 401C, 401T, 401B from the full cone $495_T$. The pupil 44 has a height greater than the pitch of the extraction facets 172. For example the pitch of the extraction facets 172 may be 1 mm and the nominal diameter of the pupil 44 may be 3 mm to 6 mm. The pupil receives light from multiple extraction facets 172A-M, and the field of view $\phi_T$ observed is the same as that input into the extraction waveguide 1 at the input end. The exit pupil 40 has a size $e_T$ that is the same as the pupil 44 height in this limiting case.

Figure 4C:
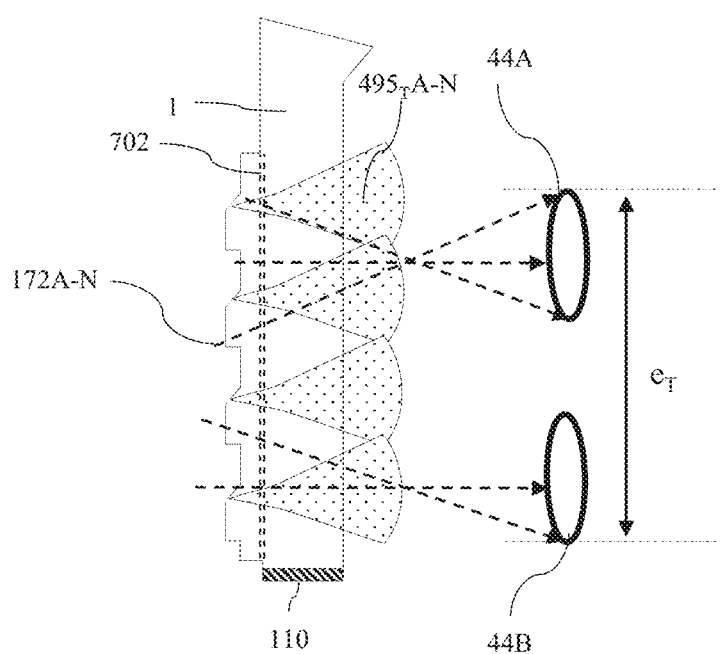
FIG. 4C is a schematic diagram illustrating a side view of light output from an anamorphic near-eye display apparatus for multiple locations for a moving viewer in the transverse direction.

Considering FIG. 4C, further extraction facets 172A-N are provided sufficient to provide movement of the pupil 44 between pupil 44A location and pupil 44B location. In this manner $e_T$ is increased and exit pupil expansion in the transverse direction is achieved. A transverse field of view $\phi_T$ is provided over an extended pupil 44 location advantageously achieving increased comfort of use and full image visibility.

As will be described in FIGS. 5A-E hereinbelow, the lateral anamorphic component 110 further provides exit pupil 40 expansion in the lateral direction 195, that is increasing the size e of the eyebox 40 in the lateral direction 195.

The imaging properties of the anamorphic near-eye display apparatus 100 in the lateral direction 195 will now be considered further.

Figure 5A:
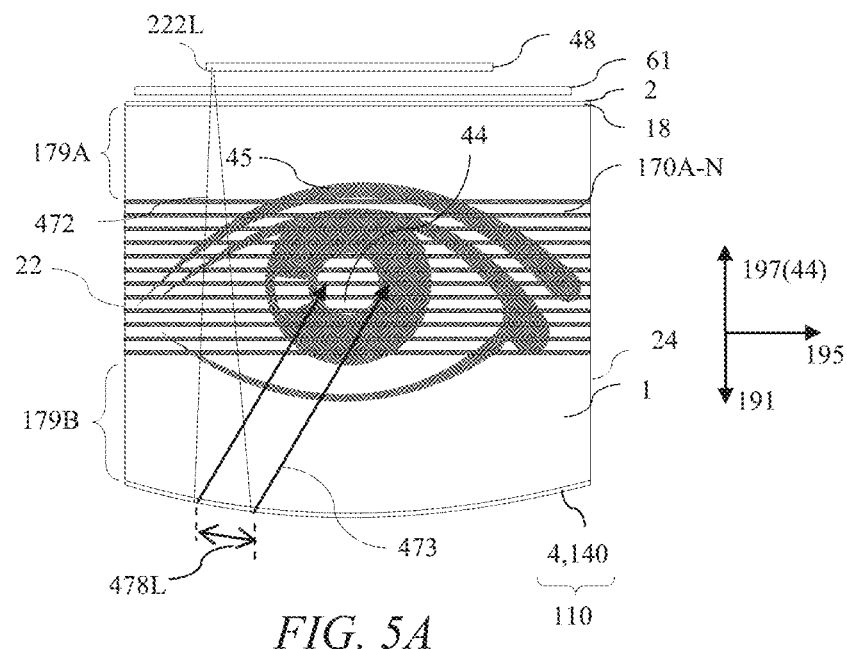
FIG. 5A is a schematic diagram illustrating a front view of light output from the anamorphic near-eye display apparatus of FIG. 1A.
Figure 5B:
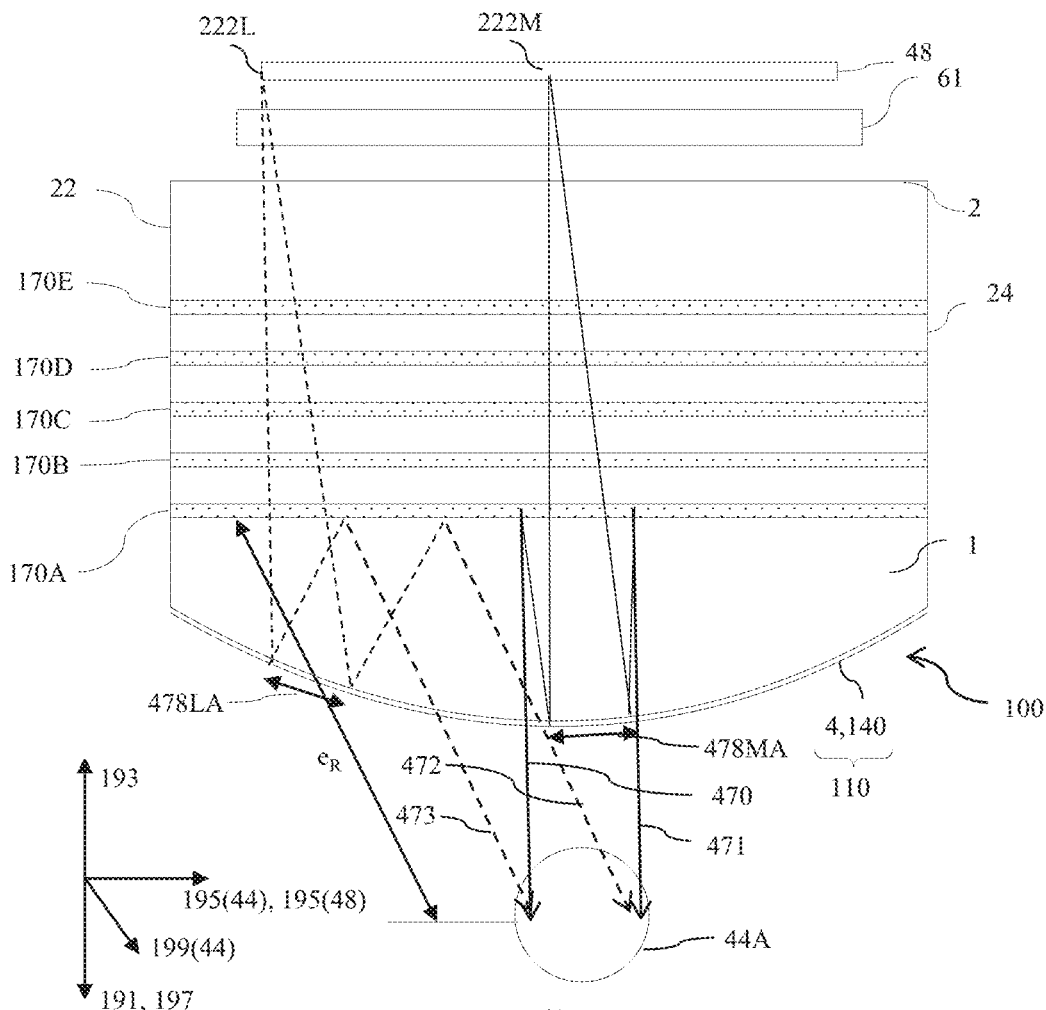
FIG. 5B is a schematic diagram illustrating a front view of the anamorphic near-eye display apparatus of FIG. 1A for a single pupil position.
Figure 5C:
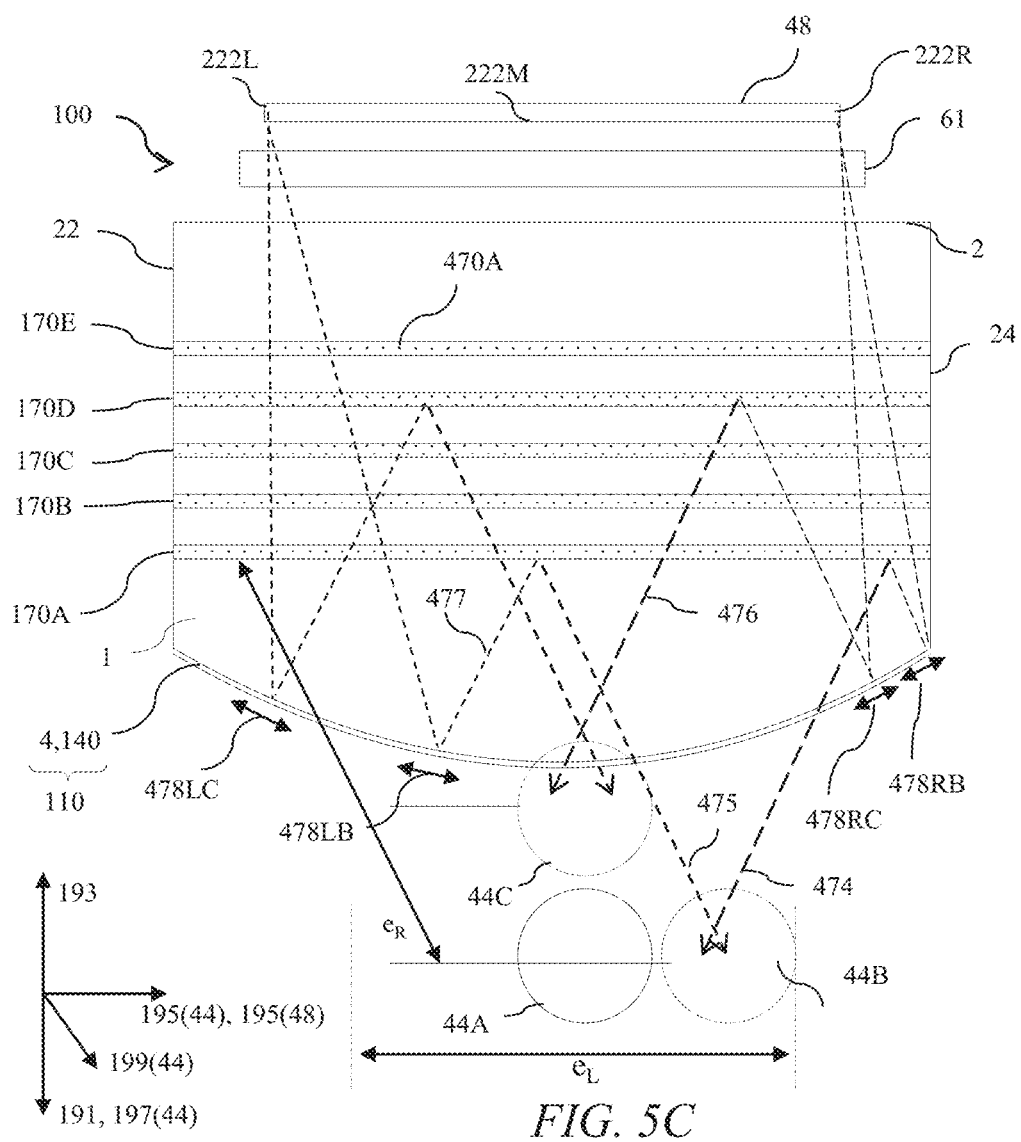
FIG. 5C is a schematic diagram illustrating a front view of the anamorphic near-eye display apparatus of FIG. 1A for multiple pupil positions.

FIGS. 5A-C are schematic diagrams illustrating front views of light output from the anamorphic near-eye display apparatus of FIG. 1A. Features of the embodiments of FIGS. 5A-C not discussed in further detail may be assumed to correspond to the features with equivalent reference numerals as discussed above, including any potential variations in the features.

FIG. 5A illustrates that a non-extracting light guiding region 179A is arranged between the tapered surface 18 and the first extraction facet 172 of the array of extraction facets 172A-N; and a non-extracting light guiding region 179B is arranged between array of extraction facets 172A-N and the lateral anamorphic component 110. Non-extracting guiding sections 179A, 179B may provide increased height of the extraction waveguide 1 in the first direction 191 without extraction facets 172. Efficiency of extraction is advantageously improved, and aberrational performance of the lateral anamorphic component 110 is further improved.

In the embodiment of FIG. 5A, the eye 45 is aligned in plan view and out-of-plane rays are not shown; however such a description provides an insight into the operation of the anamorphic near-eye display apparatus 100 in the lateral direction 195. More than one extraction facet 172 overlays the pupil 44 of the eye 45. For example, the pitch of the extraction facet 172 is 1 mm and three to six extraction facets 172 are provided across the pupil 44 of the eye 45 depending on the dilation of the pupil 44 of the eye 45. Advantageously luminance variation with eye position 45 may be reduced.

The pupil 44 receives the off-axis rays from pixel 222L at the edge of the spatial light modulator 48 after reflection from a region 478L of the lateral anamorphic component 110, which is the reflective end 4 of the extraction waveguide 1. While the lateral anamorphic component 110 in its entirety is a relatively fast optical element and thus prone to aberrations, particularly from its edges, the region 478 of the lateral anamorphic component 110 that is directing light into the pupil 44 for any one eye 45 location is small, and thus aberrations from the lateral anamorphic component 110 are correspondingly reduced. Considering FIG. 1F, desirably small width 455 of the blur ellipse 452 may be achieved.

In the embodiment of FIG. 5B, the eye 45 is aligned with out-of-plane rays to illustrate exit pupil 40 expansion in the lateral direction 195.

Light rays 470, 471 are directed from a central pixel 222M across the lateral direction 195 of the spatial light modulator 48 and transmitted through the transverse anamorphic component 60 formed by the transverse lens 61 without optical power in the lateral direction 195 and into the extraction waveguide 1. Said light rays 470, 471 propagate in the first direction 191 of the extraction waveguide 1 to the light reversing reflector 140 which provides positive optical power in the lateral direction 195 by means of the reflective end 4 which provides the lateral anamorphic component 110.

Such light rays 470, 471 are reflected in the extraction waveguide 1 in the second direction 193 from the region 478MA of the lateral anamorphic component 110 and at the extraction facet 172A is reflected away from the plane of the extraction waveguide 1 to the pupil 44 of the eye 45A at the viewing distance $e_R$. The eye 45 collects the rays 470, 471 and directs them to the same point on the retina 46 to provide a virtual pixel location as described elsewhere herein.

Similarly for off-axis pixel 222L offset in the lateral direction 195(48), at the edge of the spatial light modulator 48 provides rays 472, 473 that are directed into the extraction waveguide 1, reflected at region 478LA of the lateral anamorphic component 110 and reflected by extraction facet 172A to the eye 45A to provide an off-axis image point in the lateral direction 195(44) on the retina 46.

The lateral anamorphic component 110 has a positive optical power that provides collimated optical rays from each image point 222L, 222M in the lateral direction 195. In this manner the lateral distribution of field points are provided across the retina 46 by means of the optical power of the lateral anamorphic component 110, while the transverse anamorphic component 60 has optical power to provide the transverse distribution of field points across the retina 46. At diagonal field angles, such as illustrated in FIG. 1E with regards to the imaging of pixel 227, the field points are provided by a combination of the lateral and transverse optical powers of the lateral anamorphic component 110 and transverse anamorphic component 60 respectively.

FIG. 5C illustrates exit pupil expansion in the lateral direction 195 and in the transverse direction 197. Rays 474, 475 for pixels 222R, 222L are directed to pupil 44B by reflection from regions 478RB, 478LB respectively of the lateral anamorphic component 110. Pupil 44B is offset from the pupil 44A in the lateral direction 195, wherein the rays 474, 475 are reflected at least by the extraction facet 172A. The width $e_L$ of the exit pupil 40 is thus increased by the relatively large width of the lateral anamorphic component 110 allowing the regions 478 to be arranged over a desirable width. The viewing freedom of the eye 45 in the exit pupil 40 is increased, advantageously increasing viewing comfort for the eye 45 while achieving full field of view in the lateral direction.

FIG. 5C further illustrates the pupil expansion in the transverse direction 197. Light that is reflected from extraction facets 172D is directed to pupil 44C that has a different height to the pupil 44A, as discussed hereinbefore with respect to FIG. 4C.

Figure 5D:
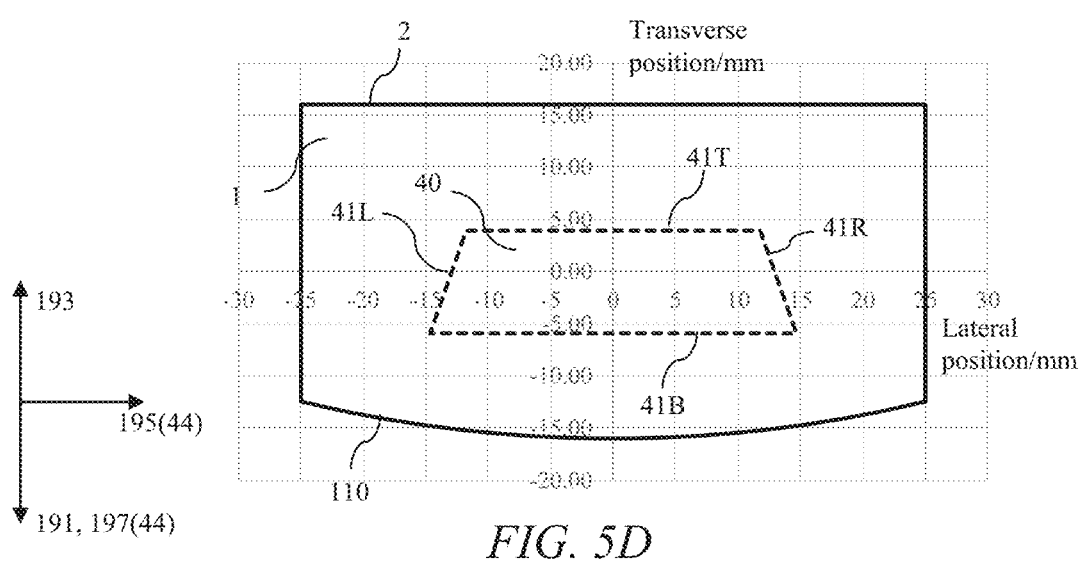
FIG. 5D is a schematic diagram illustrating a front view of an extraction waveguide and exit pupil.

FIG. 5D is a schematic diagram illustrating a front view of an extraction waveguide 1 and aligned exit pupil 40. Features of FIG. 5D not discussed in further detail may be assumed to correspond to the features with equivalent reference numerals as discussed above, including any potential variations in the features.

The illustrative embodiment of FIG. 5D illustrates the location of the exit pupil 40 with edge loci 41L, 41R which are provided by the exit pupil 40 expansion in the lateral direction 195 as illustrated in FIG. 5B; and with edge loci 41T, 41B that are provided by the exit pupil 40 expansion in the transverse direction 197 as illustrated in FIG. 4B.

The size of the exit pupil 40 is further determined at least in part by the desired field of view $\phi_L$, $\phi_T$ and the eye relief $e_R$.

Exit pupil 40 expansion will now be further described using illustrative unfolded geometries.

Figure 5E:
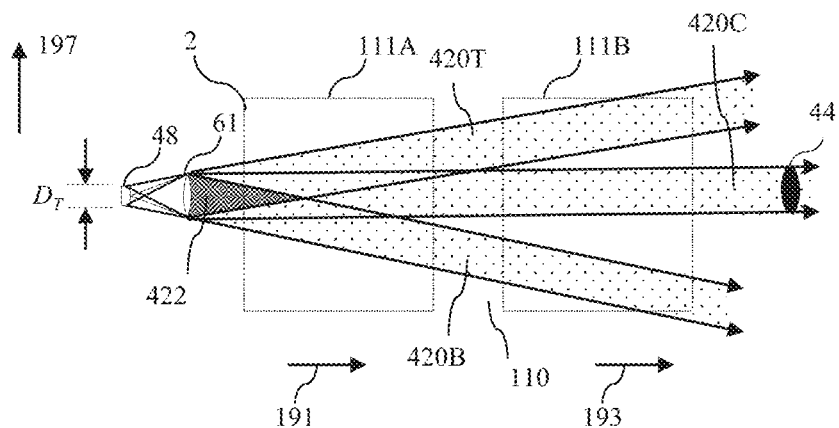
FIG. 5E is a schematic diagram illustrating a side view of an unfolded imaging system arranged to image in the transverse direction wherein no reflective extraction features are provided.
Figure 5F:
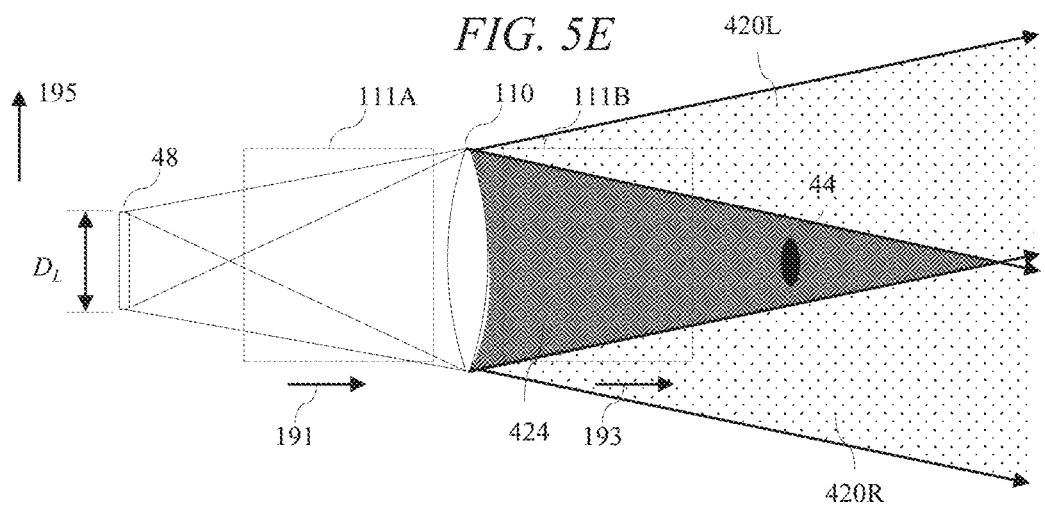
FIG. 5F is a schematic diagram illustrating a top view of an unfolded imaging system arranged to image in the lateral direction.
Figure 5G:
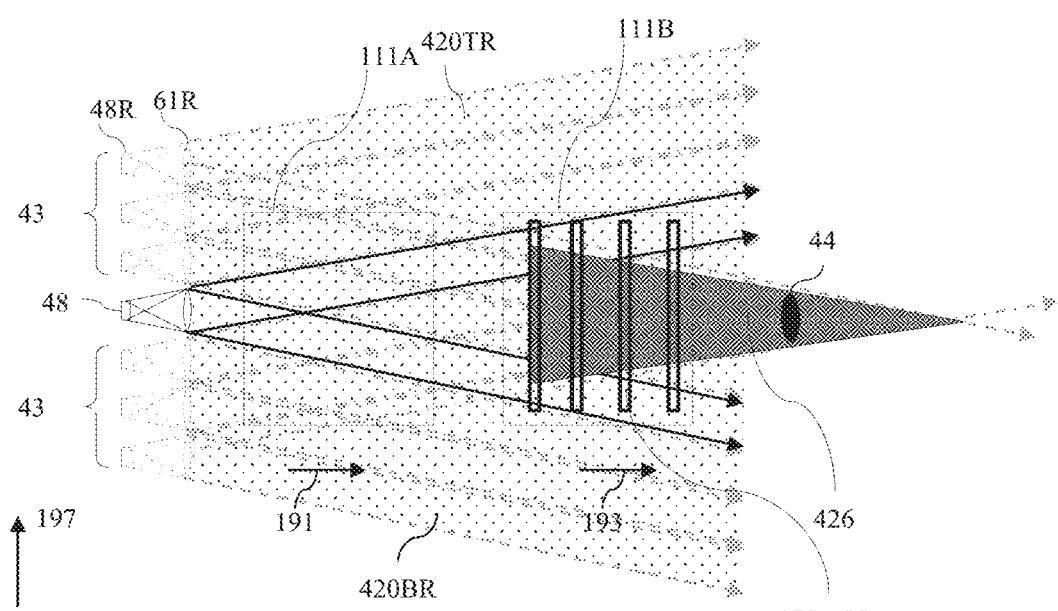
FIG. 5G is a schematic diagram illustrating a side view of an unfolded imaging system arranged to image in the transverse direction wherein an array of extraction features is provided as the reflective extractions features.

FIG. 5E is a schematic diagram illustrating a side view of an unfolded imaging system arranged to image in the transverse direction 197 wherein reflective extraction features (e.g. extraction facets 172) are provided; FIG. 5F is a schematic diagram illustrating a top view of an unfolded imaging system arranged to image in the lateral direction; and FIG. 5G is a schematic diagram illustrating a side view of an unfolded imaging system arranged to image in the transverse direction wherein an array of extraction facets 172 is provided, although the description is similarly applicable to other reflective extraction features. Features of FIGS. 5E-G not discussed in further detail may be assumed to correspond to the features with equivalent reference numerals as discussed above, including any potential variations in the features.

FIGS. 5E-G are unfolded representations of the anamorphic near-eye display apparatus 100 of FIG. 1A and are provided for illustrative purposes only.

Considering FIG. 5E, light from spatial light modulator 40 illuminates transverse anamorphic component 60 and inputs light rays into unfolded waveguide member 111A in direction 191. Light passes through the lateral anamorphic component 110 without modification and into unfolded waveguide member 111B in direction 193. Ray bundles 420T, 420C, 420B are provided across the transverse direction for pixels 222T, 222C, 222B respectively on the spatial light modulator 48. The pupil 44 of the eye 45 only observes the full ray cone if located in the cone 422 which is close to the lens and thus not accessible to the eye 45. This is analogous to the illustrative embodiment of FIG. 4A.

Considering FIG. 5F, light from spatial light modulator 40 illuminates lateral anamorphic component 110 and inputs light rays into unfolded waveguide member 111A in direction 191. The light cone in the lateral direction from the pixels 222L, 222M, 222R is collimated by the lateral anamorphic component 110 and passes into the unfolded waveguide member 111B in direction 193. Ray bundles 420L, 420M, 420R are provided across the transverse direction. The pupil 44 of the eye 45 observes the full ray cone if located in the cone 424 which is accessible to the eye outside the unfolded waveguide member 111B because of the much larger width of the lateral anamorphic component 110 compared to the transverse anamorphic component 60. This is analogous to the illustrative embodiment of FIG. 5B.

The effect of the extraction features 170 on pupil expansion in the transverse direction 197 will now be further illustrated.

In comparison to FIG. 5E, FIG. 5G illustrates the array of extraction features 170 being distributed along the extraction waveguide 1 so as to provide exit pupil 40 expansion. Each of the extraction features 170A-N effectively provides replicated images 48R, 60R of the spatial light modulator 48 and transverse anamorphic component 60 respectively. Such replicated images 48R, 60R further provide replicated light cones 420 of FIG. 5E, expanding the effective width of the final light cones 420TR, 420BR. Such replication provides replicated cone 426, from within which the pupil 44 receives light for the full field angles.

The cones 422, 424, 426 represent schematically the exit pupil 40 of the anamorphic near-eye display apparatus in the lateral direction 195 or transverse direction 197. Thus in comparison to the exit pupil 40 represented by cone 422 that by way of comparison would be provided for a conventional micro-projector without pupil expansion, exit pupil 40 expansion is achieved by the lateral anamorphic component 110 and by the array of extraction features 170A-N that in FIG. 1A comprise extraction facets 172A-N.

Polarized light propagation in the illustrative embodiment of FIG. 1A will now be described.

Figure 6A:
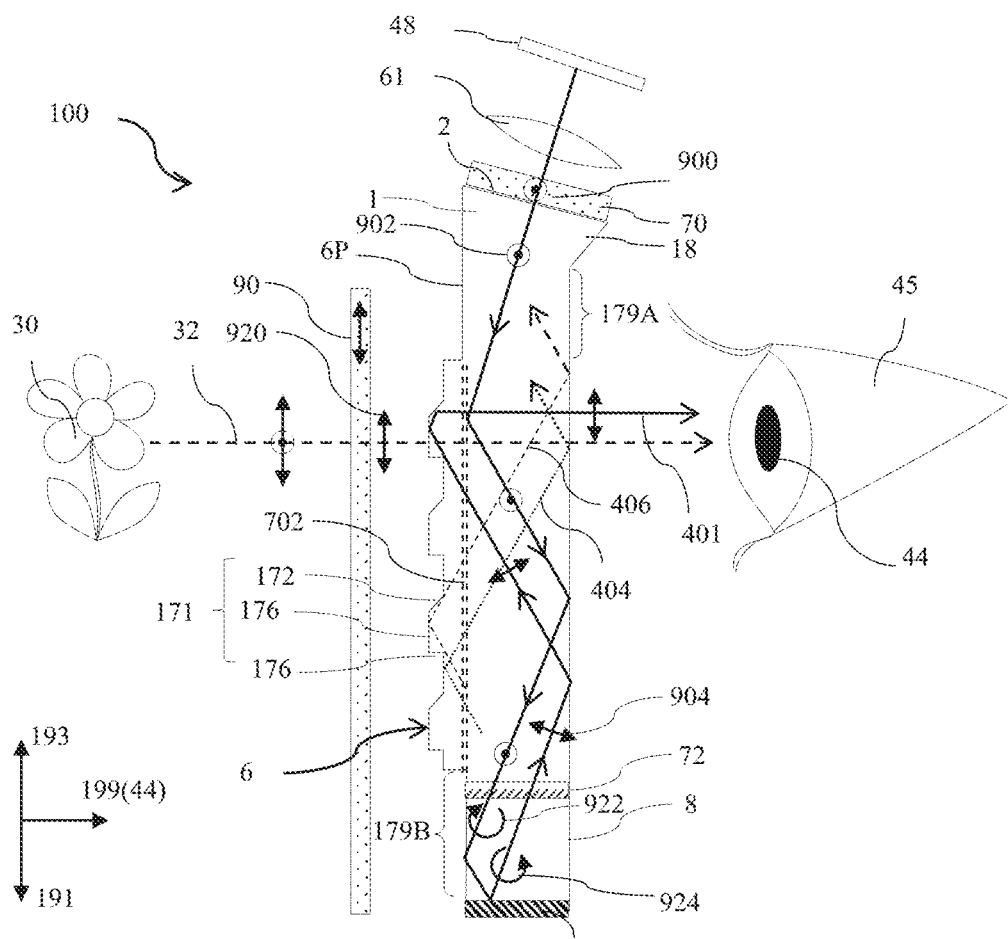
FIG. 6A is a schematic diagram illustrating a side view of polarized light propagation in the anamorphic near-eye display apparatus of FIG. 1A.
Figure 6B:
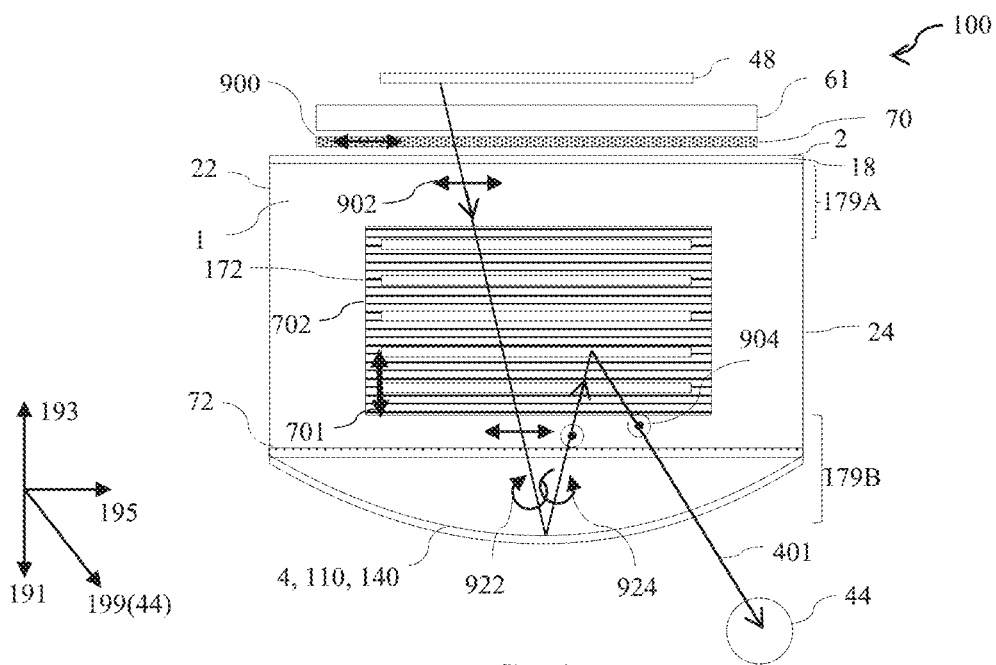
FIG. 6B is a schematic diagram illustrating a front view of polarized light propagation in the anamorphic near-eye display apparatus of FIG. 6A.
Figure 6C:
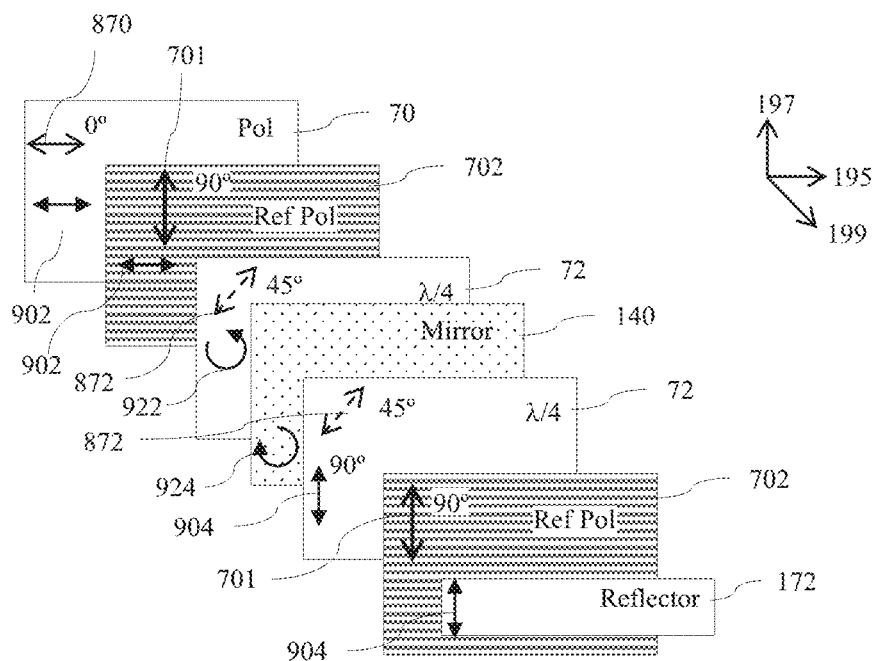
FIG. 6C is a schematic diagram illustrating alignment directions through the polarization control components of FIGS. 6A-B.

FIG. 6A is a schematic diagram illustrating a side view of polarized light propagation in the anamorphic near-eye display apparatus 100 of FIG. 1A; FIG. 6B is a schematic diagram illustrating a front view of polarized light propagation in the anamorphic near-eye display apparatus 100 of FIG. 1A; and FIG. 6C is a schematic diagram illustrating alignment directions through the polarization control components of FIGS. 6A-B. Features of the embodiments of FIGS. 6A-C not discussed in further detail may be assumed to correspond to the features with equivalent reference numerals as discussed above, including any potential variations in the features.

The illumination system 240 is arranged to output light that is unpolarized or is arranged to output light having the input linear polarization state 902; and the optical system 250 comprises an input linear polarizer 70 disposed between the spatial light modulator 48 and the polarization-sensitive reflector 700 comprising reflective linear polarizer 702. Further, the input linear polarizer 70 is disposed between the spatial light modulator 48 and the extraction waveguide 1.

The input linear polarizer 70 is arranged to pass light having the input linear polarization state 902 that in the embodiment of FIGS. 6A-C is an s-polarization state in the extraction waveguide 1; that is a polarization state 902 has an electric vector transmission direction 900 that provides a s-polarized linear polarization state 902 that is parallel to the lateral direction 195.

The reflective linear polarizer 702 is arranged to reflect light guided in the first direction 191 having the input linear polarization state 902 so that the polarization-sensitive reflector 700 is arranged to guide light in the first direction 191. The reflection of guided light from the front light guide surface 8 is provided by total internal reflection, while the reflection of guided light from the reflective linear polarizer 702 is by means of metallic reflection in the case of a wire grid type reflective polarizer such as from Moxtek or by means of stack of Fresnel reflections in the case of a dielectric stack type reflective polarizer such as APF from 3M Corporation.

The polarization conversion retarder 72 is disposed between the light reversing reflector 140 and the array of extraction features 170 and is further disposed between the light reversing reflector 140 and the reflective linear polarizer 702. The polarization conversion retarder 72 has a retardance of a quarter wavelength at a wavelength of visible light, for example 550 nm or may be tuned for another visible wavelength for example to match the peak luminance of a monochrome display.

The retardance of the polarization conversion retarder 72 may be different to a quarter wavelength, but selected to provide the same effect. For example, the polarization conversion retarder 72 may have a retardance of three quarter wavelengths or five quarter wavelengths, for example.

Retarder 72 may comprise a stack of composite retarders arranged to achieve the operation of a quarter-wave retarder over an increased spectral band, for example comprising a Pancharatnam stack (which is different to the Pancharatnam-Berry Lens described hereinbelow). Advantageously colour uniformity may be increased. The polarization conversion retarder 72 may be provided with additional retarder layers to increase the field of view of the quarter-wave retarder function, to advantageously achieve increased uniformity across the field of view of observation.

The polarization conversion retarder 72 most generally serves to provide the polarization modification to provide conversion from polarization state 902 to polarization state 904 for light ray 401.

FIG. 6C illustrates the propagation of polarization states and the alignment of various optical components. Polarizer 70 has electric vector transmission direction 870 at 0 degrees, reflective linear polarizer 702 has electric vector transmission direction 701 at 90 degrees and polarization conversion retarder 72 is a quarter-wave retarder with optical axis direction 872 aligned at 45 degrees. In operation, polarization state 902 is guided by reflection from the reflective linear polarizer 702 and converted to left circular polarization state 922 by the polarization conversion retarder 72. The phase change at reflection by the mirror of the light reversing reflector 140 provides reflected right circular polarization state 924. During the second pass for light propagating in the second direction 193 through the polarization conversion retarder 72, the polarization state 924 is converted to linear polarization state 904 which is transmitted through the reflective linear polarizer 702 onto the rear guide surface 6.

In the alternative embodiment of FIGS. 6A-B, the polarization conversion retarder 72 is provided within the extraction waveguide 1 and across the input aperture of the lateral anamorphic component 110. Such an arrangement may be suitable for an extraction waveguide 1 wherein the light reversing reflector 140 is assembled as a separate component to the extraction region of the extraction waveguide 1 comprising extraction features 170. In such an arrangement, the reflector surface of the light reversing reflector 140 is not arranged on the polarization conversion retarder 72. The surface quality of the light reversing reflector 140 may be increased. Modulation transfer function contrast may advantageously be increased and sharper images achieved. For illustrative purposes, in FIG. 6B, the extraction facets 172 are shown and draft facets 174 and primary guide facets 176, and guide portions 178 omitted.

Considering FIGS. 6A-B, for the exemplary light ray 401, the polarization conversion retarder 72 is arranged to convert the polarization state 902 of light passing therethrough between the linear polarization state 902 and a circular polarization state 922 and between a circular polarization state 924 and a linear polarization state 904 after reflection at the light reversing reflector 140 of the lateral anamorphic component 110. The polarization conversion retarder 72 and the light reversing reflector 140 are arranged in combination to rotate the input linear polarization state 902 of the light guided in the first direction 191 so that the light guided in the second direction 193 and output from the polarization conversion retarder 72 has an orthogonal linear polarization state 904 that is orthogonal to the input linear polarization state 902.

FIG. 6A illustrates that the front guide surface 8 and the polarization-sensitive reflector 700 are arranged to guide light in the first direction 191. The polarization-sensitive reflector 700 is further arranged to pass light rays 401, 404, 406 guided in the second direction 193 having the orthogonal linear polarization state 904.

The front guide surface 8 and the primary guide facet 176 and guide portion 178 of the rear guide surface 6 are arranged to guide light rays 404, 406 in the second direction 193. Further in the regions 179A, 179B as illustrated in FIG. 6B, the polarization-sensitive reflector 700 and extraction facets 170 may be omitted, and guiding in the first and second directions 191, 193 is between the front and rear guide surfaces 6, 8 that may be planar and parallel.

In other words, the optical system 250 comprises an input linear polarizer 70 disposed between the spatial light modulator 48 and the array of extraction features 170 and a polarization conversion retarder 72 disposed between the light reversing reflector 140 and the array of extraction facets 170, the polarization conversion retarder 72 being arranged to convert a polarization state of light passing therethrough between a linear polarization state 902, 904 and a circular polarization state 922, 924 respectively. Light rays 401 are extracted at extraction facet 172 with polarization state 904.

In operation, light ray 401 is not incident on the rear light guide surface 6. Light loss and stray light is reduced. Advantageously efficiency and image contrast increased. Glow directed towards external observers is reduced.

During manufacture, the extraction waveguide 1 may be formed and reflective linear polarizer 702 formed over at least a planar part 6P of the rear surface 6. The plural prisms 171 may be formed for example by embossing, UV casting, injection molding or other known techniques. The plural prisms 171 may be attached to the reflective linear polarizer 702 after molding or may be molded in situ. Alternatively the plural prisms 171 may be formed on the reflective linear polarizer 702 that may be attached to the planar part 6P of the extraction waveguide 1.

Considering external objects 30, unpolarized light from real-world objects 30 is directed through the extraction waveguide 1. Optional external polarizer 90 with p-polarized electric vector transmission direction 90 may be provided that transmits the linear polarization state 920 that is aligned to polarization state 904 and may be arranged so that the extraction waveguide 1 is arranged between the object 30 and the eye 45. External polarizer 90 may further reduce background object luminance in comparison to the luminance of the anamorphic near-eye display apparatus 100. Advantageously image contrast of overlayed virtual images may be increased and double imaging reduced. Further reflections from the reflective linear polarizer 702 may be reduced, advantageously increasing the visibility of eye 45, for increased social interaction.

Figure 6D:
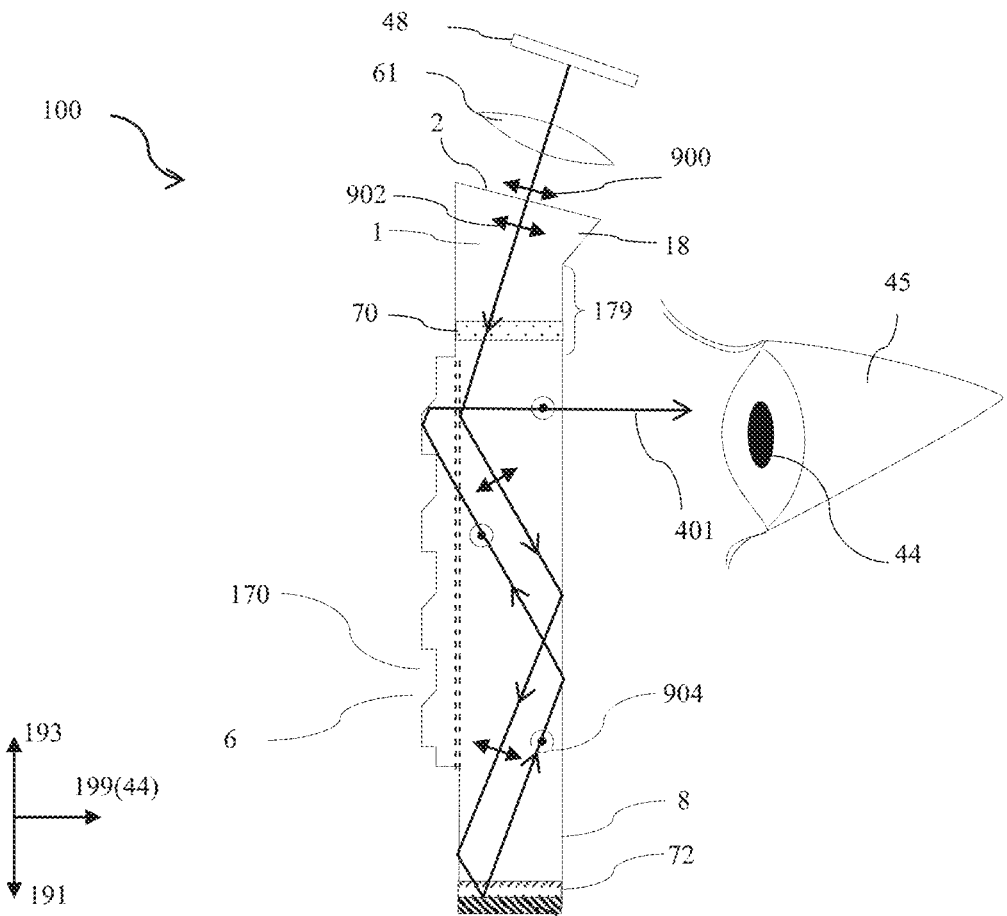
FIG. 6D is a schematic diagram illustrating a side view of polarized light propagation in an anamorphic near-eye display apparatus wherein the polarization state propagating along the first direction is orthogonal to the arrangement of FIG. 6A.
Figure 6E:
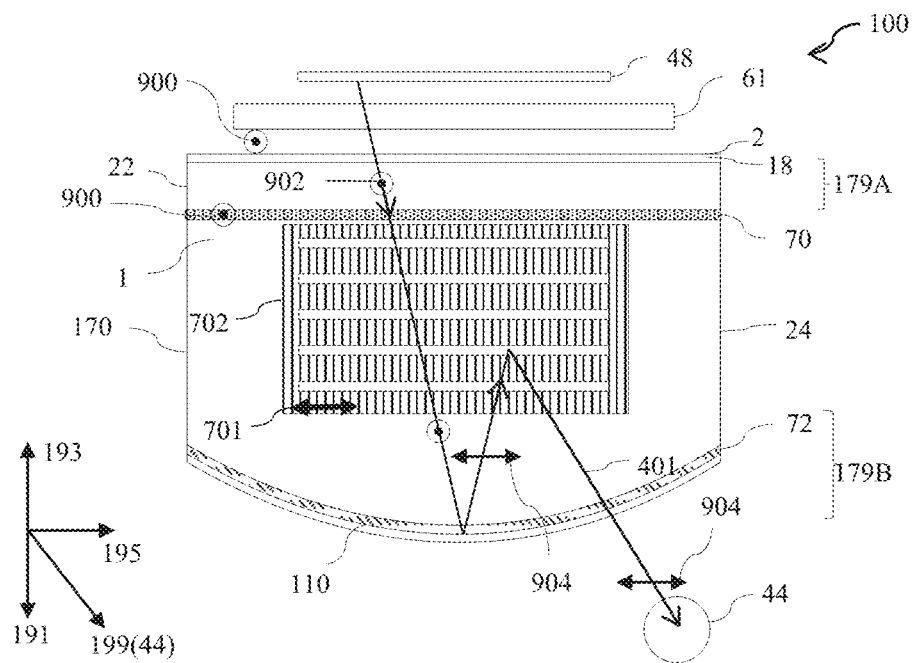
FIG. 6E is a schematic diagram illustrating a front view of polarized light propagation in the anamorphic near-eye display apparatus of FIG. 6D.
Figure 6F:
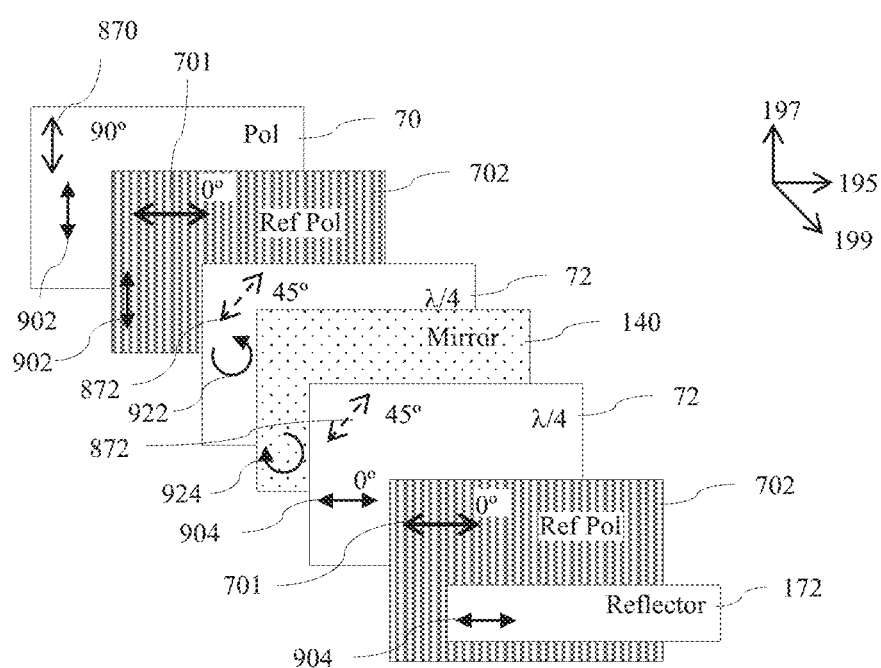
FIG. 6F is a schematic diagram illustrating alignment directions through the polarization control components of FIGS. 6D-E.

FIG. 6D is a schematic diagram illustrating a side view of polarized light propagation in an anamorphic near-eye display apparatus 100 wherein the polarization state 902 propagating along the first direction 191 is orthogonal to the arrangement of FIG. 6A; FIG. 6E is a schematic diagram illustrating a front view of polarized light propagation in the anamorphic near-eye display apparatus 100 of FIG. 6D; and FIG. 6F is a schematic diagram illustrating alignment directions through the polarization control components of FIGS. 6D-E. Features of the embodiments of FIGS. 6D-F not discussed in further detail may be assumed to correspond to the features with equivalent reference numerals as discussed above, including any potential variations in the features.

In the alternative embodiment of FIGS. 6D-E, the input linear polarizer 70 is disposed within the extraction waveguide 1. In comparison to the embodiment of FIGS. 6A-B, depolarization that may take place from scatter with the region 179A of the extraction waveguide 1 may be reduced, advantageously improving contrast. Further, the polarization conversion retarder 72 is arranged on the end 4 of the extraction waveguide 1. Advantageously complexity of construction may be reduced.

Further the input linear polarization state 902 is a p-polarization state in the extraction waveguide 1 in comparison to the s-polarization state of FIGS. 6A-B and the linear polarization state 904 is an s-polarized state in comparison to the p-polarization state of FIGS. 6A-B.

The transmission and reflectivity characteristics of the reflective linear polarizer 702 may be different for incident s-polarized and p-polarized light. In the illustrative example of FIGS. 6D-E, for light propagating in the second direction 193, some of the s-polarized light of polarization state 904 may be reflected by the reflective linear polarizer 702 rather than transmitted, and may guide between the reflective linear polarizer 702 and the front guide surface 8, advantageously achieving increased uniformity of extraction in comparison to the embodiment of FIGS. 6A-B.

Alternative embodiments of the polarization-sensitive reflector 700 will now be described. In the following examples, specific examples of the polarization-sensitive reflector 700 are shown (for example being reflective linear polarizer 702 in FIG. 1A, dielectric stack 712 in FIG. 7A and nematic liquid crystal layer 722 in FIG. 8A and so on), but this is not limitative and in general any of the polarization-sensitive reflectors disclosed herein may alternatively be applied in the following examples. Similarly, the various features of the following examples may be combined together in any combination.

A polarization-sensitive reflector 700 comprising a stack of dielectric layers will now be described.

FIG. 7A is a schematic diagram illustrating a side view of the operation of an alternative polarization-sensitive reflector 700 comprising a thin film dichroic stack 712. Features of the embodiment of FIG. 7A not discussed in further detail may be assumed to correspond to the features with equivalent reference numerals as discussed above, including any potential variations in the features.

The polarization-sensitive reflector 700 may comprise at least one dielectric layer 714 that has a different refractive index to waveguide members 111A, 111B and is arranged to provide polarization-sensitive reflection to incident illumination with polarization states 902, 904, for example by Fresnel reflections or total internal reflections and in the embodiment of FIG. 7A the at least one dielectric layer 714 comprises a stack 712 of dielectric layers 714A-E.

Dielectric stack 712 comprises multiple dielectric layers 714A-E with an illustrative embodiment in TABLE 2. Light rays 401(191) propagating in the first direction 191 with the s-polarized polarization state 902 are incident onto the dielectric stack 712 and are reflected as light rays 411. Light rays 401(193) that are propagating in the second direction 193 through the extraction waveguide 1 with the p-polarized polarization state 904 are transmitted at least in part through the dielectric stack 712.

TABLE 2

| Item | Illustrative material | Refractive index | Thickness (nm) |
| --- | --- | --- | --- |
| Waveguide member 11A | PMMA | 1.50 | — |
| Dielectric layer 174A | TiO$_2$ | 2.6 | 54 |
| Dielectric layer 174B | SiO$_2$ | 1.5 | 181 |
| Dielectric layer 174C | TiO$_2$ | 2.6 | 55 |
| Dielectric layer 174D | SiO$_2$ | 1.5 | 181 |
| Dielectric layer 174E | TiO$_2$ | 2.6 | 55 |
| Waveguide member 11B | PMMA | 1.49 | — |

FIG. 7B is a schematic graph illustrating the variation of thin film stack transmission against wavelength for incident s-polarized polarization state 902 and p-polarized polarization state 904. Features of the embodiment of FIG. 7B not discussed in further detail may be assumed to correspond to the features with equivalent reference numerals as discussed above, including any potential variations in the features.

The profiles 716S, 716P are the average transmission over a 20 degrees cone angle incident at a nominal angle of 60 degrees from the normal $n_{712}$ of the dielectric layer 712 for the s-polarization state 902 and p-polarization state 904 respectively. Over visible wavelengths, the dielectric stack 712 may achieve high reflectivity for light rays 401(191) propagating in the first direction 191 and high transmission for light rays 401(193) propagating in the second direction 191.

The arrangement of TABLE 2 achieves high efficiency of propagation of light in the first direction. In comparison with wire grid polarizers, the dielectric stack 712 may be conveniently provided on the waveguide member 111A or waveguide member 111B by known deposition techniques. The dielectric stack 712 may have low thickness and not require thermally and mechanically stable substrates for deposition, advantageously achieving reduced cost. Absorption losses in the dielectric stack may be lower than for wire grid polarizers, advantageously achieving increased efficiency.

The number and thickness of the layers of TABLE 2 may be modified to achieve reduced cost or increased bandwidth in wavelength and reflectivity for the desirable cone of illumination angles.

Further some of the polarization state 904 may be reflected by the dielectric stack 712 such that the length over which uniform extraction occurs may be increased.

It would be desirable to provide increased uniformity across the dielectric stack 712.

FIG. 7C is a flow chart illustrating compensation of pixel level to correct for transmission of a dielectric stack 712 and more generally for the polarization-sensitive reflectors 700 described elsewhere herein. Features of the embodiment of FIG. 7C not discussed in further detail may be assumed to correspond to the features with equivalent reference numerals as discussed above, including any potential variations in the features.

For a given ray angle within the extraction waveguide 1 in the transverse direction 193, the reflectivity of the dielectric stack 712 can vary. Such variations may provide luminance variations in the transverse direction. In a first step S1 the angle of incidence onto the dielectric stack 712 ray 401 for a transverse pixel 222 in row 221T is calculated. In a second step S2, the transmission of the ray 401 in the first and second directions 191, 193 is calculated. In a third step S3, the output of the pixel 222 in the row 221T is modified to compensate for the varying transmission of the ray 401 corresponding to the row 221T at the dielectric stack 712. Advantageously improved uniformity of images at the retina 47 of the eye 45 may be achieved.

A polarization-sensitive reflector 700 comprising a liquid crystal layer will now be described.

Figure 8A:
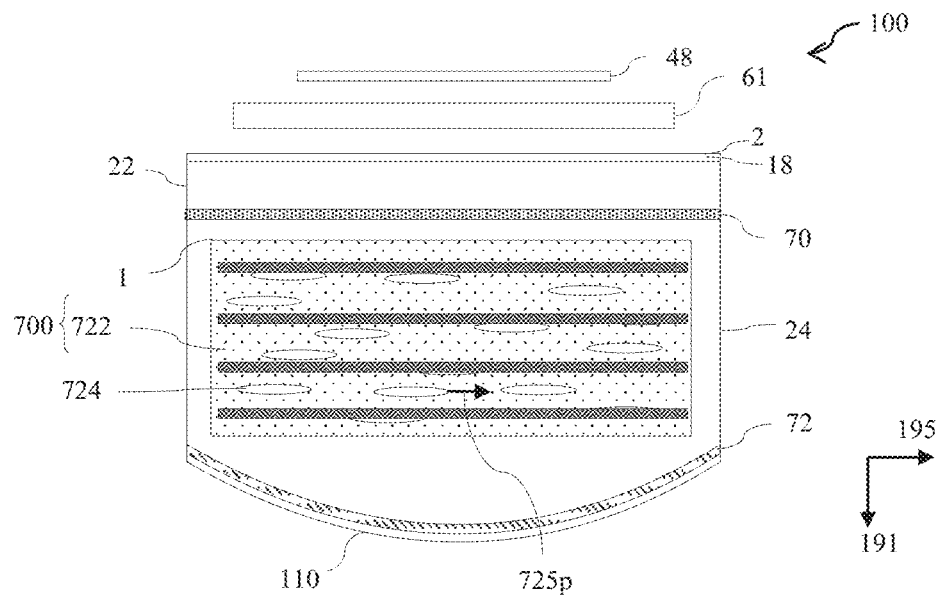
FIG. 8A is a schematic diagram illustrating a front view of an anamorphic near-eye display apparatus comprising an alternative polarization-sensitive reflector comprising an in-plane liquid crystal layer.
Figure 8B:
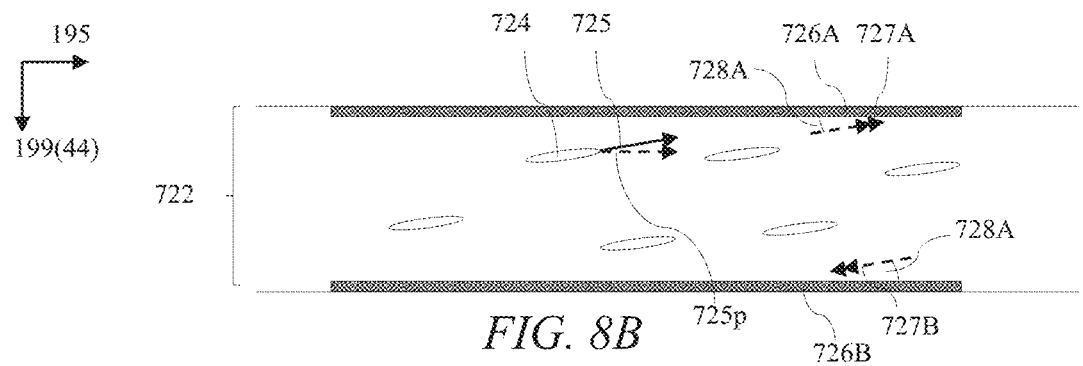
FIG. 8B is a schematic diagram illustrating in top view the liquid crystal layer of the polarization-sensitive reflector of FIG. 8A.
Figure 8C:
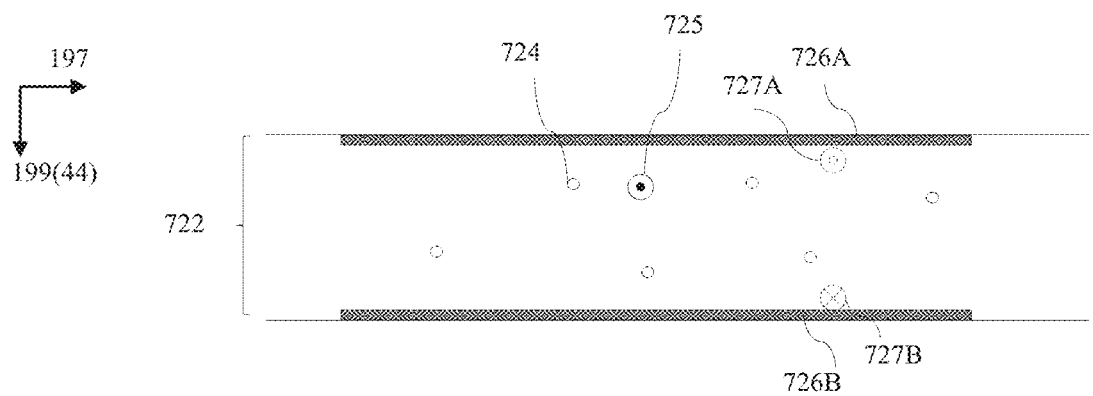
FIG. 8C is a schematic diagram illustrating in side view the liquid crystal layer of the polarization-sensitive reflector of FIG. 8A.

FIG. 8A is a schematic diagram illustrating a front view of an anamorphic near-eye display apparatus 100 comprising an alternative polarization-sensitive reflector 700 comprising an in-plane nematic liquid crystal layer 722; FIG. 8B is a schematic diagram illustrating in top view the liquid crystal layer of the polarization-sensitive reflector of FIG. 8A; and FIG. 8C is a schematic diagram illustrating in side view the liquid crystal layer of the polarization-sensitive reflector of FIG. 8A. Features of the embodiment of FIGS. 8A-C not discussed in further detail may be assumed to correspond to the features with equivalent reference numerals as discussed above, including any potential variations in the features.

In comparison to the embodiment of FIG. 1A wherein the polarization-sensitive reflector 700 is a reflective linear polarizer 702; or of FIG. 7A wherein the polarization-sensitive reflector 700 is a dielectric stack 712, in the alternative embodiment of FIGS. 8A-C, the polarization-sensitive reflector 700 comprises a liquid crystal layer 722 comprising liquid crystal molecules 724 with optical axis direction 725. The liquid crystal molecules may be nematic liquid crystal molecules and arranged in an aligned layer. The liquid crystal molecules 724 are arranged between first and second opposing alignment layers 726A, 726B with alignment directions 727A, 727B with pretilts 728A, 728B respectively that provide alignment of the optical axis directions 725 of the liquid crystal molecules 724.

The liquid crystal molecules may be uncured. Alternatively the molecules may comprise cured liquid crystal molecules such as reactive mesogen molecules that have been cured in UV illumination after alignment. The alignment layers 726A, 726B may be removed after curing, so that the nematic liquid crystal layer 722 does not include the alignment layers 726A, 726B.

The pretilts 728A, 728B may be for example 2 degrees and may be anti-parallel to reduce the presence of alignment disclinations, advantageously reducing scatter. In alternative embodiments, the pre-tilts 728A, 728B may be higher, for example 88 degrees, or may be different. The liquid crystal molecules may have positive dielectric anisotropy as illustrated in FIGS. 8A-C or may have negative dielectric anisotropy. In FIG. 8A, the optical axis direction 725 is aligned with a component 725p in the plane of the liquid crystal layer 722 that is orthogonal to the direction 191 along the extraction waveguide 1. In other embodiments (not illustrated), the optical axis direction 725 may be aligned with a component 725p in the plane of the liquid crystal layer 722 that is parallel to the direction 191 along the extraction waveguide.

The operation of the extraction waveguide 1 of FIG. 8A will now be further described.

Figure 9A:
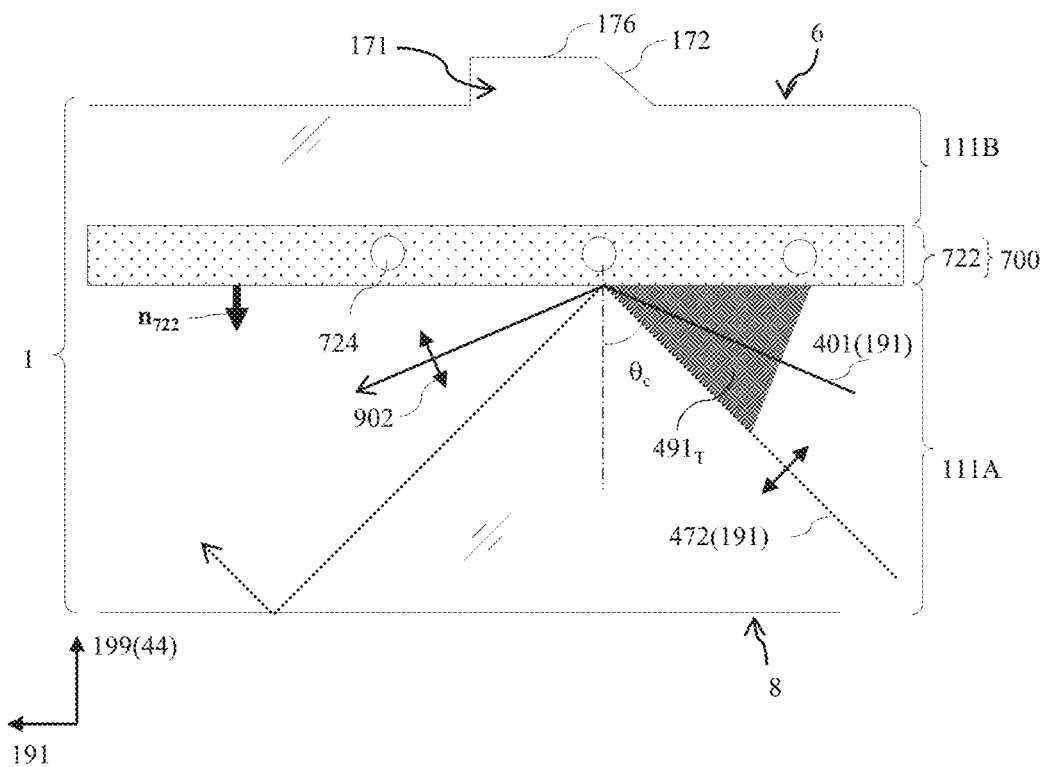
FIG. 9A is a schematic diagram illustrating a side view of the operation of an alternative polarization-sensitive reflector comprising an in-plane liquid crystal layer for p-polarized light propagating in the first direction along the extraction waveguide.
Figure 9B:
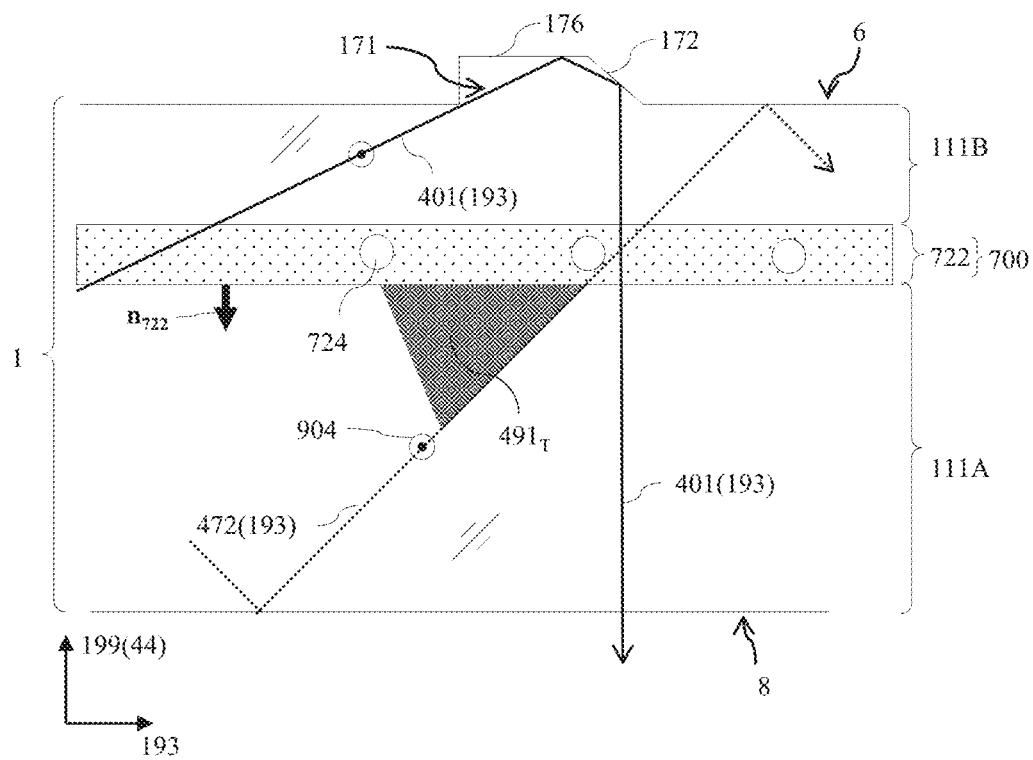
FIG. 9B is a schematic diagram illustrating a side view of the operation of the alternative polarization-sensitive reflector of FIG. 9A for light propagating in the second direction along the extraction waveguide.

FIG. 9A is a schematic diagram illustrating a side view of the operation of an alternative polarization-sensitive reflector 700 comprising nematic liquid crystal layer 722 for p-polarized light polarization state 902 propagating in the first direction 191 along the extraction waveguide 1; and FIG. 9B is a schematic diagram illustrating a side view of the operation of the alternative polarization-sensitive reflector 700 of FIG. 9A for s-polarized light polarization state 904 propagating in the second direction 193 along the extraction waveguide 1. Features of the embodiment of FIGS. 9A-B not discussed in further detail may be assumed to correspond to the features with equivalent reference numerals as discussed above, including any potential variations in the features.

An illustrative embodiment of the polarization-sensitive reflector 700 comprising nematic liquid crystal layer 722 is shown in TABLE 3.

TABLE 3

| Item | Illustrative value |
|---|---|
| Waveguide member 111A refractive index | 1.80 |
| Liquid crystal molecule 725 ordinary refractive index, $n_o$ | 1.50 |
| Liquid crystal layer molecule 725 extraordinary refractive index, $n_e$ | 1.80 |
| Waveguide member 111A refractive index | 1.80 |
| Critical angle, qc at interface of constituent part 111A and nematic liquid crystal layer 722 | 56° |

In the alternative embodiment of FIG. 9A, the polarization state 902 of rays 401(191), 472(191) see the ordinary refractive index of the liquid crystal molecules 724 and undergo total internal reflection. The light cone $491_T$ has a cone size that is limited by the critical angle $\theta_c$ at the interface of the waveguide member 111A and the nematic liquid crystal layer 722 for the incident polarization state 902.

Thus light rays 401(191) within the cone $491_T$ guide between the polarization-sensitive reflector 700 and the light guide surface 8.

FIG. 9B illustrates that the rays 401(193) propagating in the second direction 193 are index matched at the interface with the nematic liquid crystal layer 722 and are transmitted for incidence onto the rear guide surface 6.

Advantageously the nematic liquid crystal layer 722 may be conveniently manufactured with high uniformity and low cost and provided in a thin layer between the waveguide members 111A, 111B.

It may be desirable to provide an increased field of view in the transverse direction 197.

Figure 10A:
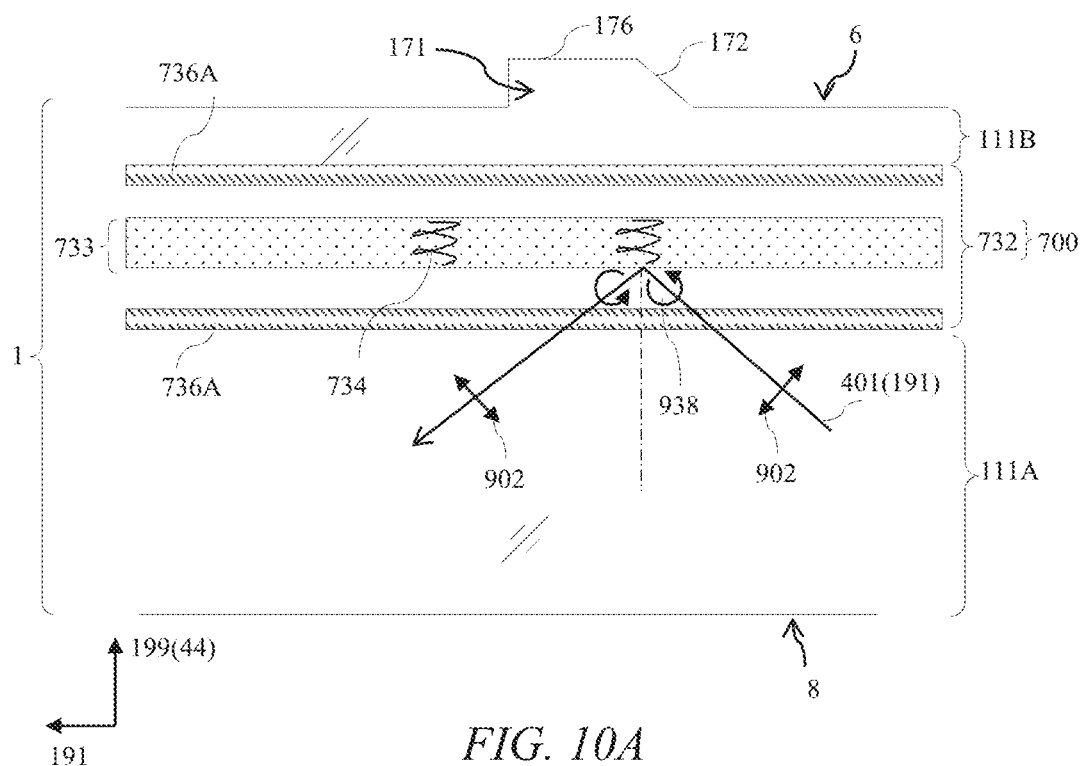
FIG. 10A is a schematic diagram illustrating a side view of the operation of an alternative polarization-sensitive reflector comprising a cholesteric liquid crystal layer for light propagating in the first direction along an extraction waveguide.
Figure 10B:
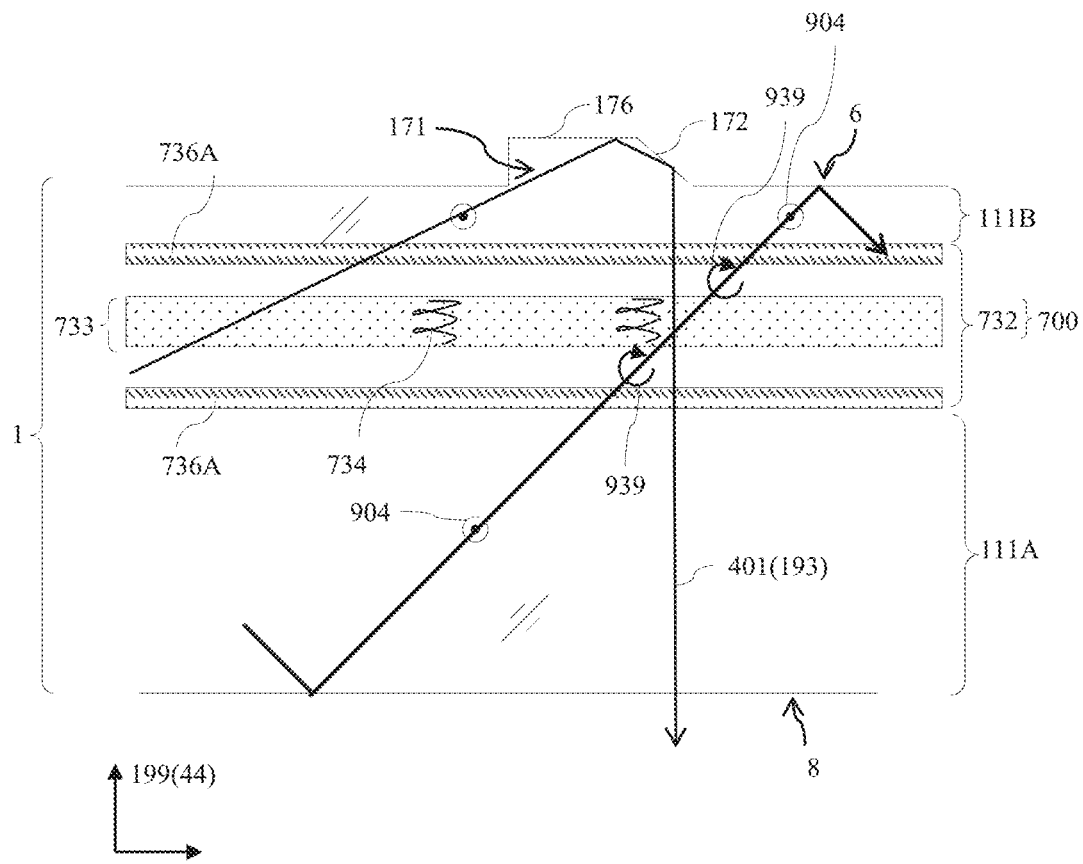
FIG. 10B is a schematic diagram illustrating a side view of the operation of the alternative polarization-sensitive reflector of FIG. 10A for light propagating in the second direction along the extraction waveguide.

FIG. 10A is a schematic diagram illustrating a side view of the operation of an alternative polarization-sensitive reflector 700 comprising a cholesteric liquid crystal layer 732 for p-polarized light polarization state 902 propagating in the first direction 191 along the extraction waveguide 1; and FIG. 10B is a schematic diagram illustrating a side view of the operation of the cholesteric liquid crystal layer 732 of FIG. 9A for s-polarized light polarization state 904 propagating in the second direction 193 along the extraction waveguide 1. Features of the embodiment of FIGS. 10A-B not discussed in further detail may be assumed to correspond to the features with equivalent reference numerals as discussed above, including any potential variations in the features.

In comparison to the embodiment of FIG. 9A, in the alternative embodiment of FIG. 10A, the polarization-sensitive reflector 700 comprises a cholesteric liquid crystal reflector 732 comprising a layer 733 of cholesteric liquid crystal material 734.

The anamorphic near-eye display apparatus 100 further comprises a polarization conversion retarder 736A arranged between front guiding surface 8 and the cholesteric liquid crystal retarder 733 wherein the polarization conversion retarder 736A is arranged to convert a polarization state of light passing therethrough between a linear polarization state 902 and a circular polarization state 938, and the polarization conversion retarder 736A and the cholesteric liquid crystal layer 733 are arranged in combination to reflect the input linear polarization state 902 of the light guided in the first direction 401(191) and to transmit the linear polarization state 904 of the light 401(193) guided in the second direction. The anamorphic near-eye display apparatus further comprises a polarization conversion retarder 736B arranged between rear guiding surface 6 and the cholesteric liquid crystal retarder 733 wherein the polarization conversion retarder 736B is arranged to convert a polarization state of light passing therethrough between a linear polarization state 904 and a circular polarization state 939.

In other words, layer 733 is arranged between opposing polarization conversion retarders 736A, 736B that are arranged to convert off-axis polarization state 902 to a circular polarization state 938 and a circular polarization state 938 to a linear polarization state 902; and to convert off-axis polarization state 904 to a circular polarization state 939 and a circular polarization state 939 to a linear polarization state 904. Polarization conversion retarders 736A, 736B may be quarter-wave retarders when considering off-axis illumination of light rays 401, and may thus have a different retardance to quarter-wave retarders for on-axis light.

Polarization conversion retarders 736A, 736B advantageously provide linear polarization states to guide within the extraction waveguide 1 that increases efficiency and uniformity. By way of comparison, guiding of circular polarization states, in which polarization conversion retarders 736A, 736B are omitted, causes depolarization of light during guiding and reduces efficiency.

In operation, the incident polarization state 902 is incident onto the polarization conversion retarder 736A and polarization state 938 is output and incident onto layer 733 of cholesteric material 734 that is aligned with chirality and pitch to reflect the incident light rays 401. The reflected polarization state from the layer 733 does not undergo a phase shift that would happen for a mirror, and so the polarization state 938 on reflection from the layer 933 is not reflected in comparison to the reflected polarization states 922, 924 described in FIG. 6A for example.

The cholesteric liquid crystal layer 733 may have a chirped pitch structure to achieve increased bandwidth and may have different orientations to increase angular reflectivity.

Output polarization state 902 is provided after the second pass of the ray 401(191) through the polarization conversion retarder 736A and light guides along the extraction waveguide 1 between the cholesteric liquid crystal reflector 732 and the front light guide surface 8 as described elsewhere herein.

FIG. 10B illustrates the propagation in the second direction 193, wherein the polarization state 904 is incident onto the cholesteric liquid crystal reflector 732. Circular polarization state 939 is incident onto the layer 939 and is transmitted and output as the same polarization state 904 into the waveguide member 111B for illumination of the second light guide surface.

In comparison to the embodiment of FIGS. 9A-B, the cone angle $491_T$ may be increased in size and the field of view $\phi_T$ in the transverse direction advantageously increased. Further the refractive index of the waveguide members 111A, 111B may be reduced, advantageously reducing cost.

It may be desirable to improve the efficiency and uniformity of the polarization-sensitive reflector 700.

Figure 11A:
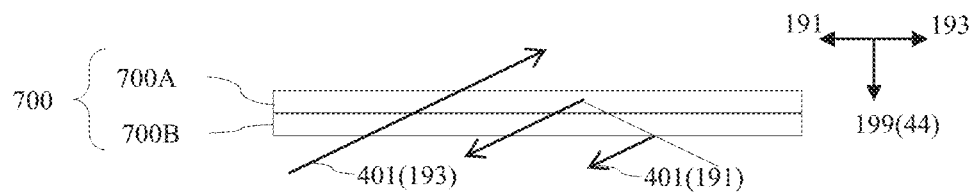
FIG. 11A, FIG. 11B, and FIG. 11C are schematic diagrams illustrating side views of various arrangements of polarization-sensitive reflectors.
Figure 11B:
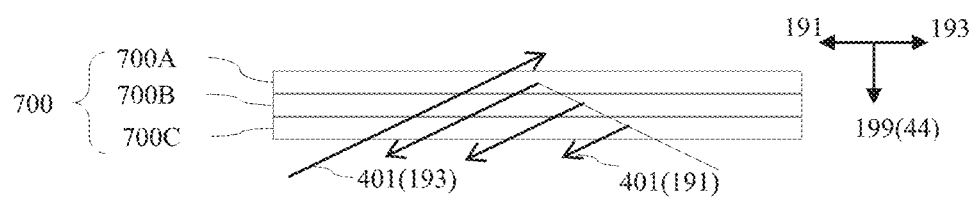
Figure 11C:
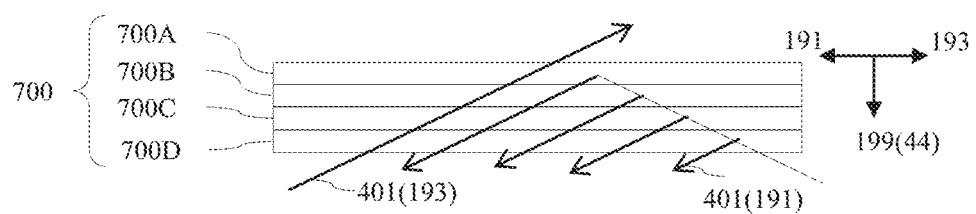

FIGS. 11A-C are schematic diagrams illustrating side views of various arrangements of polarization-sensitive reflectors 700. Features of the embodiments of FIGS. 11A-C not discussed in further detail may be assumed to correspond to the features with equivalent reference numerals as discussed above, including any potential variations in the features.

The polarization-sensitive reflector 700 may further comprise multiple polarization-sensitive reflector elements. FIG. 11A illustrates a dual-layer polarization-sensitive reflector 700, FIG. 11B illustrates a three-layer polarization-sensitive reflector 700 and FIG. 11C illustrates a four-layer polarization-sensitive reflector 700. Each of the polarization-sensitive reflectors 700A-D may comprise a reflective linear polarizer 702, a dielectric stack 712, a nematic liquid crystal layer 722 or a cholesteric liquid crystal layer 732. Other known polarization-sensitive reflective layers may alternatively be provided.

Advantageously the efficiency of discrimination between polarization states 902, 904 propagating in first and second directions 191, 193 can be increased or modified. System efficiency and image uniformity across the exit pupil 40 may be increased.

In an illustrative embodiment, the polarization-sensitive reflector 700A may comprise a reflective linear polarizer 702 and the polarization-sensitive reflector 700B may comprise a dielectric stack 712. For light rays 401(191) the dielectric stack 712 of polarization-sensitive reflector 700B may have high reflectivity and any residual light that passes through the dielectric stack is reflected by the reflective linear polarizer 702. Advantageously the light is efficiently guided between the polarization-sensitive reflector 700 and the front light guide surface 8 in the first direction 191. As much of the reflectivity is provided by the dielectric stack 712 then absorption losses from reflection at the reflective linear polarizer 702 are reduced and the efficiency of guiding along the extraction waveguide 1 increased.

For light rays 401(193), the dielectric stack 712 may be arranged to provide residual reflectivity of the incident p-polarization state. Such residual reflectivity provides increased light that guides along the extraction waveguide 1 in the second direction after the first reflection at the polarization-sensitive reflector 700, and advantageously achieves increased uniformity.

Alternative embodiments of the array of extraction features 170 comprising the prisms 171 of FIG. 1A will now be described. In the following examples, specific examples of the array of extraction features 170 are shown (for example being prisms 171 in FIG. 1A, steps 12 in FIG. 12F, plates 174 in FIG. 15, diffractive optical elements in FIG. 20B and so on), but this is not limitative and in general any of the extraction features 170 disclosed herein may alternatively be applied in the following examples. Similarly, the various features of the following examples may be combined together in any combination.

Figure 12A:
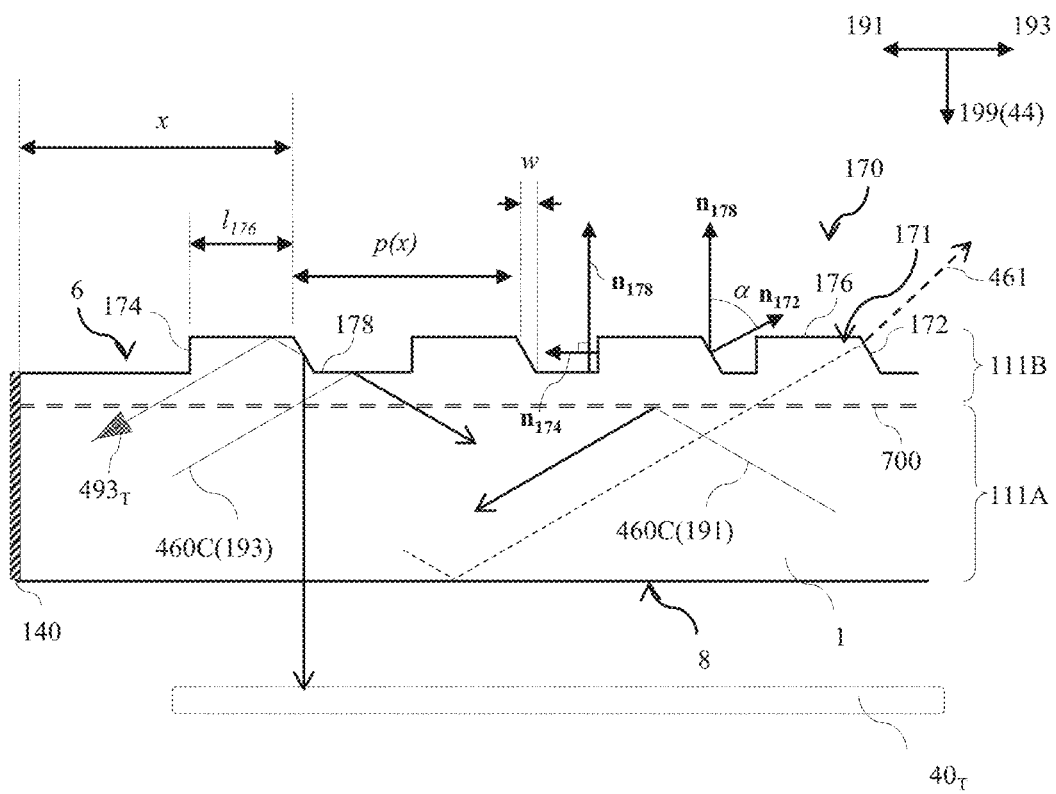
FIG. 12A is a schematic diagram illustrating a side view of the operation of an array of extraction features each comprising a prism comprising an extraction facet, a guiding facet, and a draft facet wherein the pitch of the prisms varies along the extraction waveguide.

FIG. 12A is a schematic diagram illustrating a side view of the operation of an array of extraction features 170 each comprising a prism 171 comprising an extraction facet 172, a guiding facet 176, and a draft facet 174 wherein the pitch, p(x) of the prisms 171 varies with distance, x from the light reversing reflector 140 along the extraction waveguide 1; and wherein the draft facet 174 is inclined with a surface normal direction $n_{174}$ at an angle of 90 degrees to the surface normal direction $n_{178}$ of the guide portion 178 of the rear light guide surface 6. Features of the embodiment of FIG. 12A not discussed in further detail may be assumed to correspond to the features with equivalent reference numerals as discussed above, including any potential variations in the features.

In the alternative embodiment of FIG. 12A, the extraction facet 172 is inclined at an angle α to the direction $n_{178}$ (and as illustrated in FIG. 3A) to provide deflection of light ray 460C(193) propagating in the second direction 193 from the central pixel row 222C in the transverse direction 197 such that the ray that is reflected by total internal reflection at the primary guide facet 176 and then extraction facet 172 is directed normal to the front light guide surface 8. The central pixel row 222C will then be provided along the centre line of the viewer. In alternative embodiments not shown, the central pixel may have an adjusted direction by adjustment of the angle α. Advantageously the nominal viewing direction may be adjusted.

The length $l_{176}$ of the primary guide facet 176 may be arranged to provide reflection of the incident light cone $493_T$ in the transverse direction is reflected from the extraction facet 172.

FIG. 12A further illustrates that the pitch p(x) of the extraction facets 172 may vary with distance x from the light reversing reflector 140. In operation, the light that passes through the polarization-sensitive reflector 700 may be preferentially transmitted at lower distance x, and thus extraction efficiency along the extraction waveguide 1 in the direction 193 may reduce with distance x. The pitch p(x) may be arranged to provide increased uniformity of extraction in the direction 193 such that the pitch p(x) reduces with distance x. Advantageously image uniformity may be increased across the exit pupil 40.

Figure 12B:
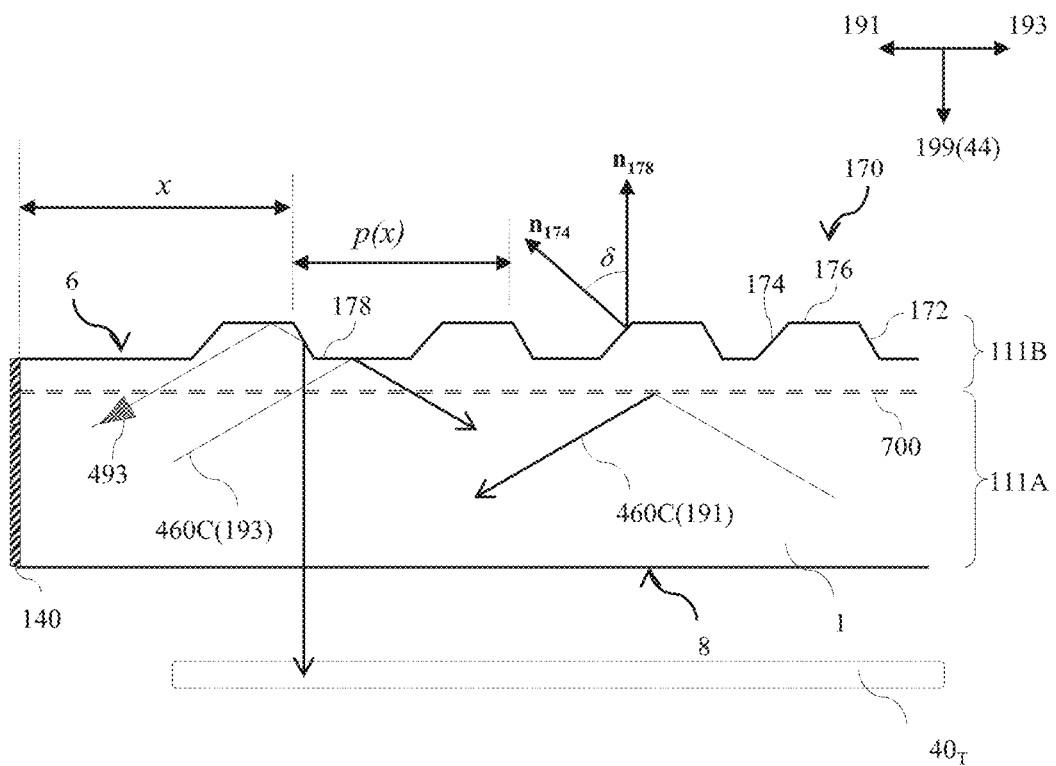
FIG. 12B is a schematic diagram illustrating a side view of the operation of an array of extraction features each comprising a prism comprising an extraction facet and a draft facet.

FIG. 12B is a schematic diagram illustrating a side view of the operation of an array of extraction features 170 each comprising a prism 171 wherein the draft facet 176 is inclined with a surface normal direction $n_{176}$ at an angle δ to the surface normal direction $n_{178}$ of the guide portion 178 of the rear light guide surface 6. Features of the embodiment of FIG. 12B not discussed in further detail may be assumed to correspond to the features with equivalent reference numerals as discussed above, including any potential variations in the features.

In comparison to FIG. 12A, in the alternative embodiment of FIG. 12B, the angle δ is adjusted so that the light cone $493_T$ is uniformly extracted by the reflection at facets 176, 172. Advantageously vignetting across the image as seen at the retina 47 of the user is reduced and image uniformity increased.

It may be desirable to reduce the glow from the extraction waveguide in the direction of light rays 461.

Figure 12C:
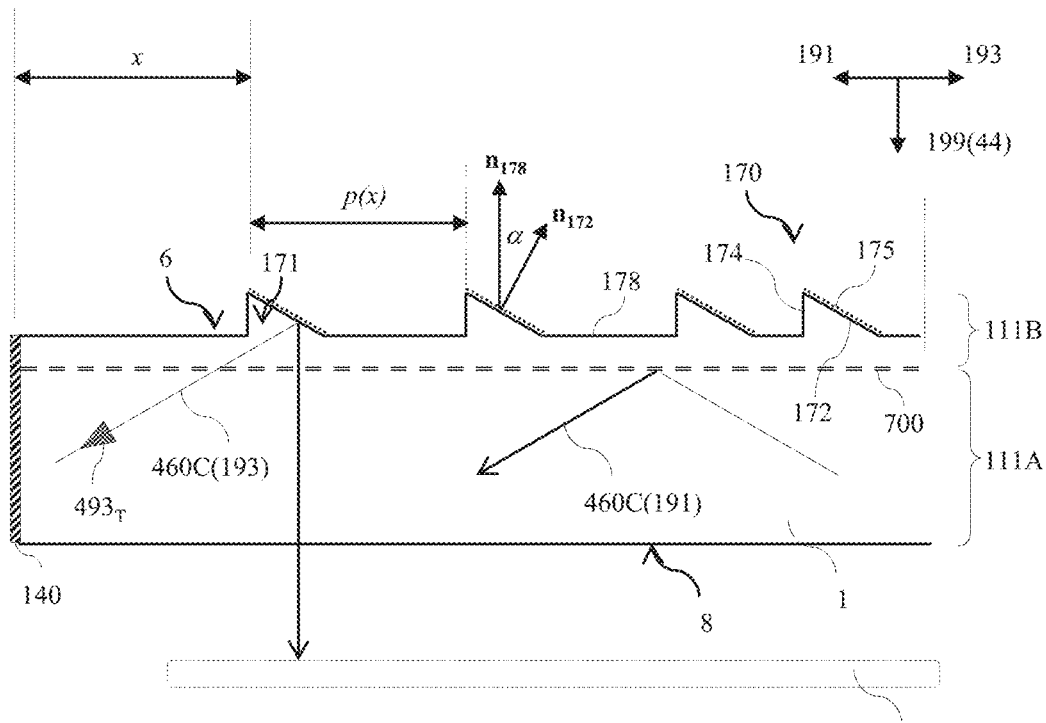
FIG. 12C is a schematic diagram illustrating a side view of the operation of an array of extraction features each comprising an extraction facet and a draft facet.

FIG. 12C is a schematic diagram illustrating a side view of the operation of an array of extraction features each comprising an extraction facet 172 and a draft facet 174. Features of the embodiment of FIG. 12C not discussed in further detail may be assumed to correspond to the features with equivalent reference numerals as discussed above, including any potential variations in the features.

In comparison to FIG. 12A, in the alternative embodiment of FIG. 12C, the primary guide facet 176 is omitted from each prism 171, and a reflective material 175 is arranged at least on the extraction facet 172 that has an angle α that is smaller.

In operation, light ray 460C(193) is reflected by reflection of the reflective material 175 rather than total internal reflection. Advantageously the extracted light rays 461 of FIG. 12A are not present, reducing output stray light.

Figure 12D:
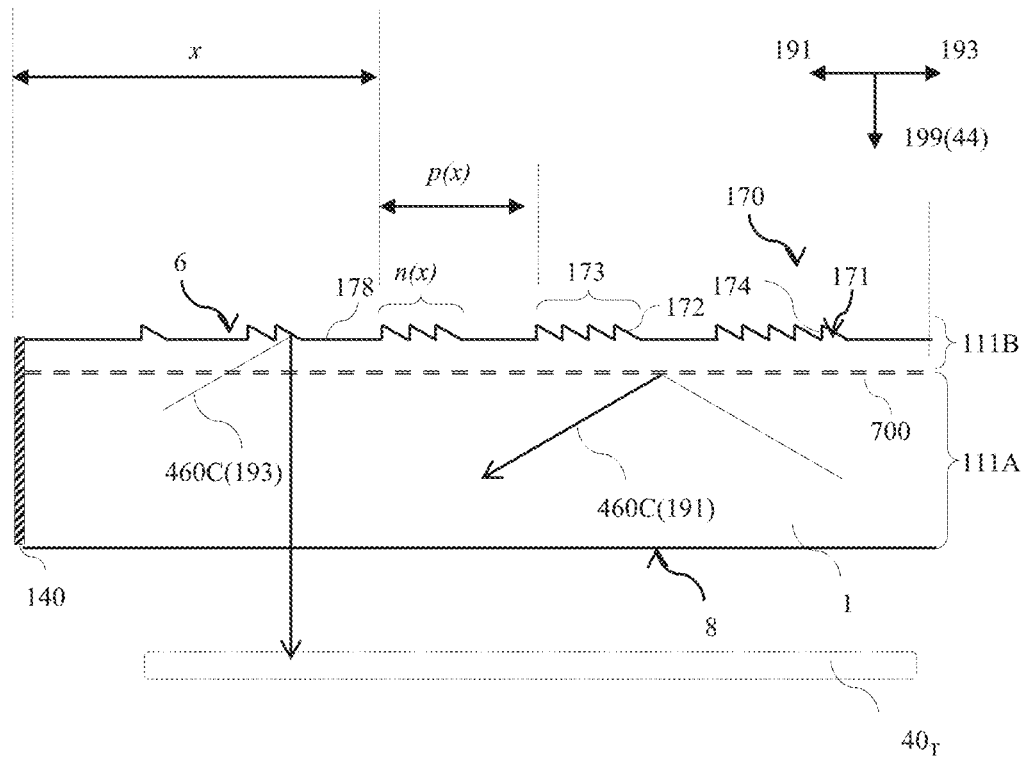
FIG. 12D is a schematic diagram illustrating a side view of the operation of an alternative array of extraction features each comprising an extraction facet and a draft facet.

FIG. 12D is a schematic diagram illustrating a side view of the operation of an alternative array of extraction features each comprising an extraction facet 172 and a draft facet 174 and arranged in groups 173. Features of the embodiment of FIG. 12D not discussed in further detail may be assumed to correspond to the features with equivalent reference numerals as discussed above, including any potential variations in the features.

In comparison to the embodiments of FIG. 12C, the prisms 171 are arranged in groups 173, where the number n(x) of prisms 171 in each group may vary with distance x from the light reversing reflector 140. Further the pitch p(x) of the groups 173 may vary with distance x from the light reversing reflector 140. Advantageously the uniformity of extraction across the exit pupil 40 may be increased.

Figure 12E:
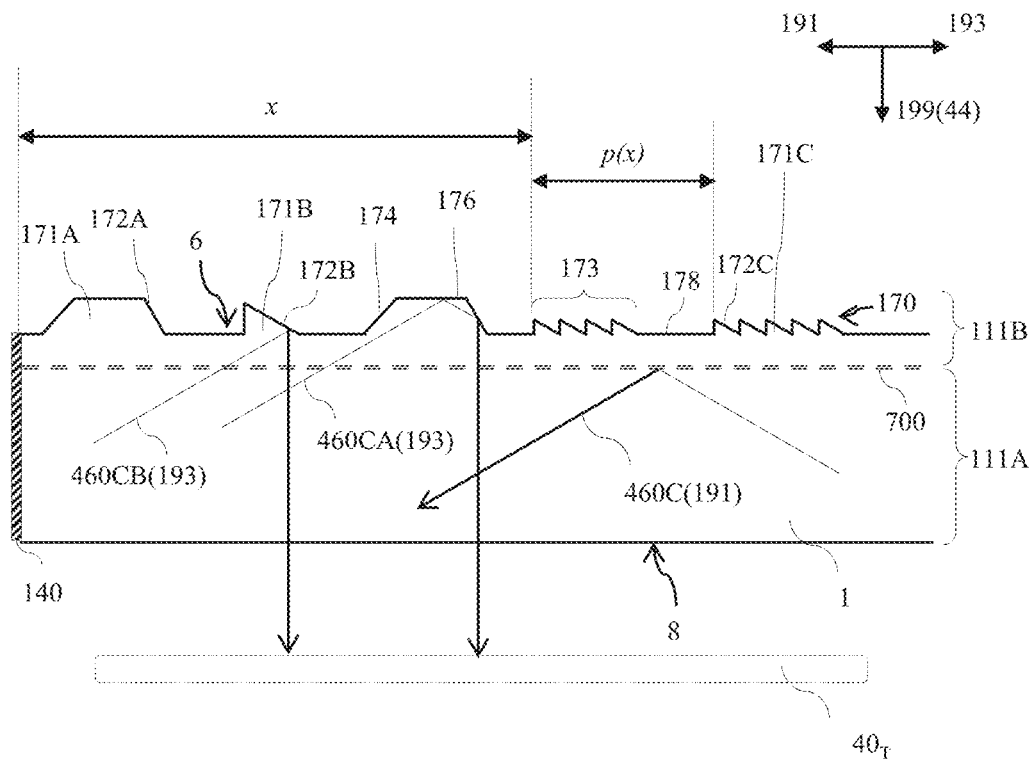
FIG. 12E is a schematic diagram illustrating a side view of the operation of an array of extraction features comprising different shaped extraction features.

FIG. 12E is a schematic diagram illustrating a side view of the operation of an array of extraction features 170 comprising different shaped and sized extraction prisms 171. Features of the embodiment of FIG. 12E not discussed in further detail may be assumed to correspond to the features with equivalent reference numerals as discussed above, including any potential variations in the features.

In comparison to the embodiments of FIGS. 12A-D, in the alternative embodiment of FIG. 12E, the extraction features 170 comprise different shaped and sized extraction prisms 171A, 171B, 171C with respective extraction facets 172A, 172B, 172C to reflect rays 460CA(193) and 460CB(193) to the desirable output direction. Some of the prisms 171C may be arranged in groups 173 and the pitch p(x) may be arranged to provide improved uniformity across the exit pupil 40$_T$ in the transverse direction 197.

Diffraction of the output image on the retina, uniformity across the exit pupil 40, efficiency and output stray light may be controlled to advantageously achieve desirable performance trade-offs.

It may be desirable to reduce stray light output from the extraction waveguide 1.

Figure 12F:
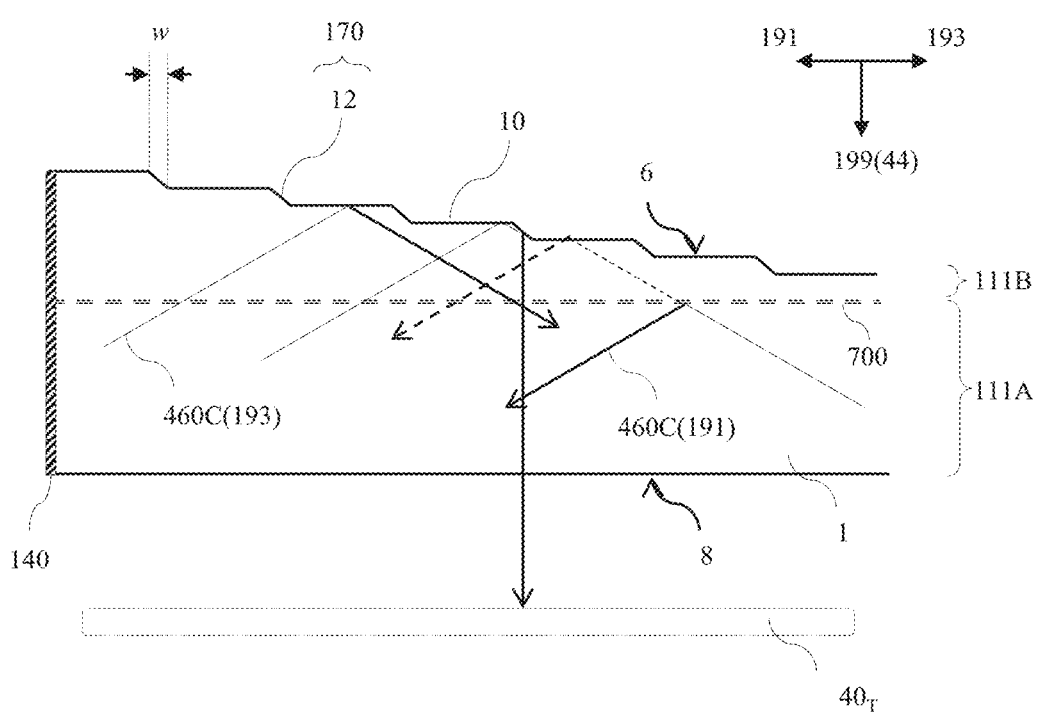
FIG. 12F is a schematic diagram illustrating a side view of the operation of an array of extraction features comprising a rear guide surface comprising stepped extraction features.

FIG. 12F is a schematic diagram illustrating a side view of the operation of an array of extraction features comprising stepped extraction features 170. Features of the embodiment of FIG. 12F not discussed in further detail may be assumed to correspond to the features with equivalent reference numerals as discussed above, including any potential variations in the features.

In the alternative embodiment of FIG. 12F, the extraction features 170 comprises inclined step facets 12 of a stepped rear guide surface 6. Intermediate light guide tread facets 10 are arranged between the steps 12.

In operation, some of the input light ray 460C(191) may pass through the polarization-sensitive reflector 700 and incident on the rear light guide surface 6. By way of comparison to FIG. 12A for example, such light rays are not incident on a draft facet 174, and are instead incident on the tread portions 10, the step facets 12 being hidden in the first direction 191. Stray light for light propagating in the first direction 191 is advantageously reduced.

For light rays propagating in the second direction 193, some light rays 460C(193) are reflected by total internal reflection at a tread facet 10 and then a step facet 12, to be output through the front light guide surface 8.

The stepped light guide surface 6 of FIG. 12F may be advantageously manufactured at low cost. In alternative embodiments, not shown, the stepped structure of FIG. 12F may be combined with the prisms 171 of FIG. 12E. Advantageously further improvement in optimisation may be achieved.

Structures of extraction facets 172 arranged to achieve improved image uniformity will now be described.

Figure 13A:
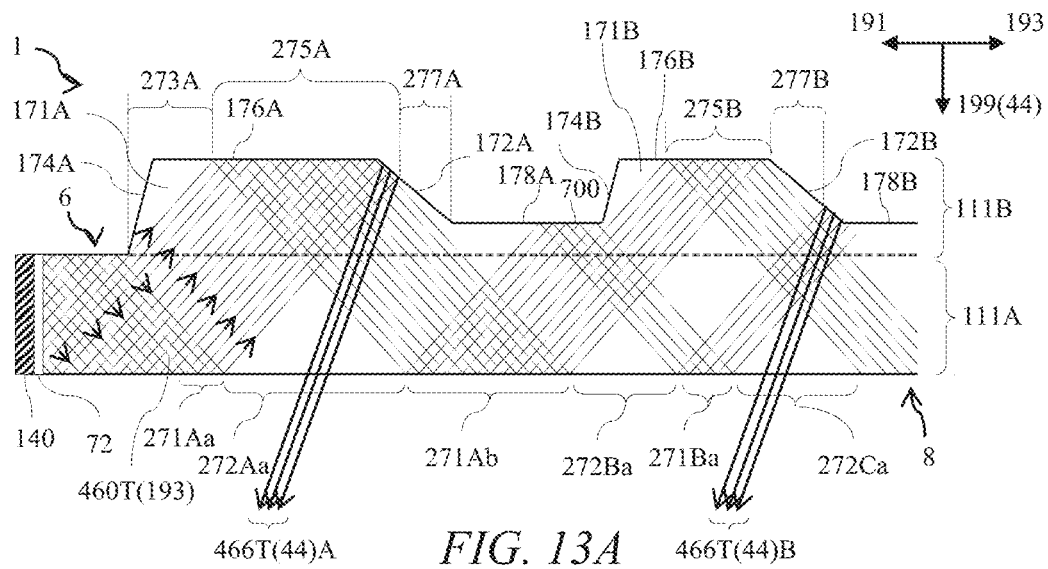
FIG. 13A is a schematic diagram illustrating a side view of light output from an extraction waveguide comprising an array of extraction features with a draft facet arranged for each extraction facet.
Figure 13B:
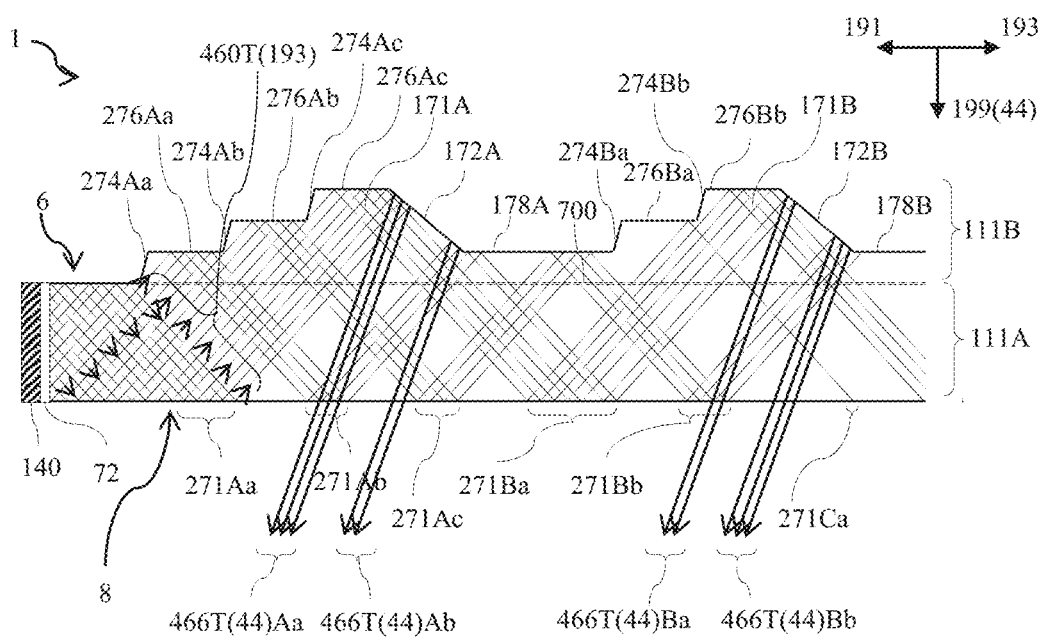
FIG. 13B is a schematic diagram illustrating a side view of light output from an extraction waveguide comprising an array of extraction features with intermediate draft facets and intermediate guide facets arranged for each extraction facet.
Figure 13C:
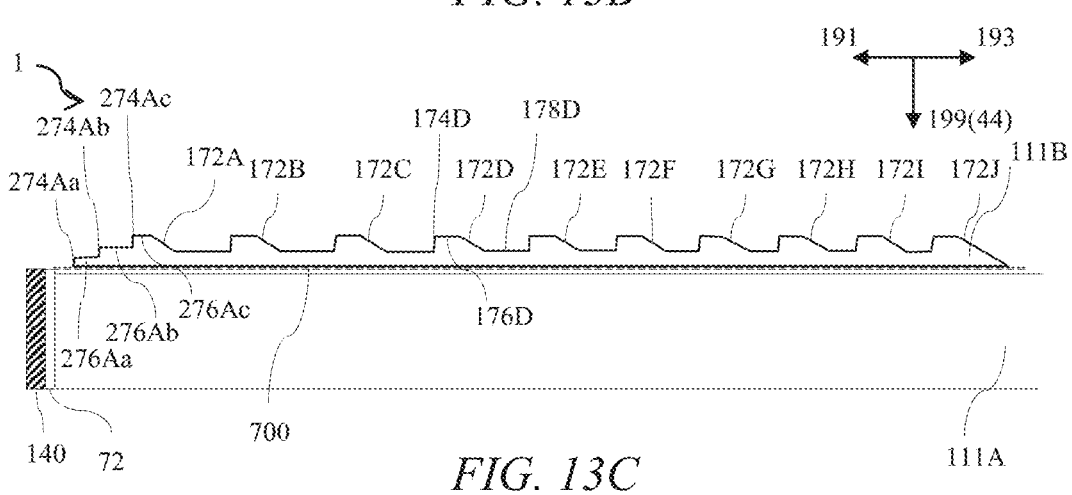
FIG. 13C is a schematic diagram illustrating a side view of an extraction waveguide comprising an array of extraction features with intermediate draft facets and intermediate guide facets arranged for one of the extraction facets.

FIG. 13A is a schematic diagram illustrating a side view of light output 466 from an extraction waveguide 1 comprising an array of extraction facets 172A-B with a draft facet 174 arranged for each extraction facet 172; FIG. 13B is a schematic diagram illustrating a side view of light output from an extraction waveguide 1 comprising an array of extraction facets 172A-B with intermediate draft facets 274Aa, 274Ab and intermediate guide facets 276Aa, 276Ab, 276Ac arranged for extraction facet 172A and with intermediate draft facets 274Ba, 274Bb and intermediate guide facets 276Ba, 276Bb, 276Bc arranged for extraction facet 172B; and FIG. 13C is a schematic diagram illustrating a side view of an extraction waveguide 1 comprising an array of extraction facets 172 with intermediate draft facets 274Ba, 274Bb and intermediate guide facets 276Aa, 276Ab, 276Ac arranged for the extraction facet 172A, and the remainder of the extraction facets 172B-J comprise single draft facets 174A-J respectively. Features of the embodiments of FIGS. 13A-C not discussed in further detail may be assumed to correspond to the features with equivalent reference numerals as discussed above, including any potential variations in the features. Non-uniformities arising from the arrangement of prisms 171 will now be described.

The embodiment of FIG. 13A illustrates light rays 460T(193) that are produced by a top pixel 222T as illustrated in FIG. 1C for example and are propagating in the second direction 193 along the extraction waveguide 1 from the light reversing reflector 140.

At the first prism 171A, a region 273A is created from which no light is directed from the rear guide surface 6 to the front guide surface 8, providing missing rays in a "hole" region 272Aa at the front guide surface 8.

In a similar manner region 275A of the rear guide surface 6 is illuminated and from which light is directed from the rear guide surface 6 to the front guide surface 8 to provide "source" region 271Aa. In the present description, a source region is not a physical source, but is the effective area of the front guide surface 8 that illuminates an extraction facet 172 and is a consequence of the propagation of light through the geometric structure of the extraction waveguide 1.

The light rays 460T(193) from the source region 271Aa that are incident on the extraction facet 172A are extracted through the front guide surface 8 as light ray bundles 466T(44)A. However, a "hole" region 272Aa provides a non-illuminated region from the front guide surface 8 to the extraction facet 172A that does not reflect light towards the eye 45.

In a similar manner, hole regions 272Ba, 272Ca and source regions 271Ba are arranged at the front guide surface 8. Output light ray bundles 466T(44)B are output by the reflection of light rays from the source region 271Ba by the extraction facet 172A. The luminance of output from an extraction facet 172 will vary with respect to (i) location in the direction 193 along the extraction waveguide 1; and (ii) ray angle (representing pixels 222 angular locations). Such non-uniformity may provide patterning in the image that varies with eye location across the exit pupil 40.

It would be desirable to reduce non-uniformities of the image and variation of non-uniformities for eye 45 pupil 44 locations across the exit pupil 40.

In the alternative embodiments of FIGS. 13B, prism 171A comprises plural draft facets 274Aa, 274Ab, 274Ac and an intermediate guide facet 276Aa, 276Ab arranged between each adjacent pair of the plural draft facets 274Aa, 274Ab, 274Ac. Prism 171B similarly comprises plural draft facets 274Ba, 274Bb, 274Bc and an intermediate guide facet 276Ba, 276ABb arranged between each adjacent pair of the plural draft facets 274Ba, 274Bb, 274Bc.

By way of comparison with FIG. 13A, such intermediate facets 274 provide an increased number of source regions 271Aa, 271Ab, 271Ac, 217Ba, 271Bb to illuminate the respective extraction features so that ray bundles 466T(44)Aa, 466T(44)Ab are output from extraction feature 172A and bundles 466T(44)Ba, 466T(44)Bb are output from extraction facet 172B. Such increased number of source regions 271 may advantageously reduce non-uniformity of image output, and reduce variation of non-uniformities for a moving eye 45 within the exit pupil 40. The number and location of the intermediate draft facets 274 and intermediate guide facets 276 may be modified to achieve desirable uniformity characteristics.

By way of comparison with FIG. 13B, in the alternative embodiment of FIG. 13C, the intermediate draft facets 274Aa, 274Ab, 274Ac are provided for the first extraction facet 172A, but are not provided for the subsequent extraction facets 172B-J. Such an arrangement pre-conditions the light that propagates in the second direction 193 along the extraction waveguide 1 so that the uniformity may be improved. Such an arrangement further reduces small size ray bundles that would be provided by small source regions 271Ca of FIG. 13B for example. Small source regions 271Ca provide output that has a small diffractive aperture, and thus image blur is increased. The alternative arrangement of FIG. 13C may advantageously reduce image blur while achieving desirable uniformity. FIG. 13C further illustrates extraction facets 172 that are chirped with pitch p(x) to further reduce Moiré beating between the source regions 271 and the respective extraction facets 172.

The intermediate draft facets 274 and intermediate guide facets 276 may be provided with other embodiments of extraction features 170 of the present description to advantageously achieve improved image uniformity. Internal extraction features 170 will now be described.

Figure 14A:
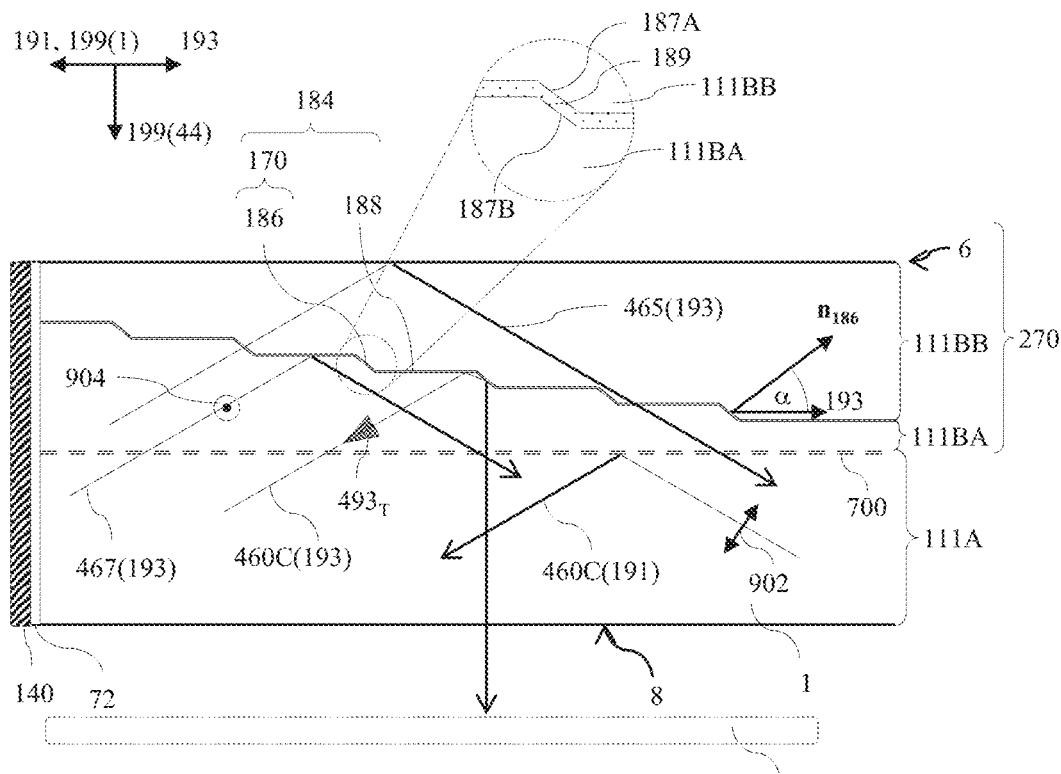
FIG. 14A is a schematic diagram illustrating a side view of the operation of a stepped reflecting layer comprising an array of extraction features.

FIG. 14A is a schematic diagram illustrating a side view of the operation of an array of extraction features comprising buried partially reflective stepped extraction features 170. Features of the embodiment of FIG. 14A not discussed in further detail may be assumed to correspond to the features with equivalent reference numerals as discussed above, including any potential variations in the features.

In the alternative embodiment of FIG. 14A, the extraction element 270 comprises an array of extraction reflectors 186 disposed internally within the extraction waveguide 1 and arranged between the polarization-sensitive reflector 700 and the rear light guide surface 6.

The stepped extraction reflectors 186 comprise extraction surfaces 187A, 187B spaced apart by a partially reflective coating 189 as illustrated by the blown up section. The partially reflective coating 189 may comprise at least one dielectric layer such as an adhesive material or other dielectric material. Alternatively, the partially reflective coating 189 may comprise a stack of dielectric layers as will be described hereinbelow or may be metallic, for example aluminium or silver.

The stepped extraction reflectors 186 extend partially across the extraction waveguide 1 between opposing rear and front guide surfaces 6, 8 of the extraction waveguide 1 with successively shifted positions and partially reflective layer 184 further comprises intermediate reflectors 188 extending along the extraction waveguide 1 between adjacent pairs of stepped extraction reflectors 186.

In the embodiments of FIGS. 12A-F for example, the extraction element 270 comprises an array of extraction features 170 that are formed on the rear light guide surface 6.

By way of comparison, in the alternative embodiment of FIG. 14A, extraction element 270 comprises waveguide members 111BA, 111BB separated by a dielectric partially reflective layer 184 comprising partially reflective stepped extraction reflectors 186 and partially reflective tread facets 188. The dielectric partially reflective layer 184 may be a dielectric stack, the principles of operation of which is similar to the dielectric stack 712 of FIG. 7A for example. The dielectric layers of the dielectric stack may be arranged to achieve desirable reflectivity of the partially reflective layer 184.

The stepped extraction reflectors 186 are another example of reflective extraction features 170 and each comprises a set of layers that are reflective layers described hereinbelow.

The extraction waveguide 1 is further arranged to receive light cone $493_T$ from the transverse anamorphic component 60 and the lateral anamorphic component 110; and comprises an array of stepped extraction reflectors 186A-N disposed internally within the extraction waveguide 1.

The extraction features 170 comprise stepped extraction reflectors 186A-N that are each inclined at angle α with respect to the first and second directions 191, 193 along the optical axis 199(1) of the extraction waveguide 1. The extraction features 170 extend partially across the extraction waveguide 1 between the opposing rear and front guide surfaces 6, 8. In the embodiment of FIG. 14A, the partially reflective surfaces of stepped extraction reflectors 186A-D extend between the polarization-sensitive reflector 700 and the rear light guide surface 6. The extraction waveguide 1 comprises intermediate surfaces 188 extending along the extraction waveguide 1 between adjacent pairs of stepped extraction reflectors 186.

In the alternative embodiment of FIG. 14A, the partially reflective coating 184 may comprise a stack 184 of dielectric layers 186A-E with alternating high and low refractive indices. An illustrative embodiment is provided in TABLE 4. The stack 185 of dielectric layers 189A-E may be formed on one or both of the waveguide members 111BA, 111BB by evaporation or sputtering for example and the extraction waveguide 1 assembled by alignment of the waveguide members 111BA, 111BB.

TABLE 4

| Item | Illustrative material | Refractive index | Thickness (nm) |
|---|---|---|---|
| Waveguide member 111BA | PMMA | 1.50 | — |
| Dielectric layer 189A | TiO$_2$ | 2.6 | 7 |
| Dielectric layer 189B | SiO$_2$ | 1.5 | 79 |
| Dielectric layer 189C | TiO$_2$ | 2.6 | 21 |
| Dielectric layer 189D | SiO$_2$ | 1.5 | 30 |
| Dielectric layer 189E | TiO$_2$ | 2.6 | 45 |
| Waveguide member 111BB | PMMA | 1.49 | — |

Polarization selectivity of reflections at the partially reflective surfaces 180 will now be considered further.

Figure 14B:
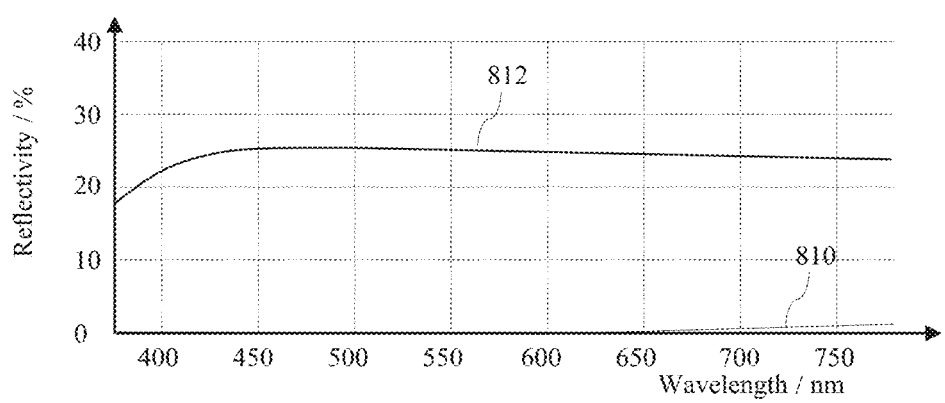
FIG. 14B is a schematic graph illustrating the variation of reflectivity against wavelength for light rays propagating through an extraction reflector comprising dielectric layers set out in TABLE 4.

FIG. 14B is a schematic graph illustrating the variation of reflectivity against wavelength for light rays propagating through an extraction reflector comprising dielectric layers set out in TABLE 4. Profile 810 illustrates the total p-polarization state 902 reflectivity for a single reflection from the dielectric stack 184 while profile 812 illustrates the total s-polarization state 904 reflectivity for a single reflection from the dielectric stack 185 wherein the thicknesses of TABLE 2 are arranged to provide approximately 25% reflectivity for each reflection. Adjustment of the thicknesses and/or increased number of layers may be used to adjust the reflectivity to achieve desirable reflectivity of the s-polarization state 904 light ray 460C(193).

In other embodiments not illustrated, the dielectric stack may comprise a single layer of material such as air or an adhesive with desirable refractive index arranged between the members 111BA, 111BB. Advantageously cost and complexity may be reduced while desirable reflectivity and transmission is achieved.

Considering the material of the waveguide members 111A, 111B in this embodiment and other embodiments described elsewhere herein, a material with higher refractive index such as polycarbonate or high index glasses may be used. Advantageously increased field of view, Ør may be provided in the transverse direction.

In operation, some light rays 465 (193) are transmitted through the partially reflective stepped extraction reflectors 186 and partially reflective tread facets 188, and are guided between the rear and front guide surfaces 6, 8. Some light passed by the polarization-sensitive reflector 700 is transmitted along the extraction waveguide 1 and not extracted near the light reversing reflector 140. Other light rays 467 (193) are reflected by the partially reflective tread facets 188 and are not extracted near the light reversing reflector 140. Advantageously increased uniformity may be achieved across the exit pupil 40.

Further, each of the stepped extraction reflectors 186 may see light from across the light reversing reflector 140 in the transverse direction. Vignetting across the field of view may be reduced and the uniformity in the output image seen on the retina 47 may be advantageously improved.

It may be desirable to increase the size of the extraction features 170.

Figure 15:
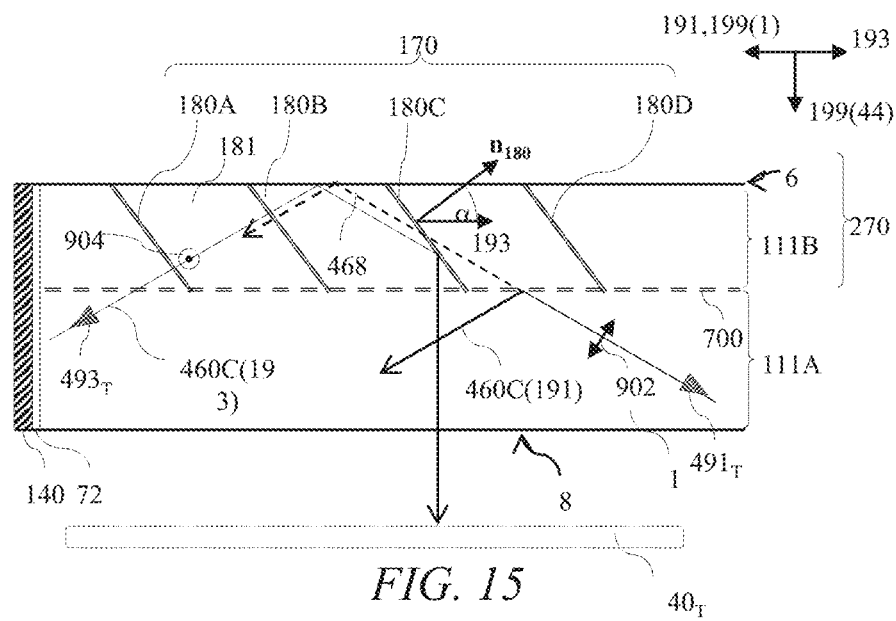
FIG. 15 is a schematic diagram illustrating a side view of the operation wherein the array of extraction features comprises inclined partially reflective surfaces.
Figure 16:
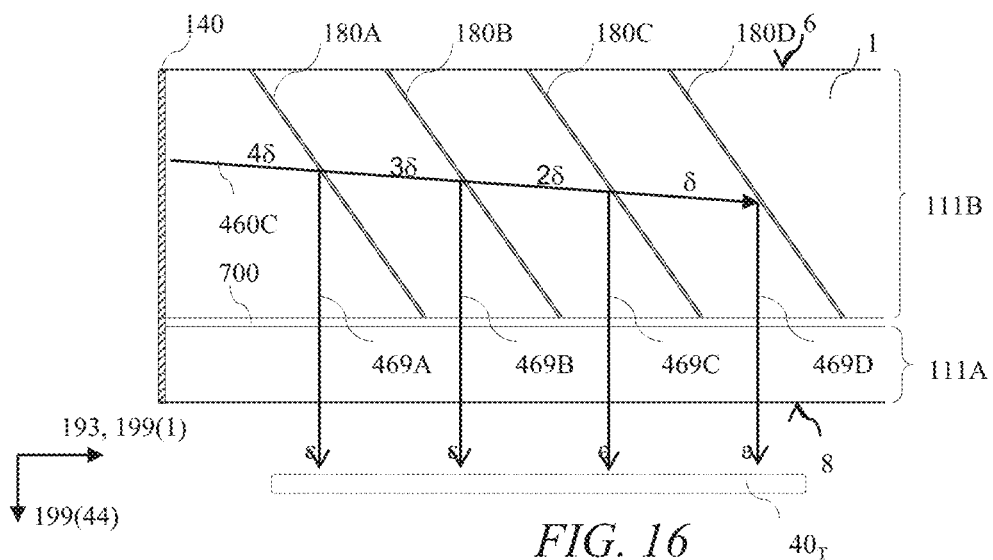
FIG. 16 is a schematic diagram illustrating the variation of reflectivity of the partially reflective surfaces along the extraction waveguide of FIG. 15.

FIG. 15 is a schematic diagram illustrating a side view of the operation wherein the array of extraction features 170 comprises inclined partially reflective surfaces 180; and FIG. 16 is a schematic diagram illustrating the variation of the partially reflective surfaces 180 along the extraction waveguide 1 of FIG. 15. Features of the embodiments of FIGS. 15-16 not discussed in further detail may be assumed to correspond to the features with equivalent reference numerals as discussed above, including any potential variations in the features.

In the alternative embodiments of FIG. 15 and FIG. 16, the extraction waveguide 1 comprises an array of extraction features 170 comprising partially reflective surfaces 180 disposed internally within the extraction waveguide 1, the partially reflective surfaces 180 being arranged to transmit light guided 400 along the extraction waveguide 1 in the first direction 191 and to extract light guided along the extraction waveguide 1 in the second direction 193 towards an eye 45 of a viewer arranged in the exit pupil 40. The array of extraction features 170 are distributed along the extraction waveguide 1 so as to provide exit pupil 40 expansion in the transverse direction 197.

The partially reflective surfaces 180 are another example of reflective extraction features 170 and each comprises a set of layers that are reflective layers similar to those illustrated in FIG. 14A and TABLE 4.

The extraction waveguide 1 is further arranged to receive light cone $493_T$ from the transverse anamorphic component 60 and the lateral anamorphic component 110.

The extraction features 170 comprising partially reflective surfaces 180A-D are each inclined at angle α with respect to the first and second directions 191, 193 along the optical axis 199(1) of the extraction waveguide 1. The extraction features 170 extend partially across the extraction waveguide 1 between the opposing rear and front guide surfaces 6, 8. In the embodiment of FIG. 15, the partially reflective surfaces 180A-D extend between the polarization-sensitive reflector 700 and the rear light guide surface 6.

The dielectric stacks of the partially reflective surfaces 180 may be formed on one or both surfaces of the adjacent plates 181. In other embodiments, the dielectric stacks may be replaced by single dielectric layers, metal, or a gap.

The partially reflective surfaces 180A-D are arranged to transmit at least some rays 468 of light cone $491_T$ guided along the extraction waveguide 1 in the first direction 191 and to extract at least some of light cone 493 guided back along the extraction waveguide 1 in the second direction 193 towards an eye 45 of a viewer 47 arranged in the exit pupil 40.

Partially reflective surfaces 180 comprises dielectric stack comprising dielectric layers that may vary between the different partially reflective surfaces 180A-D.

FIG. 16 is a schematic diagram illustrating the variation of reflectivity of partially reflective surfaces 180 in the direction 191 along the extraction waveguide 1 of FIG. 15 and with the illustrative embodiment of TABLE 5 in the case the extraction waveguide comprises four partially reflective surfaces 180A-D. Features of the embodiment of FIG. 16 not discussed in further detail may be assumed to correspond to the features with equivalent reference numerals as discussed above, including any potential variations in the features.

TABLE 5

| Reflector | Stack reflectivity | Input power to reflector | Output power to ray 469 |
|---|---|---|---|
| 180A | 25% | 4ε | ε |
| 180B | 33% | 3ε | ε |
| 180C | 50% | 3ε | ε |
| 180D | 100% | ε | ε |

In the alternative embodiment of FIG. 16, the partially reflective surfaces 180 extend across the extraction waveguide 1 and have the same reflective areas. The reflectivities of the partially reflective surfaces 180 are defined across their overall area and increase with increasing distance along the optical axis 199(1), that is along the second direction 193 along the extraction waveguide 1 for light that is reflected from the light reversing reflector 140. In other words, the reflectivities of the partially reflective surfaces 180 are defined across their overall area and increase with increasing distance in the direction 193 along the extraction waveguide 1 from the light reversing reflector 140.

The stack reflectivity profile of TABLE 5 achieves uniform power & of output to rays 469A-D, so that advantageously a uniform image luminance is seen for different pupil 44 positions across the exit pupil 40. Such reflectivity profile may be achieved by adjusting the dielectric stack to be different at each partially reflective surface 180. Such differences may be achieved by adjustment of number, thickness and material of dielectric layers 186.

The illustrative embodiment of TABLE 5 provides desirable output properties for polarized illumination of FIG. 15 and FIG. 16, because the partially reflective surfaces 180 are substantially transparent to light rays 460C with the p-polarized state 902. Thus the reflectors 180D are substantially blocking to transmitted s-polarization state 904 but are transmitting to p-polarization state 902 and are thus partially transmitting in a general sense.

In comparison to the arrangement of FIG. 12E, FIG. 12F, or FIG. 14A, the width, w of the extraction feature 170 comprising the partially reflective surface 180 in the direction 193 along the extraction waveguide 1 is increased. Advantageously diffraction from the aperture of the partially reflective surface 180 is reduced and image fidelity increased.

Alternative arrangements of reflective extraction elements 270 will now be described.

Figure 17A:
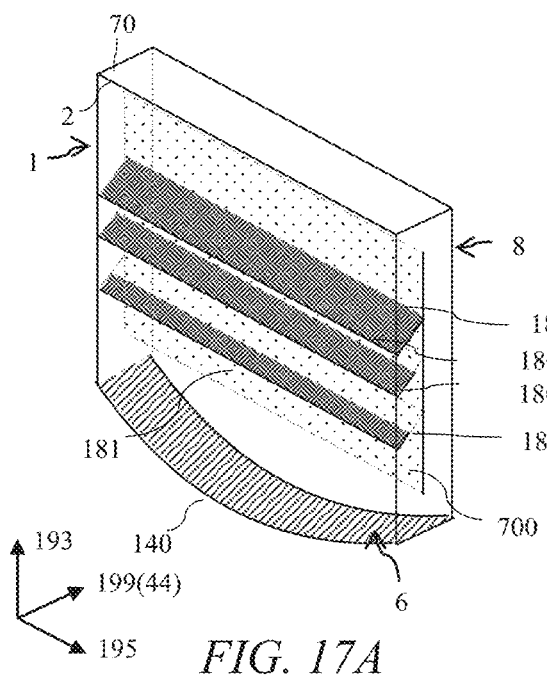
FIG. 17A is a schematic diagram illustrating in perspective front view an alternative arrangement of the anamorphic near-eye display apparatus wherein some of the polarizing beam splitters do not extend the entirety of the thickness of the extraction waveguide.
Figure 17B:
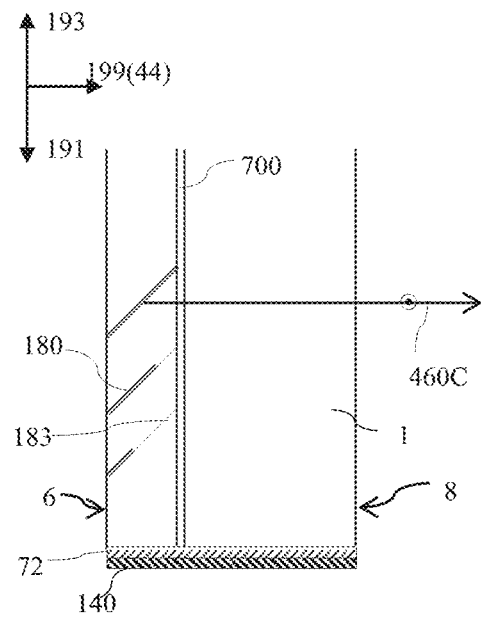
FIG. 17B is a schematic diagram illustrating in side view the operation of the anamorphic near-eye display apparatus of FIG. 17A.

FIG. 17A is a schematic diagram illustrating in perspective front view an alternative arrangement of the anamorphic near-eye display apparatus 100 of FIG. 17A wherein some of the partially reflective surfaces 180 do not extend the entirety of the thickness of the extraction waveguide 1 between the polarization-sensitive reflector 700 and the rear light-guide surface 6; and FIG. 17B is a schematic diagram illustrating in side view the operation of the anamorphic near-eye display apparatus 100 of FIG. 17A. Features of the embodiment of FIGS. 17A-B not discussed in further detail may be assumed to correspond to the features with equivalent reference numerals as discussed above, including any potential variations in the features.

In the alternative embodiment of FIGS. 17A-B, the reflective extraction features 170 are partially reflective surfaces 180 that extend across part of the extraction waveguide 1, the array of partially reflective surfaces 180 having reflectivities defined across their overall area that increase with increasing distance along the optical axis 199 along the extraction waveguide 1 in the direction 193. In other words, the partially reflective surfaces 180 are patterned to have different reflective areas providing reflectivities defined across their overall area that increase with increasing distance along the optical axis 199(60) in the second direction 193. In region 183 of the interface between plates 181 is arranged to be transmissive. Alternatively or additionally the partially reflective surfaces 180 may be patterned to have different reflective areas providing reflectivities defined across their overall area that increase with increasing distance along the optical axis 199(60) in the second direction 193.

Such partially reflective surfaces 180 may be manufactured by masking of the plates 180 during the formation of the dielectric layers 186A-N, for example by deposition. Some regions 181 of the surfaces of the plates may thus have no dielectric stack. As illustrated in TABLE 4, the total power & extracted at each facet may be constant across the array of partially reflective surfaces 180A-D. In comparison to FIG. 18B, the dielectric stack composition may be the same for each of the partially reflective surfaces 180A-D. Advantageously cost and complexity of deposition onto the plates 180 may be reduced.

Figure 18A:
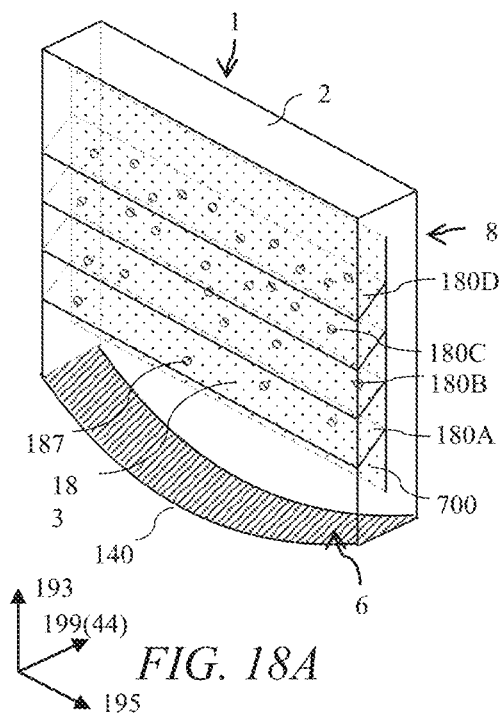
FIG. 18A is a schematic diagram illustrating in perspective front view an alternative arrangement of the anamorphic near-eye display apparatus wherein the polarizing beam splitters are patterned.
Figure 18B:
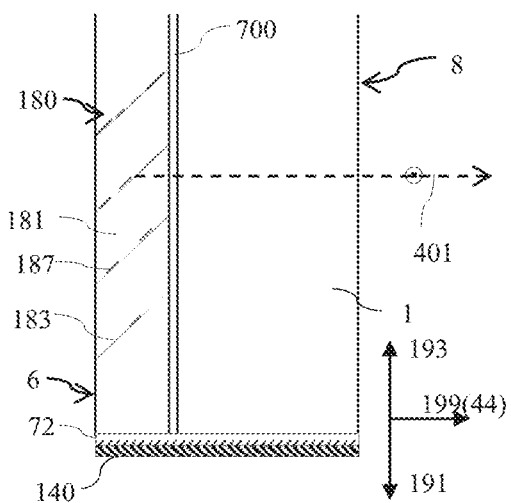
FIG. 18B is a schematic diagram illustrating in side view the operation of the anamorphic near-eye display apparatus of FIG. 18A.

FIG. 18A is a schematic diagram illustrating in perspective front view an alternative arrangement of the anamorphic near-eye display apparatus 100 of FIG. 17A, wherein the partially reflective surfaces 180 comprise patterned reflectors 187; and FIG. 18B is a schematic diagram illustrating in side view the operation of the anamorphic near-eye display apparatus 100 of FIG. 18A. Features of the embodiment of FIGS. 18A-B not discussed in further detail may be assumed to correspond to the features with equivalent reference numerals as discussed above, including any potential variations in the features.

In the alternative embodiment of FIGS. 18A-B, the partially reflective surfaces 180 have a density by area of patterning of reflector 187 separated by transmissive region 183 that increases with distance along the extraction waveguide 1 in the direction 193 away from the light reversing reflector 140 to achieve the desirable reflectivity profile, for example as illustrated in TABLE 4.

The patterning of the partially reflective surfaces 180 may achieve reduced complexity of fabrication of the plates 180.

Further, the partially reflective surfaces 180 may comprise patterned reflectors 187 that comprise high reflectivity metal compared to the dielectric stacks discussed elsewhere herein. Advantageously cost of fabrication of the partially reflective surfaces 180 may be reduced.

Figure 19A:
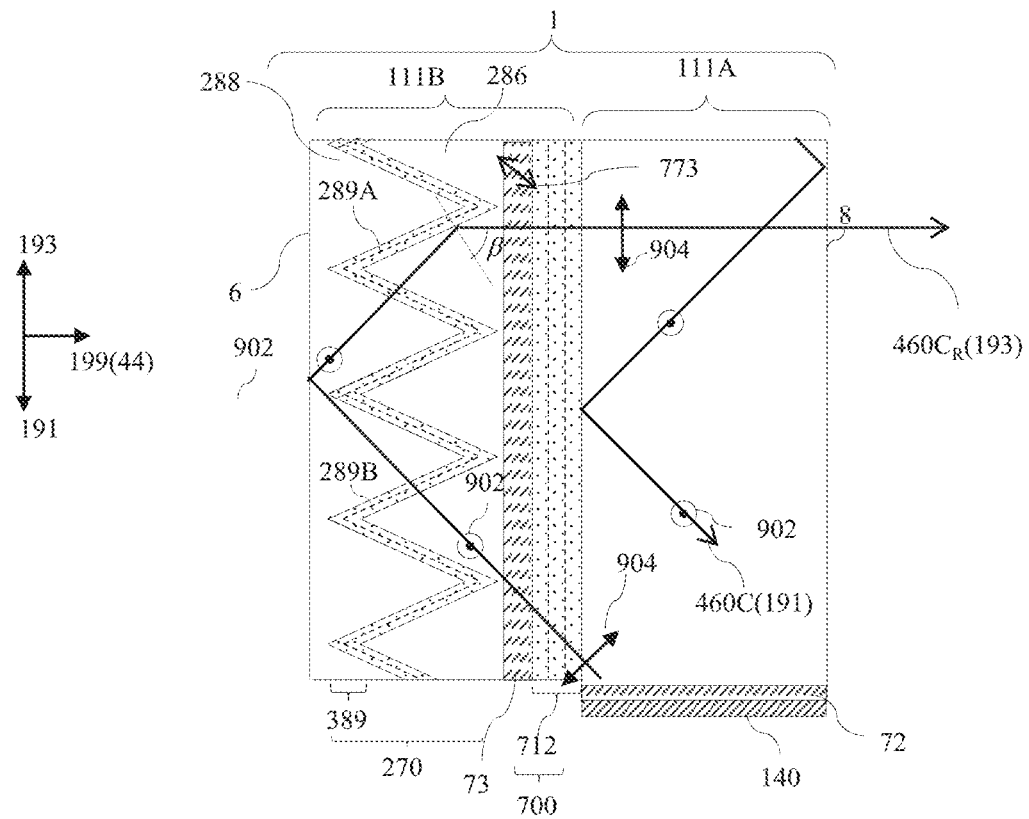
FIG. 19A is a schematic diagram illustrating in side view an arrangement of an extraction waveguide comprising an alternative array of extraction features.
Figure 19B:
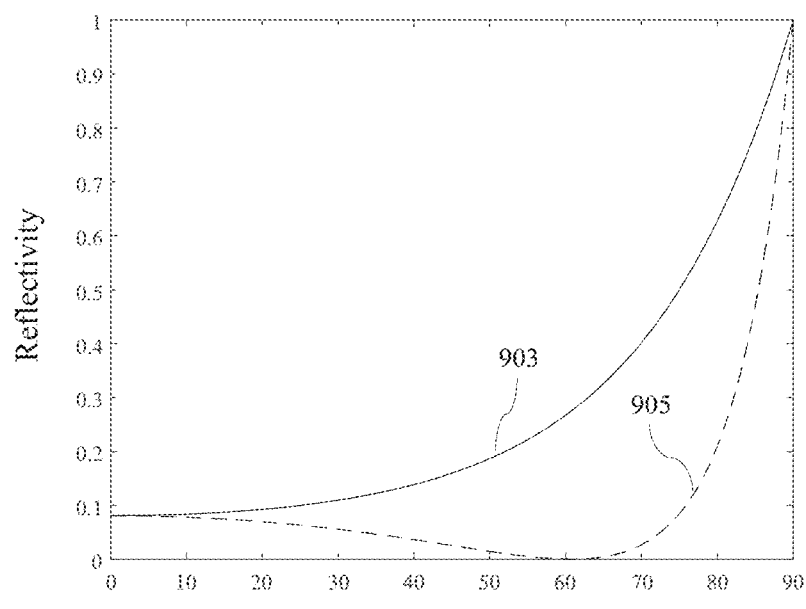
FIG. 19B is a schematic graph illustrating the variation of reflectivity for polarized light from a dichroic stack with angle of incidence.

FIG. 19A is a schematic diagram illustrating in side view an arrangement of extraction waveguide 1 comprising an alternative array of extraction features 270; and FIG. 19B is a schematic graph illustrating the variation of reflectivity for polarized light from a dichroic stack with angle of incidence. Features of the embodiment of FIGS. 19A-B not discussed in further detail may be assumed to correspond to the features with equivalent reference numerals as discussed above, including any potential variations in the features.

In the alternative embodiment of FIG. 19A, polarization-sensitive reflector 700 comprises a dichroic stack 712 and extraction element 270 comprises an array of tilted dichroic stacks 389. Said dichroic stacks 389 are an example of a partially reflective coating 189 as described elsewhere hereinabove and are provided in a zig-zag arrangement with dichroic stack facets 289A, 289B. The dichroic stacks 389 are provided by alternating layers of high and low index materials, for example dichroic materials used in the manufacture of polarizing beam-splitters similar to those illustrated in TABLE 2 hereinabove.

The light extraction element 270 may be formed by depositing the dielectric layers 174 of the dichroic stack 389 onto a prismatic array 286. After deposition of the dichroic stack 389, a planarization layer 288 may be provided, and further providing the front guide surface 8.

FIG. 19B illustrates an example of Fresnel reflectivities 903, 905 for s-polarized light polarization state 902 and p-polarized light polarization state 904 respectively at a single interface between $SiO_2$ and $TiO_2$. At Brewster's angle, the reflectivity of p-polarized light polarization state 904 is close to zero and so light is transmitted by the dichroic stack 389 and s-polarized light polarization state 902 is at least partially reflected. By comparison, for on-axis incidence, such as at the dichroic stack 712, light rays are transmitted for both polarization states 902, 904. In practice, multilayer stacks such as the illustrative multilayer arrangement of TABLE 2 may be provided for the dichroic stacks 712, 389.

Considering FIG. 19A, in operation, light ray 460C(193) with a p-polarized light polarization state 904 is returned from the light reversing reflector 140 and polarization conversion retarder 72. The ray 460C(193) is transmitted from the waveguide member 111A through the dichroic stack 712 of the polarization-sensitive reflector 700.

Light ray 460C(193) is converted from linear p-polarization state 904 to linear s-polarization state 902 by polarization conversion retarder 73. Polarization conversion retarder 73 may comprise a half-wave plate for a design wavelength such as 550 nm and may comprise a Pancharatnam stack of retarders to achieve improved spectral uniformity. The optical axis direction 773 may be arranged to provide rotation of the linear polarization state 904 to the linear polarization state 902 at the design wavelength.

Light ray 460C(193) from the polarization conversion retarder 73 is incident on the dichroic stack facet 289A near to normal incidence and is transmitted. The light ray is guided from the rear guide surface 6 and at the dichroic stack facet 289B, the angle of incidence δ is near to the Brewster angle, in an illustrative example β is 60 degrees, and some of the light with the polarization state 902 is reflected towards the eye 45 of the user as light ray 463C$_R$(193).

The dichroic stacks 712, 389 may be conveniently provided by dichroic material deposition with low cost. The dichroic stacks 712, 389 may be provided by the same coating stack design to achieve desirable light propagation properties, advantageously providing reduced cost of manufacture.

The size f of the facets 289A, 289B may be arranged to minimise diffractive blur in the image seen by the user. Advantageously improved fidelity of image quality may be achieved.

Figure 19C:
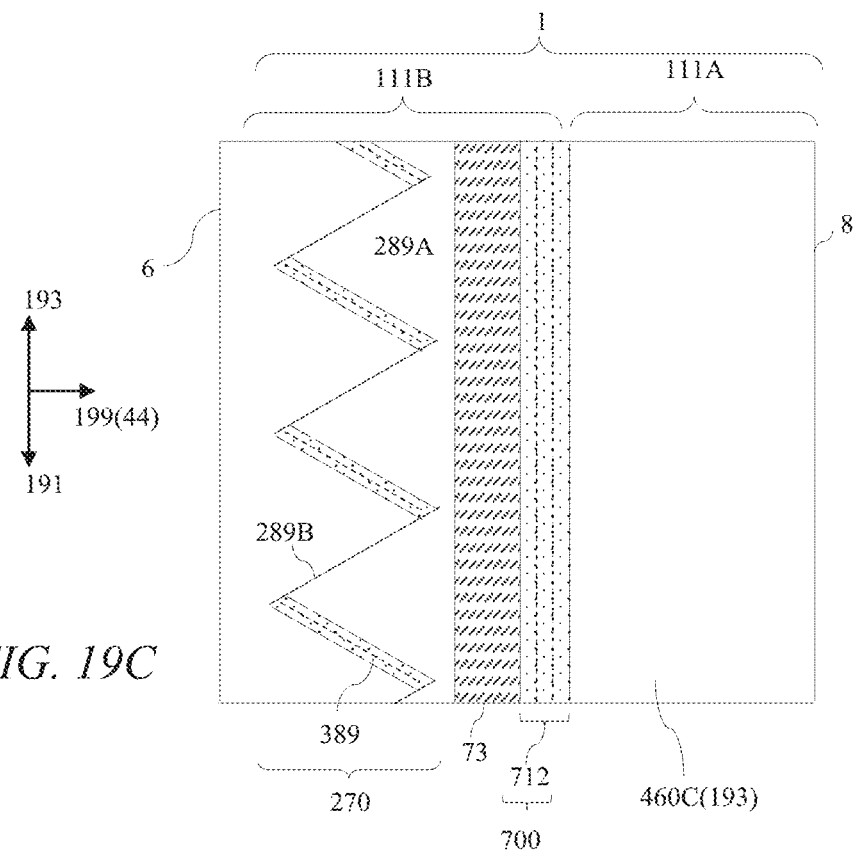
FIG. 19C is a schematic diagram illustrating in side view an arrangement of an extraction waveguide comprising an alternative array of extraction features.
Figure 19D:
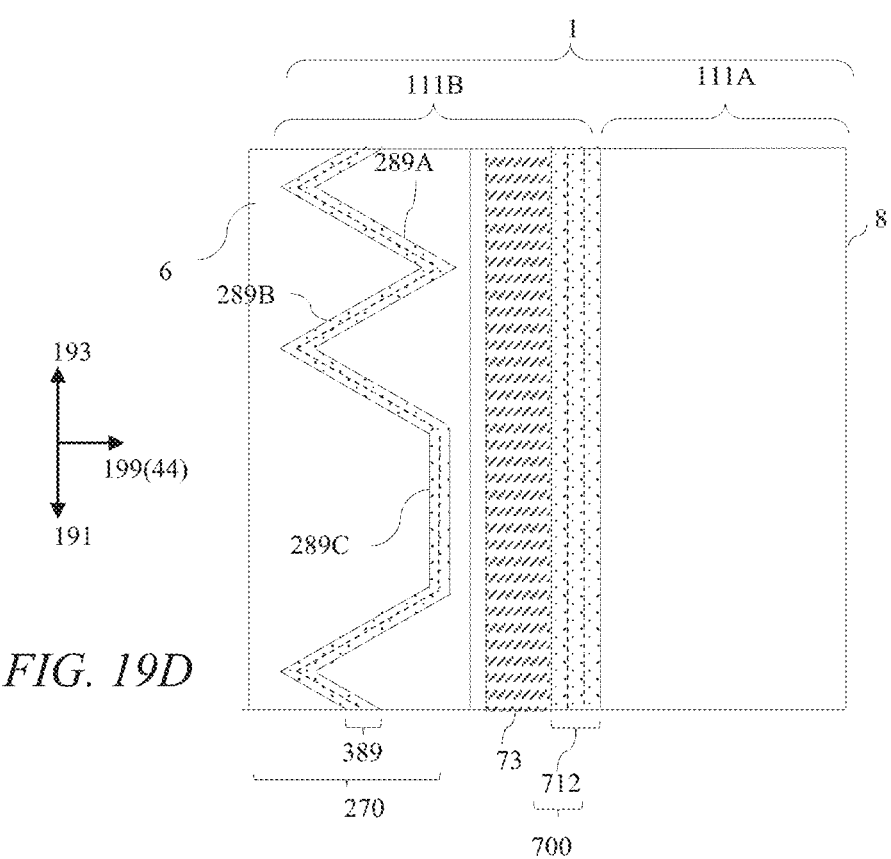
FIG. 19D is a schematic diagram illustrating in side view an arrangement of an extraction waveguide comprising an alternative array of extraction features.

FIG. 19C is a schematic diagram illustrating in side view an arrangement of an extraction waveguide comprising an alternative array of extraction features 270; and FIG. 19D is a schematic diagram illustrating in side view an arrangement of an extraction waveguide comprising an alternative array of extraction features 270. Features of the embodiments of FIGS. 19C-D not discussed in further detail may be assumed to correspond to the features with equivalent reference numerals as discussed above, including any potential variations in the features.

By way of comparison with FIG. 19A, the alternative embodiment of FIG. 19C illustrates facets 289B may be provided with no dichroic stack. Such an arrangement may be achieved by oblique deposition of the dichroic stack onto the facets 289A, minimising the coating onto facets 289B. In operation, light rays 460C(193) are transmitted at the location of the facets 289B and reflected by the facets 289A. Advantageously efficiency is increased and stray light reduced, achieving reduced glare.

By way of comparison with FIG. 19A, the alternative embodiment of FIG. 19D comprises additional planar facets 289C in the dichroic layer 389 to achieve some guiding of light from the front guide surface 8. Advantageously image uniformity may be increased.

Extraction features 170 that comprise diffractive structures will now be described.

Figure 20A:
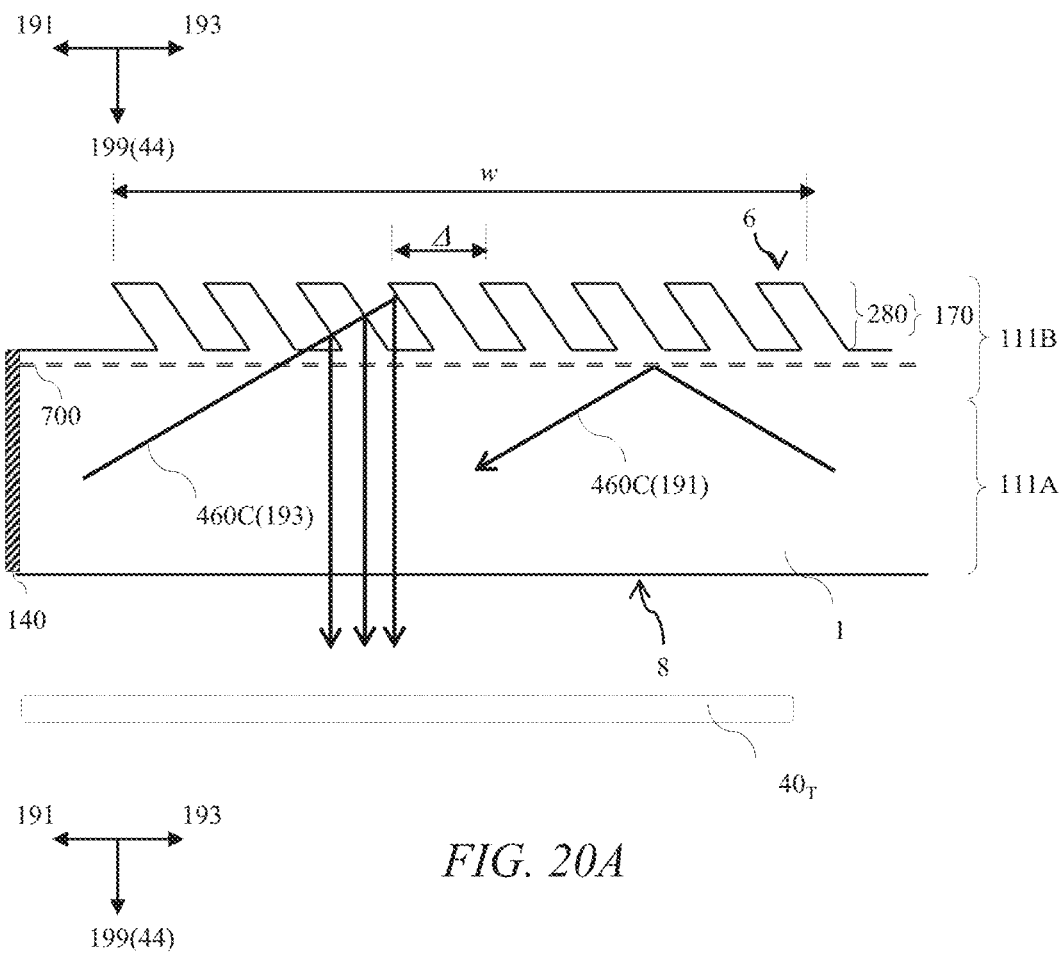
FIG. 20A is a schematic diagram illustrating a side view of the operation of an array of extraction features comprising a surface relief grating.

FIG. 20A is a schematic diagram illustrating a side view of the operation of an array of extraction features 170 comprising a surface relief grating 280. Features of the embodiment of FIG. 20A not discussed in further detail may be assumed to correspond to the features with equivalent reference numerals as discussed above, including any potential variations in the features.

In the alternative embodiment of FIG. 20A, the rear guide surface 6 comprises a surface relief grating 280 comprising the extraction features 170 provided by the surface structure of the surface relief grating. The pitch 4 of the surface relief grating 280 is arranged to provide reflection of incident light through the front light guide surface 8 to the exit pupil 40.

In comparison to the prism structures 171 comprising reflective facets 172 of FIG. 12E, the embodiment of FIG. 20A provides reduced blurring due to diffraction from the large aperture width, w of the reflective extraction feature 170. Advantageously image resolution may be increased.

Figure 20B:
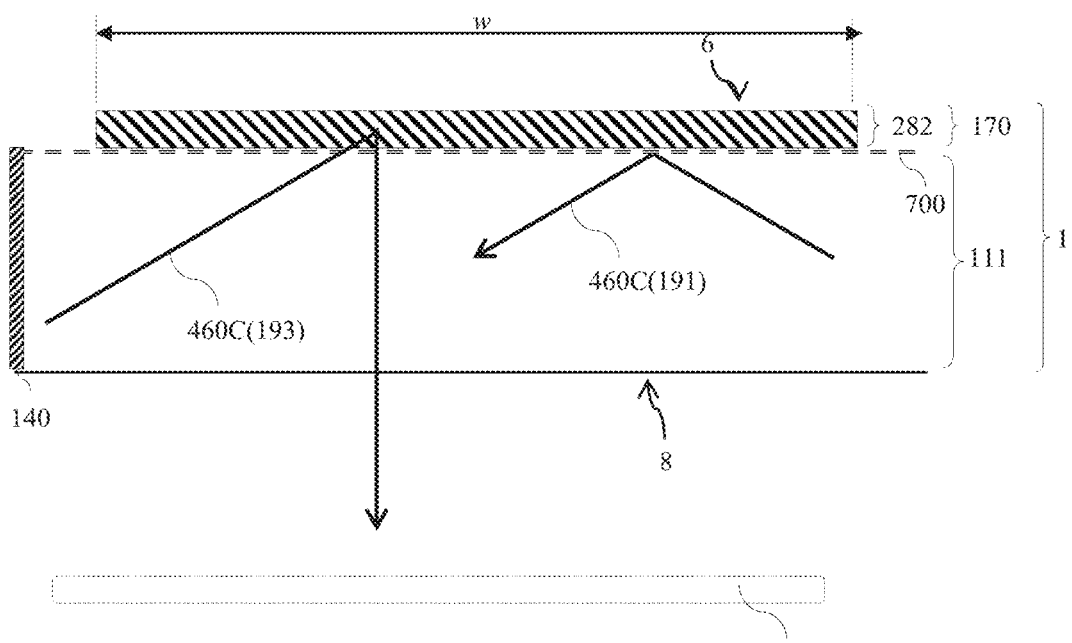
FIG. 20B is a schematic diagram illustrating a side view of the operation of an array of extraction features comprising a volume diffractive optical element.

FIG. 20B is a schematic diagram illustrating a side view of the operation of an array of extraction features 170 comprising a volume diffractive optical element 282. Features of the embodiment of FIG. 20B not discussed in further detail may be assumed to correspond to the features with equivalent reference numerals as discussed above, including any potential variations in the features.

In comparison to the embodiment of FIG. 20A, in the alternative embodiment of FIG. 20B, the volume diffractive optical element 282 may comprise diffractive structure disposed within the extraction waveguide 1 comprising modulated phase grating comprising the array of reflective extraction features so that the volume diffractive optical element 282 is arranged to provide reflection of incident light through the front light guide surface 8 to the exit pupil 40.

The extraction waveguide 1 of FIG. 20B may be formed by forming the polarization-sensitive reflector 700 on the rear surface of waveguide member 111 and forming the volume diffractive optical element 282 on the polarization-sensitive reflector 700. Advantageously thickness may be reduced.

In comparison to the prism structures 171 comprising reflective facets 172 of FIG. 12E, the embodiment of FIG. 20B provides reduced blurring due to diffraction from the large aperture width, w of the reflective extraction feature 170. Advantageously image resolution may be increased.

The spectral bandwidth of reflection may be increased by providing chirped or multiple volume diffractive optical elements 282.

Figure 20C:
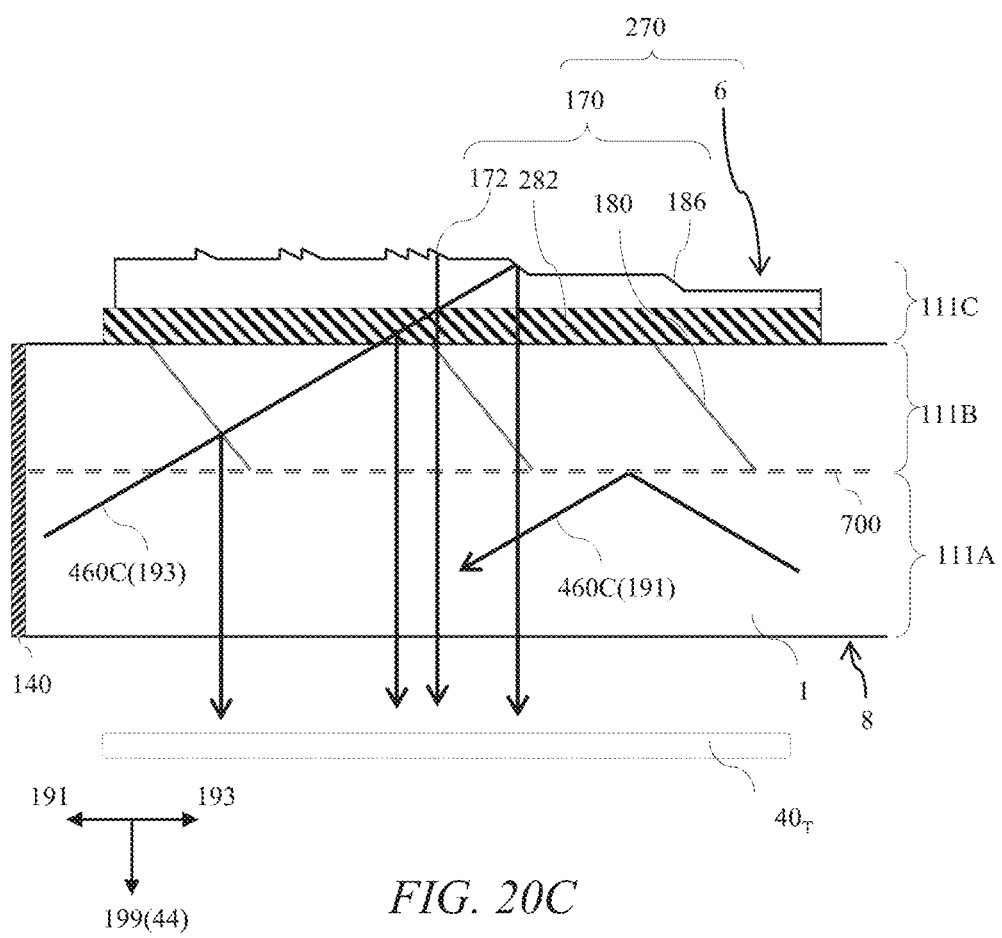
FIG. 20C is a schematic diagram illustrating a side view of the operation of an array of extraction features comprising different types of extraction features.

FIG. 20C is a schematic diagram illustrating a side view of the operation of an array of extraction features 170 comprising different types of extraction features. Features of the embodiment of FIG. 20C not discussed in further detail may be assumed to correspond to the features with equivalent reference numerals as discussed above, including any potential variations in the features.

In the alternative embodiment of FIG. 20C, in the first direction 191, light 460C(191) is guided between the polarization-sensitive reflector 700 and the front light guide surface 8. In the second direction 193, at least some light 460C(193) is transmitted through the polarization-sensitive reflector 700 and incident on the extraction element 270 comprising the rear guide surface 6 and array of extraction features 170 comprising reflective facets 172, diffractive optical element 282, partially reflective surfaces 180 and stepped extraction reflectors 186 for extraction through the front light guide surface 8 to the exit pupil 40.

In alternative embodiments, other combinations of extraction features may be used. The embodiment for example of FIG. 20C illustrates different types of extraction features to achieve improved image resolution, efficiency and uniformity to the eye 45 of the user.

As illustrated in FIG. 3C, some light may return to the input end 2. It would be desirable to minimise cross talk and increase contrast of the anamorphic near-eye display apparatus 100.

Figure 21A:
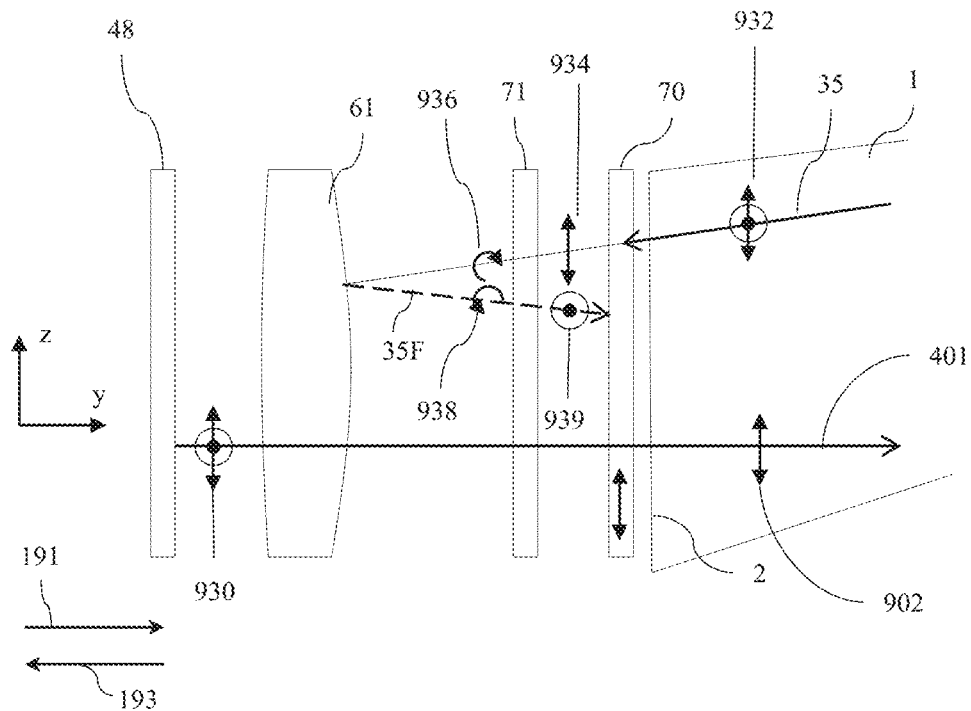
FIG. 21A is a schematic diagram illustrating a side view of optical isolation for an anamorphic near-eye display apparatus comprising an emissive spatial light modulator.
Figure 21B:
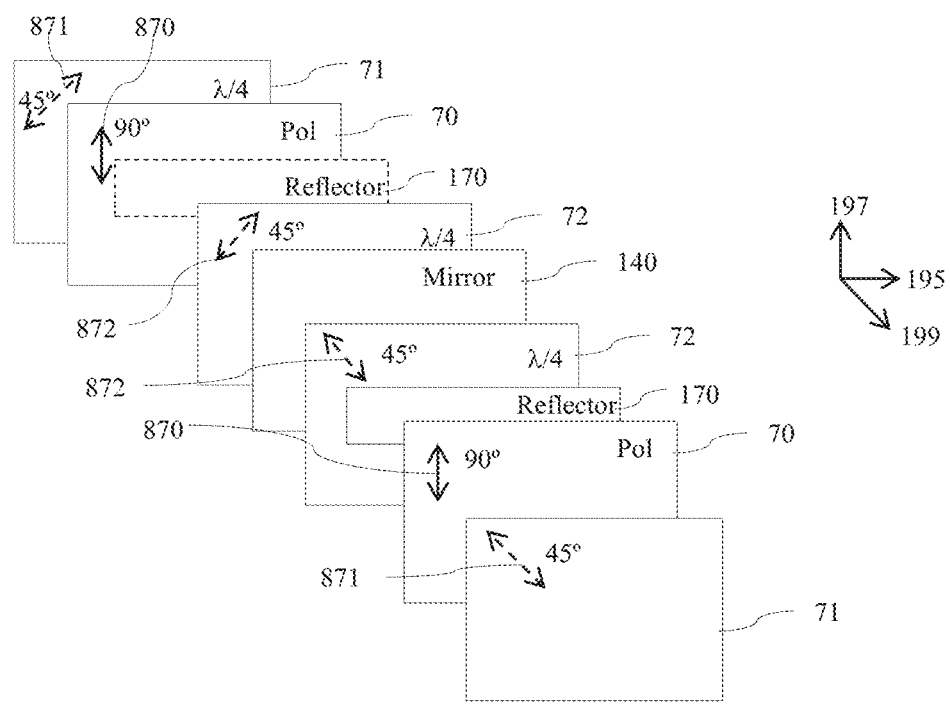
FIG. 21B is a schematic diagram illustrating optical axis alignment directions through the polarization control components of FIG. 21A.

FIG. 21A is a schematic diagram illustrating a side view of optical isolation near the input end 2 of an anamorphic near-eye display apparatus 100 comprising an emissive spatial light modulator 48; and FIG. 21B is a schematic diagram illustrating optical axis alignment directions through the polarization control components of FIG. 21A. Features of the embodiment of FIGS. 21A-B not discussed in further detail may be assumed to correspond to the features with equivalent reference numerals as discussed above, including any potential variations in the features.

In the alternative embodiment of FIGS. 21A-B, the optical system 250 further comprises: an input linear polarizer 70 disposed between the transverse optical component 60 and the input end 2 of the extraction waveguide 1; and a polarization conversion retarder 71 with orientation of optical axis 871 disposed between the the transverse optical component 60 and the input linear polarizer 70, the polarization conversion retarder 71 being arranged to convert a polarization state of light passing therethrough between a linear polarization state 934, 939 and a circular polarization state 936, 938 respectively.

In other words, the input linear polarizer 70 is disposed after the transverse anamorphic component 60, and the optical system 250 further comprises a polarization conversion retarder 71 disposed between the transverse anamorphic component 60 and the input linear polarizer 70, the polarization conversion retarder 71 being arranged to convert a polarization state of light passing therethrough between a linear polarization state and a circular polarization state.

The polarization conversion retarder 71 has a retardance of a quarter wavelength at a wavelength of visible light, for example 550 nm and may be a Pancharatnam stack of retarders for example. The retardance of the polarization conversion retarder 71 may be different to a quarter wavelength, but selected to provide the same effect. For example, the polarization conversion retarder 71 may have a retardance of three quarter wavelengths or five quarter wavelengths, for example.

In operation, light ray 401 from the spatial light modulator 48 is output with unpolarized light state 930 and then polarized by input linear polarizer 70 to provide linear polarization state 902 in the extraction waveguide 1. Some light rays 35 as described elsewhere herein may return towards the input end 2 and are transmitted through the input linear polarizer 70.

The light ray 35 which is returning in the second direction 193 along the extraction waveguide 1 towards the input end 2 may have been partially depolarized within the extraction waveguide 1 and has incident polarization state 932 that can be considered a superposition of p-polarized and s-polarized polarization states. Linear polarization state 934 which is p-polarized is transmitted by the input linear polarizer 70 while the orthogonal (s-polarized) polarization state is absorbed. Light ray 35 with p-polarization state 934 is converted to circular polarization state 936 by the polarization conversion retarder 71 and is incident on surfaces of transverse lens 61 and spatial light modulator 48. Fresnel reflections of rays 35F at said surfaces are reflected back towards the additional polarization conversion retarder 71 with a n phase shift so that the orthogonal polarization state 938 is reflected. Polarization conversion retarder 71 provides s-polarized polarization state 939 which is absorbed by the input linear polarizer 70. Back reflections from the spatial light modulator 48 and transverse lens 61 are advantageously reduced. Additional polarization conversion retarder 71 thus provides optical isolation of such returning light rays 35 such that light rays 35F that are reflected from surfaces of the transverse lens 61 back into the extraction waveguide 1 are reduced. Advantageously image contrast is increased.

Input linear polarizer 70 and an additional polarization conversion retarder 71 may be bonded to the input end 2. Advantageously improved reduction of reflections from the input end may be achieved.

Figure 21C:
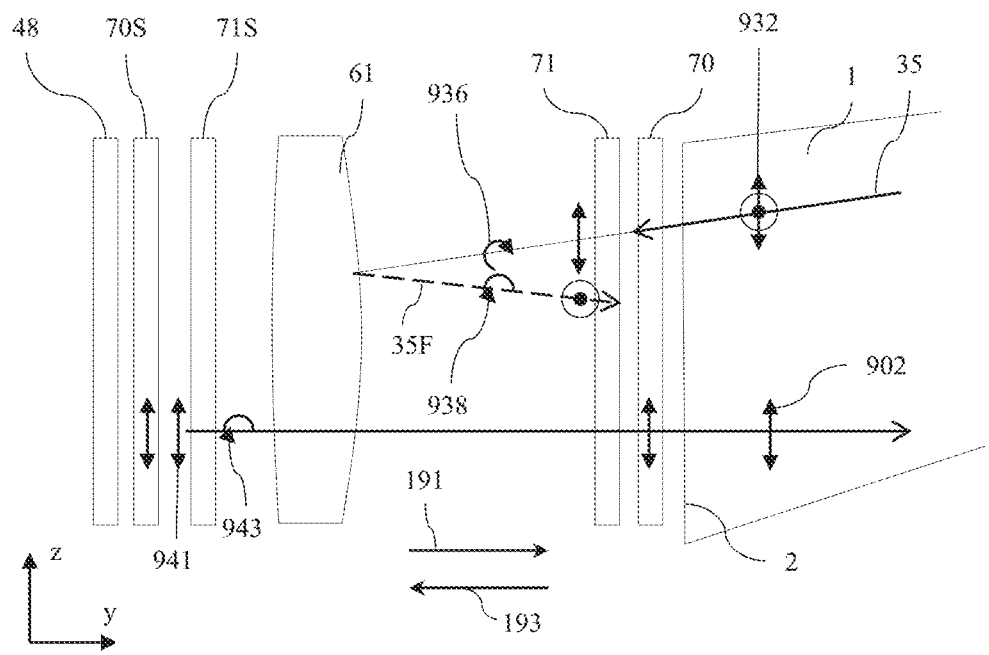
FIG. 21C is a schematic diagram illustrating a side view of optical isolation for an anamorphic near-eye display apparatus comprising a transmissive or reflective spatial light modulator.
Figure 21D:
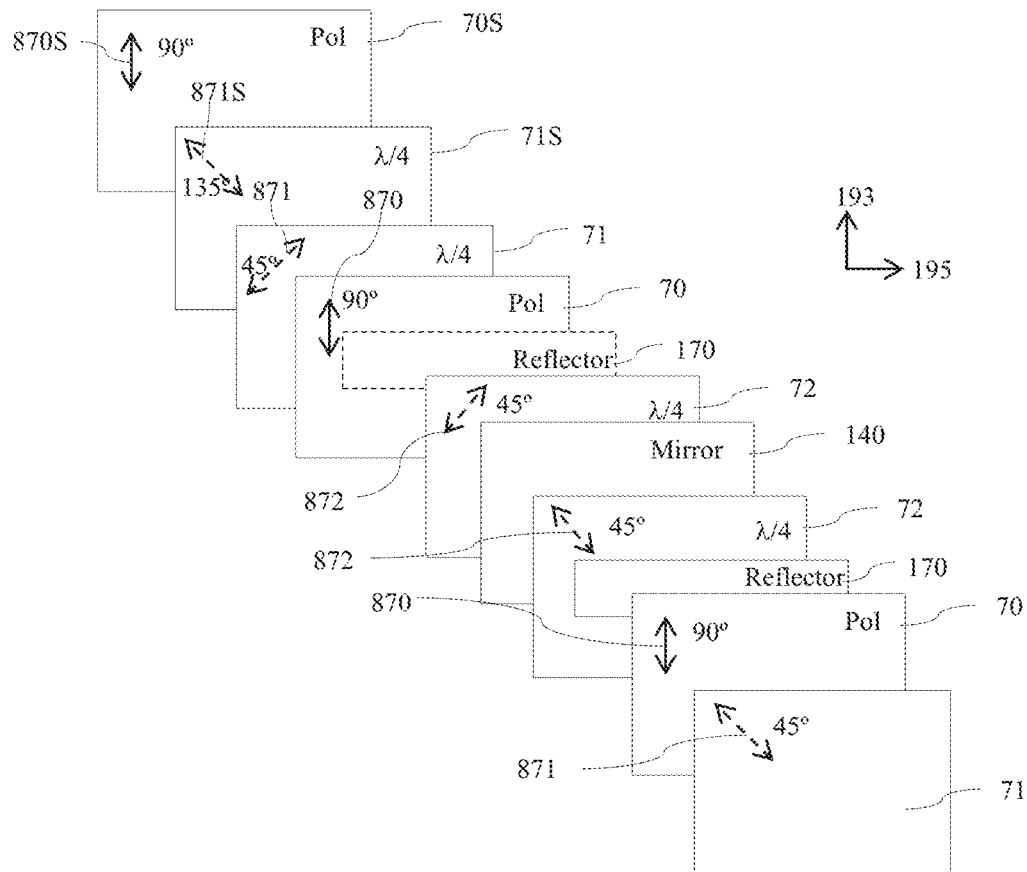
FIG. 21D is a schematic diagram illustrating optical axis alignment directions through the polarization control components of FIG. 21C.

FIG. 21C is a schematic diagram illustrating a side view of optical isolation for an anamorphic near-eye display apparatus 100 comprising a transmissive or reflective spatial light modulator 48; and FIG. 21D is a schematic diagram illustrating optical axis alignment directions through the polarization control components of FIG. 21C. Features of the embodiment of FIGS. 21C-D not discussed in further detail may be assumed to correspond to the features with equivalent reference numerals as discussed above, including any potential variations in the features.

In comparison to FIG. 21A, in the alternative embodiment of FIG. 21C the spatial light modulator 48 comprises an output linear polarizer 70S and a further polarization conversion retarder 71S with optical axis direction 871S. In operation, the input linear polarizer 70 and polarization conversion retarder 71 operate as for FIG. 21A. Output linear polarizer 70S provides a linear polarization state 941 that is transmitted through the further polarization conversion retarder 71S to provide a circular polarization state 943. Said polarization state 943 is converted back to a linear polarization state 902 by the polarization conversion retarder 71 and transmitted through the input linear polarizer 70. Advantageously brightness and contrast may be improved in spatial light modulators 48 comprising a polarized output such as LCD and LCOS.

Further illustrative arrangements of the extraction features 170 will now be described. In the embodiments hereinbelow, most typically the extraction features 170 are illustrated as extraction facets 172. However, other types of extraction features such as step facets 12, partially reflective stepped extraction reflectors 186, partially reflective surfaces 180, surface relief gratings 280 or volume diffractive optical elements 282 may additionally or alternatively be provided. Similarly, the polarization-sensitive reflector 700 may be provided as described elsewhere herein.

Figure 22A:
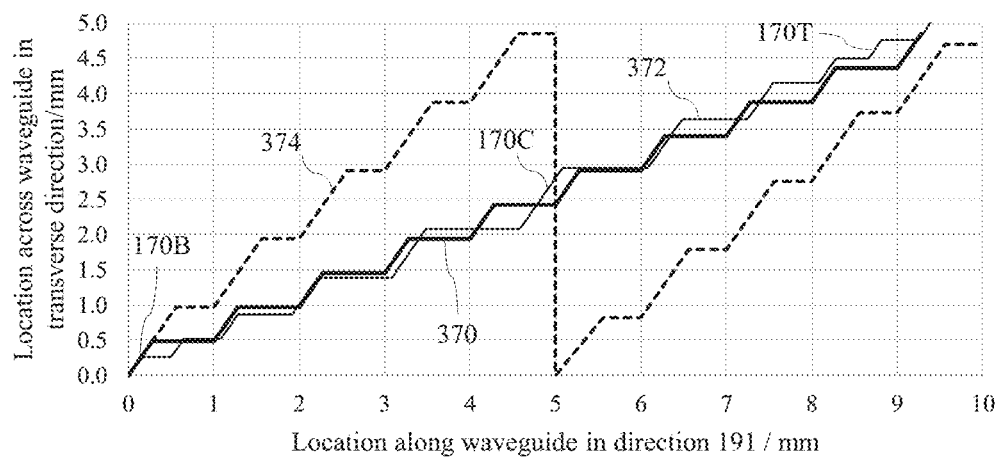
FIG. 22A is a schematic graph of the variation of stepped surface height with position along the extraction waveguide for various illustrative arrangements of steps for a stepped surface.
Figure 22B:
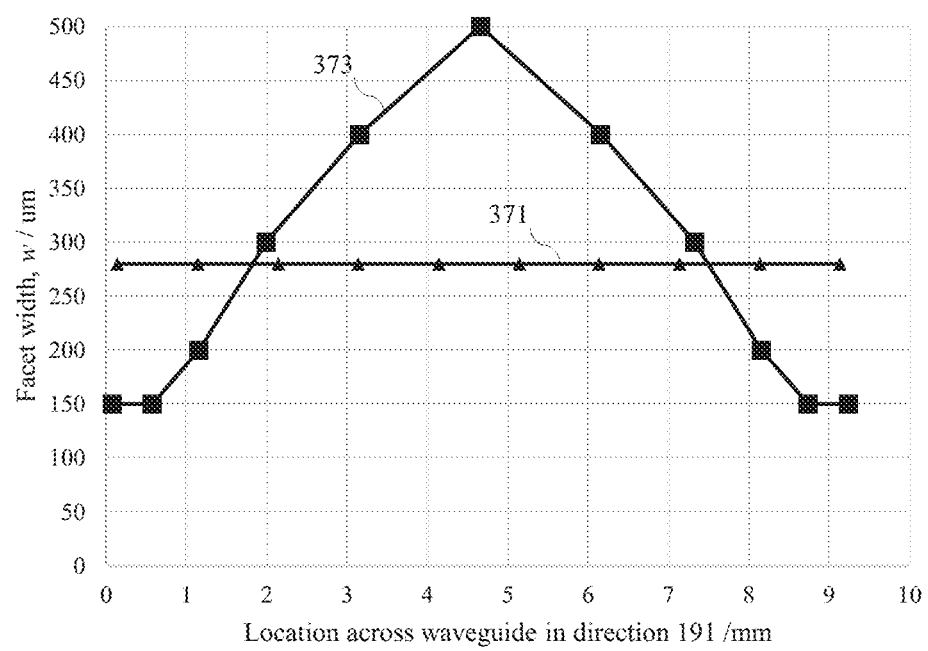
FIG. 22B is a schematic graph of the variation of facet width with position along the extraction waveguide for various illustrative arrangements of steps for a stepped surface.
Figure 22C:
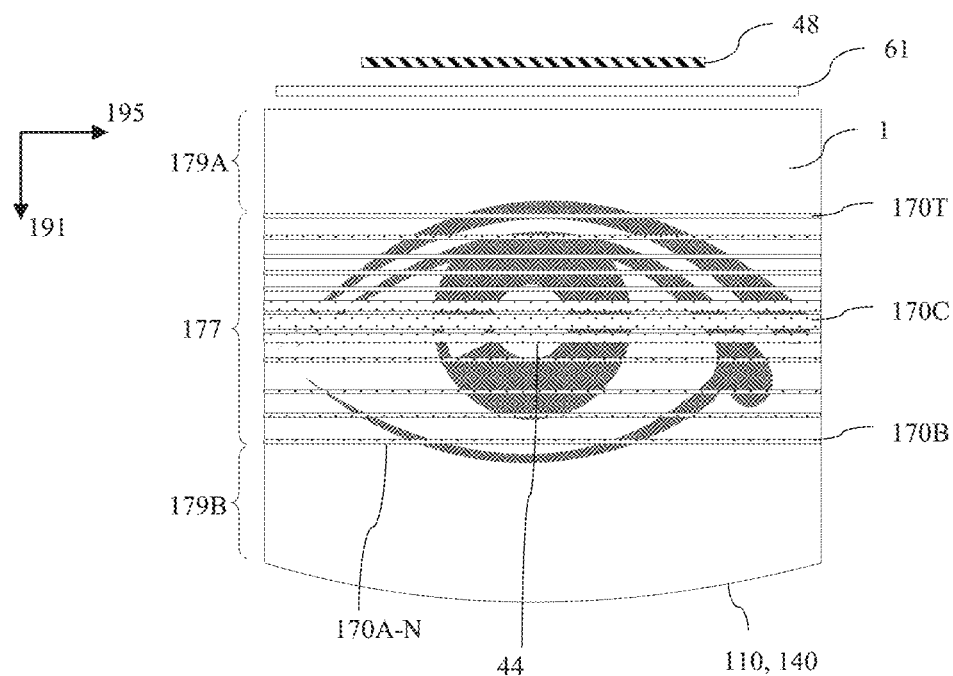
FIG. 22C is a schematic diagram illustrating in front view an arrangement of chirped extraction features for a monocular near-eye anamorphic display apparatus.

FIG. 22A is a schematic graph of the variation of rear guide surface 6 profiles with distance, x in the direction 191 along the extraction waveguide 1 for various illustrative arrangements of extraction features 170; FIG. 22B is a schematic graph of the variation of facet width w with position along the extraction waveguide 1 for various illustrative arrangements of steps for a stepped surface; and FIG. 22C is a schematic diagram illustrating in front view an arrangement of chirped extraction features 170 for a monocular near-eye anamorphic display apparatus 100. Features of the embodiments of FIGS. 22A-C not discussed in further detail may be assumed to correspond to the features with equivalent reference numerals as discussed above, including any potential variations in the features.

Profile 370 of FIG. 22A illustrates a rear guide surface 6 comprising 60 degrees tilt extraction features 170 arranged on a uniform 1 mm pitch, with approximately 0.49 mm step height h, and uniform 0.28 mm step extent w, as illustrated by profile 371 in FIG. 22B. The step extent, w provides a diffracting aperture for the light rays 401 directed towards the pupil 44 of the eye and so a diffractive blur is added to the image data in the transverse direction 197. It would be desirable to increase the extent w and thus reduce diffractive blur in the transverse direction, to minimise the blur ellipse height 454 in the transverse direction 197 of FIG. 1F.

Profile 372 of FIG. 22A, profile 373 of FIG. 22B and FIG. 22C illustrate an alternative embodiment wherein the extraction features 170 have a varying pitch, s along the extraction waveguide 1 in the direction 191. Further, the extraction features 170 have a varying extent w along the extraction waveguide 1 in the direction 191. Thus considering the central extraction feature 170C, the extent w is 0.5 mm whereas the top extraction feature 170T has an extent of 0.15 mm. Diffractive blur is reduced for light from the centre of the extraction waveguide 1 which may be a preferred viewing location for the pupil 44. Thus high image quality may be achieved for the preferred viewing location, whereas off-axis imagery from the top and bottom extraction features 170T, 170B is somewhat degraded. The best image quality is provided in the preferred viewing direction, advantageously achieving high image performance for the most commonly used image data.

Profile 374 of FIG. 22A illustrates an alternative embodiment wherein two sets of extraction features 170 are provided, for example as further illustrated in the alternative embodiment of FIG. 7D. The extent w is increased for each step while maintaining a constant 1 mm pitch. Advantageously diffractive blur is reduced in comparison to the embodiment of the profile 370. Further, for a given extent w, the total thickness t of the extraction waveguide 1 may advantageously be reduced while achieving a desirable pitch p so that multiple extraction features 170 overlap the pupil 44.

It would be desirable to further reduce the appearance of image blur due to diffraction in the lateral direction 197 from the extent w of the extraction features 170.

Figure 22D:
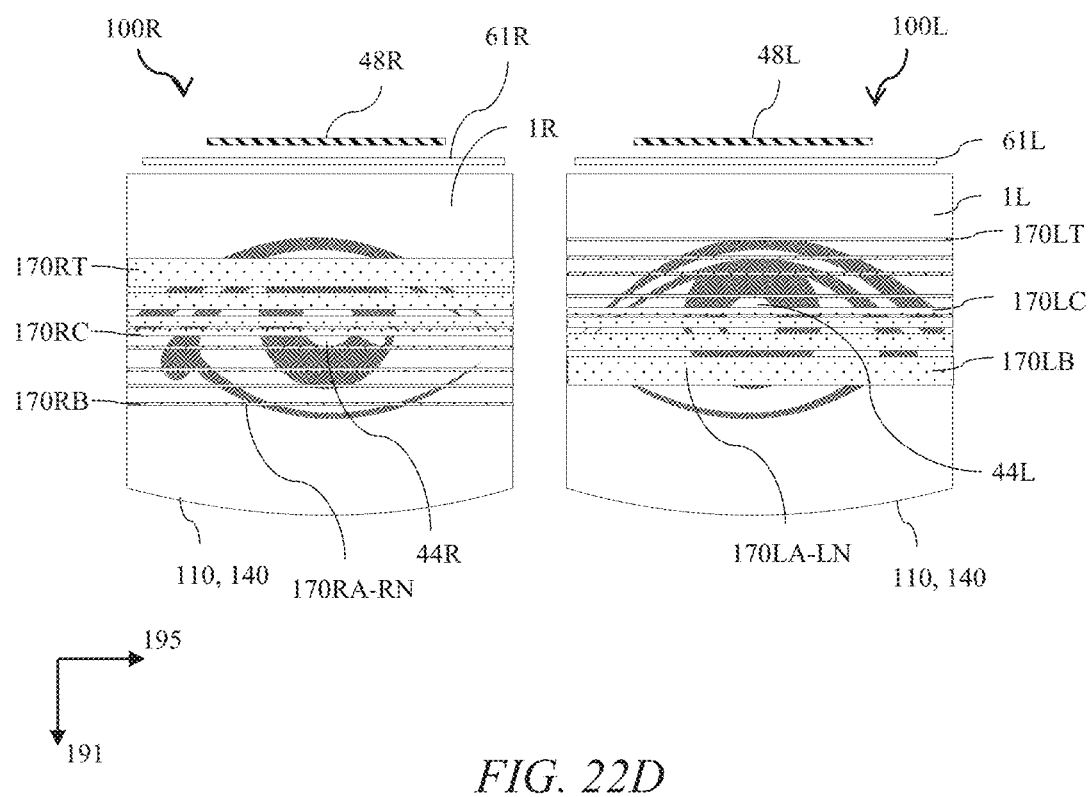
FIG. 22D is a schematic diagram illustrating in front view an arrangement of chirped extraction features for a binocular near-eye anamorphic display apparatus.

FIG. 22D is a schematic diagram illustrating in front view an arrangement of chirped extraction features 170 for a binocular near-eye anamorphic display apparatus 1. Features of the embodiment of FIG. 22D not discussed in further detail may be assumed to correspond to the features with equivalent reference numerals as discussed above, including any potential variations in the features.

In the alternative embodiment of FIG. 22D the extraction features 170RA-RN for the pupil 44R of the right-eye 45R have a first profile of pitch s and extent w in the first direction 191 along the extraction waveguide 1. Further the extraction features 170LA-LN have a second profile of pitch s and extent w that is different to the first profile.

In the illustrative embodiment of FIG. 22D, the top extraction feature 170RT for directing light towards the right pupil 44R has a large pitch and thus low diffraction blur while the bottom extraction feature 170RB for directing light towards the right pupil 44R has a small pitch and thus increased diffraction blur. Further the top extraction feature 170LT for directing light towards the left pupil 44L has a small pitch and thus higher diffraction blur while the bottom extraction feature 170LB for directing light towards the left pupil 44L has a larger pitch and thus reduced diffraction blur. In operation, the human visual system may combine the two different blurs of the left-eye and right-eye images. Such combination may achieve perceived blur that is improved in comparison to arrangements in which the first and second profiles of pitch s and extent w are the same. Advantageously improved image quality may be perceived.

Headwear 600 comprising the anamorphic near-eye display apparatus 100 will now be described.

Figure 23A:
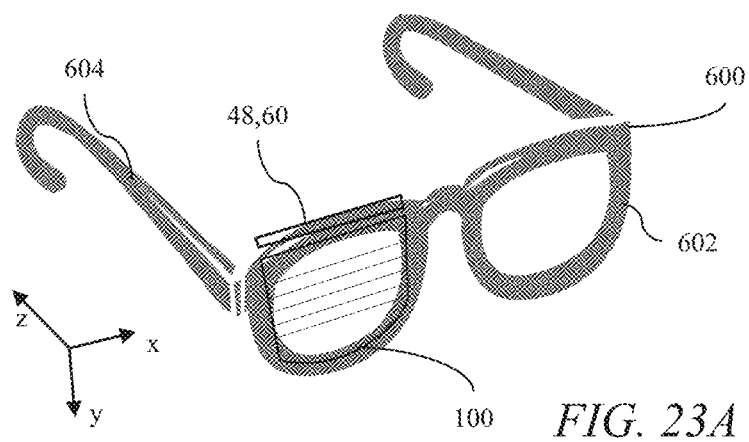
FIG. 23A is a schematic diagram illustrating in perspective front view an augmented reality head-worn display apparatus comprising a right-eye anamorphic display apparatus arranged with spatial light modulator in brow position.
Figure 23B:
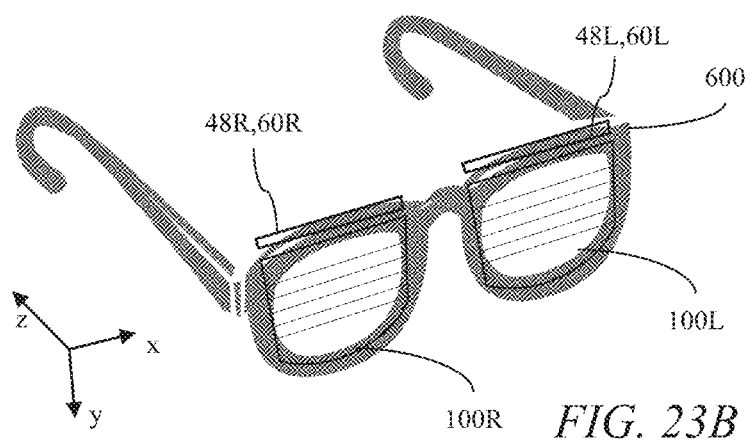
FIG. 23B is a schematic diagram illustrating in perspective front view an augmented reality head-worn display apparatus comprising left-eye and right-eye anamorphic display apparatuses arranged with spatial light modulator in brow position.

FIG. 23A is a schematic diagram illustrating in perspective front view augmented reality head-worn display apparatus 600 comprising a monocular anamorphic display apparatus arranged with spatial light modulator 48 and transverse anamorphic component 60 formed by the transverse lens 61 in brow position; and FIG. 23B is a schematic diagram illustrating in perspective front view augmented reality head-worn display apparatus 600 comprising binocular anamorphic display apparatuses 100L, 100R arranged with spatial light modulators 48R, 48L and transverse anamorphic components 60R, 60L in brow position. Features of the embodiments of FIGS. 23A-B not discussed in further detail may be assumed to correspond to the features with equivalent reference numerals as discussed above, including any potential variations in the features.

The head-worn display apparatus 600 of FIGS. 23A-B each comprise at least one anamorphic near-eye display apparatus 100 and a head-mounting arrangement 602 arranged to mount the anamorphic near-eye display apparatus 100 on a head of a wearer with the anamorphic near-eye display apparatus 100 extending across at least one eye 45 of the wearer.

The head-worn display apparatus 600 may comprise a pair of spectacles comprising the anamorphic near-eye display apparatus 100 described elsewhere herein that is arranged to extend across at least one eye 45 of a viewer 47 when the head-worn display apparatus 600 is worn. The head-worn display apparatus 600 may comprise a pair of spectacles comprising spectacle frames with the head-mounting arrangement 602 comprising rims 603 and arms 604. In general, any other head-mounting arrangement may alternatively be provided. The rims 602 and/or arms 604 may comprise electrical systems for at least power, sensing and control of the illumination system 240. The anamorphic near-eye display apparatus 100 of the present embodiments may be provided with low weight and may be transparent. The head-worn display apparatus 600 may be tethered by wires to remote control system or may be untethered for wireless control. Advantageously comfortable viewing of augmented reality, mixed reality or virtual reality content may be provided.

It may be desirable to provide improved aesthetic appearance of the anamorphic near-eye display apparatus 100.

Figure 23C:
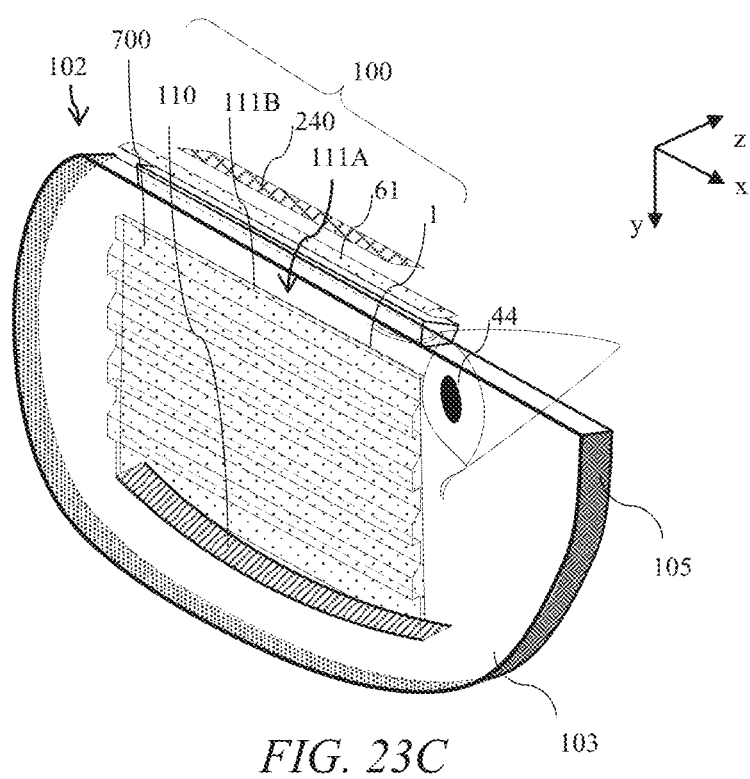
FIG. 23C is a schematic diagram illustrating in perspective front view an eyepiece arrangement for an augmented reality head-worn display apparatus.

FIG. 23C is a schematic diagram illustrating in perspective front view an eyepiece arrangement 102 for an augmented reality head-worn display apparatus 600 comprising an embedded display apparatus 100. Features of the embodiment of FIG. 23C not discussed in further detail may be assumed to correspond to the features with equivalent reference numerals as discussed above, including any potential variations in the features.

The eyepiece arrangement 102 may be arranged within the head-worn display apparatus 600 and may comprise the anamorphic near-eye display apparatus 100. The extraction waveguide 1 may be embedded with a substrate 103 that extends in around the components 111A, 110 of the anamorphic near-eye display apparatus 100. The shape of the substrate 103 may be profiled to fit various shaped head-worn display apparatuses, for example spectacles. Advantageously aesthetic appearance may be improved.

The edge 105 of the substrate 103 may be provided with a light-absorbing surface that absorbs incident light from the anamorphic near-eye display apparatus 100. The light-absorbing surface may be a structured anti-reflection surface that is coated with an absorbing material. Advantageously image contrast is improved.

It may be desirable to change the illumination system 240 positioning in the head-worn display apparatus 600.

The eye-piece arrangement 102 comprising substrate 103 may further be provided for others of the embodiments of the present disclosure.

Figure 24A:
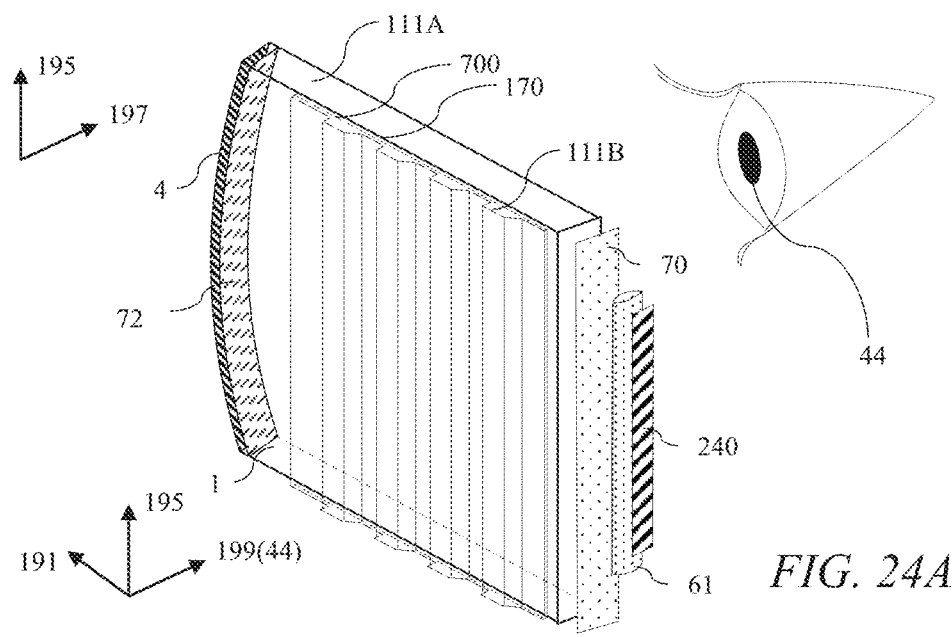
FIG. 24A is a schematic diagram illustrating in perspective front view an anamorphic near-eye display apparatus with spatial light modulator in temple position.
Figure 24B:
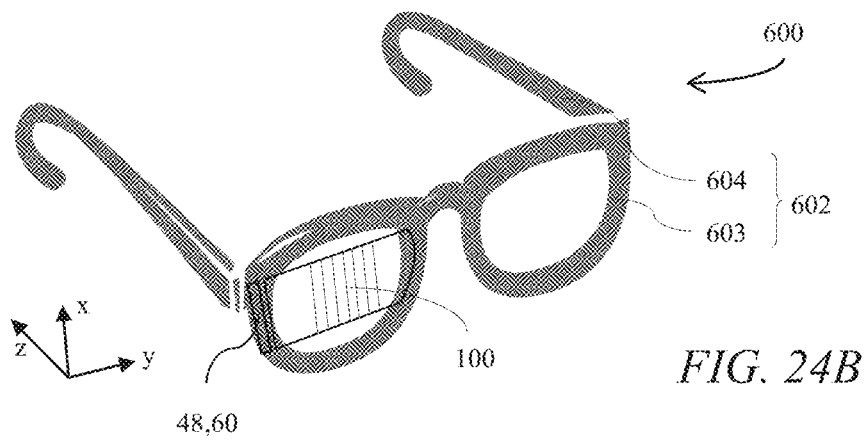
FIG. 24B is a schematic diagram illustrating in perspective front view an augmented reality head-worn display apparatus comprising a left-eye anamorphic display apparatus arranged with spatial light modulator in temple position.
Figure 24C:
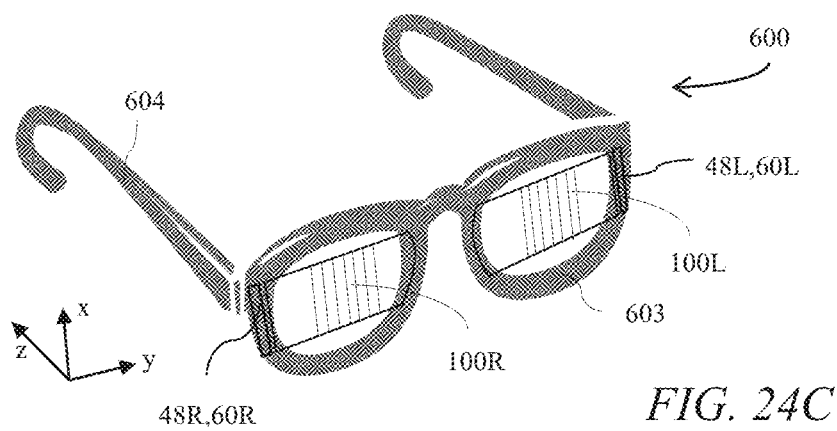
FIG. 24C is a schematic diagram illustrating in perspective front view an augmented reality head-worn display apparatus comprising left-eye and right-eye anamorphic display apparatuses arranged with spatial light modulator in temple position.

FIG. 24A is a schematic diagram illustrating in perspective front view an anamorphic near-eye display apparatus 100 with spatial light modulator 48 in temple location; FIG. 24B is a schematic diagram illustrating in perspective front view augmented reality head-worn display apparatus 600 comprising a left-eye anamorphic display apparatus arranged with spatial light modulator in temple position; and FIG. 24C is a schematic diagram illustrating in perspective front view augmented reality head-worn display apparatus 600 comprising left-eye and right-eye anamorphic display apparatuses arranged with spatial light modulator in temple position. Features of the embodiments of FIGS. 24A-C not discussed in further detail may be assumed to correspond to the features with equivalent reference numerals as discussed above, including any potential variations in the features.

In comparison to the arrangement of FIG. 1A, the illumination system 240 is arranged on the side of the extraction waveguide 1 and the direction 191 in which the extraction waveguide 1 extends in the horizontal direction for the eyes 45 of the user. Thus the lateral direction 195 for the pupil 44 is vertical and the transverse direction 197 is horizontal. The anamorphic near-eye display apparatus 100 may be arranged within the arms of the headwear 600, reducing the bulk of the rims of the head-worn display apparatus. Advantageously the aesthetic appearance of the head-worn display apparatus may be improved. Further the connectivity between the illumination system 240 and control electronics arranged in the arms 604 may be provided with reduced complexity, reducing cost.

It would be desirable to provide a virtual reality head-worn display apparatus 600 in which the head-worn display apparatus is not transparent to external images.

Figure 25A:
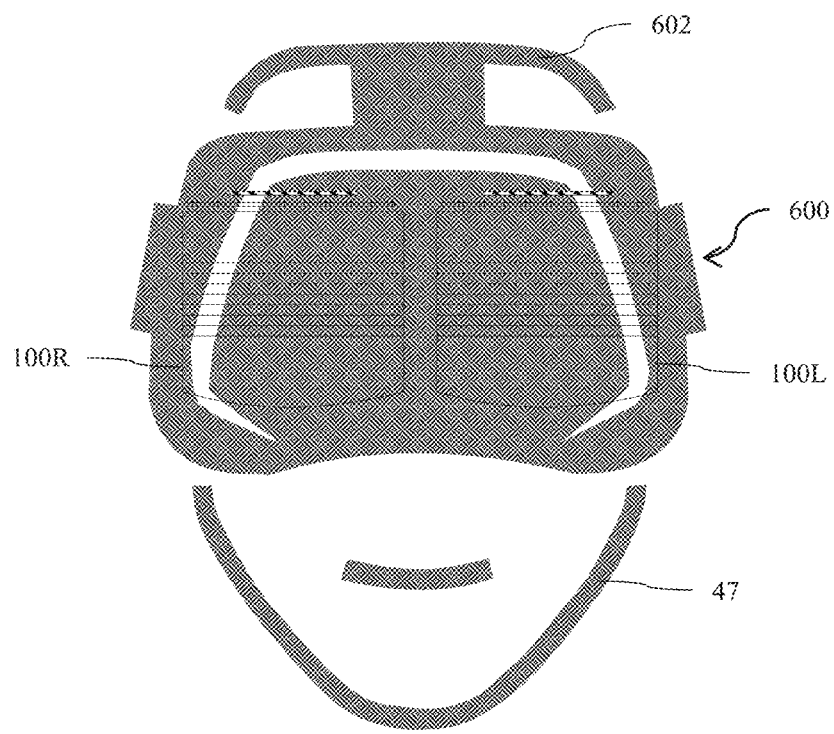
FIG. 25A is a schematic diagram illustrating in front view a virtual reality head-worn display apparatus comprising left-eye and right-eye anamorphic display apparatuses.
Figure 25B:
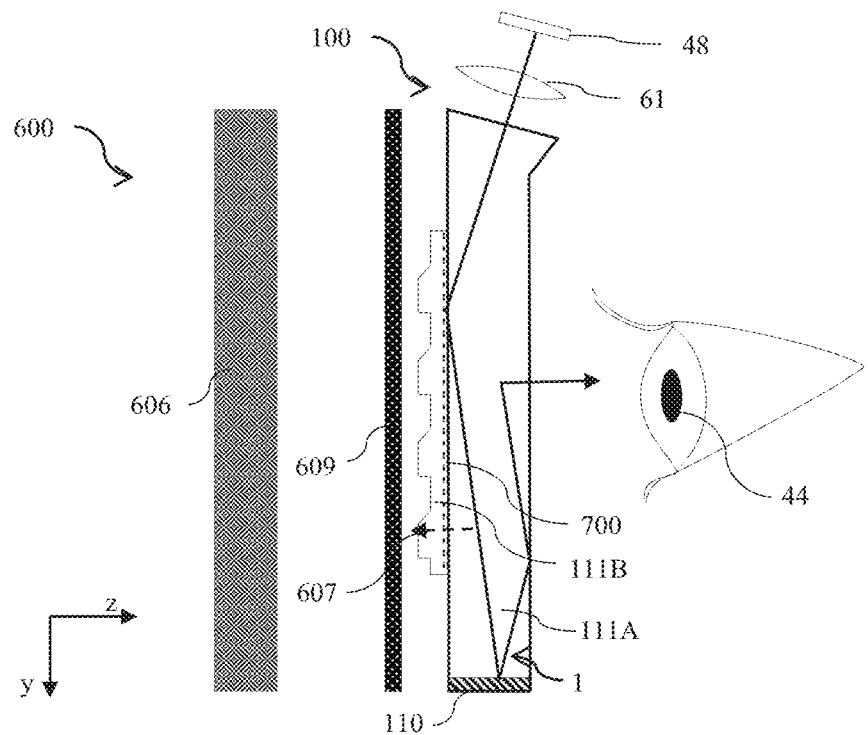
FIG. 25B is a schematic diagram illustrating in side view a virtual reality head-worn display apparatus comprising an anamorphic near-eye display apparatus.

FIG. 25A is a schematic diagram illustrating in front view virtual reality head-worn display apparatus 600 comprising left-eye and right-eye anamorphic display apparatuses 100R, 100L; and FIG. 25B is a schematic diagram illustrating in side view a virtual reality head-worn display apparatus 600 comprising an anamorphic near-eye display apparatus 100. Features of the embodiment of FIGS. 25A-B not discussed in further detail may be assumed to correspond to the features with equivalent reference numerals as discussed above, including any potential variations in the features.

The alternative embodiment of head-worn display apparatus 600 of FIG. 25A may comprise display apparatuses 100R, 100L that have larger size than desirable for spectacle head-worn display apparatus 600 of FIG. 23B. Referring to FIG. 1F, aberrations may be reduced for a given field angle, field of view increased for a given ellipse blur 452 limit. Further image brightness may be increased.

FIG. 25B illustrates an alternative arrangement wherein a light trap layer 609 is provided between the head-worn display apparatus 600 casing 606 and extraction waveguide 1 to receive stray light rays 607 output from the extraction waveguide 1. Advantageously image contrast is improved.

It may be desirable to reduce the number of illumination systems in a binocular near-eye display.

Figure 25C:
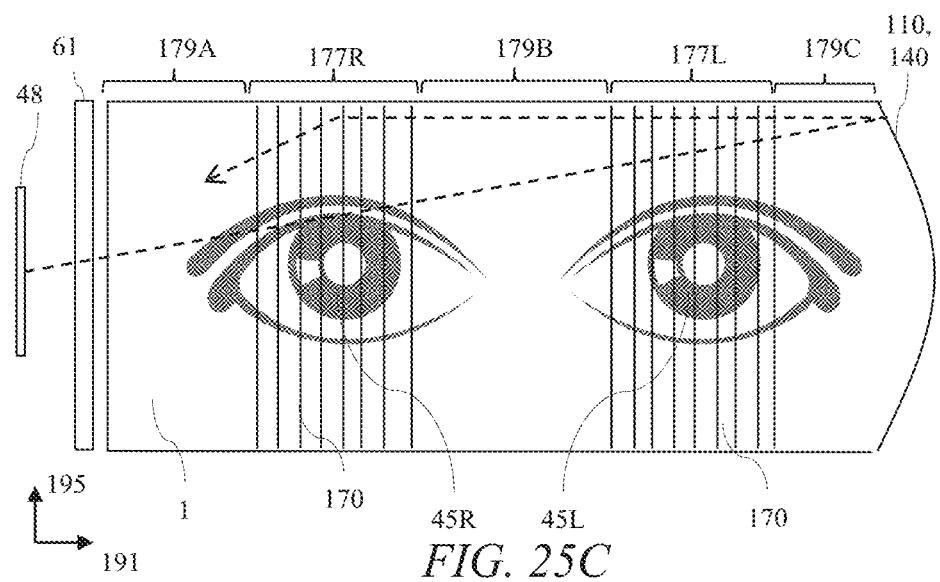
FIG. 25C is a schematic diagram illustrating in front view an anamorphic near-eye display apparatus comprising a single waveguide suitable for use by both eyes of a display user.

FIG. 25C is a schematic diagram illustrating in front view an anamorphic near-eye display apparatus 100 comprising a single waveguide 1 suitable for use by both eyes of a display user. Features of the embodiment of FIG. 25C not discussed in further detail may be assumed to correspond to the features with equivalent reference numerals as discussed above, including any potential variations in the features.

The array of extraction features 170 comprises two separated regions 177L, 177R, each region 177L, 177R being arranged to extract light guided along the extraction waveguide 1 towards a respective eye 45L, 45R of the viewer 47. Non-extracting regions 179A-C are arranged in the extraction waveguide 1 outside of the separated regions 177L, 177R.

Thus a single illumination system 240 comprising spatial light modulator 48 may be arranged to provide illumination to both eyes 45R, 45L. Advantageously cost and complexity is reduced.

It may be desirable to increase the performance and functionality of the head-worn display apparatus 600.

Figure 25D:
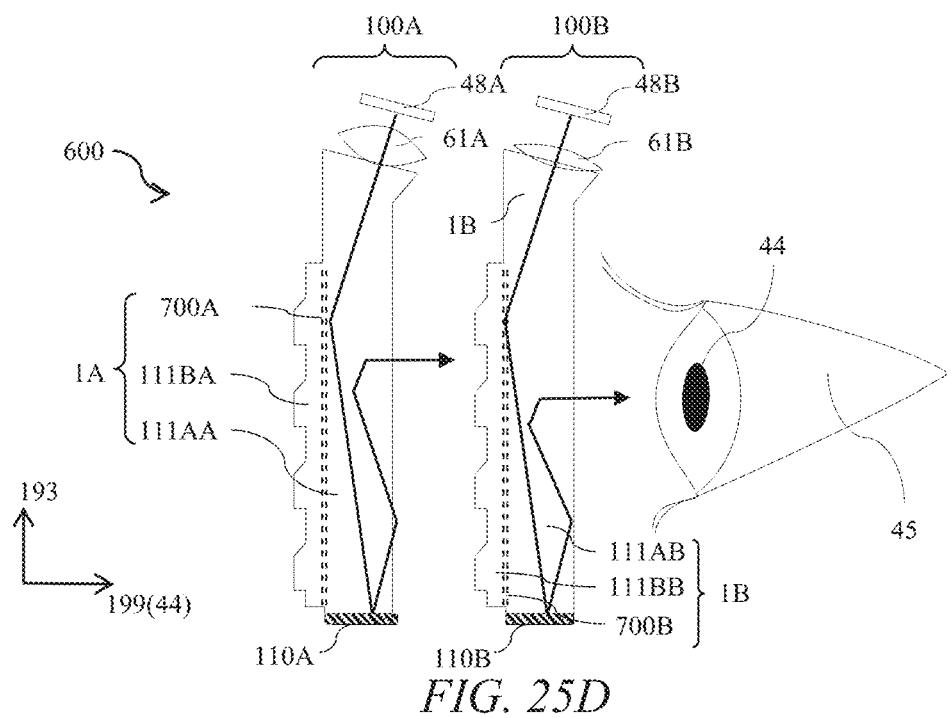
FIG. 25D is a schematic diagram illustrating in side view a head-worn display apparatus comprising two anamorphic near-eye display apparatuses.
Figure 25E:
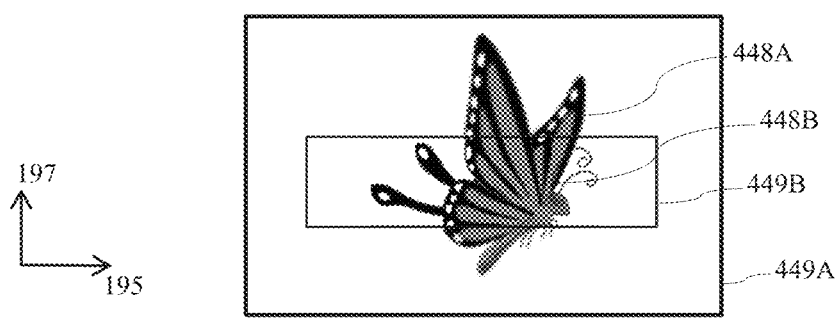
FIG. 25E is a schematic diagram illustrating a composite image.

FIG. 25D is a schematic diagram illustrating in side view a head-worn display apparatus comprising two anamorphic near-eye display apparatuses; and FIG. 25E is a schematic diagram illustrating a composite image provided by the head-worn display apparatus 600 of FIG. 25D to the eye 45. Features of the embodiments of FIGS. 25D-E not discussed in further detail may be assumed to correspond to the features with equivalent reference numerals as discussed above, including any potential variations in the features.

In the alternative embodiment of FIG. 25D, the anamorphic near-eye display apparatus 100A is a first near-eye display apparatus and the head-worn display apparatus 600 further comprises a second near-eye display apparatus 100B, wherein the second near-eye display apparatus 100B is arranged in series with and to receive light from the first near-eye display apparatus 100A.

Near-eye anamorphic display apparatus 100A comprises spatial light modulator 48A with a first size and pixel 222 density; transverse anamorphic component 60A with a first transverse optical power; and extraction waveguide 1A comprising a lateral anamorphic component 110A with a first lateral optical power. Near-eye anamorphic display apparatus 100B comprises spatial light modulator 48B that may have size and pixel 222 density that is the same or different to the spatial light modulator 48A; transverse anamorphic component 60B with a second transverse optical power that may be the same or different to the first transverse optical power; and extraction waveguide 1A comprising a lateral anamorphic component 110A with a second lateral optical power that may be the same or different to the first lateral optical power.

The spatial light modulators 48A, 48B, transverse anamorphic components 60A, 60B; lateral anamorphic components 110A, 110B and the extraction features 170 may be arranged to provide desirably increased optical performance including at least one of (i) increased image resolution; (ii) increased brightness; (iii) increased exit pupil 40 size; (iv) reduced image diffraction; (v) increased field of view; and (vi) multiple focal planes.

In the illustrative embodiment of FIG. 25D, the spatial light modulators 48A, 48B are the same but the transverse anamorphic components 60A, 60B and lateral anamorphic components 110A, 110B are different so that the magnification provided by the respective anamorphic display apparatuses 100A, 100B are different. FIG. 25E illustrates that an outer image region 448A with border 449A is provided by the anamorphic near-eye display apparatus 100A and the central image region 448B with border 449B is provided by the anamorphic near-eye display apparatus 100B. Advantageously a high resolution image may be provided in the central region 448A, overlaid on a lower resolution image in the outer region 448B. Such an arrangement may advantageously achieve increased image fidelity for the most common viewing directions while providing large field of view.

FIG. 25D also illustrates that the extraction features 170 may be provided with different alignments to achieve increased exit pupil 40 size and to reduce diffraction blur.

It may be desirable to increase the performance of virtual reality display systems.

Figure 26A:
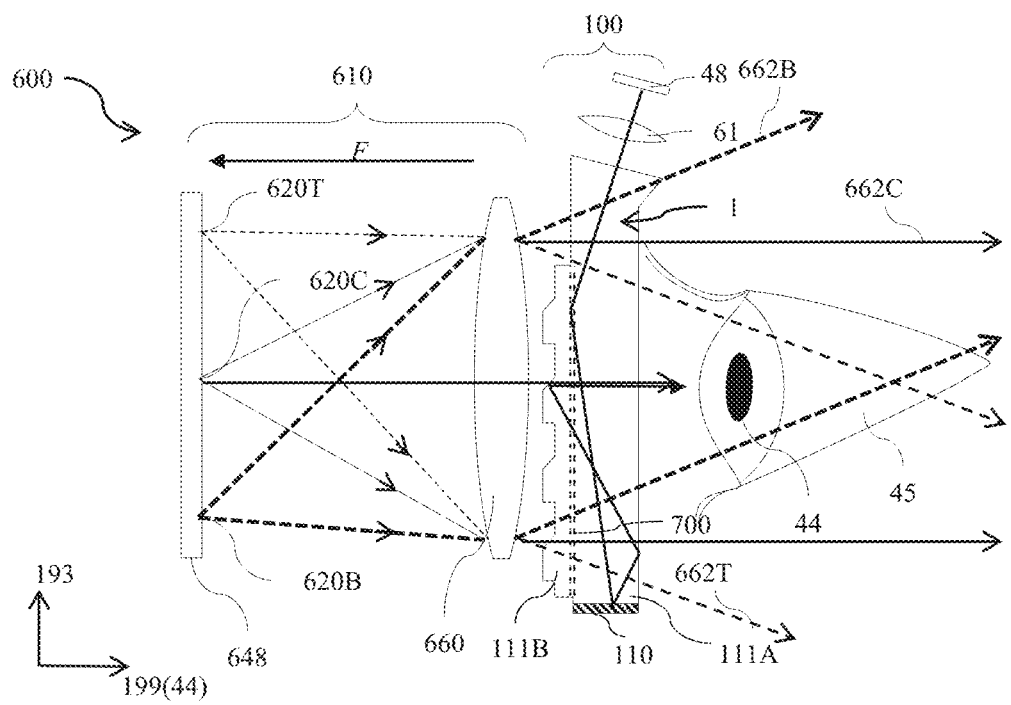
FIG. 26A is a schematic diagram illustrating in side view a virtual reality head-worn display apparatus comprising an anamorphic near-eye display apparatus arranged to receive light from a magnifying lens and additional spatial light modulator.
Figure 26B:
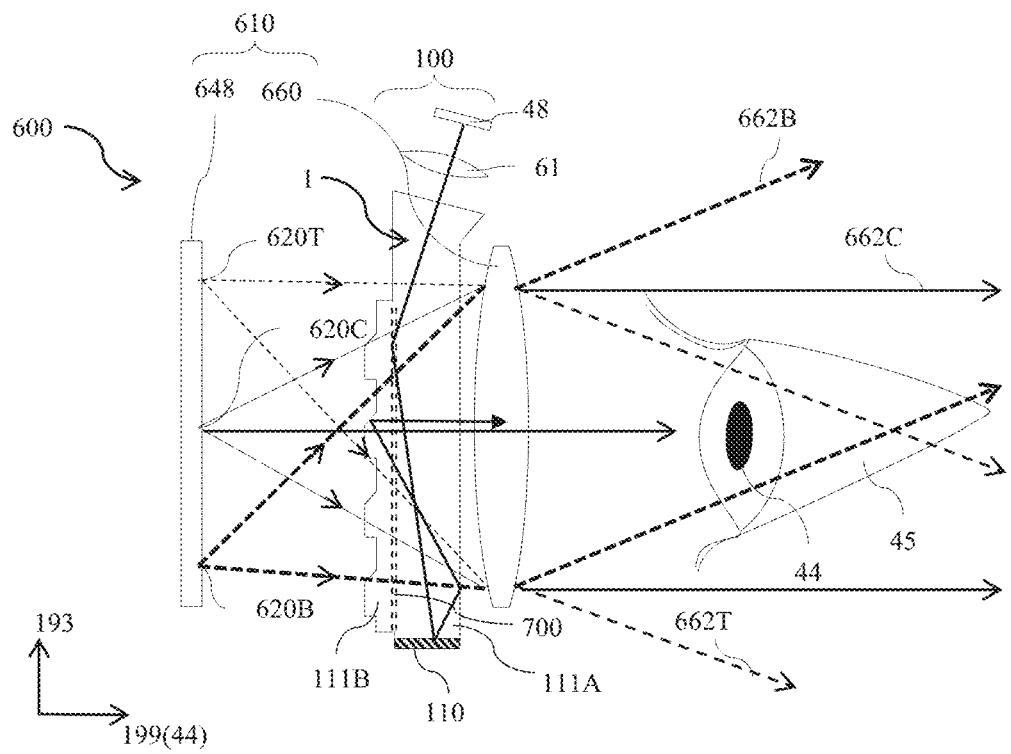
FIG. 26B is a schematic diagram illustrating in side view a virtual reality head-worn display apparatus comprising an anamorphic near-eye display apparatus arranged between the anamorphic spatial light modulator and magnifying lens of a non-anamorphic near-eye display apparatus.

FIG. 26A is a schematic diagram illustrating in side view a virtual reality head-worn display apparatus 600 comprising an anamorphic near-eye display apparatus 100 arranged to receive light from a magnifying lens 610; and FIG. 26B is a schematic diagram illustrating in side view a virtual reality head-worn display apparatus comprising an anamorphic near-eye display apparatus arranged between the anamorphic spatial light modulator and magnifying lens of a non-anamorphic display apparatus. Features of the embodiments of FIGS. 26A-B not discussed in further detail may be assumed to correspond to the features with equivalent reference numerals as discussed above, including any potential variations in the features.

In the alternative embodiment of FIG. 26A, head-worn display apparatus 600 further comprises a non-anamorphic near-eye display apparatus 610, wherein the non-anamorphic near-eye display apparatus 610 comprises a non-anamorphic spatial light modulator 648 and a non-anamorphic magnifying optical system such as lens 660; and wherein the at least one near-eye display apparatus 100 is arranged in series with and to receive light from the non-anamorphic near-eye display apparatus 610.

FIG. 26A is an example of a head-worn display apparatus 600 comprising lens 660 having optical power, the anamorphic near-eye display apparatus 100 overlying the lens 660. The lens 660 may comprise a refractive lens or may be catadioptric, for example a pancake lens.

In the alternative embodiment of FIG. 26B, the anamorphic near-eye display apparatus 100 may be arranged in series with the non-anamorphic spatial light modulator 648, being arranged between the non-anamorphic spatial light modulator 648 and the non-anamorphic near-eye display apparatus 610. The anamorphic near-eye display apparatus may be arranged substantially at the pupil of the magnifying optical system 660 to provide no optical power to light from the non-anamorphic near-eye display apparatus 100. Alternatively some small optical power for light from the anamorphic near-eye display apparatus 100, may be provided modifying the virtual image distance. The total thickness of the optical system may be reduced, advantageously achieving reduced bulk.

In the embodiments of FIGS. 26A-B, the non-anamorphic magnifying optical system 660 may comprise a lens such as a Fresnel lens, a pancake lens or other known non-anamorphic magnifying lenses and is arranged to provide the eye 45 with a virtual image of the spatial light modulator 648. In comparison to the anamorphic near-eye display apparatus 100, the non-anamorphic near-eye display apparatus 610 provides magnification of pixels 622 on the non-anamorphic spatial light modulator 648 that is equal in the lateral and transverse directions 195, 197. The non-anamorphic magnifying optical system 660 is typically circularly symmetric.

In operation, top pixel 620T of the non-anamorphic spatial light modulator 648 provides light rays 662T, central pixel 620C provides light rays 662C and bottom pixel 620B provides light rays 662B. The eye of the viewer 45 collects the light rays 460T, 460C, 460B and produces an image on the retina of the eye such that an image is perceived with angular size that is magnified in comparison to the angular size of the spatial light modulator 48.

The spatial light modulators 48, 648, non-anamorphic magnifying optical system 660, transverse anamorphic component 60; lateral anamorphic component 110 and the extraction features 170 may be arranged to provide desirably increased optical performance including at least one of (i) increased image resolution; (ii) increased brightness; (iii) increased exit pupil 40 size; (iv) reduced image diffraction; (v) increased field of view; and (vi) multiple focal planes.

Figure 27A:
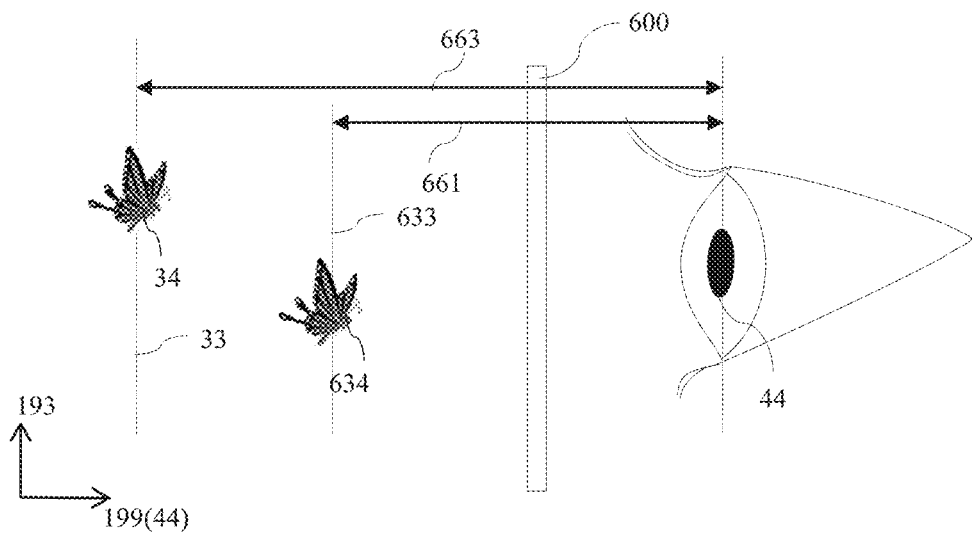
FIG. 27A is a schematic diagram illustrating in side view an arrangement of virtual image distances for a virtual reality display apparatus.

FIG. 27A is a schematic diagram illustrating in side view an arrangement of virtual image distances for a virtual reality display apparatus. Features of the embodiment of FIG. 27A not discussed in further detail may be assumed to correspond to the features with equivalent reference numerals as discussed above, including any potential variations in the features.

Considering the embodiment of FIG. 26A, the virtual image distance 61 from the eye 44 to the virtual image 34 provided by the anamorphic near-eye display apparatus 100 may be at an infinite conjugate plane 33 distance 663, whereas by control of the back working distance, F of the spatial light modulator 648 to the non-anamorphic magnifying system 660 the virtual image 634 provided by the non-anamorphic near-eye display apparatus 610 may be at a finite conjugate plane 633 distance 661.

More generally a virtual image distance for light from the first near-eye display apparatus 100A, 100 may be different from a virtual image distance for light from the second near-eye display apparatus 100B or non-anamorphic near-eye display apparatus 610 respectively.

Advantageously comfort of display use may be increased.

Figure 27B:
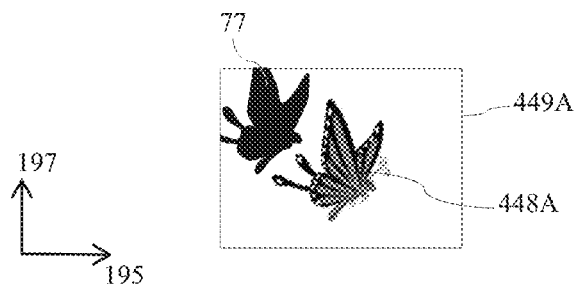
FIG. 27B and FIG. 27C are schematic diagrams illustrating displayed images for the arrangement of FIG. 27A.
Figure 27C:
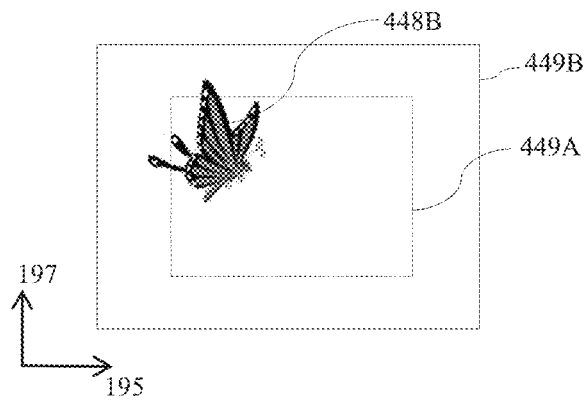

FIGS. 27B-C are schematic diagrams illustrating displayed virtual images for the arrangement of FIG. 27A. Features of the embodiments of FIGS. 27B-C not discussed in further detail may be assumed to correspond to the features with equivalent reference numerals as discussed above, including any potential variations in the features.

FIG. 27B illustrates the image 448A with border 449A provided by the anamorphic near-eye display apparatus 100 whereas FIG. 27C illustrates the image 448B with border 449B provided by the non-anamorphic near-eye display apparatus 610.

The background image 448A and foreground images 448B are provided so that the image 448A may further comprise an occlusion image 77 that is aligned in operation to the foreground images 448B that overlay the background image. Opaque foreground images may advantageously be achieved.

Alternative arrangements of lateral anamorphic component 110 comprising Pancharatnam-Berry lenses will now be described.

Figure 28A:
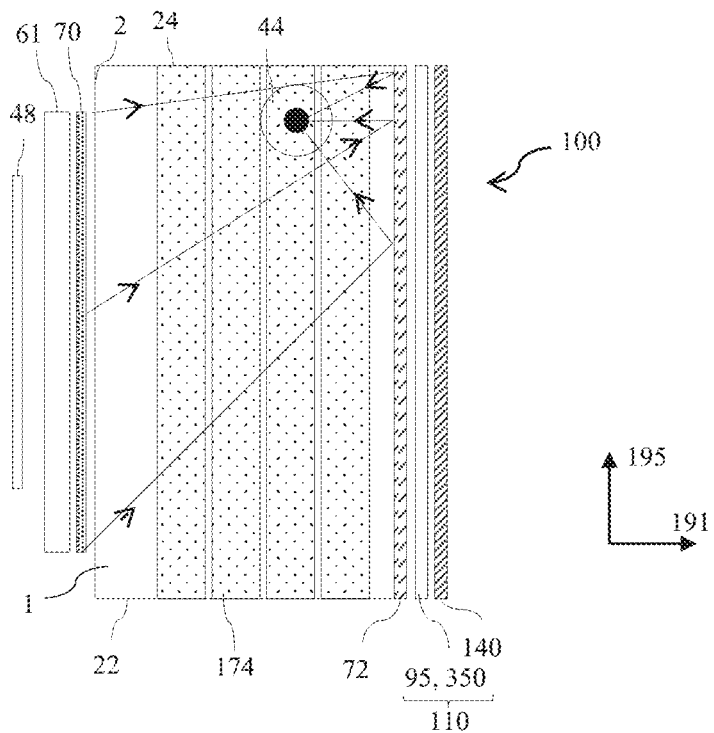
FIG. 28A is a schematic diagram illustrating in front view an anamorphic near-eye display apparatus comprising a reflective end comprising a Pancharatnam-Berry lens.

FIG. 28A is a schematic diagram illustrating in front view an anamorphic near-eye display apparatus 100 comprising a reflective end 4 comprising a Pancharatnam-Berry lens 350. Features of the embodiment of FIG. 28A not discussed in further detail may be assumed to correspond to the features with equivalent reference numerals as discussed above, including any potential variations in the features.

In the alternative embodiment of an anamorphic near-eye display apparatus 100 of FIG. 28A, the lens 95 of the lateral anamorphic component 110 is a Pancharatnam-Berry lens 350 and the light reversing reflector 140 is a planar mirror. Thus the Pancharatnam-Berry lens 350 is arranged between the extraction waveguide 1 and reflective end 4.

In the alternative embodiment of FIG. 28A, the extraction waveguide 1 is illustrated with extraction reflectors 174 arranged between plural plates 180 although the other extraction reflectors described hereinbefore may be provided as alternatives.

In operation, the Pancharatnam-Berry lens 350 provides optical power in the lateral direction 195 (350) and no optical power in the transverse direction 197 (350). The Pancharatnam-Berry lens 350 thus provides a similar operation to the curved reflective end 4 and curved reflective ends 4 with lens 95 described hereinabove. In alternative embodiments, not shown, the reflective end 4 may comprise a curved mirror and the optical power of the lateral anamorphic component 110 may be shared between the Pancharatnam-Berry lens 350 and the curved reflective end 4. Advantageously aberrations may be improved.

Figure 28B:
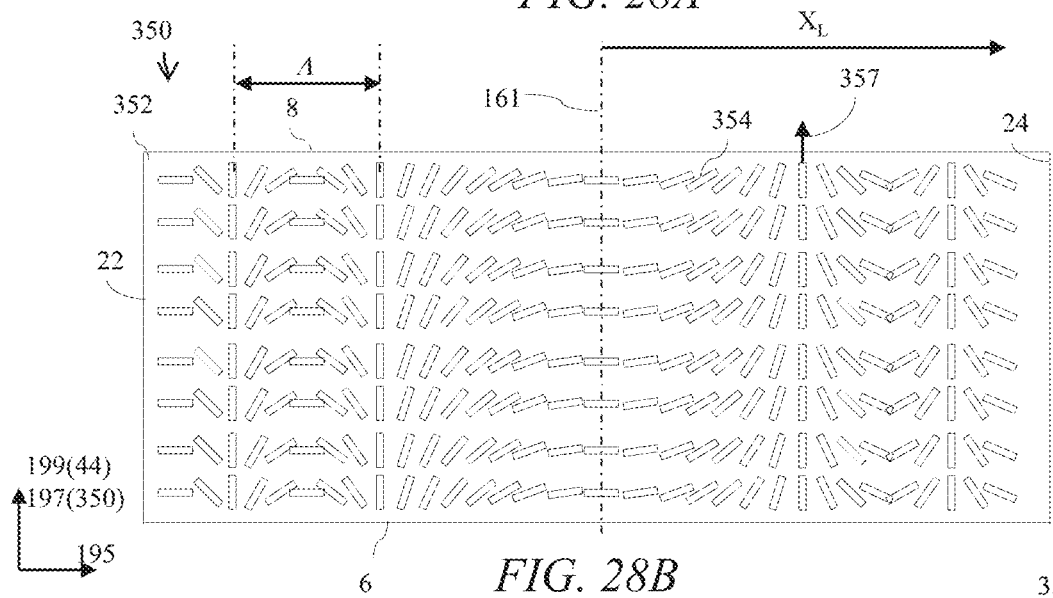
FIG. 28B is a schematic diagram illustrating in end view the optical structure of a Pancharatnam-Berry lens.
Figure 28C:
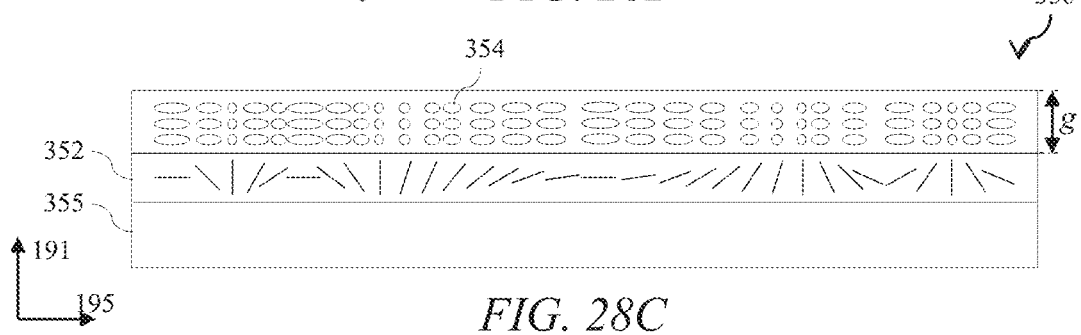
FIG. 28C is a schematic diagram illustrating in front view an optical structure of the Pancharatnam-Berry lens of FIG. 28B.

FIG. 28B is a schematic diagram illustrating in end view the optical structure of a Pancharatnam-Berry lens 350 and FIG. 28C is a schematic diagram illustrating in front view the optical structure of the Pancharatnam-Berry lens of FIG. 28B. Features of the embodiment of FIGS. 28B-C not discussed in further detail may be assumed to correspond to the features with equivalent reference numerals as discussed above, including any potential variations in the features.

The alternative embodiments of FIG. 28B and FIG. 28C illustrate a Pancharatnam-Berry lens 350 comprising liquid crystal molecules 354 arranged on alignment layer 352 and support substrate 355. The alignment layer 354 provides component 357 of the liquid crystal molecule 354 director direction (typically the direction of the extraordinary index) that varies across the Pancharatnam-Berry lens 350 in the lateral direction 195. In the transverse direction 197 (350) there is no variation of the component 357 of the director direction and so no phase modulation is provided by the Pancharatnam-Berry lens 350.

During manufacture, the alignment layer 352 may be formed for example by exposure and curing of a photoalignment layer with circularly polarized light with the desirable phase profile to achieve a variation of the optical axis direction 357. More specifically, an interference pattern is created between two oppositely circularly polarized wavefronts that creates locally linear polarized light whose orientation varies in the plane of the alignment layer to provide the desired alignment profile by the alignment layer 352. The alignment layer is thus oriented with linear polarized light to provide an optical axis direction 357 in the layer of liquid crystal material 354 that provides a desirable optical power profile.

The layer of liquid crystal material 354 may have a thickness g that has a half-wave thickness at a desirable wavelength of light, for example 550 nm. The liquid crystal material 354 may be a cured liquid crystal material such as a liquid crystal polymer or may be a nematic phase liquid crystal material arranged between opposing alignment layers.

Figure 29:
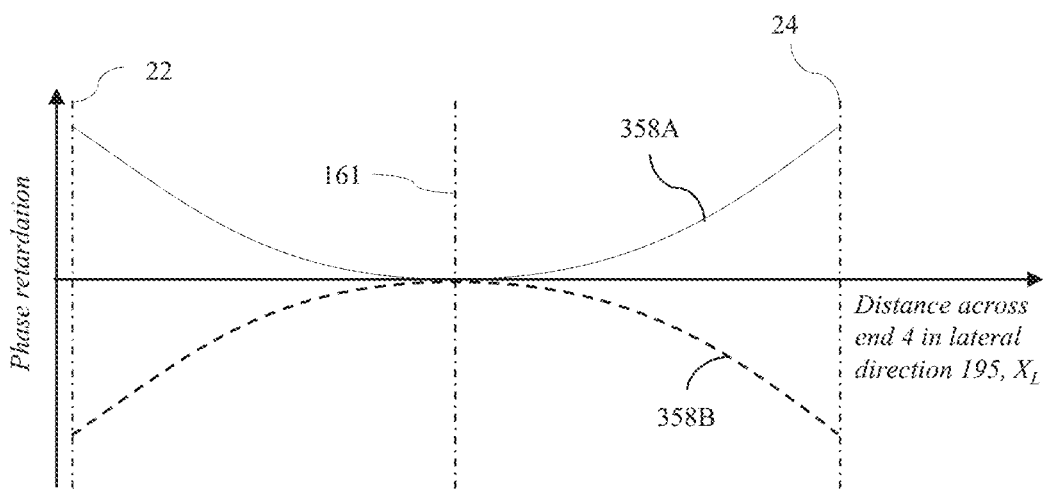
FIG. 29 is a schematic graph illustrating the variation of phase difference with lateral position for an illustrative Pancharatnam-Berry lens of FIG. 28B.

FIG. 29 is a schematic graph illustrating the variation of phase difference with lateral position for an illustrative Pancharatnam-Berry lens of FIG. 28B. FIG. 29 illustrates the profile 358A of phase retardation across the Pancharatnam-Berry lens 350 across the end 4 in the lateral direction 195 for a monochromatic circularly polarized planar wave incident onto the Pancharatnam-Berry lens 350. The pitch Λ of the profile of phase across the Pancharatnam-Berry lens 350 varies across the lateral direction 195 to achieve said profile 358A, with a large pitch at the location 161 which may be the centre of the Pancharatnam-Berry lens 350 and reducing pitch/either side. As illustrated in FIG. 28B, the liquid crystal material director rotates across the pitch Λ, which for the circularly polarized incident light provides the phase difference and hence deflection of the incident wavefront.

At one location 161 of the Pancharatnam-Berry lens 350 that is typically the centre of the end 4 of the extraction waveguide 1, the liquid crystal molecules 354 are aligned such that there is no relative phase difference. Profile 358A illustrates the phase modulation for a first circular polarization state (which may be right-handed circular polarization state) and profile 358B illustrates the phase modulation for a second circular polarization state orthogonal to the first polarization state (which may be left-handed circular polarization state).

Figure 30:
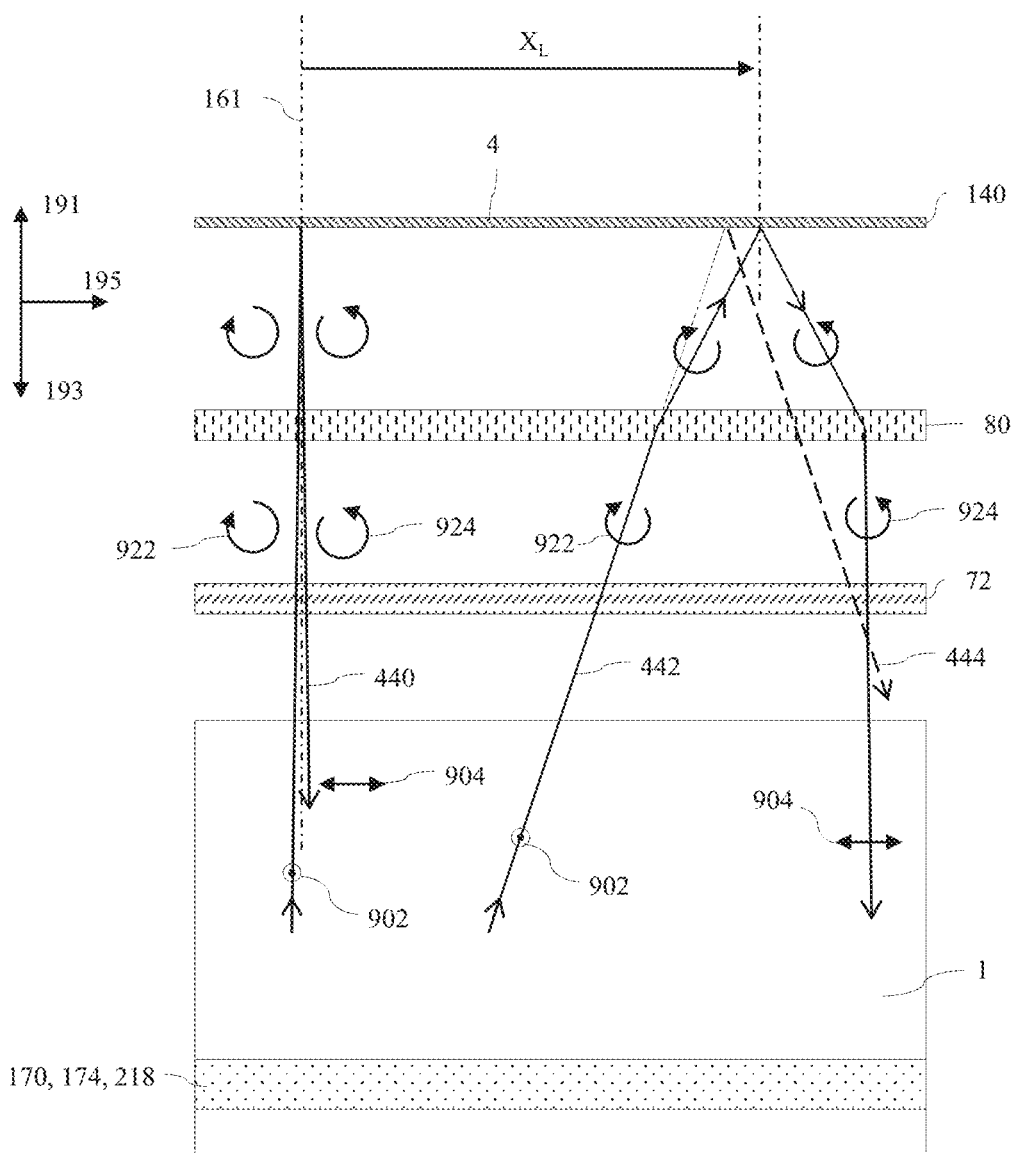
FIG. 30 is a schematic diagram illustrating in side view the operation of the Pancharatnam-Berry lens of FIG. 28A.

FIG. 30 illustrates in front view the operation of a portion of a Pancharatnam-Berry lens 350 to provide the lateral anamorphic component 110 across the end 4 of the extraction waveguide 1 in the lateral direction 195. Features of the embodiment of FIG. 30 not discussed in further detail may be assumed to correspond to the features with equivalent reference numerals as discussed above, including any potential variations in the features.

The light rays 440, 442 incident onto the Pancharatnam-Berry lens 350 propagating along the direction 191 of the extraction waveguide 1 are polarized with the linear polarization state 902.

For light ray 440 at the location 161, the incident polarization state 902 is transmitted by the polarization control retarder 72 with phase difference to provide circularly polarized state 922. The Pancharatnam-Berry lens 350 uses the polarization control retarder 72 that is the same as the retarder used to optimise the transmission and reflectivity to polarized light of the dielectric layers of the extraction reflectors 170, 174, advantageously achieving improved efficiency.

The Pancharatnam-Berry lens 350 provides no relative phase modulation at the location 161, so that the reflection of light ray 440 from the light reversing reflector 140 provides the orthogonally circularly polarized state 924 that is transmitted as polarization state 924 along the direction 193 back towards the extraction elements 270 that may be reflectors such as extraction reflectors 170, 174, 218 as described hereinabove.

For light ray 442 at the location offset by distance XL in the lateral direction 195 from the location 161, the incident polarization state 902 is again transmitted by the polarization control retarder 72 with phase difference to provide circularly polarized state 922. The Pancharatnam-Berry lens 350 provides a gradient of phase difference so that the ray 442 representing a planar phase front is deflected in comparison to an illustrative undeflected ray 444. After reflection from the light reversing reflector 140, a further phase shift is provided by the Pancharatnam-Berry lens 350 so that the light ray 442 undergoes a further deflection. The reflected ray 442 propagating in the direction 193 along the extraction waveguide 1 is parallel to the returning ray 440. Thus the Pancharatnam-Berry lens 350, light reversing reflector 140 and polarization control retarder 72, achieve the desirable optical function of the lateral anamorphic component 110.

Advantageously the physical size of the lateral anamorphic component 110 is reduced and a more compact arrangement achieved. The phase profile may further provide correction for aberrations of the lateral anamorphic component 110.

In other embodiments, plural Pancharatnam-Berry lenses 350 or Pancharatnam-Berry lenses 350 in combination with refractive lenses 95 and curved reflective end 4, for example as illustrated in FIG. 25A that may be separated in the direction 191 along the extraction waveguide 1 may be provided. Improved control of aberrations may be achieved and exit pupil 40 expanded in the lateral direction 195. Advantageously the blur ellipses 452 of FIG. 1F may have a reduced width 455.

Lenses for use with the anamorphic near-eye display apparatus 100 will now be described.

Figure 31A:
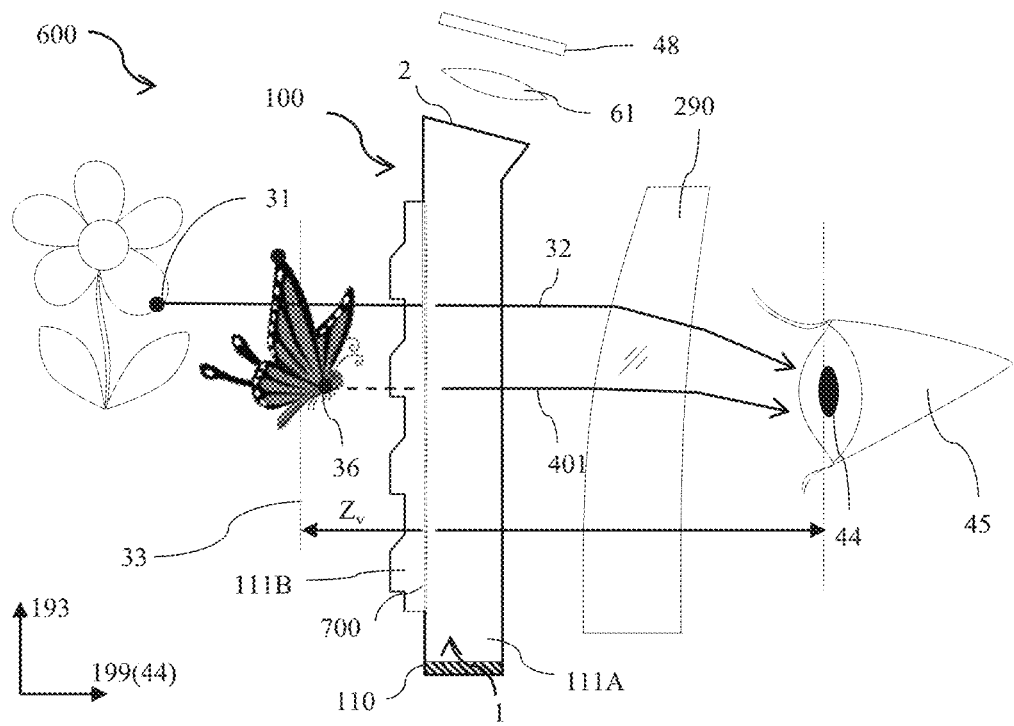
FIG. 31A is a schematic diagram illustrating in side view the operation of an anamorphic near-eye display apparatus further comprising a corrective spectacle lens.

FIG. 31A is a schematic diagram illustrating in side view the operation of an anamorphic near-eye display apparatus 100 further comprising a lens 290. Features of the embodiment of FIG. 31A not discussed in further detail may be assumed to correspond to the features with equivalent reference numerals as discussed above, including any potential variations in the features.

FIG. 31A and other embodiments disclosed herein are further examples of a head-worn display apparatus 600 comprising lens 660 having optical power, the anamorphic near-eye display apparatus 100 overlying the lens 660.

The anamorphic near-eye display apparatus 100 described hereinabove provides virtual images 36 that are located in the far field, so that the nominal viewing distance $Z_v$ is infinite. It may be desirable to provide modification of the distance $Z_v$ to the virtual image plane 33 of the virtual image 36 provided by the anamorphic near-eye display apparatus 100.

The head-worn display apparatus 600 further comprises at least one lens 290 that may be a corrective lens having optical power for correcting eyesight. The correction of eyesight may be for example to correct for presbyopia, astigmatism, myopia or hyperopia of the display user 45.

The lens 290 may further or alternatively be a focal plane modifying lens for providing the virtual image 33 such that the distance $Z_v$ is a finite distance. Such an arrangement may provide suitable accommodation cues for the display user 47 such that virtual images that are desirably close to the user 47 are provided at desirable accommodation distances. In stereoscopic display applications, the accommodation correction of the lens 290 may be arranged to approximate the convergence distance of the imagery. Accommodation-convergence mismatch may be reduced and advantageously visual stress reduced, increasing comfort of use.

Such lenses 290 may be used for example in the spectacles head-worn display apparatus 600 of FIGS. 23A-B or the virtual reality head-worn display apparatus 600 of FIG. 25A.

It may be desirable to adjust the accommodation distance $Z_v$ of the virtual image.

Figure 31B:
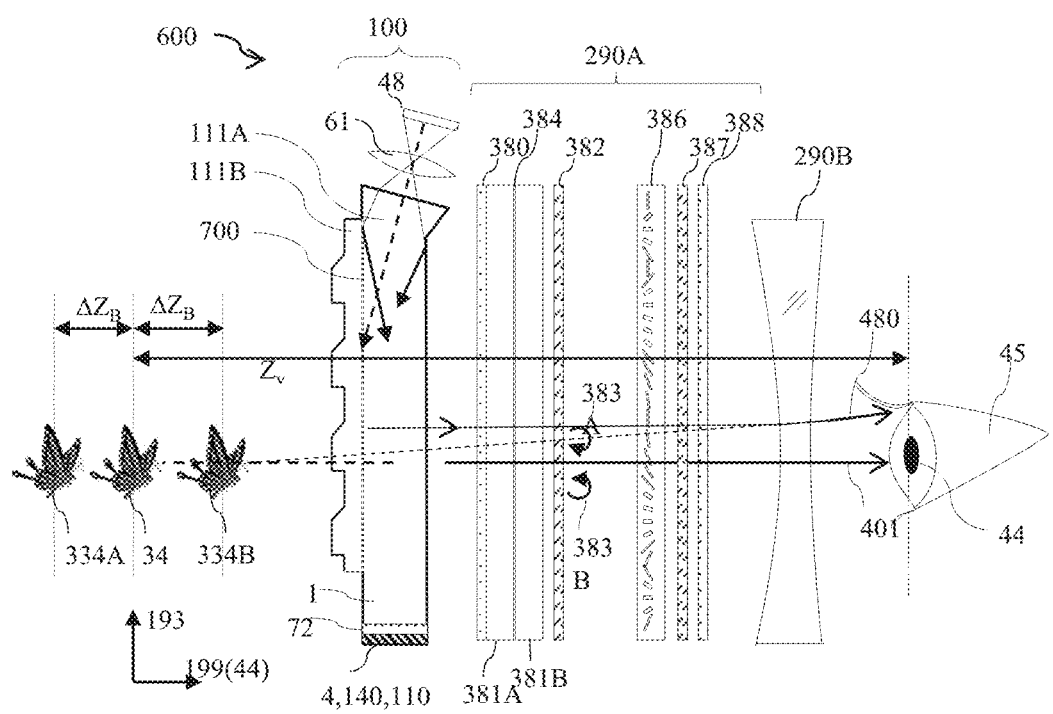
FIG. 31B is a schematic diagram illustrating in side view the operation of an anamorphic near-eye display apparatus further comprising a corrective Pancharatnam-Berry lens and a corrective spectacle lens.

FIG. 31B is a schematic diagram illustrating in side view the operation of an anamorphic near-eye display apparatus 100 further comprising a Pancharatnam-Berry lens 386. Features of the embodiment of FIG. 31B not discussed in further detail may be assumed to correspond to the features with equivalent reference numerals as discussed above, including any potential variations in the features.

In the alternative embodiment of FIG. 31B, the anamorphic near-eye display apparatus 100 is arranged to direct output light rays 401 into lens 290 that comprises a switchable optical stack.

Switchable optical stack comprises input polarizer 380, transparent substrates 381A, 381B with an electrically switchable liquid crystal layer 384 provided therebetween and a quarter-wave retarder 382. In a first state, the liquid crystal layer 384 is arranged to provide no polarization rotation of the polarized light from the polarizer 380 and the switchable optical stack provides a first circularly polarized output polarization state 383A. In a second state, the liquid crystal layer 384 is arranged to provide a polarization rotation of the polarized light from the polarizer 380 and the switchable optical stack provides a second circularly polarized output polarization state 383B, orthogonal to the polarization state 383A.

The Pancharatnam-Berry lens 386 comprises a circularly symmetric alignment of liquid crystal molecules with similar but different alignment across each radius of the circularly symmetric alignment to that illustrated across the lateral direction 195 in FIG. 29A hereinabove. The Pancharatnam-Berry lens 386 thus provides a circularly symmetric first phase radial profile similar to profile 358A of FIG. 29B for the light with polarization state 383A and a circularly symmetric second phase radial profile similar to profile 358B of FIG. 29B for the light with polarization state 383B. The output polarization state from the Pancharatnam-Berry lens 386 is analysed by quarter-wave retarder 387 and linear polarizer 388.

Output light from the lens 290A with positive or negative power modification of the wavefront from the anamorphic near-eye display apparatus 100 is then incident onto the fixed lens 290B so that the eye 45 observes one of the two power corrections.

Considering the virtual image 34, the absence of the lens 290A would provide a virtual image at distance $Z_v$. In the first state of the liquid crystal layer 384, the virtual image 334A is provided with a separation $\Delta Z_A$ from the distance $Z_v$; and in the second state of the liquid crystal layer 384, the virtual image 334B is provided with a separation $\Delta Z_B$ from the distance $Z_v$.

In alternative embodiments, the lens 290B may be provided by a Pancharatnam-Berry lens. Advantageously thickness may be reduced.

The lenses 290A, 290B thus achieve adjustable accommodation distances for virtual images 334A, 334B. Stacks of lenses 290A with for example a geometric sequence of optical power adjustments may be provided to achieve increased fidelity in location of the virtual image 334. Accommodation conflicts with the provided imagery may advantageously be reduced and image comfort increased. Comfortable usage time for the head-worn display apparatus 600 may be extended.

It may be desirable to provide a virtual image 34 that does not have an infinite conjugate while not modifying the real image 30 magnification or distance ZR.

Figure 32A:
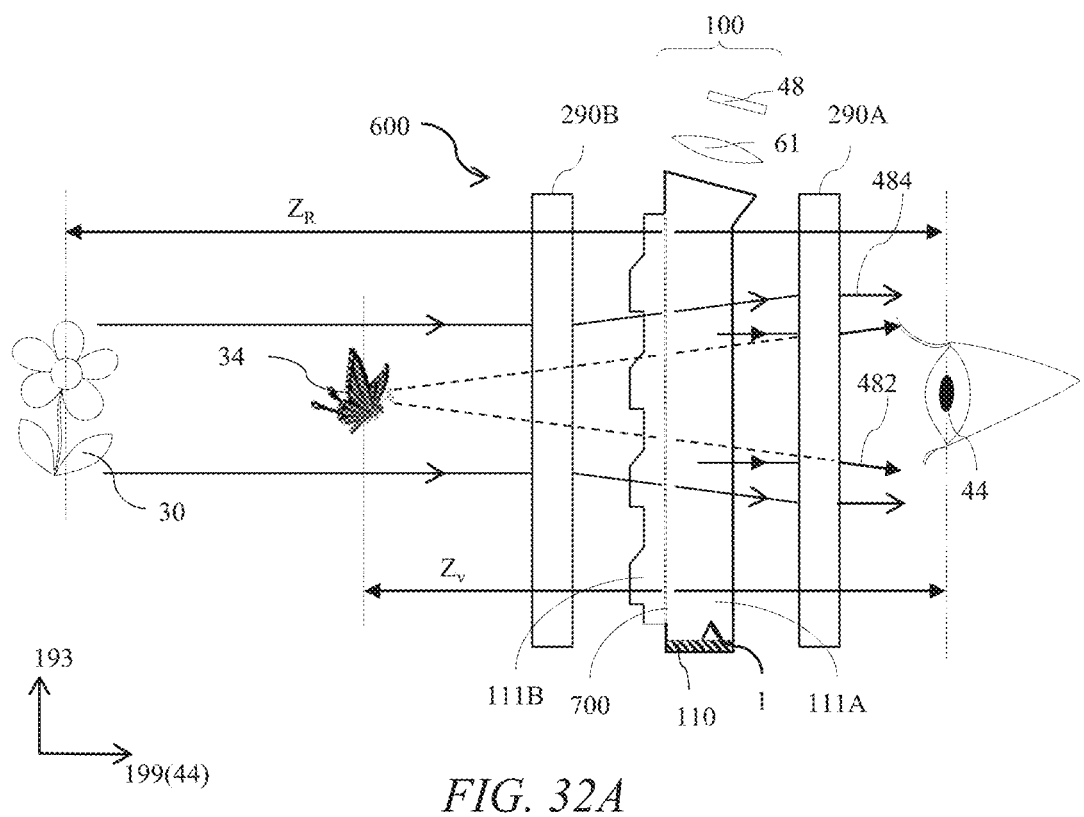
FIG. 32A is a schematic diagram illustrating in side view a head-worn display apparatus comprising first and second focal plane modifying lenses.

FIG. 32A is a schematic diagram illustrating in side view a head-worn display apparatus 600 comprising first and second focal plane modifying lenses 290A, 290B. Features of the embodiment of FIG. 32A not discussed in further detail may be assumed to correspond to the features with equivalent reference numerals as discussed above, including any potential variations in the features.

In the alternative embodiment of FIG. 32A, anamorphic near-eye display apparatus 100 is arranged between the focal plane modifying lenses 290A, 290B. The lens 290A is a focal plane modifying lens that is arranged to modify the distance $Z_v$ to the virtual image 34 by deflection of light rays 482 from the anamorphic near-eye display apparatus 100.

The lens 290B is a correction lens arranged to correct for the optical power of the lens 290A, so that light rays 484 from real images 30 are undeflected by the head-worn display apparatus 600. Advantageously virtual images 34 may be provided near to the eye, for example to provide a user interface and overlayed with real-world images, advantageously reducing the degradation of the real-world images 30.

The lenses 290A, 290B may be Pancharatnam-Berry lenses as described hereinabove, so that the distance Zv may be modified in correspondence to desired image data. The lenses 290A, 290B may have the same optical design and the lens 290B may be driven in the opposite output to the lens 290A to achieve resultant zero power of lenses 290A, 290B. Advantageously cost and complexity may be reduced.

Figure 32B:
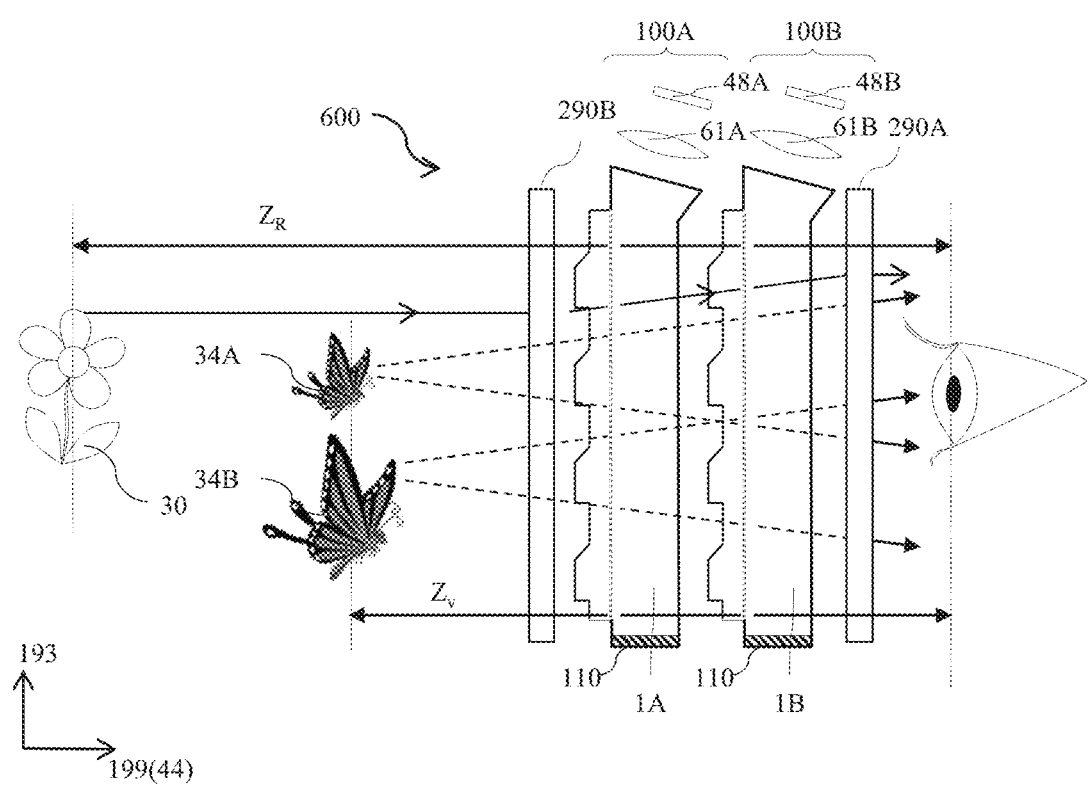
FIG. 32B is a schematic diagram illustrating in side view a head-worn display apparatus comprising plural extraction waveguides and further comprising first and second focal plane modifying lenses.

FIG. 32B is a schematic diagram illustrating in side view a head-worn display apparatus 600 comprising plural extraction waveguides and further comprising first and second focal plane modifying lenses. Features of the embodiment of FIG. 32B not discussed in further detail may be assumed to correspond to the features with equivalent reference numerals as discussed above, including any potential variations in the features.

In the alternative embodiment of FIG. 32B, two anamorphic near-eye display apparatuses 100A, 100B are provided to achieve multiple virtual images 34A, 34B. The performance of the head-worn display apparatus may be increased, for example as described with respect to FIG. 25D hereinabove. Further, focal plane modifying lenses 290A, 290B are provided with operation as described in FIG. 32A. Advantageously real-world images 30 may be provided with reduced degradation.

It may be desirable to provide virtual images 34A, 34B with different focal distances $Z_vA$, $Z_vB$.

Figure 32C:
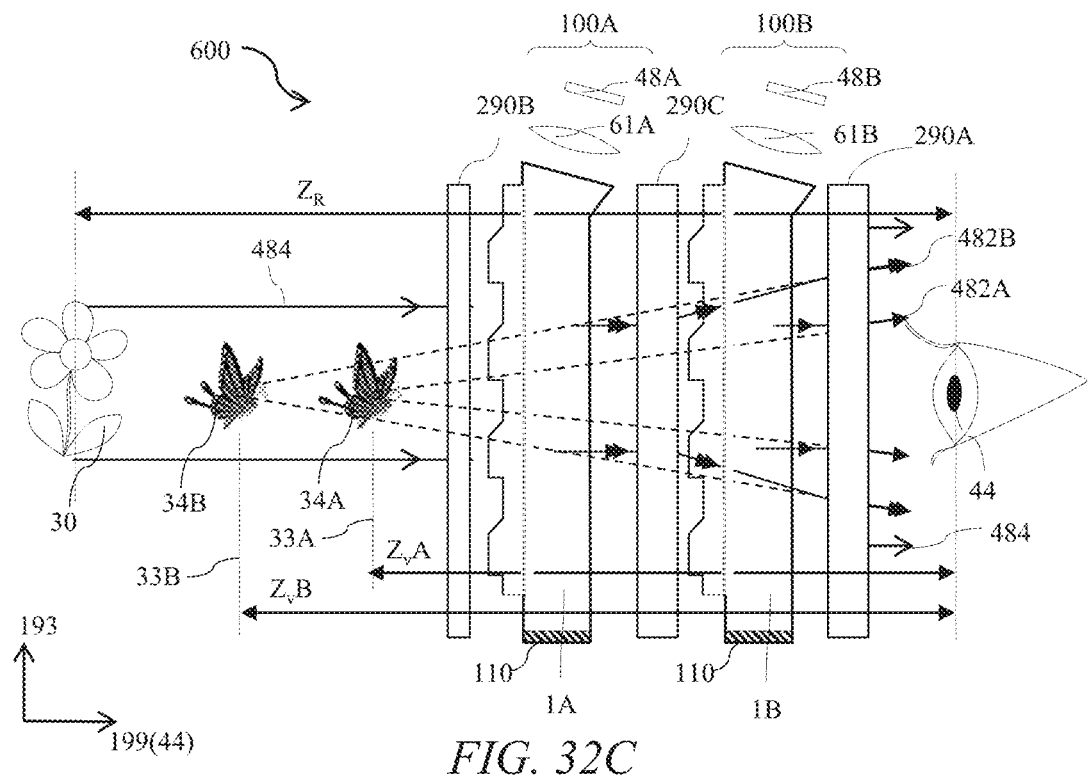
FIG. 32C is a schematic diagram illustrating in side view a head-worn display apparatus comprising plural extraction waveguides and three focal plane modifying lenses.

FIG. 32C is a schematic diagram illustrating in side view a head-worn display apparatus 600 comprising plural extraction waveguides and three focal plane modifying lenses 290A, 290B, 290C. Features of the embodiment of FIG. 32C not discussed in further detail may be assumed to correspond to the features with equivalent reference numerals as discussed above, including any potential variations in the features.

In comparison to the embodiment of FIG. 32B, in the alternative embodiment of FIG. 32C a further focal plane modifying lens 290C is provided to receive light from the anamorphic near-eye display apparatus 100A and to pass light to the further anamorphic near-eye display apparatus 100B. The virtual image distance $Z_vA$ for light from one of the anamorphic near-eye display apparatuses 100A is different to the virtual image distance $Z_vB$ for light from at least one other near-eye display apparatus 100B. The multiple focal planes 33A, 33B may advantageously achieve increased image comfort.

The lens 290C cooperates with the lens 290A to provide the second virtual image 34B, and the lens 290B cooperates with the lenses 290A, 290C to provide zero total optical power. In an alternative embodiment (not shown) the lens 290B may be omitted, for example for virtual reality applications. Advantageously cost and complexity may be reduced.

It may be desirable to increase the performance of a virtual reality head-worn display apparatus by providing increased control of focal planes 33, 633.

Figure 32D:
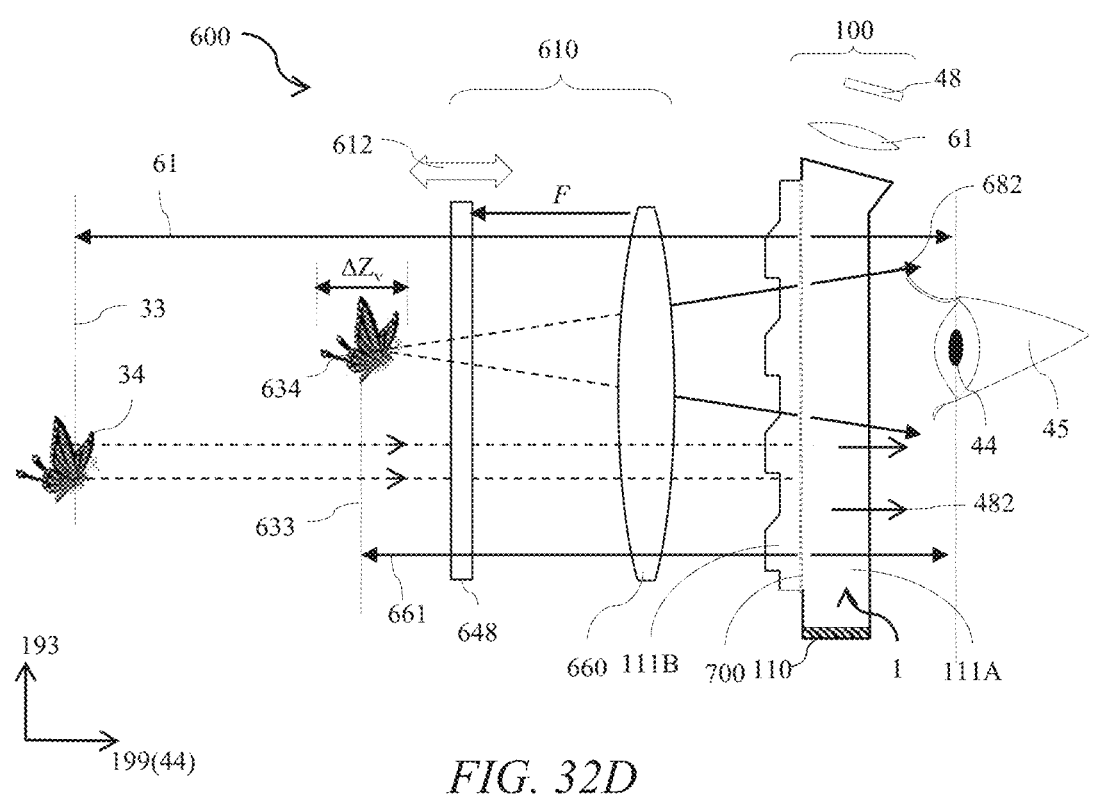
FIG. 32D is a schematic diagram illustrating in side view a head-worn display apparatus comprising a non-anamorphic near-eye display apparatus and an anamorphic extraction waveguide.

FIG. 32D is a schematic diagram illustrating in side view a head-worn display apparatus 600 comprising a non-anamorphic near-eye display apparatus 610 and an anamorphic near-eye display apparatus 100. Features of the embodiment of FIG. 32D not discussed in further detail may be assumed to correspond to the features with equivalent reference numerals as discussed above, including any potential variations in the features.

In comparison to the embodiment of FIG. 26A, in the alternative embodiment of FIG. 32D, the non-anamorphic near-eye display apparatus 610 comprises an actuator 612 arranged to move the further spatial light modulator 648 in relation to the non-anamorphic magnifying optical system 660, adjusting the magnification of the non-anamorphic near-eye display apparatus 100. The virtual image distance 663 for light from the anamorphic near-eye display apparatus 100 provided by rays 482 is different to the virtual image distance 661 for light from the non-anamorphic near-eye display apparatus 610 provided by rays 482. The distance F may be adjusted in correspondence to desired image data that may be in response to measured viewing direction of the eye 45.

Advantageously user comfort may be increased.

Figure 32E:
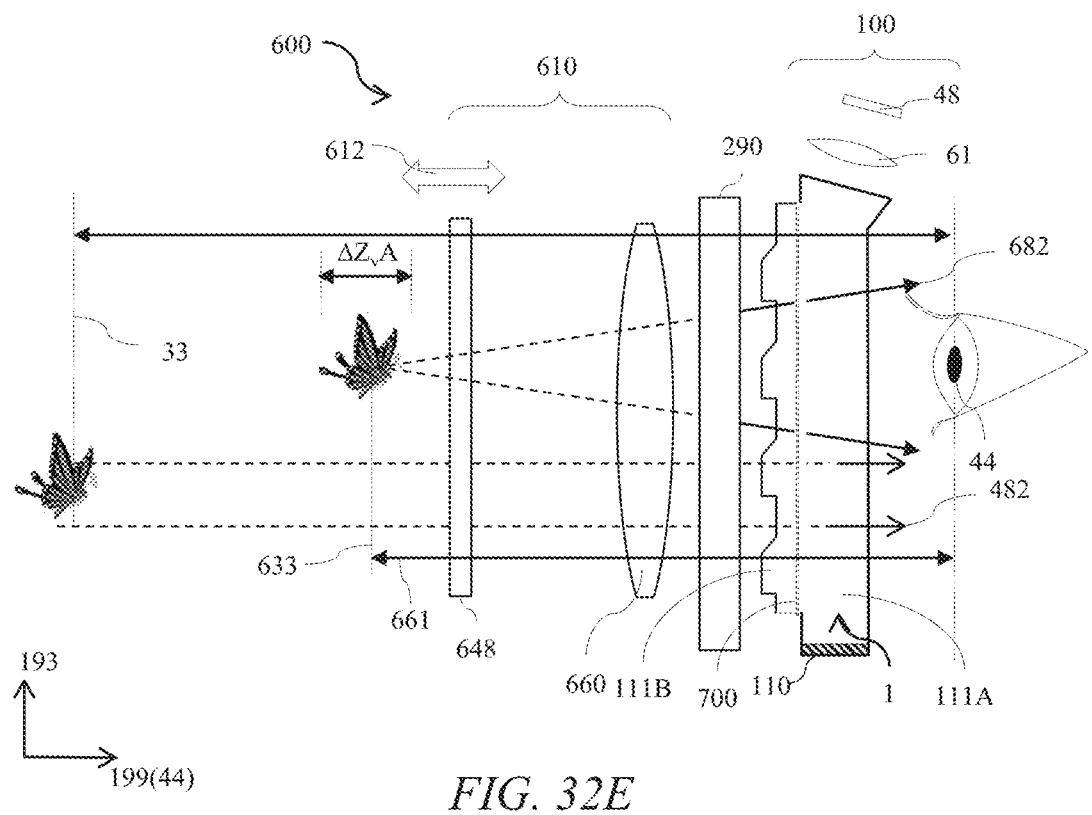
FIG. 32E is a schematic diagram illustrating in side view a head-worn display apparatus comprising a non-anamorphic near-eye display apparatus; an anamorphic extraction waveguide; and a focal plane modifying lens arranged between the non-anamorphic near-eye display apparatus and the anamorphic near-eye display apparatus.

FIG. 32E is a schematic diagram illustrating in side view a head-worn display apparatus 600 comprising a non-anamorphic near-eye display apparatus 610; an anamorphic near-eye display apparatus 100; and a focal plane modifying lens 290. Features of the embodiment of FIG. 32E not discussed in further detail may be assumed to correspond to the features with equivalent reference numerals as discussed above, including any potential variations in the features.

In the alternative embodiment of FIG. 32D, an additional focal plane modifying lens 290 is provided between the non-anamorphic near-eye display apparatus 610 and the anamorphic near-eye display apparatus 100. The lens 290 may comprise a controllable Pancharatnam-Berry lens. The actuator 612 may optionally be omitted. The range of focal distances $\Delta Z_vA$ may be increased and the speed of control may be increased. User comfort may advantageously be increased.

Figure 32F:
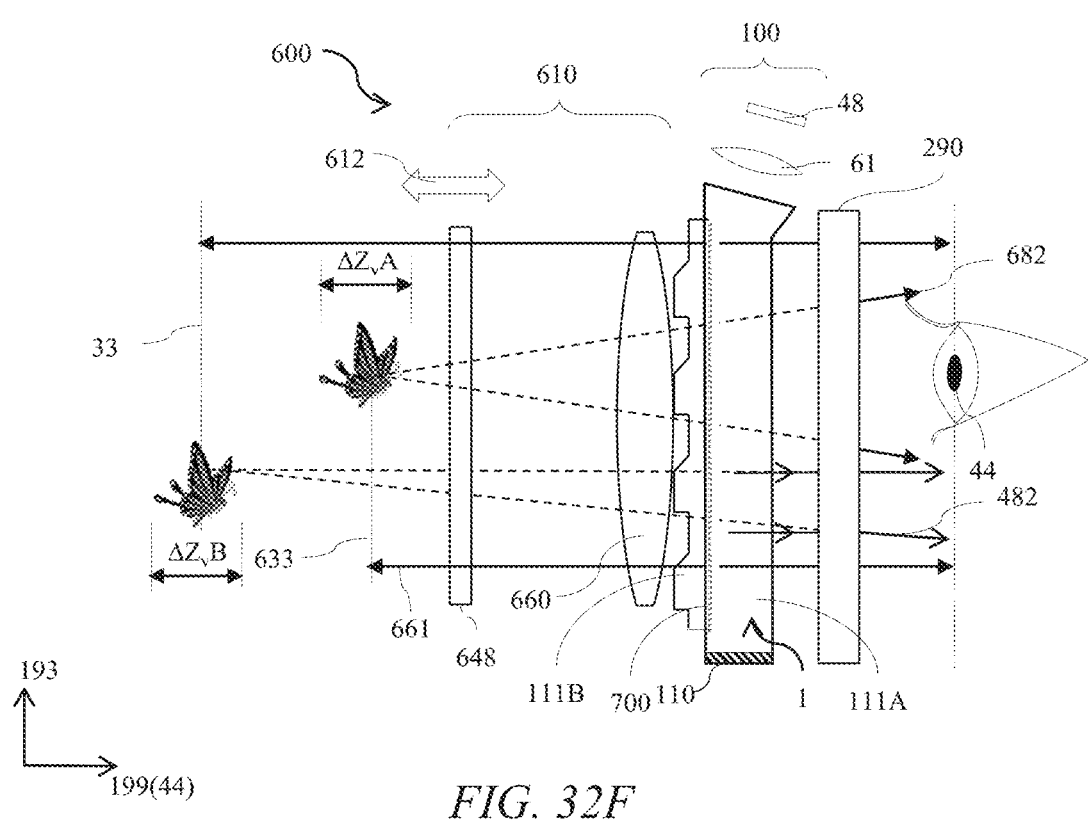
FIG. 32F is a schematic diagram illustrating in side view a head-worn display apparatus comprising a non-anamorphic near-eye display apparatus; an anamorphic extraction waveguide; and a focal plane modifying lens arranged to receive light from the non-anamorphic near-eye display apparatus and the anamorphic near-eye display apparatus.

FIG. 32F is a schematic diagram illustrating in side view a head-worn display apparatus comprising a non-anamorphic near-eye display apparatus 610; an anamorphic near-eye display apparatus 100; and a focal plane modifying lens 290 arranged to receive light from the non-anamorphic near-eye display apparatus and the anamorphic near-eye display apparatus. Features of the embodiment of FIG. 32F not discussed in further detail may be assumed to correspond to the features with equivalent reference numerals as discussed above, including any potential variations in the features.

In the alternative embodiment of FIG. 32F, the focal plane modifying lens 290 is arranged to provide finite virtual image distances 33, 633. Further, the focal plane modifying lens 290 may be controllable to achieve variable focal plane distances $\Delta Z_vA$, $\Delta Z_vB$ from the displays 610, 100 respectively. User comfort may advantageously be increased.

Figure 32G:
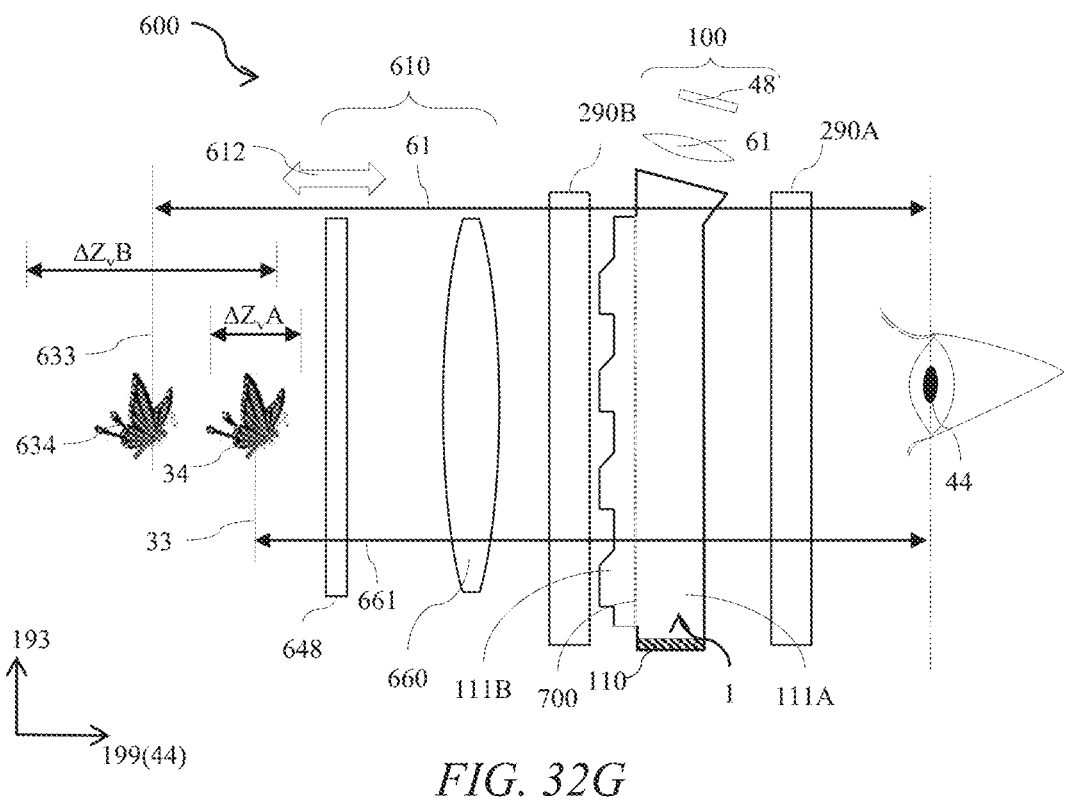
FIG. 32G is a schematic diagram illustrating in side view a head-worn display apparatus comprising a non-anamorphic near-eye display apparatus; an anamorphic extraction waveguide; and two focal plane modifying lenses.

FIG. 32G is a schematic diagram illustrating in side view a head-worn display apparatus 600 comprising a non-anamorphic near-eye display apparatus 610; an anamorphic near-eye display apparatus 100; and two focal plane modifying lenses 290A, 290B. Features of the embodiment of FIG. 32G not discussed in further detail may be assumed to correspond to the features with equivalent reference numerals as discussed above, including any potential variations in the features.

In comparison to the embodiments of FIGS. 32E-F, in the alternative embodiment of FIG. 32G, focal plane modifying lenses 290A, 290B are arranged with the anamorphic near-eye display apparatus 100 provided therebetween. Focal plane control of both virtual images 33, 633 may be provided. Advantageously user comfort may be further increased.

Figure 32H:
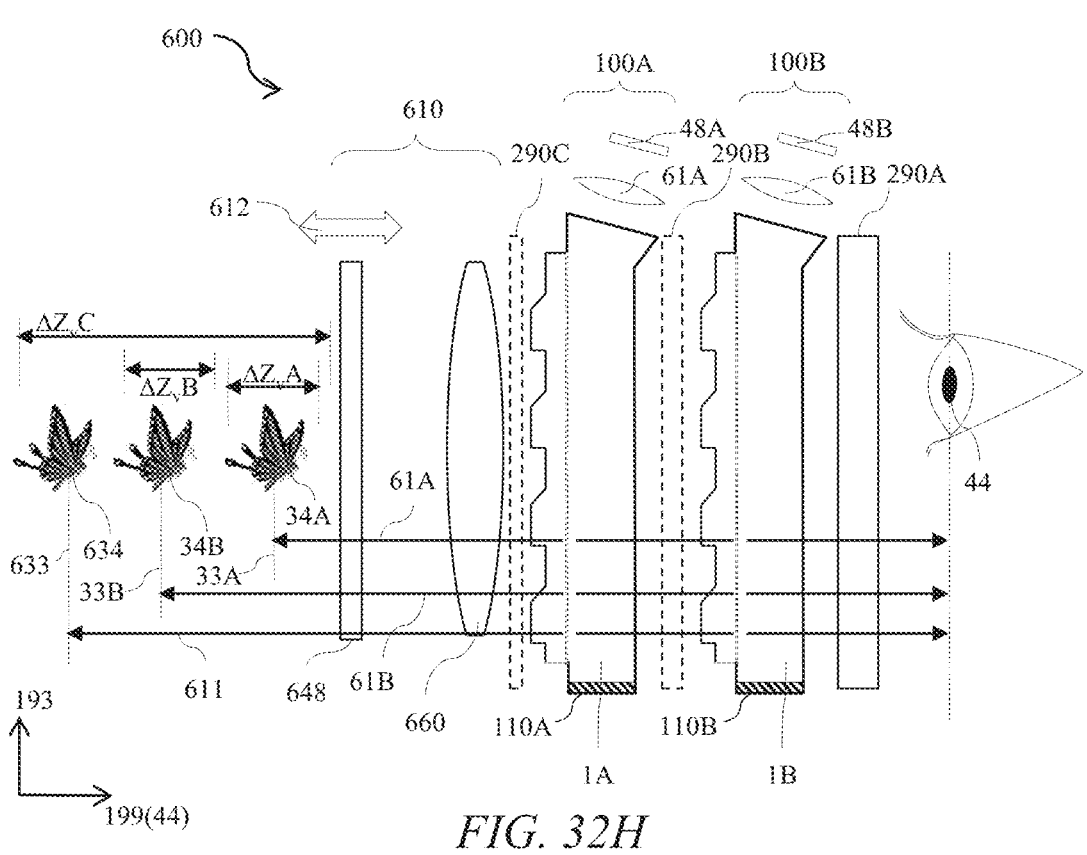
FIG. 32H is a schematic diagram illustrating in side view a head-worn display apparatus comprising a non-anamorphic near-eye display apparatus; two anamorphic extraction waveguides; and focal plane modifying lenses.

FIG. 32H is a schematic diagram illustrating in side view a head-worn display apparatus 600 comprising a non-anamorphic near-eye display apparatus 610; two anamorphic extraction waveguides 1100A, 100B; and focal plane modifying lenses 290A, 290B, 290C. Features of the embodiment of FIG. 32H not discussed in further detail may be assumed to correspond to the features with equivalent reference numerals as discussed above, including any potential variations in the features.

In the alternative embodiment of FIG. 32H, multiple images 33A, 33B, 634 may be provided with multiple focal ranges $\Delta Z_vA$, $\Delta Z_vB$, $\Delta Z_vC$ that may overlap. Focal plane control of virtual images 33A, 33B, 633 may be provided. Advantageously user comfort may be further increased.

Alternative arrangements of illumination systems and transverse anamorphic components 60 will now be described.

Figure 33A:
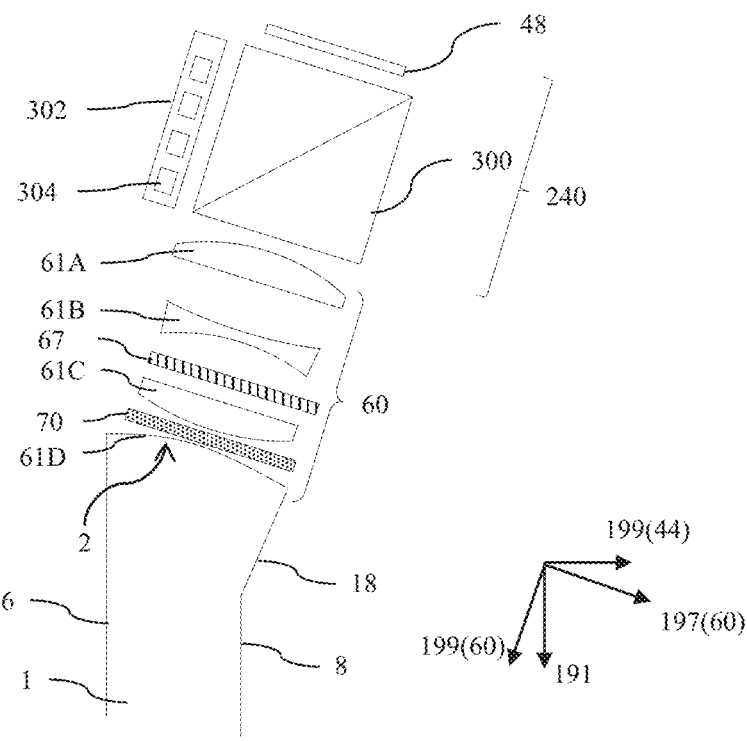
FIG. 33A is a schematic diagram illustrating in side view a detail of an arrangement of an input focusing lens.
Figure 33B:
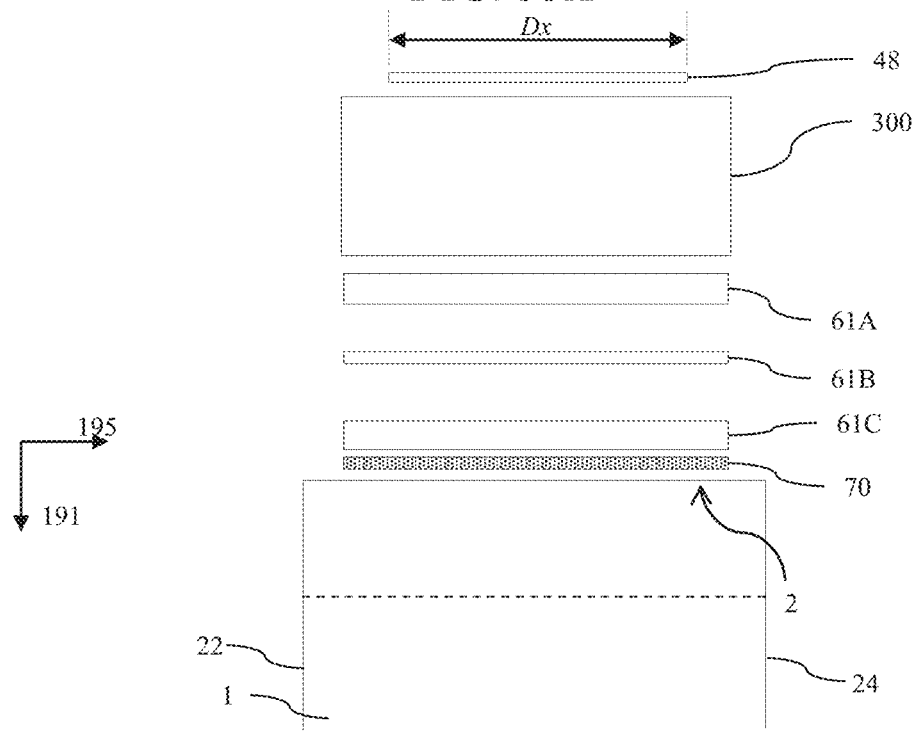
FIG. 33B is a schematic diagram illustrating in front view a detail of the arrangement of the input focusing lens of FIG. 33A.

FIG. 33A is a schematic diagram illustrating in side view a detail of an arrangement of a transverse lens 61 that forms a transverse optical component 60; and FIG. 33B is a schematic diagram illustrating in front view a detail of the arrangement of the transverse lens 61 of FIG. 33A. Features of the embodiment of FIGS. 33A-B not discussed in further detail may be assumed to correspond to the features with equivalent reference numerals as discussed above, including any potential variations in the features.

In the alternative embodiment of FIG. 33A, the transverse lens 61 forming the transverse anamorphic component 60 comprises a compound lens 61A-C. Further the compound lens 61A-C may comprise a lens 61D comprising the curved input end 2 of the extraction waveguide 1. FIG. 33B illustrates that the illumination system 240 and transverse anamorphic component 60 do not provide optical power in the lateral direction 195, that is the compound lenses 61A-D are cylindrical or elongate with a non-spherical surface profile, for example aspheric such as illustrated by the shapes of lenses 61A-B to achieve improved field aberrations and advantageously increased MTF at higher field angles.

Advantageously aberrations in the transverse direction 197(60) may be improved.

Further, the illumination system may comprise a reflective spatial light modulator 48, an illumination array 302 comprising light sources 304 and a beam combiner cube arranged to illuminate the spatial light modulator 48. The illumination array 302 may comprise different coloured light sources so that the spatial light modulator 48 may provide time sequential colour illumination.

FIG. 33A further illustrates that the transverse anamorphic component 60 may comprise a transverse diffractive component 67 that is provided with optical power in the transverse direction 197. The component 67 may have chromatic aberrations that are angularly varying so as to correct for chromatic aberrations from the refractive components 60A-D in the transverse direction 197. Colour blurring in the transverse direction 197 may advantageously be reduced.

FIG. 34A is a schematic diagram illustrating in side view a spatial light modulator arrangement 50 for use in the anamorphic near-eye display apparatus 100 of FIG. 1 comprising separate red, green and blue spatial light modulators 48R, 48G, 48B and a beam combining element 82. Features of the embodiment of FIG. 34A not discussed in further detail may be assumed to correspond to the features with equivalent reference numerals as discussed above, including any potential variations in the features.

The alternative embodiment of FIG. 34A illustrates that the illumination system 240 may comprise red, green and blue spatial light modulators 48R, 48G, 48B and a colour combining prism arrange to direct light rays 412R, 412G, 412B towards the transverse anamorphic component 60. Such an arrangement may be used to provide high resolution colour imagery from emissive spatial light modulators 48 for example. Emissive displays may be OLED on silicon or microLED on silicon spatial light modulators for example. Advantageously high resolution colour virtual images may be provided.

FIG. 34B is a schematic diagram illustrating in side view an illumination system 240 and transverse anamorphic component 60 for use in the anamorphic near-eye display apparatus 100 of FIG. 1A comprising a birdbath folded arrangement. Features of the embodiment of FIG. 34B not discussed in further detail may be assumed to correspond to the features with equivalent reference numerals as discussed above, including any potential variations in the features.

In the alternative embodiment of FIG. 34B, the spatial light modulator 48 illuminates a catadioptric illumination system 240 comprising input lens 79, curved mirror 86A and partially reflective mirror 81 such that rays 412 are directed into the input side 2 of the extraction waveguide 1. Advantageously chromatic aberrations in the transverse direction 197 may be reduced. The partially reflective mirror 81 may be a polarizing beam splitter or may be a thin metallised layer for example.

Additionally or alternatively curved mirror 86B may be provided to increase efficiency of operation.

FIG. 34C is a schematic diagram illustrating in side view a spatial light modulator 48 arrangement for use in an anamorphic near-eye display apparatus comprising a transverse anamorphic component 60 comprising a reflector 62. Features of the embodiment of FIG. 34C not discussed in further detail may be assumed to correspond to the features with equivalent reference numerals as discussed above, including any potential variations in the features.

In comparison to the embodiment of FIG. 1A, illumination system 240 comprises the spatial light modulator 48, reflector 62 and curved input end 2. The transverse anamorphic component 60 is an illustrative example of a catadioptric optical element comprising reflective and refractive surfaces of reflector 62, and input end 2 respectively. In other embodiments, not shown, the refractive components may be omitted and the transverse anamorphic component 60 may comprise only reflective surfaces with optical power and the input end 2 may be planar. In comparison to the refractive lens 61 described hereinabove, advantageously chromatic aberration of rays 414 input into the extraction waveguide 1 may be reduced.

Alternative arrangements of transverse anamorphic component 60 comprising input reflectors 62 will now be described.

Figure 35A:
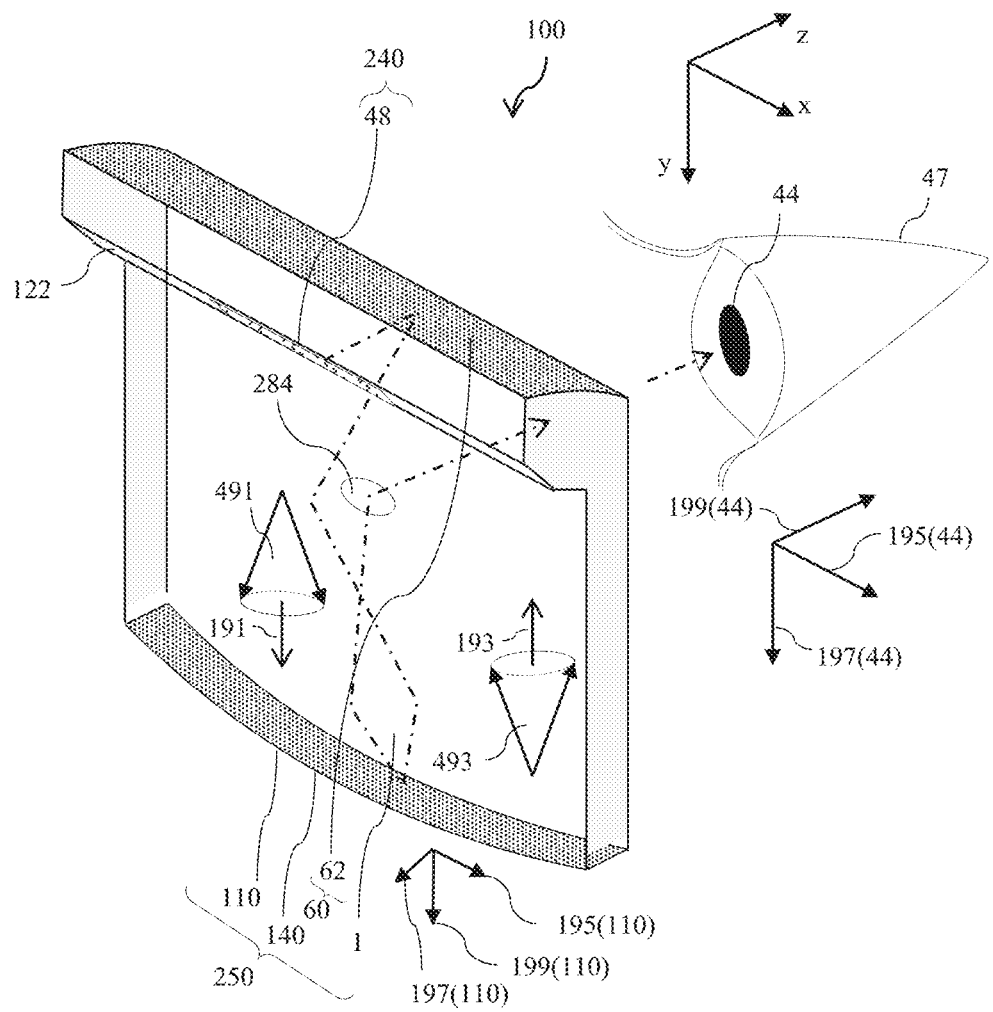
FIG. 35A is a schematic diagram illustrating a front perspective view of an anamorphic near-eye display apparatus comprising an input reflector.
Figure 35B:
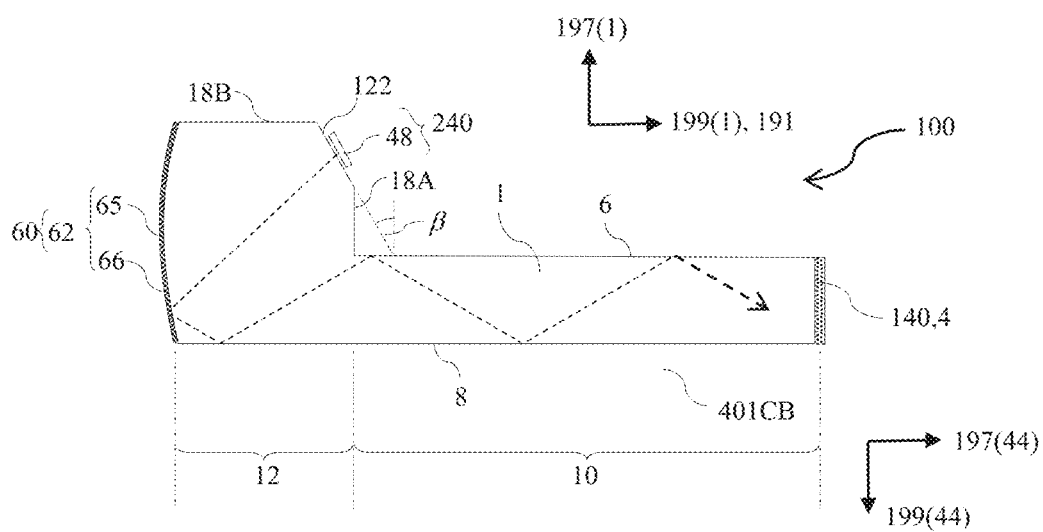
FIG. 35B is a schematic diagram illustrating a side view of the anamorphic near-eye display apparatus of FIG. 35A.
Figure 35C:
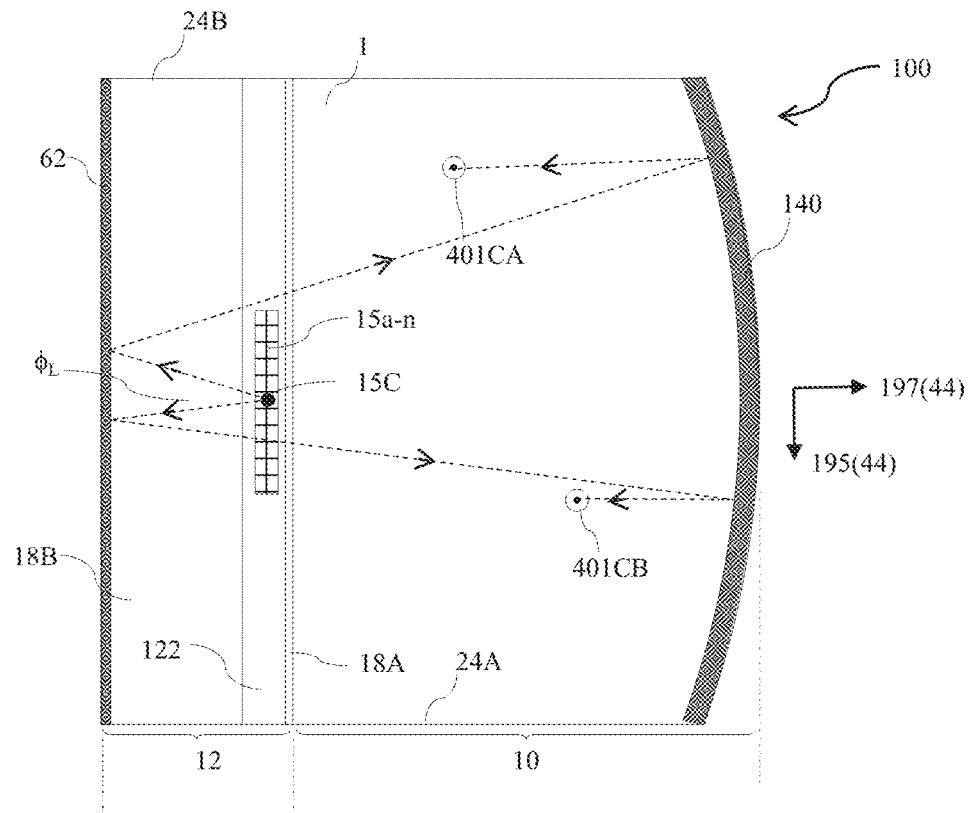
FIG. 35C is a schematic diagram illustrating a front view of the anamorphic near-eye display apparatus of FIG. 35A.

FIG. 35A is a schematic diagram illustrating a front perspective view of an anamorphic near-eye display apparatus 100 comprising an input reflector 62; FIG. 35B is a schematic diagram illustrating a side view of the anamorphic near-eye display apparatus 100 of FIG. 35A; and FIG. 35C is a schematic diagram illustrating a front view of the anamorphic near-eye display apparatus 100 of FIG. 35A. Features of the embodiment of FIGS. 35A-C not discussed in further detail may be assumed to correspond to the features with equivalent reference numerals as discussed above, including any potential variations in the features.

For clarity of explanation of the input section 12, in the alternative embodiments of FIGS. 35A-G, the polarization-sensitive reflector 700 and array of extraction features 170 are not illustrated. In construction, various embodiments of polarization-sensitive reflector 700 and array of extraction features 170 as described elsewhere herein are provided with the waveguide 1 to achieve light extraction.

In comparison to FIG. 1, in the alternative embodiment of FIGS. 35A-C, the optical system 250 comprises an input section 12 comprising an input reflector 62 that is the transverse anamorphic component 60 and is arranged to reflect the light from the illumination system 240 and direct it along the waveguide 1. The input section 12 further comprises an input face 122 disposed on a front or rear side 8, 6 of the waveguide 1 and facing the input reflector 62, and the input section 12 is arranged to receive the light from the illumination system 240 through the input face 122 wherein the input face 122 is disposed outwardly of one of the front or rear guide surfaces 8, 6 and the input section 12 is integral with the waveguide 1. The input section 12 further comprises a separation face 28 extending outwardly from the one of the front or rear guide surface 8, 6 to the input face 122. Extraction features in extraction region 284 may be of the types as illustrated elsewhere herein.

The embodiment of FIGS. 35A-G may be fabricated using a moulding process and reflective material 66 formed on curved surface 65 to provide the input reflector, for example by sputtering, evaporation or other known coating methods. Alternatively the reflective material 66 may comprise a reflective film such as ESR™ from 3M Corporation. Advantageously the cost and complexity of fabrication may be reduced.

It may be desirable to provide further control of optical aberrations in the transverse direction 197.

Figure 35D:
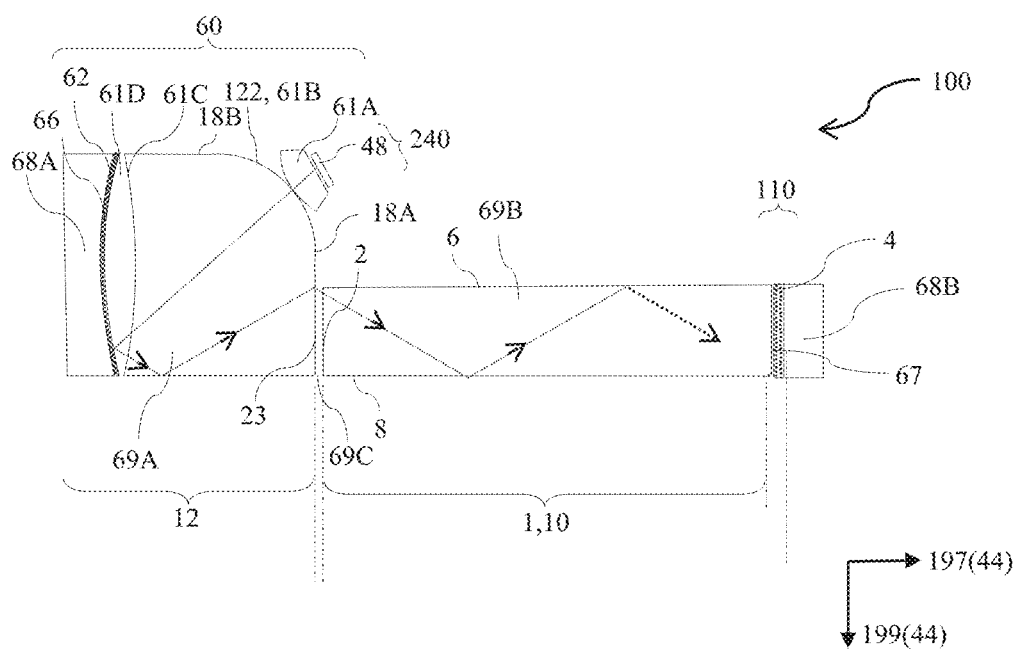
FIG. 35D is a schematic diagram illustrating a side view of an alternative anamorphic near-eye display apparatus comprising an input reflector.

FIG. 35D is a schematic diagram illustrating a side view of an alternative anamorphic near-eye display apparatus 100 comprising alternative input reflector 62 and lens 61. Features of the embodiment of FIG. 35D not discussed in further detail may be assumed to correspond to the features with equivalent reference numerals as discussed above, including any potential variations in the features.

In the alternative embodiment of FIG. 35D, the waveguide 1 has an end 2 that is an input face through which the waveguide 1 is arranged to receive light from the illumination system 240, and the input section 12 is a separate element from the waveguide 1 that further comprises an output face 23 and is arranged to direct light reflected by the input reflector 62 through the output face 23 and into the waveguide 1 through the input face 2 of the waveguide 1.

The transverse anamorphic component 60 further comprises a lens 61 wherein the lens 61 of the transverse anamorphic component 60 is a compound lens 61. Lens 61 may comprise a refractive element 61A. Further, lens 61 may comprise a lens 61B comprising the curved input surface 2 of the waveguide 1. Further, lens 61 may comprise a curved surface 61C and a material 61D that may be air or a material with a different refractive index to the refractive index of the waveguide 1 material. The lenses 61A-D may be arranged to reduce the aberrations of the input reflector 62 of FIGS. 1A-D. The transverse anamorphic component 60 is thus a catadioptric optical element comprising refractive and reflective optical functions. Advantageously the fidelity of the image may be improved in the transverse direction.

FIG. 35D further illustrates an alternative embodiment wherein the input reflector 62 is arranged on the surface of a member 68A. The surface of the input reflector 62 may advantageously be further protected. FIG. 35D further illustrates an alternative embodiment wherein the lateral anamorphic component 110 is a reflector arranged on the surface of a member 68B. The surface of the extraction reflector 140 may advantageously be further protected. The coatings 66, 67 may be formed on the members 68A, 68B respectively. Higher temperature processing conditions may be achieved than for coating of polymer waveguides 1. Advantageously cost may be reduced and efficiency of operation increased. Gap 69D may be provided between the waveguide 1 end 4 and member 68B, wherein the gap 69D may comprise air or a bonding material such as an adhesive.

In the alternative embodiment of FIG. 35D, the input section 12 is not integral with the waveguide 1. The waveguide 1 has an end that is an input face 2 through which the waveguide 1 is arranged to receive light from the illumination system 240, and the input section 12 is a separate element from the waveguide 1 that further comprises an output face 23 and is arranged to direct light reflected by the input reflector 62 through the output face 23 and into the waveguide 1 through the input face 2 of the waveguide 1. Further, the transverse anamorphic component 60 is disposed outside the waveguide 1, and the waveguide 1 is arranged to receive light 400 from the transverse anamorphic component 60 through the input face 2. In other words, FIG. 35D further illustrates an alternative embodiment wherein the input section 12 and the guide section 10 of the waveguide 1 are formed by separate members 69A, 69B respectively and aligned across gap 69C which may comprise air or a bonding material such as an adhesive. The members 69A, 69B may be formed separately during manufacture, reducing complexity of processing of the waveguide 1 surfaces and advantageously increasing yield.

It may be desirable to increase the size of spatial light modulator 48 in the transverse direction.

Figure 35E:
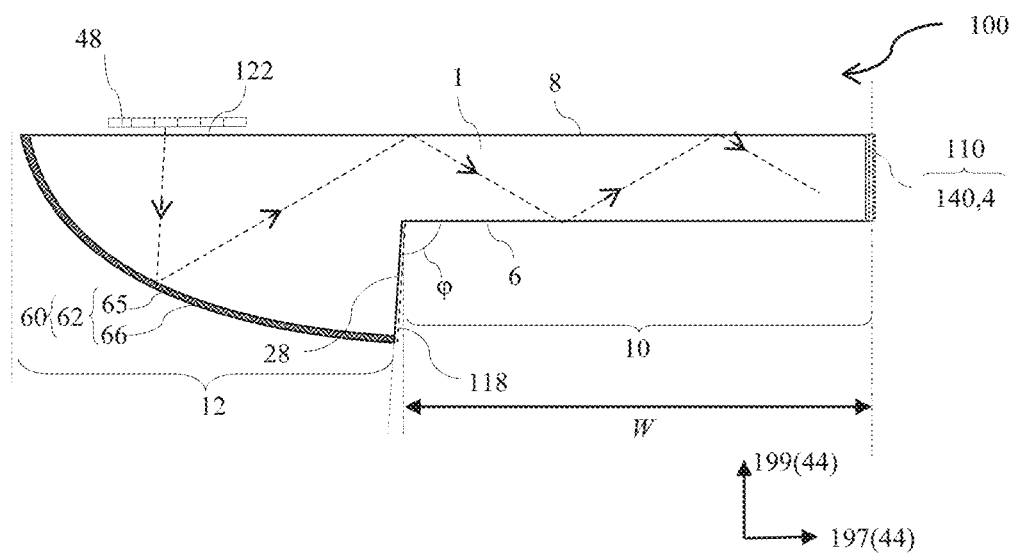
FIG. 35E is a schematic diagram illustrating a side view of an anamorphic near-eye display apparatus comprising an alternative input reflector.
Figure 35F:
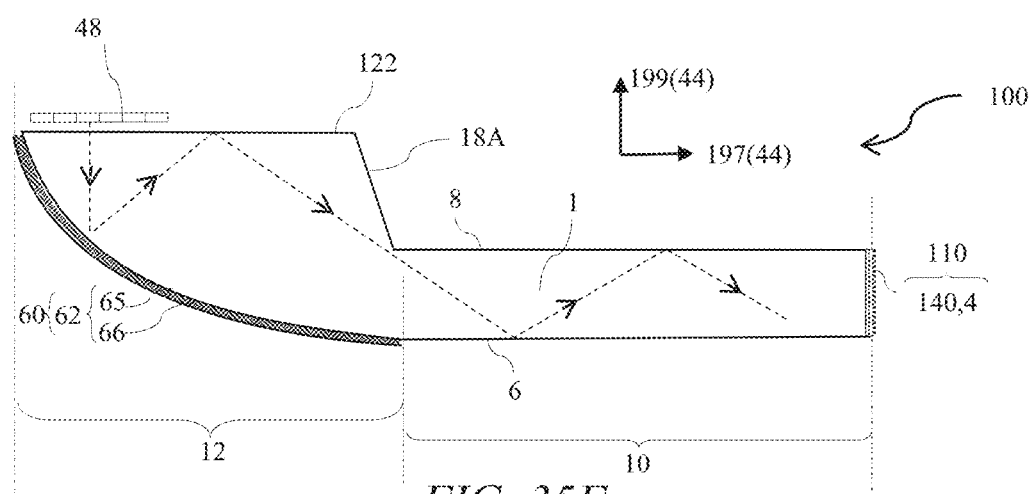
FIG. 35F is a schematic diagram illustrating a side view of an anamorphic near-eye display apparatus comprising an alternative input reflector.
Figure 35G:
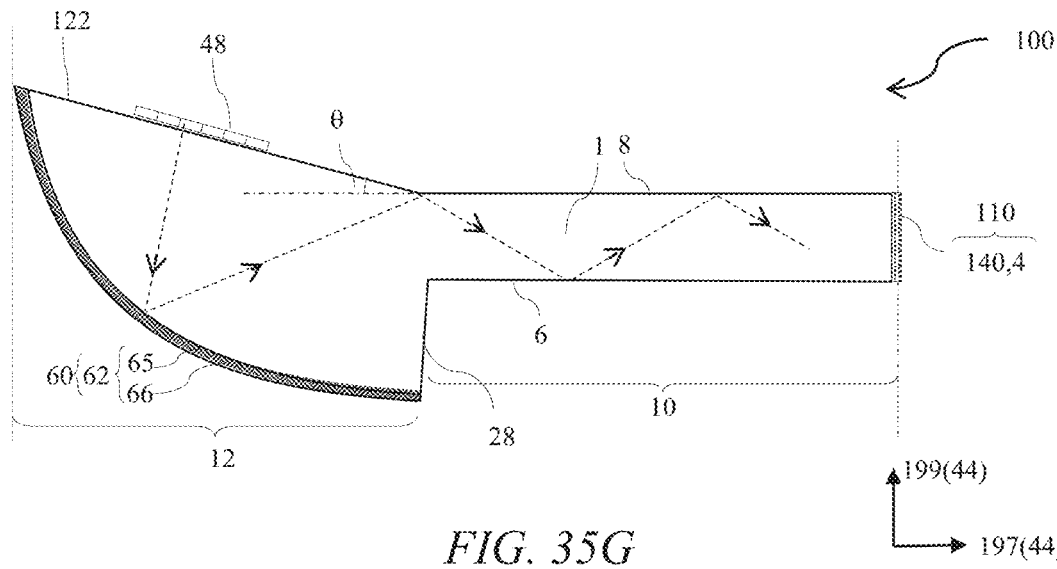
FIG. 35G is a schematic diagram illustrating a side view of an anamorphic near-eye display apparatus comprising an alternative input reflector.

FIGS. 35E-G are schematic diagrams illustrating in side views alternative embodiments of an anamorphic near-eye display apparatus 100 comprising an input reflector 62. Features of the embodiments of FIGS. 35E-G not discussed in further detail may be assumed to correspond to the features with equivalent reference numerals as discussed above, including any potential variations in the features.

In the alternative embodiments of FIGS. 35E-F input face 122 extends parallel to the front guide surface 8 in the case that the input face 122 is on the front side of the waveguide 1 or to the rear guide surface 6 in the case that the input face 122 is on the rear side of the waveguide 1. FIG. 35E comprises input face 122 that is coplanar with the front guide surface 8 in the case that the input face 122 is on the front side of the waveguide 1 or with the rear guide surface 6 in the case that the input face 122 is on the rear side of the waveguide 1. Advantageously the spatial light modulator 48 may be provided on a drive board that has a larger size.

In the alternative embodiment of FIG. 35F, input face 122 is offset and parallel with the front guide surface 8 in the case that the input face 122 is on the front side of the waveguide 1 or with the rear guide surface 6 in the case that the input face 122 is on the rear side of the waveguide 1. Advantageously the spatial light modulator 48 may be provided within or near to the arms 604 of the headwear 600.

In the alternative embodiment of FIG. 35G, the input face 122 extends at an acute angle θ to the front guide surface 8 in the case that the input face 122 is on the front side of the waveguide 1 or to the rear guide surface 6 in the case that the input face 122 is on the rear side of the waveguide 1. Advantageously a more convenient mechanical arrangement may be provided.

In the alternative embodiments of FIGS. 35E-G, the extraction features may be of the types as illustrated elsewhere herein.

Figure 36A:
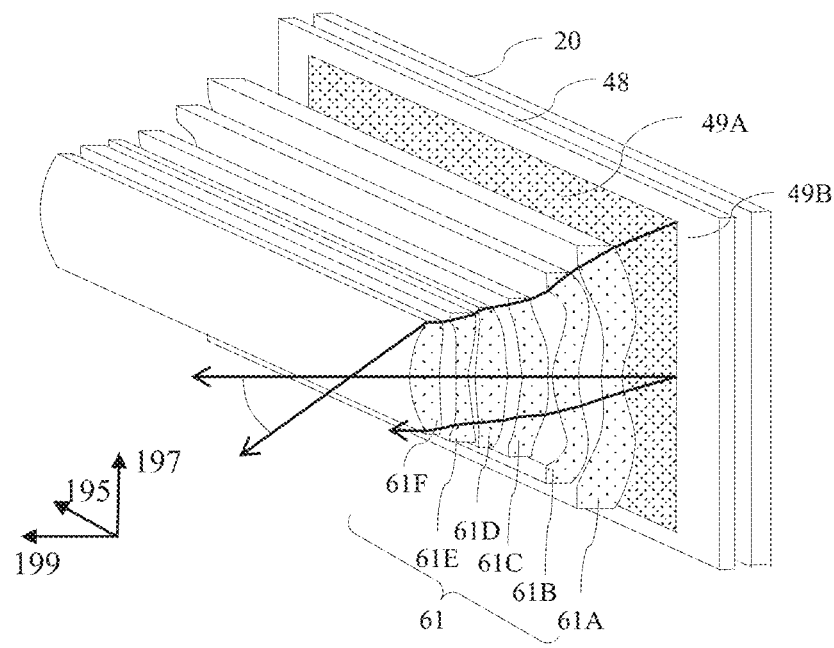
FIG. 36A is a schematic diagram illustrating in perspective front view an alternative arrangement of an input focusing lens.

FIG. 36A is a schematic diagram illustrating in perspective front view an alternative arrangement of an input focusing lens 61. Features of the embodiment of FIG. 36A not discussed in further detail may be assumed to correspond to the features with equivalent reference numerals as discussed above, including any potential variations in the features.

Spatial light modulator 48 comprises active area 49A and border 49B and is aligned to the lens of the transverse anamorphic component 60 that is a compound lens comprising lenses 60A-F. Some of the lenses 60A-F may comprise surfaces that have a constant radius and some may comprise variable radius surfaces such that in combination aberration correction is advantageously improved.

Alternative arrangements of spatial light modulator 48, illumination system 240 and optical system 250 will now be described.

Figure 36B:
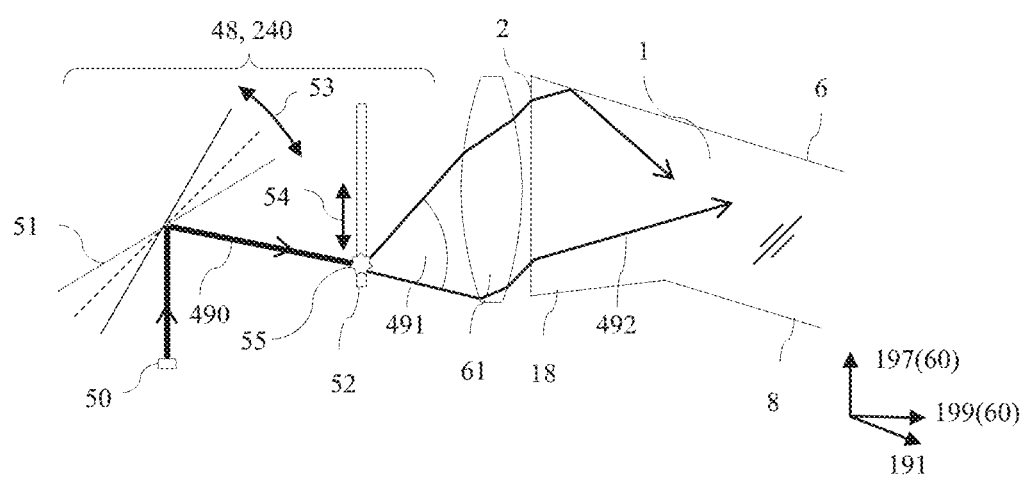
FIG. 36B is a schematic diagram illustrating in side view a spatial light modulator arrangement for use in the anamorphic near-eye display apparatus of FIG. 1 comprising a spatial light modulator comprising a laser scanner and light diffusing screen.

FIG. 36B is a schematic diagram illustrating in side view a spatial light modulator arrangement for use in the anamorphic near-eye display apparatus of FIG. 1 comprising a spatial light modulator 48 comprising a laser 50, a scanning arrangement 51 and a light diffusing screen 52. Features of the embodiment of FIG. 36B not discussed in further detail may be assumed to correspond to the features with equivalent reference numerals as discussed above, including any potential variations in the features.

In the alternative embodiment of FIG. 36B, the spatial light modulator 48 comprises the laser 50 arranged to direct a beam 490 towards scanning arrangement 51 that may be a rotating mirror for example, with oscillation 53 that is synchronised to the image data.

The beam 490 is arranged to illuminate a screen 52 to provide a diffuse light source 55 at the screen. The screen 52 may comprise a diffusing arrangement so that the transmitted light is diffused into light cone 491 arranged to provide input light rays 492 into the transverse anamorphic component 60 and extraction waveguide 1.

The screen 52 may alternatively comprise a photoemission layer such as a phosphor laser at which the laser beam 490 is arranged to produce emission from the photoemission layer. The output colour can advantageously be independent of the laser 50 emission wavelength. Further laser speckle may be reduced.

The laser 50 may comprise a one dimensional array of laser emitting pixels 222 across a row 221T and the scanning arrangement 51 may provide one dimensional array of light sources 55 at the screen 52 for each addressable row of the spatial light modulator 48. The scanning speed of the scanning arrangement 51 is reduced, advantageously achieving reduced cost and complexity.

Alternatively the laser 50 may comprise a single laser emitter and the scanning arrangement 51 may provide two dimensional scanning of the beam 490 to achieve a two dimensional pixel array of emitters 55 at the screen 52. Advantageously laser 50 cost may be reduced.

Further arrangements comprising laser sources will now be described.

Figure 37A:
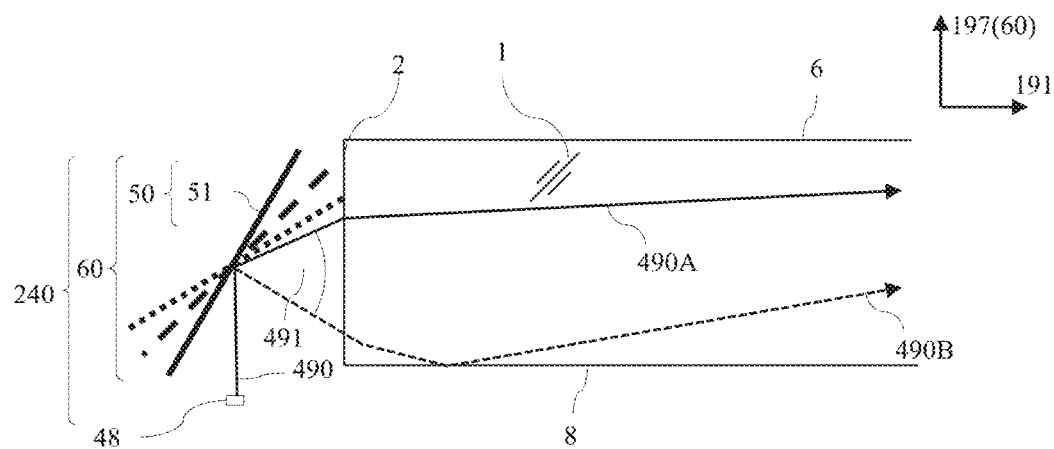
FIG. 37A is a schematic diagram illustrating in side view input to the extraction waveguide comprising a laser sources and scanning arrangement.
Figure 37B:
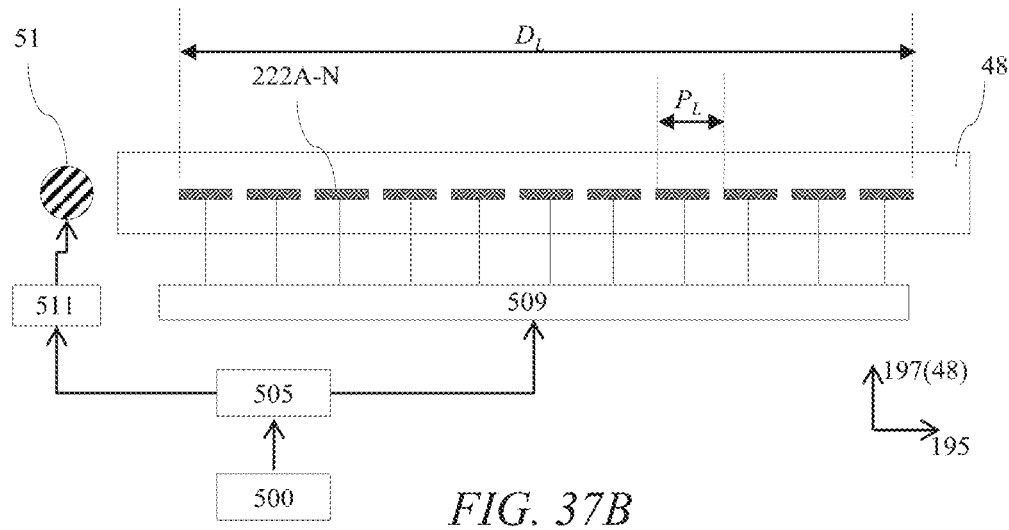
FIG. 37B is a schematic diagram illustrating in front view a spatial light modulator arrangement comprising an array of laser light sources for use in the arrangement of FIG. 37A.
Figure 37C:
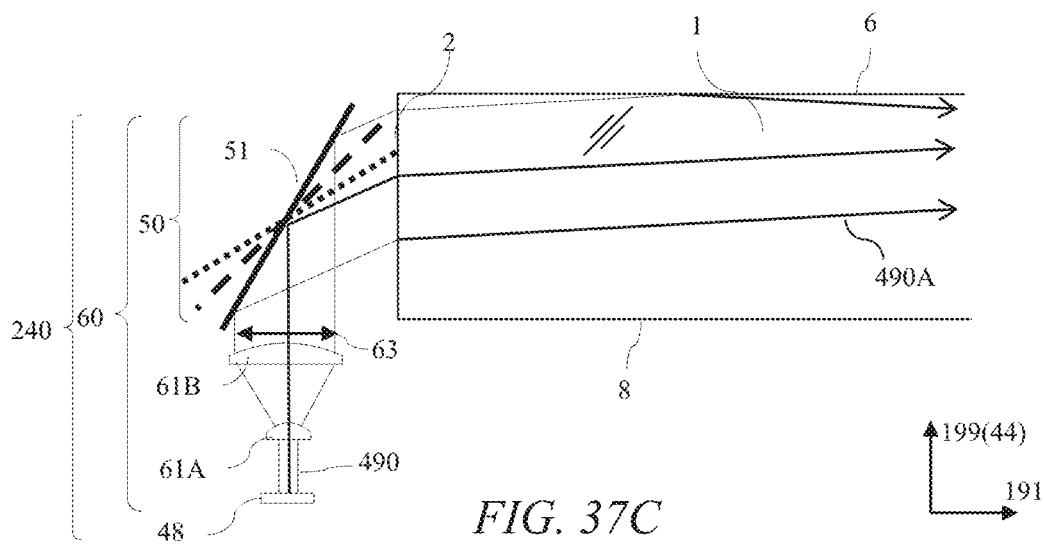
FIG. 37C is a schematic diagram illustrating in side view a spatial light modulator arrangement comprising an array of laser light sources, a beam expander and a scanning mirror.

FIG. 37A is a schematic diagram illustrating in side view input to the extraction waveguide 1 comprising a spatial light modulator 48 comprising laser sources and a deflector element 50; FIG. 37B is a schematic diagram illustrating in front view a spatial light modulator 48 comprising a row of laser light sources 222A-N for use in the arrangement of FIG. 37A; and FIG. 37C is a schematic diagram illustrating an alternative illumination arrangement. Features of the embodiment of FIGS. 37A-C not discussed in further detail may be assumed to correspond to the features with equivalent reference numerals as discussed above, including any potential variations in the features.

The alternative embodiment of FIG. 37A comprises a transverse anamorphic component 60 that is formed by a deflector element 50 that comprises scanning mirror 51.

FIG. 37B illustrates a spatial light modulator 48 suitable for use in the arrangement of FIG. 37A comprising a one dimensional array of pixels 222A-N wherein the pixels 222A-N each comprise a laser source. Control system 500 is arranged to supply line-at-a-time image data to spatial light modulator 48 controller 505 that outputs pixels data to laser pixels 222A-N by means of driver 509; and location data to deflector element 50 by means of scanner driver 511. The laser pixels 222A-N are arranged in a single row with pitch $P_L$ in the lateral direction 195 that is the same as illustrated in FIG. 2D for example.

Returning to the description of FIG. 37A, in operation, image data for a first addressed row of image data are applied to the laser pixels 222A-N and the deflector element 50 adjusted so that the laser light from the spatial light modulator 48 is directed as ray 490A in a first direction across the transverse direction 197. At a different time, image data for a different addressed row of image data are applied to the laser pixels 222A-N and the deflector element 50 adjusted so that the laser light from the spatial light modulator 48 is directed as ray 490B in a different direction across the transverse direction 197. The transverse anamorphic component 60 is thus arranged to receive light from the spatial light modulator 48 and the illumination system 240 is arranged so that light output from the transverse anamorphic component 60 is directed in directions illustrated by rays 490A, 490B that are distributed in the transverse direction 197 with cone 491.

In other words, the deflector element 50 scans about the lateral direction 197(60) and serves to provide illustrative light rays 490A, 490B sequentially. By means of sequential scanning, the deflector element 50 effectively has positive optical power in the transverse direction 197(60) for light from the spatial light modulator 48, achieving output cone 491 in a sequential manner. In this manner, the deflector element 50 directs light in directions that are distributed in the transverse direction, allowing it to serve as a transverse anamorphic component 60. The scanning of the deflector element 50 may be arranged not to direct light near to parallel to the direction 191 along the extraction waveguide 1. Advantageously double imaging is reduced.

Advantageously the cost and complexity of the illumination system 240 and transverse anamorphic component 60 may be reduced.

The alternative embodiment of FIG. 37C provides beam expander 61A, 61B that increases the width 63 of the output beam from the illumination system 240. In FIG. 37C, the illumination system 240 further comprises a deflector element 50 arranged to deflect light output from the transverse anamorphic component 60 by a selectable amount, the deflector element 50 being selectively operable to direct the light output from the transverse anamorphic component 60 in the directions that are distributed in the transverse direction 197. Advantageously uniformity of the output image from across the exit pupil 40 is provided.

It may be desirable to provide a tracking sensor to determine the location of the pupil of a viewer.

FIG. 38A is a schematic diagram illustrating in perspective front view an anamorphic near-eye display apparatus 100 comprising an eye tracking arrangement 750; FIG. 38B is a schematic diagram illustrating in side view an anamorphic near-eye display apparatus 100 comprising an eye tracking arrangement 750 with a transmissive hole 752 arranged at the reflective end; and FIG. 38C is a schematic diagram illustrating in side view an anamorphic near-eye display apparatus 100 comprising an eye tracking arrangement 750 with a partially transmissive reflector arranged with the light reversing reflector 140. Features of the embodiments of FIGS. 38A-C not discussed in further detail may be assumed to correspond to the features with equivalent reference numerals as discussed above, including any potential variations in the features.

In the alternative embodiment of FIGS. 38-C, the extraction waveguide 1 is illustrated with stepped extraction features 170 although other extraction reflectors such as those described hereinbefore may be provided as alternatives.

In the alternative embodiments of FIGS. 38A-B, a hole is provided in the light reversing reflector 140. In operation, some light from the eye 45 may be reflected into the extraction waveguide 1 and directed towards the light reversing reflector 140. Some light rays 760 incident on the hole 752 are directed onto an optional lens 756 and an optical sensor 754 arranged to collect the received image data for the location 745 at the sensor of the image of the eye 45. The image of the eye 45 may be directed to multiple locations 745 from the respective extraction features 170 and from guiding of light in the extraction waveguide 1. A machine learning algorithm may be implemented in the position location estimation unit 545 to determine most likely eye 45 location on the basis of the image from the sensor 754 with locations 745. The eye location data is returned to the control system 500. The control system may be adjusted to optimise the image quality for the measured eye 45 location, advantageously increasing image quality.

In the alternative embodiment of FIG. 38C, the light reversing reflector 140 may be partially transmitting, for example to infra-red illumination of the eye 45 by rays 707 provided by light source 756 arranged at the input end 2 of the extraction waveguide 1. Advantageously improved uniformity of output of image data to the eye 45 may be achieved.

The illumination system 240 and optical system 250 of the embodiments hereinabove may be provided for anamorphic directional illumination devices for illumination of external scenes 479.

Figure 39A:
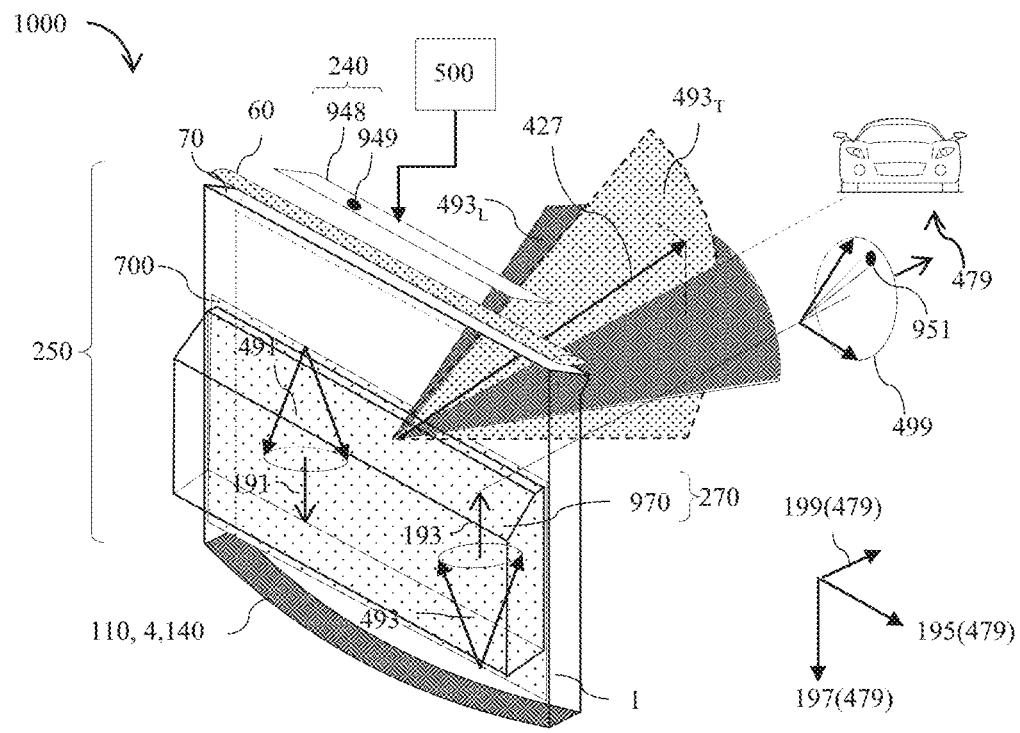

FIG. 39A is a schematic diagram illustrating in front perspective view an anamorphic directional illumination device 1000 arranged to illuminate a scene 479. Features of the embodiment of FIG. 39A not discussed in further detail may be assumed to correspond to the features with equivalent reference numerals as discussed above, including any potential variations in the features.

The alternative embodiment of FIG. 39A illustrates an anamorphic directional illumination device 1000 that comprises an illumination system 240 comprising a light source array 948, the illumination system being arranged to output light. Light source array 948 may for example comprise an array of light emitting diodes, or may be provided by a spatial light modulator 48 as described elsewhere herein.

Optical system 250 is arranged to direct light from the illumination system 240. The light in light cone 499 may be directed towards an externally illuminated scene 479. Illuminated scenes 479 may include but are not limited to roads, rooms, external spaces, processing equipment, metrology environments, theatrical stages, human bodies such as for face illumination for face detection and measurement purposes.

The optical system 250 has an optical axis 199 and has anamorphic properties in a lateral direction 195 and a transverse direction 197 that are perpendicular to each other and perpendicular to the optical axis 199, wherein the light source array 948 comprises light sources 949a-n distributed in the lateral direction 195, and which may further be distributed in the transverse direction 197 as described elsewhere herein.

The optical system 250 further comprises a transverse anamorphic component 60 having positive optical power in the transverse direction 197, wherein the transverse anamorphic component 60 is arranged to receive light from the light source array 948 and the illumination system 250 is arranged so that light output from the transverse anamorphic component 60 is directed in directions that are distributed in the transverse direction 197.

The optical system 250 further comprises an extraction waveguide 1 arranged to receive light from the transverse anamorphic component 60 and a lateral anamorphic component 110 having positive optical power in the lateral direction 195, the extraction waveguide 1 being arranged to guide light in light cone 491 from the transverse anamorphic component 60 to the lateral anamorphic component 110 along the extraction waveguide 1 in a first direction 191.

A light reversing reflector 140 is arranged to reflect light that has been guided along the extraction waveguide 1 in the first direction 191 so that the reflected light in light cone 493 is guided along the extraction waveguide 1 in a second direction 193 opposite to the first direction 191.

The extraction waveguide 1 comprises: a front guide surface 8; a polarization-sensitive reflector 700 opposing the front guide surface 8; and an extraction element 270 disposed outside the polarization-sensitive reflector 700, the extraction element 270 comprising: a rear guide surface 6 opposing the front guide surface 8; and at least one extraction feature 970; the anamorphic directional illumination device 1000 is arranged to provide light in cone 491 guided along the extraction waveguide 1 in the first direction 191 with an input linear polarization state 902 before reaching the polarization-sensitive reflector 700; and the optical system further comprises a polarization conversion retarder 72 disposed between the polarization-sensitive reflector 700 and the light reversing reflector 140, wherein the polarization conversion retarder 72 is arranged to convert a polarization state of light passing therethrough between a linear polarization state and a circular polarization state, and the polarization conversion retarder 72 and the light reversing reflector 140 are arranged in combination to rotate the input linear polarization state 902 of the light guided in the first direction 191 so that the light guided in the second direction 193 and output from the polarization conversion retarder 72 has an orthogonal linear polarization state 904 that is orthogonal to the input linear polarization state 902; the polarization-sensitive reflector 700 is arranged to reflect light in cone 491 guided in the first direction 191 having the input linear polarization state 902 and to pass light guided in the second direction 193 having the orthogonal linear polarization state 904, so that the front guide surface 8 and the polarization-sensitive reflector 700 are arranged to guide light in the first direction 191, and the front guide surface 8 and the rear guide surface 6 are arranged to guide light in the second direction 193; and the at least one extraction feature 970 is arranged to extract light guided along the extraction waveguide 1 in the second direction 193 through the front guide surface 8.

The anamorphic directional illumination device 1000 of FIG. 39A may comprise various embodiments arranged to improve efficiency and image quality as described elsewhere herein.

By way of comparison with the anamorphic near-eye display apparatuses 100 described hereinabove, the output light from the anamorphic directional illumination device 1000 is provided as illumination cones 951a-n for illumination of a scene 479 compared to the angular pixel information for illumination of pupil 44 and retina 46. High resolution imaging of illuminated scenes 479 may be achieved with high efficiency and low cost in a compact package.

The light sources 949 may output light that is visible light or infra-red light. Advantageously directional illumination of scenes 479 may be provided for visible illumination or illumination of scenes for other detectors such as LIDAR detectors. The light sources 949 may have different spectral outputs. The different spectral outputs may include: a white light spectrum, plural different white light spectra, red light, orange light, and/or infra-red light. A visible illumination may be provided and a further illumination for detection purposes may also be provided, which may have different illumination structures to achieve improved signal to noise of detection.

In an alternative embodiment, the scene 479 may comprise a projection screen and the anamorphic directional illumination device 1000 may provide projection of images onto the projection screen. Advantageously a lightweight and portable image projector with high efficiency may be provided in a thin package.

The reflective extraction feature 970 of FIG. 39A may alternatively be provided by an array of light extraction features 970a-n. Advantageously the aesthetic appearance of the directional illumination appearance may be modified. Alternatively the reflective extraction feature 970 may be provided by at least one of reflective extraction feature 270 as described elsewhere hereinabove and may comprise at least one feature such as but not limited to extraction reflectors 170, 172, 12, 186, 180, 289 and diffractive extraction features 280, 282. Alternative embodiments of light source array 948 may be provided by embodiments of spatial light modulator 48 as described hereinabove, for example in FIGS. 2A-D, FIG. 36, and FIGS. 37A-C. The transverse anamorphic component 60 may alternatively comprise a one or more lenses such as illustrated with reference to FIG. 17D, FIG. 36A, FIG. 33A-B, FIGS. 34A-B and FIG. 35. Aberration control and power of anamorphic components 60, 110 may be further improved by the Pancharatnam-Berry lenses of FIGS. 28A-C, FIG. 29 and FIG. 30 for use in the lateral anamorphic component 110 and/or transverse anamorphic component 60. The features mentioned above may be provided in isolation or in combination.

Further alternative embodiments of waveguide 1 arrangements, transverse anamorphic component 60 arrangements, lateral anamorphic component 110 arrangements and extraction feature 970 arrangements may be provided as described elsewhere hereinabove.

Figure 39B:
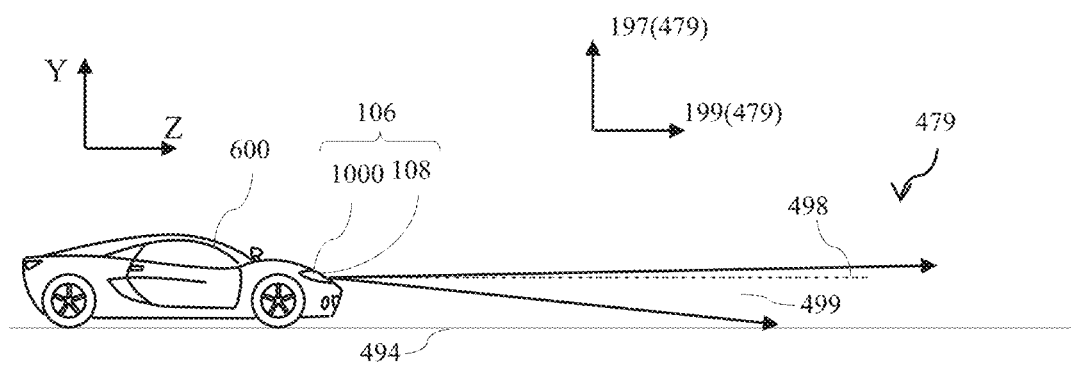

FIG. 39B is a schematic diagram illustrating a side view of a road scene 479 comprising a vehicle 600 comprising a vehicle external light apparatus 106 comprising the anamorphic directional illumination device 1000 of FIG. 39A. Features of the embodiment of FIG. 39B not discussed in further detail may be assumed to correspond to the features with equivalent reference numerals as discussed above, including any potential variations in the features.

The alternative embodiment of FIG. 39B illustrates a vehicle external light apparatus 106 comprising an anamorphic directional illumination device 1000 such as illustrated in FIG. 39A that is a vehicle external light device mounted on a housing 108 for fitting to a vehicle 600. The vehicle external light apparatus 106 is arranged to illuminate an external scene 479 such as a road environment. The vehicle external light apparatus 106 provides output light cone 499 so that the horizon 499 and road surface 494 may be illuminated. In the example of FIG. 39B the cross section of light cone 499 is distributed across the transverse direction 197. In alternative embodiments the cross section of light cone 499 may be distributed across the lateral direction 195.

The light source array 948 may be controlled by controller 500 in response to the location of objects such as other drivers or road hazards in the illuminated scene 479. The light cone 499 may be arranged to illuminate a two dimensional array of light cones 951 corresponding to respective light sources 949. The light sources 949a-n may be individually or collectively controllable so that some parts of the scene 479 are illuminated and other parts are not illuminated or illuminated with different illuminance. Advantageously glare to other drivers may be reduced while providing increased levels of illuminance of the road scene 479.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

The invention claimed is:

1. An anamorphic near-eye display apparatus comprising:
an illumination system comprising a spatial light modulator, the illumination system being arranged to output light; and
an optical system arranged to direct light from the illumination system to a viewer's eye, wherein the optical system has an optical axis and has anamorphic properties in a lateral direction and a transverse direction that are perpendicular to each other and perpendicular to the optical axis, wherein the spatial light modulator comprises pixels distributed in the lateral direction, and the optical system comprises:
a transverse anamorphic component having positive optical power in the transverse direction, wherein the transverse anamorphic component is arranged to receive light from the spatial light modulator and the illumination system is arranged so that light output from the transverse anamorphic component is directed in directions that are distributed in the transverse direction;
an extraction waveguide arranged to receive light from the transverse anamorphic component;
a lateral anamorphic component having positive optical power in the lateral direction, the extraction waveguide being arranged to guide light from the transverse anamorphic component to the lateral anamorphic component along the extraction waveguide in a first direction; and
a light reversing reflector that is arranged to reflect light guided along the extraction waveguide in the first direction to form light that is guided along the extraction waveguide in a second direction opposite to the first direction,
wherein:
the extraction waveguide comprises:
a front guide surface;
a polarization-sensitive reflector opposing the front guide surface; and
an extraction element disposed outside the polarization-sensitive reflector, the extraction element comprising:
  a rear guide surface opposing the front guide surface; and an array of extraction features;
  the anamorphic near-eye display apparatus is arranged to provide light guided along the extraction waveguide in the first direction with an input linear polarization state before reaching the polarization-sensitive reflector; and
  the optical system further comprises a polarization conversion retarder disposed between the polarization-sensitive reflector and the light reversing reflector, wherein the polarization conversion retarder is arranged to convert a polarization state of light passing therethrough between a linear polarization state and a circular polarization state, and the polarization conversion retarder and the light reversing reflector are arranged in combination to rotate the input linear polarization state of the light guided in the first direction so that the light guided in the second direction and output from the polarization conversion retarder has an orthogonal linear polarization state that is orthogonal to the input linear polarization state;
  the polarization-sensitive reflector is arranged to reflect light guided in the first direction having the input linear polarization state and to pass light guided in the second direction having the orthogonal linear polarization state, so that the front guide surface and the polarization-sensitive reflector are arranged to guide light in the first direction, and the front guide surface and the rear guide surface are arranged to guide light in the second direction; and
  the array of extraction features is arranged to extract light guided along the extraction waveguide in the second direction towards an eye of a viewer through the front guide surface, the array of extraction features being distributed along the extraction waveguide so as to provide exit pupil expansion in the transverse direction;
  wherein the polarization conversion retarder has a retardance of a quarter wavelength at a wavelength of visible light.

2. An anamorphic near-eye display apparatus according to claim 1, wherein the polarization-sensitive reflector comprises a reflective linear polarizer.

3. An anamorphic near-eye display apparatus according to claim 1, wherein the input linear polarization state is a p-polarization state in the extraction waveguide, or the input linear polarization state is an s-polarization state in the extraction waveguide.

4. An anamorphic near-eye display apparatus according to claim 1, wherein the optical system further comprises an input linear polarizer that is disposed between the spatial light modulator and the polarization-sensitive reflector and is arranged to pass light having the input linear polarization state.

5. An anamorphic near-eye display apparatus according to claim 4, wherein the input linear polarizer is disposed between the spatial light modulator and the extraction waveguide.

6. An anamorphic near-eye display apparatus according to claim 4, wherein the input linear polarizer is disposed within the extraction waveguide.

7. An anamorphic near-eye display apparatus according to claim 4, wherein the input linear polarizer is disposed after the transverse anamorphic component, and the optical system further comprises a polarization conversion retarder disposed between the transverse anamorphic component and the input linear polarizer, the polarization conversion retarder being arranged to convert a polarization state of light passing therethrough between a linear polarization state and a circular polarization state.

8. An anamorphic near-eye display apparatus according to claim 4, wherein the illumination system is arranged to output light that is unpolarized.

9. An anamorphic near-eye display apparatus according to claim 1, wherein the illumination system is arranged to output light having the input linear polarization state.

10. An anamorphic near-eye display apparatus according to claim 1, wherein the extraction features are elongate in the lateral direction.

11. An anamorphic near-eye display apparatus according to claim 1, wherein the rear guide surface comprises extraction facets that are the extraction features, each extraction facet being arranged to reflect light guided in the second direction towards an eye of a viewer through the front guide surface.

12. An anamorphic near-eye display apparatus according to claim 11, wherein the rear guide surface comprises plural prisms that protrude outwardly, the prisms each comprising at least one extraction facet and at least one draft facet.

13. An anamorphic near-eye display apparatus according to claim 12, wherein at least one of the prisms comprises plural draft facets, and an intermediate guide facet arranged between each adjacent pair of the plural draft facets.

14. An anamorphic near-eye display apparatus according to claim 12, wherein the prisms each further comprise a primary guide facet between the at least one extraction facet and the at least one draft facet.

15. An anamorphic near-eye display apparatus according to claim 12, wherein the rear guide surface comprises guide portions between the prisms.

16. An anamorphic near-eye display apparatus according to claim 1, wherein the rear guide surface comprises a surface relief grating comprising the extraction features.

17. An anamorphic near-eye display apparatus according to claim 1, wherein the extraction element comprises an array of extraction reflectors disposed internally within the extraction waveguide.

18. An anamorphic near-eye display apparatus according to claim 17, wherein the array of extraction reflectors is arranged between the polarization-sensitive reflector and the rear light guide surface.

19. An anamorphic near-eye display apparatus according to claim 17, wherein the array of extraction reflectors have reflectivities defined across their overall area that increase with increasing distance along the second direction along the extraction waveguide.

20. An anamorphic near-eye display apparatus according to claim 17, wherein the extraction reflectors comprise extraction surfaces spaced apart by a partially reflective coating.

21. An anamorphic near-eye display apparatus according to claim 20, wherein the partially reflective coating comprises at least one dielectric layer.

22. An anamorphic near-eye display apparatus according to claim 21, wherein the at least one dielectric layer comprises a stack of dielectric layers.

23. An anamorphic near-eye display apparatus according to claim 18, wherein the partially reflective coating is metallic.

24. An anamorphic near-eye display apparatus according to claim 17, wherein the extraction reflectors extend partially across the extraction waveguide between opposing rear and front guide surfaces of the extraction waveguide with successively shifted positions.

25. An anamorphic near-eye display apparatus according to claim 24, further comprising intermediate reflectors extending along the extraction waveguide between adjacent pairs of extraction reflectors.

26. An anamorphic near-eye display apparatus according to claim 1, wherein the polarization-sensitive reflector comprises at least one dielectric layer.

27. An anamorphic near-eye display apparatus according to claim 26, wherein the at least one dielectric layer comprises a stack of dielectric layers.

28. An anamorphic near-eye display apparatus according to claim 1, wherein the polarization-sensitive reflector comprises a nematic liquid crystal layer.

29. An anamorphic near-eye display apparatus according to claim 28, wherein the liquid crystal layer comprises a liquid crystal material arranged between first and second opposing alignment layers.

30. An anamorphic near-eye display apparatus according to claim 28, wherein the component of the optical axis of the liquid crystal layer in the plane of the liquid crystal layer is parallel or orthogonal to the first direction along the extraction waveguide.

31. An anamorphic near-eye display apparatus according to claim 1, wherein the polarization-sensitive reflector comprises a cholesteric liquid crystal layer.

32. An anamorphic near-eye display apparatus according to claim 31, further comprising a polarization conversion retarder arranged between a front guiding surface and the cholesteric liquid crystal retarder, wherein the polarization conversion retarder is arranged to convert a polarization state of light passing therethrough between a linear polarization state and a circular polarization state, and the polarization conversion retarder and the cholesteric liquid crystal layer are arranged in combination to reflect the input linear polarization state of the light guided in the first direction and to transmit the linear polarization state of the light guided in the second direction.

33. An anamorphic near-eye display apparatus according to claim 31, further comprising a polarization conversion retarder arranged between a rear guiding surface and the cholesteric liquid crystal retarder, wherein the polarization conversion retarder is arranged to convert a polarization state of light passing therethrough between a linear polarization state and a circular polarization state.

34. An anamorphic near-eye display apparatus according to claim 1, wherein the extraction waveguide has an input end extending in the lateral and transverse directions, the extraction waveguide being arranged to receive light from the illumination system through the input end.

35. An anamorphic near-eye display apparatus according to claim 34, wherein the input linear polarizer is disposed between the spatial light modulator and the input end of the extraction waveguide.

36. An anamorphic near-eye display apparatus according to claim 34, wherein the direction of the optical axis through the transverse anamorphic component is inclined with respect to the first and second directions along the extraction waveguide.

37. An anamorphic near-eye display apparatus according to claim 34, wherein the input end is inclined with respect to the first and second directions along the extraction waveguide.

38. An anamorphic near-eye display apparatus according to claim 37, wherein the polarization conversion retarder has a retardance of a quarter wavelength at a wavelength of visible light.

39. An anamorphic near-eye display apparatus according to claim 1, wherein the light reversing reflector is a reflective end of the extraction waveguide.

40. An anamorphic near-eye display apparatus according to claim 1, wherein the lateral anamorphic component comprises the light reversing reflector.

41. An anamorphic near-eye display apparatus according to claim 1, wherein the transverse anamorphic component comprises a lens.

42. An anamorphic near-eye display apparatus according to claim 41, wherein the lens of the transverse anamorphic component is a compound lens.

43. An anamorphic near-eye display apparatus according to claim 1, wherein the optical system comprises an input section comprising an input reflector that is the transverse anamorphic component and is arranged to reflect the light from the illumination system and direct it along the extraction waveguide.

44. An anamorphic near-eye display apparatus according to claim 43, wherein the transverse anamorphic component further comprises a lens.

45. An anamorphic near-eye display apparatus according to claim 43, wherein the input section further comprises an input face disposed on a front or rear side of the extraction waveguide and facing the input reflector, and the input section is arranged to receive the light from the illumination system through the input face.

46. An anamorphic near-eye display apparatus according to claim 45, wherein the input face extends at an acute angle to the front guide surface in the case that the input face is on the front side of the extraction waveguide or to the rear guide surface in the case that the input face is on the rear side of the extraction waveguide.

47. An anamorphic near-eye display apparatus according to claim 45, wherein the input face extends parallel to the front guide surface in the case that the input face is on the front side of the extraction waveguide or to the rear guide surface in the case that the input face is on the rear side of the waveguide.

48. An anamorphic near-eye display apparatus according to claim 47, wherein the input face is coplanar with the front guide surface in the case that the input face is on the front side of the extraction waveguide or with the rear guide surface in the case that the input face is on the rear side of the waveguide.

49. An anamorphic near-eye display apparatus according to claim 45, wherein the input face is disposed outwardly of one of the front or rear guide surfaces.

50. An anamorphic near-eye display apparatus according to claim 49, wherein the input section further comprises a separation face extending outwardly from the one of the front or rear guide surfaces to the input face.

51. An anamorphic near-eye display apparatus according to claim 43, wherein the input section is integral with the extraction waveguide.

52. An anamorphic near-eye display apparatus according to claim 43, wherein the extraction waveguide has an end that is an input face through which the extraction waveguide is arranged to receive light from the illumination system, and the input section is a separate element from the extraction waveguide that further comprises an output face and is arranged to direct light reflected by the input reflector through the output face and into the extraction waveguide through the input face of the extraction waveguide.

53. An anamorphic near-eye display apparatus according to claim 1, wherein the pixels of the spatial light modulator are also distributed in the transverse direction so that the light output from the transverse anamorphic component is directed in the directions that are distributed in the transverse direction.

54. An anamorphic near-eye display apparatus according to claim 1, wherein the illumination system further comprises a deflector element arranged to deflect light output from the transverse anamorphic component by a selectable amount, the deflector element being selectively operable to direct the light output from the transverse anamorphic component in the directions that are distributed in the transverse direction.

55. An anamorphic near-eye display apparatus according to claim 1, wherein the spatial light modulator comprises pixels having pitches in the lateral and transverse directions with a ratio that is the same as the inverse of the ratio of optical powers of the lateral and transverse anamorphic optical elements.

56. An anamorphic near-eye display apparatus according to claim 1, further comprising a control system arranged to operate the illumination system to provide light input in accordance with image data representing an image.

57. A head-worn display apparatus comprising an anamorphic near-eye display apparatus according to claim 1 and a head-mounting arrangement arranged to mount the anamorphic near-eye display apparatus on a head of a wearer with the anamorphic near-eye display apparatus extending across at least one eye of the wearer.

58. A head-worn display apparatus according to claim 57, further comprising lenses having optical power, the anamorphic near-eye display apparatus overlying one or each lens.

59. A head-worn display apparatus according to claim 57, wherein the head-worn display apparatus comprises a pair of spectacles.

60. An anamorphic directional illumination device comprising:
- an illumination system comprising a light source array, the illumination system being arranged to output light; and
- an optical system arranged to direct light from the illumination system, wherein the optical system has an optical axis and has anamorphic properties in a lateral direction and a transverse direction that are perpendicular to each other and perpendicular to the optical axis, wherein the light source array comprises light sources distributed in the lateral direction, and the optical system comprises:
- a transverse anamorphic component having positive optical power in the transverse direction, wherein the transverse anamorphic component is arranged to receive light from the light source array and the illumination system is arranged so that light output from the transverse anamorphic component is directed in directions that are distributed in the transverse direction;
- an extraction waveguide arranged to receive light from the transverse anamorphic component;
- a lateral anamorphic component having positive optical power in the lateral direction, the extraction waveguide being arranged to guide light from the transverse anamorphic component to the lateral anamorphic component along the extraction waveguide in a first direction; and
- a light reversing reflector that is arranged to reflect light guided along the extraction waveguide in the first direction to form light that is guided along the extraction waveguide in a second direction opposite to the first direction, wherein:
the extraction waveguide comprises:
a front guide surface;
a polarization-sensitive reflector opposing the front guide surface; and
an extraction element disposed outside the polarization-sensitive reflector,
the extraction element comprising:
a rear guide surface opposing the front guide surface; and
at least one extraction feature;
the anamorphic directional illumination device is arranged to provide light guided along the extraction waveguide in the first direction with an input linear polarization state before reaching the polarization-sensitive reflector; and
the optical system further comprises a polarization conversion retarder disposed between the polarization-sensitive reflector and the light reversing reflector, wherein the polarization conversion retarder is arranged to convert a polarization state of light passing therethrough between a linear polarization state and a circular polarization state, and the polarization conversion retarder and the light reversing reflector are arranged in combination to rotate the input linear polarization state of the light guided in the first direction so that the light guided in the second direction and output from the polarization conversion retarder has an orthogonal linear polarization state that is orthogonal to the input linear polarization state;
the polarization-sensitive reflector is arranged to reflect light guided in the first direction having the input linear polarization state and to pass light guided in the second direction having the orthogonal linear polarization state, so that the front guide surface and the polarization-sensitive reflector are arranged to guide light in the first direction, and the front guide surface and the rear guide surface are arranged to guide light in the second direction; and the at least one extraction feature is arranged to extract light guided along the extraction waveguide in the second direction through the front guide surface;
wherein the polarization conversion retarder has a retardance of a quarter wavelength at a wavelength of visible light.

61. A vehicle external light device comprising an anamorphic directional illumination device according to claim 60.

62. A vehicle external light apparatus comprising: a housing for fitting to a vehicle; and a vehicle external light device according to claim 61 mounted on the housing.

* * * * *